US00RE51043E

(19) United States
(12) Reissued Patent
Agarwal et al.

(10) Patent Number: US RE51,043 E
(45) **Date of Reissued Patent: *Sep. 22, 2026**

(54) COMMUNICATING WITH AND CONTROLLING LOAD CONTROL SYSTEMS

(71) Applicant: Lutron Technology Company LLC, Coopersburg, PA (US)

(72) Inventors: Rhythm Agarwal, Sunnyvale, CA (US); Brad M. Kreschollek, Bethlehem, PA (US); Bryan R. Barnes, Lansdale, PA (US); Christopher M. Green, Austin, TX (US); Rhodes B. Baker, Allentown, PA (US); Jennifer Wong, Breinigsville, PA (US); Gregory S. Altonen, Easton, PA (US); Karelys Alfonzo, Philadelphia, PA (US)

(73) Assignee: Lutron Technology Company LLC, Coopersburg, PA (US)

( * ) Notice: This patent is subject to a terminal disclaimer.

(21) Appl. No.: 18/087,039

(22) Filed: Dec. 22, 2022

Related U.S. Patent Documents

Reissue of:
(64) Patent No.: 10,874,005
Issued: Dec. 22, 2020
Appl. No.: 16/560,931
Filed: Sep. 4, 2019

U.S. Applications:
(60) Provisional application No. 62/726,755, filed on Sep. 4, 2018, provisional application No. 62/789,412, filed on Jan. 7, 2019.

(51) Int. Cl.
*H05B 33/00* (2006.01)
*G05B 15/02* (2006.01)
(Continued)

(52) U.S. Cl.
CPC ..... *H05B 45/20* (2020.01); *G05B 15/02* (2013.01); *G06F 3/04847* (2013.01)

(58) Field of Classification Search
CPC ..... G05B 15/02; H05B 45/20
See application file for complete search history.

(56) References Cited

U.S. PATENT DOCUMENTS 5,926,101 A 7/1999 Dasgupta
6,922,816 B1 7/2005 Amin et al.
(Continued)

FOREIGN PATENT DOCUMENTS

CN 102057753 A 5/2011
CN 106713760 A 5/2017
(Continued)

OTHER PUBLICATIONS

""Application Note Atmel AVR2060: BitCloud ZigBee Light Link Quick Start Guide Atmel 8-bit Microcontrollers Features @Bullet BitCloud? ZigBee?", Light Link package overview @Bullet Instructions for getting started with the package @Bullet Description of the Light Link demo application @Bullet Light, bri" , XP055187354,, Apr. 29, 2013.
(Continued)

*Primary Examiner* — Angela M Lie
(74) *Attorney, Agent, or Firm* — Flaster Greenberg P.C.

(57) ABSTRACT

Systems and methods are disclosed for communicating via a communications network with a load control system of a respective user environment, receiving information on the load control system via the communications network, displaying graphical user interfaces based on the received information, and controlling and configuring the load control system via graphical user interfaces by communicating via the communications network messages the load control system.

55 Claims, 69 Drawing Sheets

(51) Int. Cl.
*H05B 45/20* (2020.01)
*G06F 3/04847* (2022.01)

(56) References Cited

U.S. PATENT DOCUMENTS

| | | | | |
|---|---|---|---|---|
| 9,345,103 | B1 | 5/2016 | Letourneur | |
| 9,655,214 | B1 | 5/2017 | Sooch et al. | |
| 9,674,931 | B1 | 6/2017 | Chen et al. | |
| 9,784,417 | B1 | 10/2017 | Springer | |
| 9,900,957 | B2 | 2/2018 | Van De Ven et al. | |
| 9,980,346 | B2 | 5/2018 | Hidaka et al. | |
| 10,140,732 | B2 | 11/2018 | Maksymczuk et al. | |
| 10,201,060 | B2 | 2/2019 | Hidaka et al. | |
| 10,240,732 | B1 | 3/2019 | Ganick et al. | |
| 10,268,354 | B2 | 4/2019 | Kim et al. | |
| 10,356,883 | B2 | 7/2019 | Ueno et al. | |
| 10,448,486 | B2 | 10/2019 | Baek et al. | |
| 11,968,756 | B2 | 4/2024 | Barnes et al. | |
| 2004/0021694 | A1 | 2/2004 | Doar | |
| 2004/0124338 | A1 | 7/2004 | Cloutier et al. | |
| 2005/0116667 | A1 | 6/2005 | Mueller et al. | |
| 2005/0174473 | A1* | 8/2005 | Morgan et al. | H05B 45/355 348/370 |
| 2005/0285965 | A1 | 12/2005 | Zimmer et al. | |
| 2006/0076908 | A1 | 4/2006 | Morgan et al. | |
| 2009/0180149 | A1 | 7/2009 | Drake et al. | |
| 2009/0244089 | A1 | 10/2009 | Gadd et al. | |
| 2010/0001648 | A1 | 1/2010 | De et al. | |
| 2010/0110672 | A1 | 5/2010 | Durand et al. | |
| 2011/0084614 | A1 | 4/2011 | Sheldon et al. | |
| 2011/0084901 | A1 | 4/2011 | Diederiks | |
| 2011/0248835 | A1 | 10/2011 | Speegle et al. | |
| 2011/0273100 | A1 | 11/2011 | Sloan et al. | |
| 2011/0273107 | A1 | 11/2011 | Hsia et al. | |
| 2012/0306375 | A1 | 12/2012 | Van De Ven | |
| 2012/0320262 | A1 | 12/2012 | Chung | |
| 2013/0076262 | A1 | 3/2013 | Noguchi et al. | |
| 2013/0271004 | A1 | 10/2013 | Jeon et al. | |
| 2013/0286033 | A1* | 10/2013 | Mesaros | G06F 3/03545 345/589 |
| 2014/0070706 | A1* | 3/2014 | Fushimi | H05B 47/10 315/131 |
| 2014/0070707 | A1 | 3/2014 | Nagazoe | |
| 2014/0132180 | A1 | 5/2014 | Ukai | |
| 2014/0298430 | A1* | 10/2014 | Tomasik | G06F 21/316 726/5 |
| 2015/0170584 | A1 | 6/2015 | Casper et al. | |
| 2015/0189723 | A1 | 7/2015 | Ogawa | |
| 2015/0198938 | A1 | 7/2015 | Steele et al. | |
| 2015/0201480 | A1 | 7/2015 | Ogawa | |
| 2015/0351187 | A1 | 12/2015 | Mcbryde et al. | |
| 2016/0007419 | A1 | 1/2016 | Lee et al. | |
| 2016/0026371 | A1 | 1/2016 | Lu et al. | |
| 2016/0132138 | A1 | 5/2016 | Angermayer | |
| 2016/0150616 | A1 | 5/2016 | Bell et al. | |
| 2016/0151117 | A1 | 6/2016 | Gibbs et al. | |
| 2016/0154193 | A1 | 6/2016 | Brukilacchio | |
| 2016/0227629 | A1 | 8/2016 | Conner et al. | |
| 2016/0322817 | A1 | 11/2016 | Baker et al. | |
| 2016/0357430 | A1 | 12/2016 | Migos et al. | |
| 2016/0364206 | A1 | 12/2016 | Keyser-Allen et al. | |
| 2017/0181241 | A1 | 6/2017 | Koo | |
| 2017/0228110 | A1 | 8/2017 | Arora et al. | |
| 2017/0235470 | A1 | 8/2017 | Baluja et al. | |
| 2017/0245340 | A1 | 8/2017 | Chen et al. | |
| 2017/0315704 | A1 | 11/2017 | Shaw et al. | |
| 2017/0354019 | A1* | 12/2017 | Julian | G06F 3/04847 |
| 2018/0066816 | A1* | 3/2018 | Clark | H05B 47/19 |
| 2018/0077770 | A1 | 3/2018 | Sooch et al. | |
| 2018/0116040 | A1 | 4/2018 | Mann et al. | |
| 2018/0160502 | A1 | 6/2018 | Casey et al. | |
| 2018/0235039 | A1 | 8/2018 | Krajnc et al. | |
| 2018/0314412 | A1 | 11/2018 | Nakauchi et al. | |
| 2018/0352628 | A1 | 12/2018 | Crosbie et al. | |
| 2018/0364665 | A1 | 12/2018 | Clymer et al. | |
| 2019/0014638 | A1 | 1/2019 | Weaver et al. | |
| 2019/0024853 | A1 | 1/2019 | Petluri et al. | |
| 2019/0034043 | A1 | 1/2019 | Zolotykh et al. | |
| 2019/0086046 | A1 | 3/2019 | Ganick et al. | |
| 2019/0208599 | A1 | 7/2019 | Darton et al. | |
| 2019/0230768 | A1 | 7/2019 | Kamp et al. | |
| 2019/0254142 | A1 | 8/2019 | Petluri et al. | |
| 2019/0266977 | A1 | 8/2019 | Ward et al. | |
| 2020/0026420 | A1 | 1/2020 | Sicard | |
| 2020/0092968 | A1 | 3/2020 | Sun et al. | |
| 2021/0232624 | A1 | 7/2021 | Mckenzie | |
| 2024/0080953 | A1* | 3/2024 | Broekman | H05B 47/1985 |

FOREIGN PATENT DOCUMENTS

| | | | |
|---|---|---|---|
| CN | 106958746 | A | 7/2017 |
| CN | 107926091 | A | 4/2018 |
| CN | 108029179 | A | 5/2018 |
| CN | 108260264 | A | 7/2018 |
| CN | 108713350 | A | 10/2018 |
| CN | 109315050 | A | 2/2019 |
| CN | 109952812 | A | 6/2019 |
| EP | 3099143 | A1 | 11/2016 |
| EP | 3099143 | B1 | 3/2020 |
| KR | 20170099048 | A | 8/2017 |
| WO | WO2007033667 | A1 | 3/2007 |
| WO | 2012131544 | A1 | 10/2012 |
| WO | 2018052572 | A1 | 3/2018 |

OTHER PUBLICATIONS

"Lutron Q-Control+ on the App Store (apple.com)", retrieved from the internet: https://apps.apple.com/us/app/lutron-q-control/id575728994, 3 pages.

Callahan, Kerri , et al., "Museum Lighting Symposium & Workshops", Retrieved from the Internet: URL:https://discovery.ucl.ac.uk/10048078//1/book-of-abstracts2.pdf; retrieved on Oct. 19, 2020, Sep. 12, 2017, pp. 67-69.

Deng-Feng , et al., "Design of intelligent lighting control system", 2011 IEEE International Conference on Cyber Technology in Automation, Control, and Intelligent Systems, 2011, doi: 10.1109/CYBER.2011.6011779., accessed Dec. 13, 2021) (Year: 2011), 2011, pp. 134-137.

Ren, Hui , et al., "Study on LED Color Mixing for Stage Lighting Based on Locus Fitting of Blackbody", IEEE 3rd International Conference on Cloud Computing and Internet of Things (CCIOT), 2018, accessed Dec. 12, 2021). Year: 2018), 2018, 5 pages.

"Application Note Atmel AVR2060: BitCloud ZigBee Light Link Quick Start Guide Atmel 8-bit Microcontrollers Features @BULLET BitCloud? ZigBee? Light Link package overview @BULLET Instructions for getting started with the package @BULLET Description of the Light Link demo application @BULLET Light, bri", Apr. 29, 2013 (Apr. 29, 2013), XP055187354, Retrieved from the Internet: URL: http://www.atmel.com/Images/Atmel-42004-AVR2060-BitCloud-ZLL-Quick-Start-Guide_Application-note.pdf [retrieved on May 5, 2015] the whole document in particular.

* cited by examiner

COMMUNICATING WITH AND CONTROLLING LOAD CONTROL SYSTEMS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application *is a broadening reissue of U.S. Pat. No. 10,874,005, issued Dec. 22, 2020, which corresponded to U.S. patent application Ser. No. 16/560,931, filed Sep. 4, 2019, and which* claims the benefit of U.S. Provisional Patent Application No. 62/726,755, filed Sep. 4, 2018, and the benefit of U.S. Provisional Patent Application No. 62/789,412, filed Jan. 7, 2019, each of which is hereby incorporated by reference herein in its entirety.

BACKGROUND

A user environment, such as a residence, an office building, or a hotel for example, may be configured to include various types of load control systems. For example, a lighting control system may be used to control the lighting loads in the user environment. A motorized window treatment control system may be used to control the natural light provided to the user environment. A heating, ventilating, and air conditioning (HVAC) system may be used to control the temperature in the user environment.

SUMMARY

It may be desirable to communicate with and control load control systems from a network device.

As on example, an apparatus may include a display screen, a communications circuit, and at least one processor, and may further include at least one tangible memory device communicatively coupled to the at least one processor. The at least one tangible memory device may have software instructions stored thereon that when executed by the at least one processor may direct the at least one processor to receive via the communications circuit from a communications network information communicated by a controller. The controller may be configured to communicate with a lighting control device. The lighting control device may be configured to control a lighting load. The lighting load may include a plurality of light emitting diodes (LEDs) including a red diode, a green diode, and a blue diode and may be configured to produce any of a plurality of different colors through the plurality of LEDs. The information may include an indication of a color the lighting load is configured to presently produce. The software instructions, when executed by the at least one processor, may further direct the at least one processor to display on the display screen a graphical user interface that includes an on-off actuator to turn the lighting load on and off, a dimming actuator to change an intensity of the lighting load, a warm-cool actuator to configure the lighting load to produce a color on a black body curve, and a full-color actuator to configure the lighting load to produce a color within a color gamut formed by the plurality LEDs that make up the lighting load. The software instructions, when executed by the at least one processor, may further direct the at least one processor to display with the on-off actuator in the graphical user interface an indicator that indicates the color the lighting load is configured to presently produce.

The above advantages and features are of representative embodiments only. They are not to be considered limitations. Additional features and advantages of embodiments will become apparent in the following description, from the drawings, and from the claims.

BRIEF DESCRIPTION OF THE DRAWINGS

[The patent or application file contains at least one drawing executed in color. Copies of this patent or patent application publication with color drawing(s) will be provided by the Office upon request and payment of the necessary fee.]

DETAILED DESCRIPTION

Figure 1:
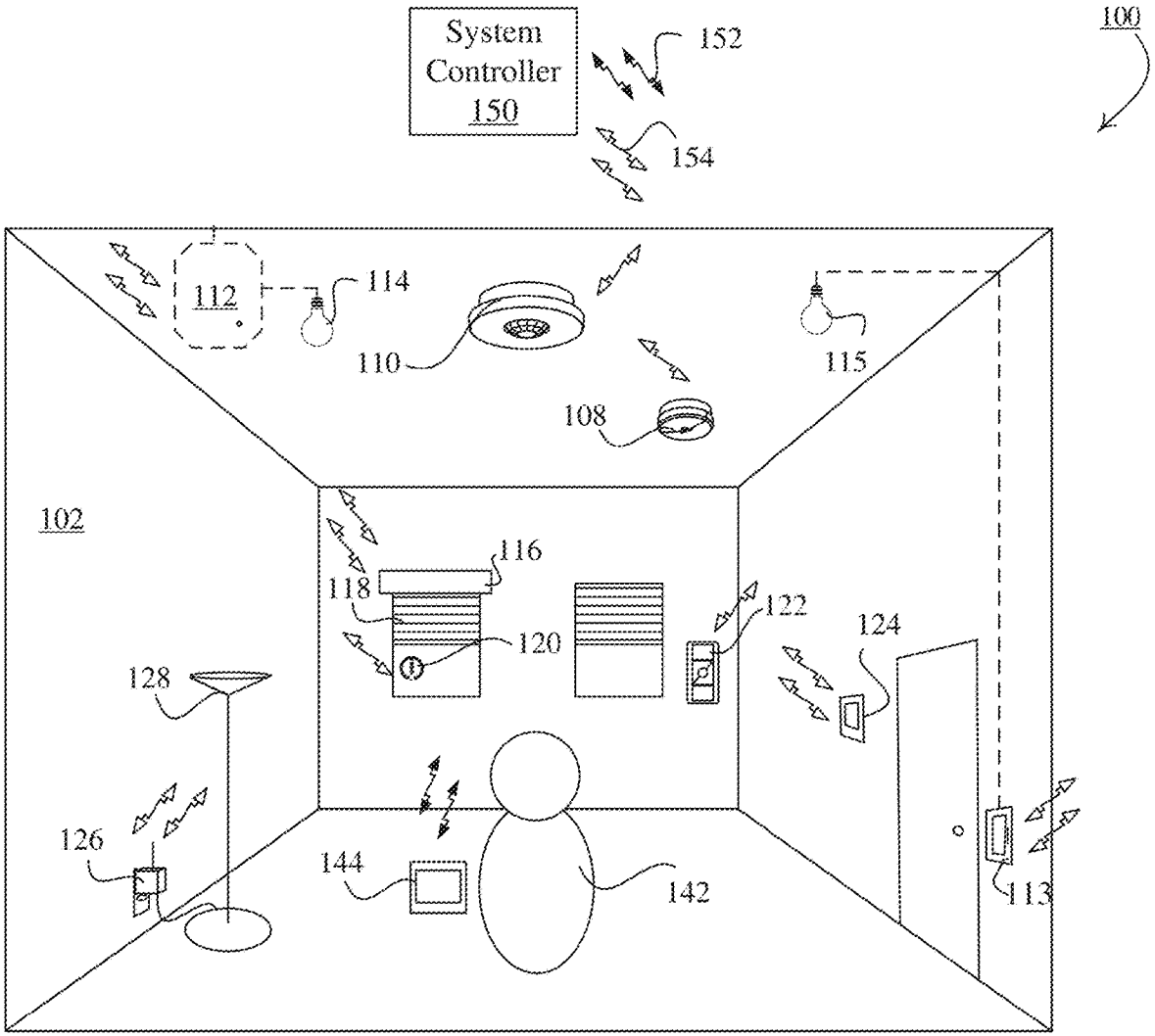
FIG. 1 is a system diagram that illustrates an example load control system that includes control-devices.

FIG. 1 shows a high-level diagram of an example load control system 100. Load control system 100 may include a system controller 150 and load control devices for controlling (e.g., directly and/or indirectly) one or more electrical loads in a user environment 102 (also referred to herein as a load control environment). Example user environments/load control environments 102 may include one or more rooms of a home, one or more floors of a building, one or rooms of a hotel, etc. As one example, load control system 100 may enable the automated control of lighting systems, shades, and heating, ventilating, and air conditioning (HVAC) systems in the user environment, among other electrical loads.

The load control devices of load control system 100 may include a system controller 150, control-source devices (e.g., elements 108, 110, 120, and 122 discussed below), and control-target devices (e.g., elements 112, 113, 116, 124, and 126 discussed below) (control-source devices and control-target devices may be individually and/or collectively referred to herein as load control devices and/or control devices). The system controller 150, the control-source devices, and the control-target devices may be configured to communicate (transmit and/or receive) messages, such as digital messages (although other types of messages may be communicated), between one another using wireless signals 154 (e.g., radio-frequency (RF) signals), although wired communications may also be used. "Digital" messages will be used herein for discussion purposes only.

The control-source devices may include, for example, input devices that are configured to detect conditions within the user environment 102 (e.g., user inputs via switches, occupancy/vacancy conditions, changes in measured light intensities, and/or other input information) and in response to the detected conditions, transmit digital messages to control-target devices that are configured to control electrical loads in response to instructions or commands received in the digital messages. The control-target devices may include, for example, load control devices that are configured to receive digital messages from the control-source devices and/or the system controller 150 and to control respective electrical loads in response to the received digital messages. A single control device of the load control system 100 may operate as both a control-source device and a control-target device.

According to one example, the system controller 150 may be configured to receive the digital messages transmitted by the control-source devices, to interpret these messages based on a configuration of the load control system, and to then transmit digital messages to the control-target devices for the control-target devices to then control respective electrical loads. In other words, the control-source devices and the control-target device may communicate via the system controller 150. According to another and/or additional example, the control-source devices may directly communicate with the control-target devices without the assistance of the system controller 150. The system controller may still monitor such communications. According to a further and/or additional example, the system controller 150 may originate and then communicate digital messages with control-source devices and/or control-target devices. Such communications by the system controller 150 may include programming/configuration data (e.g., settings) for the control devices, such as configuring scene buttons on light switches. Communications from the system controller 150 may also include, for example, messages directed to control-target devices and that contain instructions or commands for the control-target devices to control respective electrical loads in response to the received messages. For example, the system controller 150 may communicate messages to change light levels, to change shade levels, to change HVAC settings, etc. These are examples and other examples are possible.

Communications between the system controller 150, the control-source devices, and the control-target devices may be via a wired and/or wireless communications network as indicated above. One example of a wireless communications network may be a wireless LAN where the system controller, control-source devices, and the control-target devices may communicate via a router, for example, that is local to the user environment 102. For example, such a network may be a standard Wi-Fi network. Another example of a wireless communications network may be a point-to-point communications network where the system controller, control-source devices, and the control-target devices communicate directly with one another using, for example, Bluetooth, Wi-Fi Direct, a proprietary communication channel, such as CLEAR CONNECT™, etc. to directly communicate. Other network configurations may be used such as the system controller acting as an access point and providing one or more wireless/wired based networks through which the system controller, the control-source devices, and the control-target devices may communicate.

For a control-target device to be responsive to messages from a control-source device, the control-source device may first need to be associated with the control-target device. As one example of an association procedure, a control-source device may be associated with a control-target device by a user 142 actuating a button on the control-source device and/or the control-target device. The actuation of the button on the control-source device and/or the control-target device may place the control-source device and/or the control-target device in an association mode for being associated with one another. In the association mode, the control-source device may transmit an association message(s) to the control-target device (directly or through the system controller). The association message from the control-source device may include a unique identifier of the control-source device. The control-target device may locally store the unique identifier of the control-source, such that the control-target device may be capable of recognizing digital messages (e.g., subsequent digital messages) from the control-source device that may include load control instructions or commands. The control-target device may be configured to respond to the digital messages from the associated control-source device by controlling a corresponding electrical load according to the load control instructions received in the digital messages. This is merely one example of how control devices may communicate and be associated with one another and other examples are possible. According to another example, the system controller 150 may receive configuration instructions from a user that specify which control-source devices should control which control-target devices. Thereafter, the system controller may communicate this configuration information to the control-source devices and/or control-target devices.

As one example of a control-target device, load control system 100 may include one or more lighting control devices, such as the lighting control devices 112 and 113. The lighting control device 112 may be a dimmer, an electronic switch, a ballast, a light emitting diode (LED) driver, and/or the like. The lighting control device 112 may be configured to directly control an amount of power provided to a lighting load(s), such as lighting load 114. The lighting control device 112 may be configured to wirelessly receive digital messages via signals 154 (e.g., messages originating from a control-source device and/or the system controller 150), and to control the lighting load 114 in response to the received digital messages. One will recognize that lighting control device 112 and lighting load 114 may be integral and thus part of the same fixture or may be separate.

The lighting control device 113 may be a wall-mounted dimmer, a wall-mounted switch, or other keypad device for controlling a lighting load(s), such as lighting load 115. The lighting control device 113 may be adapted to be mounted in a standard electrical wall box. The lighting control device 113 may include one or more buttons for controlling the lighting load 115. The lighting control device 113 may include a toggle actuator. Actuations (e.g., successive actuations) of the toggle actuator may toggle (e.g., turn off and on) the lighting load 115. The lighting control device 113 may include an intensity adjustment actuator (e.g., a rocker switch or intensity adjustment buttons). Actuations of an upper portion or a lower portion of the intensity adjustment actuator may respectively increase or decrease the amount of power delivered to the lighting load 115 and thus increase or decrease the intensity of the receptive lighting load from a minimum intensity (e.g., approximately 1%) to a maximum intensity (e.g., approximately 100%). The lighting control device 113 may include a plurality (two or more) of visual indicators, e.g., light-emitting diodes (LEDs), which may be arranged in a linear array and that may illuminate to provide feedback of the intensity of the lighting load 115.

The lighting control device 113 may be configured to wirelessly receive digital messages via wireless signals 154 (e.g., messages originating from a control-source device and/or the system controller 150). The lighting control device 113 may be configured to control the lighting load 115 in response to the received digital messages.

The load control system 100 may include one or more other control-target devices, such as a motorized window treatment 116 for directly controlling the covering material 118 (e.g., via an electrical motor); ceiling fans; a table top or plug-in load control device 126 for directly controlling a floor lamp 128, a desk lamp, and/or other electrical loads that may be plugged into the plug-in load control device 126; and/or a temperature control device 124 (e.g., thermostat) for directly controlling an HVAC system (not shown). The load control system 100 may also, or alternatively, include an audio control device (e.g., a speaker system) and/or a video control device (e.g., a device capable of streaming video content). Again, these devices may be configured to wirelessly receive digital messages via wireless signals 154 (e.g., messages originating from a control-source device and/or the system controller 150). These devices may be configured to control respective electrical loads in response to the received digital messages.

Control-target devices, in addition to being configured to wirelessly receive digital messages via wireless signals and to control respective electrical loads in response to the received digital messages, may also be configured to wirelessly transmit digital messages via wireless signals (e.g., to the system controller 150 and/or an associated control device(s)). A control-target device may communicate such messages to confirm receipt of messages and actions taken, to report status (e.g., light levels), etc. Again, control-target devices may also or alternatively communicate via wired communications.

With respect to control-source devices, the load control system 100 may include one or more remote-control devices 122, one or more occupancy sensors 110, one or more daylight sensors 108, and/or one or more window sensors 120. The control-source devices may wirelessly send or communicate digital messages via wireless signals, such as signals 154, to associated control-target devices for controlling an electrical load. The remote-control device 122 may send digital messages for controlling one or more control-target devices after actuation of one or more buttons on the remote-control device 122. One or more buttons may correspond to a preset scene for controlling the lighting load 115, for example. The occupancy sensor 110 may send digital messages to control-target devices in response to an occupancy and/or vacancy condition (e.g., movement or lack of movement) that is sensed within its observable area. The daylight sensor 108 may send digital messages to control-target devices in response to the detection of an amount of light within its observable area. The window sensor 120 may send digital messages to control-target devices in response to a measured level of light received from outside of the user environment 102. For example, the window sensor 120 may detect when sunlight is directly shining into the window sensor 120, is reflected onto the window sensor 120, and/or is blocked by external means, such as clouds or a building. The window sensor 120 may send digital messages indicating the measured light level. The load control system 100 may include one or more other control-source devices. Again, one will recognize that control-source devices may also or alternatively communicate via wired communications.

Turning again to the system controller 150, it may facilitate the communication of messages from control-source devices to associated control-target devices and/or monitor such messages as indicated above, thereby knowing when a control-source device detects an event and when a control-target device is changing the status/state of an electrical load. It may communicate programming/configuration information to the control devices. It may also be the source of control messages to control-target devices, for example, instructing the devices to control corresponding electrical loads. As one example of the later, the system controller may run one or more time-clock operations that automatically communicates messages to control-target devices based on configured schedules (e.g., commands to lighting control device 113 to adjust light 115, commands to motorized window treatment 116 for directly controlling the covering material 118, etc.) For description purposes only, shades will be used herein to describe functions and features related to motorized window treatments. Nonetheless, one will recognize that features and functions described herein are applicable to other types of window coverings such as drapes, curtains, blinds, etc. Other examples are possible.

According to a further aspect of load control system 100, the system controller 150 may be configured to communicate with one or more network devices 144 in use by a user(s) 142, for example. The network device 144 may include a personal computer (PC), a laptop, a tablet, a smart phone, or equivalent device. The system controller 150 and the network device 144 may communicate via a wired and/or wireless communications network. The communications network may be the same network used by the system controller and the control devices, or may be a different network (e.g., a wireless communications network using wireless signals 152). As one example, the system controller 150 and the network device 144 may communicate over a wireless LAN (e.g., that is local to the user environment 102). For example, such a network may be a standard Wi-Fi network provided by a router local to the user environment 102. As another example, the system controller 150 and the network device 144 may communicate directly with one-another using, for example, Bluetooth, Wi-Fi Direct, etc.

Other examples are possible such as the system controller acting as an access point and providing one or more wireless/wired based networks through which the system controller and network device may communicate.

In general, the system controller 150 may be configured to allow a user 142 of the network device 144 to determine, for example, the configuration of the user environment 102 and load control system 100, such as rooms in the environment, which control devices are in which rooms (e.g., the location of the control devices within the user environment, such as which rooms), to determine the status and/or configuration of control devices (e.g., light levels, HVAC levels, shade levels), to configure the system controller (e.g., to change time clock schedules), to issue commands to the system controller in order to control and/or configure the control devices (e.g., change light levels, change HVAC levels, change shade levels, change presets, etc.), etc. Other examples are possible.

The load control system 100 of FIG. 1 may be configured such that the system controller 150 is only capable of communicating with a network device 144 when that device is local to the system controller, in other words, for the two to directly communicate in a point-to-point fashion or through a local network specific to the user environment 102 (such as a network provided by a router that is local to the user environment). It may be advantageous to allow a user of network device 144 to communicate with the system controller 150 and to control the load control system 100 from remote locations, such as via the Internet or other public or private network. Similarly, it may be advantageous to allow third-party integrators to communicate with the system controller 150 in order to provide enhanced services to users of user environment 102. For example, a third-party integrator may provide other systems within user environment 102. It may be beneficial to integrate such systems with load control system 100.

Figure 2:
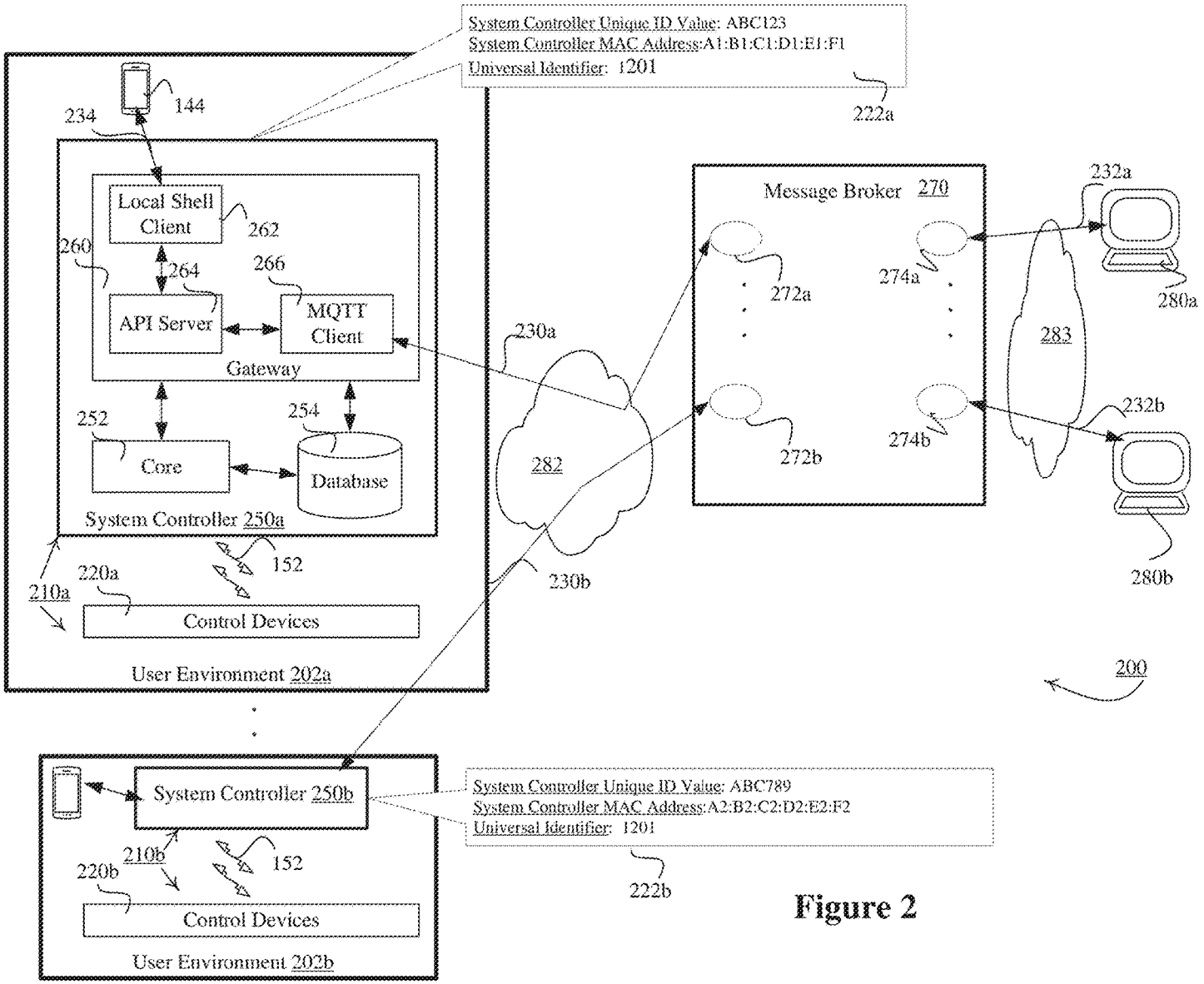
FIG. 2 is a system diagram that illustrates a system for communicating with and controlling a load control system using messaging based interfaces.

Referring now to FIG. 2 there is shown an example system 200. System 200 may include one or more user environments as represented by user environments 202a and 202b. More specifically, system 200 may be configured to support numerous user environments, with only two user environments 202a and 202b shown to assist in describing system 200. Each user environment may be substantially the same, each including a respective load control system 210a and 210b that includes a respective system controller 250a and 250b and respective control devices 220a and 220b (e.g., control-source devices and/or control-target devices). In general, the system controller 250a and 250b and control devices 202a and 202b of load control systems 210a and 210b may functionally operate similar to system controller 150 and the control devices as discussed with respect to FIG. 1. Each user environment 202a and 202b of system 200 may differ in that the user environments may be owned by different entities. For example, each user environment may be a residential home owned by respectively different users/homeowners, may be a business, etc. or come combination thereof. For description purposes only, user environments 202a and 202b may be referred to herein as residential homes that are owned/rented by home-owners. Hence, each user environment may include different control devices and different configurations of these control devices and system controllers. In this fashion, system 200 may include numerous different homes, for example. As compared to load control system 100, system 200 may include systems for a user and/or third party to interface with a load control system 210a/210b from a location remote from the respective user environments 202a/202b, such as over the Internet or other private or public network.

As indicated, each user environment 202a and 202b of system 200 may include a respective system controller 250a and 250b (although a user environment may include more than one system controller) and control devices, collectively represented as elements 220a and 220b (again, system controller 250a and control devices 220a may make up load control system 210a, and system controller 250b and control devices 220b may make up load control system 210b). System 200 may also include one or more message brokers 270 and one or more network devices 280a and 280b. Network devices 280a and 280b may represent computing devices in use by respective users of respective user environments 202a and 202b. For example, network device 280a may be a device (e.g., a phone, PC, a laptop, a tablet, a smart phone, or equivalent device) in use by a home-owner of user environment 202a, and network device 280b may be a device (e.g., a phone, etc.) in use by a home-owner of user environment 202b. As another and/or additional example, network devices 280a and 280b may be third-party integrators that provide services to respective users/home-owners of user environments 202a and 202b. Here, network devices 280a and 280b may each be one or more computing servers for example. Again, system 200 may include numerous network devices 280a and 280b, with only two being shown for description purposes. According to system 200, network devices 280a and 280b may be remote from the user environments (e.g., not located within the user environments). Nonetheless, network devices 280a and 280b may also be local to the user environments (e.g., located within the user environments) and communicate with system controllers 250a and/or 250b using the message broker 270 as described below.

System 200 may also include networks 282 and 283, which may include private and/or public networks, such as the Internet. Networks 282 and 283 may at least in part be the same network. In general, system controllers 250a and 250b may be configured to communicate via network 282 with message broker 270, and each network device 280a and 280b may be configured to communicate via network 283 with the message broker 270. Through the use of the message broker 270 and other mechanisms described herein, a network device 280a, for example, may communicate with a system controller 250a of user environment 202a, for example, and interact with the control devices 220a of that environment. As one example of system 200, a user may use network device 280a to communicate with system controller 250a and through these communications, may determine, for example, the configuration of the load control system 210a/user environment 202a (e.g., such as rooms in the environment and the location of the control devices within the user environment, such as which rooms), to determine the status and/or configuration of control devices 220a (e.g. light levels, HVAC levels, shade levels), to configure the system controller 250a (e.g., to change time clock schedules), to issue commands to the system controller 250a to control and/or configure the control devices 220a (e.g., change light levels, change HVAC levels, change shade levels, change presets, etc.). These are merely examples. As another example, a network device 280a that is operated by a third-party integrator may communicate with system controller 250a to determine the status of and to control the load control system 210a (as described herein), and to also use this functionality to integrate the features of load control system 210a with features of another system in the user environment 202a that the third-party integrator may have control over. As one example, a third-party integrator may be a home security provider and in response to detecting an issue in the user environment 202a through a system provided by the third-party integrator (e.g., an alarm system), instruct the system controller 250a to actuate lights in the user environment. Other examples are possible. For example, a third-party integrator may provide one or more voice/speaker-based devices that are located in the user environment 202a. A user may audibly interface with such a device (e.g., through voice commands) which in turn may communicate with a network device 280a (e.g., a computing server of the third-party integrator). Network device 280a may in turn communicate with system controller 250a to control the load control system 210a based on how the user interfaced with the voice/speaker-based device. Alternatively, network device 280a may communicate with system controller 250a to determine the status of the load control system 210a and in turn may communicate with the voice/speaker-based device to audibly report the status to the user. Again, this is one example. In similar fashions, users and third-party integrators may communicate with any user environment of system 200.

Referring more specifically now to system controller 250a (system controller 250b may be similarly configured), it may include one or more general purpose processors, special purpose processors, conventional processors, digital signal processors (DSPs), microprocessors, microcontrollers, integrated circuits, programmable logic devices (PLD), field programmable gate arrays (FPGA), application specific integrated circuits (ASICs), or any suitable controller or processing device or the like (not shown) (hereinafter collectively referred to as processor(s)), for example. The processor(s) of system controller 250a may be configured to execute one or more software-based applications and/or firmware based modules that include instructions that when executed by the processor(s), may configure the processor(s) to perform signal coding, data processing, input/output processing, or any other functions and/or features of the system controller as described herein. These features and functions are represented in part by modules 252 and 260 in FIG. 2, which are further described below. Modules 252 and 260 may execute as one or more software-based processes, for example. One will also recognize that features, functions, and processes described herein may also and/or alternatively be provided by hardware in addition to and/or as an alternative to software-based instructions and processes. System controller 250a may also include one or more memory modules/devices (including volatile and non-volatile memory modules/devices) that may be communicatively coupled to the processor(s). The memory modules/devices may be implemented as one or more external integrated circuits (IC) and/or as one or more internal circuits of the processor(s). The one or more memory modules/devices may store the software-based applications and may also provide an execution space as the processors execute the applications. System controller 250a may also include one or more communication interfaces/transceivers/network interface devices (not shown) communicatively coupled to the processors and/or memory devices/modules. The communication interfaces may allow system controller 250a to communicate over one or more wired and/or wireless communication networks. As one example, the communication interfaces may allow system controller 250a to communicate wirelessly with control devices 220a as similarly described for load control system 100. The communication interfaces may also allow the system controller 250a to communicate wirelessly and/or via a wired connection(s) with a router (not shown), for example, that is local to user environment 202a and that provides the user environment with a local network. Through this local network, the system controller 250a may communicate with a network device 144 that is local to the user environment 202a, and may also communicate and with network 282 (such as through an Internet service provider, not shown). System controller 250a may also include one or more databases 254 as further described herein. These databases may be flat databases, relational/SQL databases, NoSQL/non SQL databases, and/or a time series databases, etc., although any form of database(s) may be used. System controller 250a may also include one or more user interfaces such a display monitor, keyboard, mouse, speakers, audio receivers, etc. While system controller 250a is shown as having example modules 252 and 260 and example database 254, the system controller may include fewer, other, and/or additional modules and databases.

Referring more specifically to modules 252 and 260 and to database 254, database 254 may maintain configuration information of the load control system 250a. This information may include, for example, the control devices 220a of the load control system, the configuration of the user environment 202a such as rooms in the environment, which control devices 220a are in which rooms, communication addresses of the control devices needed to communicate with the devices, which control-source devices may be controlled by/associated with which control-target devices, configuration information of the control devices (e.g., button scene configurations, occupancy/vacancy sensor configurations, etc.), system configurations such as time clock schedules, etc. The database may also maintain status information of the control devices (e.g., error conditions, light levels, shade levels, HVAC levels, power consumption levels, etc.). The database may also maintain event-based information, as referred to below, which may include a record of events as they occur within the system. These are merely examples, and other and/or additional or less information may be possible.

Module 252 may be referred to herein as the core module or core 252 for description purposes and may be configured to execute as one or more software based processes. Core 252 may be configured to act as a communications module between the control devices 220a and the system controller, assisting in and/or monitoring communications between control-source devices and control-target devices and storing related information in database 254. This information may include, for example, changes to which control-source devices are associated with which control-target devices. The information may also include event-based information, such as (i) events detected by control-source devices (e.g., occupancy/vacancy as detected by sensor 110, light levels as detected by sensors 108 and 120, detection of buttons actuated on remote control devices 113 or wall panels/switches 113, etc.), (ii) commands communicated by control-source devices to control-target devices to alter settings based on detected events (e.g., changes to light levels, shade levels, HVAC levels, etc.), and (iii) commands from control-target devices indicting/confirming altered settings. Core 252 may receive status messages directly from control devices, such as error conditions, light levels, shade levels, HVAC levels, power consumption levels, occupancy/vacancy conditions, etc. and store such information in database 254. Core 252 may also run time clock schedules, and communicate messages to the control devices in accordance with those schedules. Again, core 252 may store such changes to the control devices and/or acknowledgements from the control devices in database 254. Core 252 may also communicate information/messages to module 260 (which may be referred to as the gateway module or gateway 260 for description purposes) as described below. Core 252 may receive messages from the gateway 260 that may result in the core changing configuration parameters of the system controller (e.g., time clock settings), or communicating messages to the control devices (such as changes to light levels), or adjusting configuration/operating parameters of the control devices (e.g., change scene buttons on switch buttons, occupancy/vacancy sensor configurations), etc. Core 252 may respond back to the gateway 260 after it performs such operations. Core 252 may also receive from the gateway 260 requests for any of the information stored in the database 254 as discussed above, and report that information back to the gateway. These are examples and core 252 may perform other and/or additional functions and operations.

Turning to gateway 260, it may be configured to act as an interface between the system controller 250a and external devices, such as local network device 144 situated in the user environment 202a and remote network devices 280a and 280b. For example, gateway 260 may receive messages from network device 144 and/or network devices 280a and/or 280b and route those messages within the system controller 250a, such as to core 252 for execution. Gateway 260 may also receive responses to such messages, such as from core 252, and route them back to the network devices 144, 280a and/or 280b. Gateway 260 may also receive, for example, status and event based information, such as from core 252, and route that information to network devices 144, 280a and/or 280b. These are examples and other examples are possible. To perform such functions and operations, gateway 260 may include an API (application programming interface) server 264, a local shell client (also referred to herein as shell client) 262, and an MQTT (message queue telemetry transport) client 266. Each of the API server 264, the local shell client 262, and the MQTT client 266 may operate as one or more software based processes within the system controller 250a, although other configurations are possible. One will recognize that the names API server, local shell client, and MQTT client as used herein are for description purposes only.

Local shell client 262 may be configured to function or operate as an interface point to network devices 144 that are local to the system controller 250a (e.g., that are on the same local network as the system controller and/or are located in within user environment 202a). Local shell client 262 may be configured to support a communications connection 234 with network device 144. This connection may be, for example, a TCP/IP (transmission control protocol/internet protocol) or UDP/IP (user datagram protocol) based connection, although other connections may be used. Local shell client 262 may provide a shell type interface (e.g., a command-line type interface) to network device 144 over the connection. The interface may be a secure shell interface (e.g., use the secure shell (SSH) protocol). One will recognize that while local shell client 262 is described herein as an interface point to network devices 144 that are local to the system controller 250a, a network device that is on a different network as the system controller (i.e., not on the same local network as the system controller) and/or not located in within user environment 202a may also use local shell client 262 to communicate with the system controller.

MQTT client 266 may be configured to function or operate as an interface point to the message broker 270 and therefore as an interface point to network devices 280a and 280b that are remote to the system controller 250a. MQTT client 266 may support a communications connection 230a with the message broker 270. This connection may be, for example, a TCP/IP based connection although other connections may be used. On top of this connection the MQTT client 266 may support the MQTT publish-subscribe-based messaging protocol, for example, with the message broker 270, with the MQTT client 266 acting as a client to the broker. As further described below, MQTT client 266 may send messages out of the system controller to the message broker and thus to network devices 280a and/or 280b by publishing messages to one or more defined topics, as that term is used in messaging based protocols. Similarly, MQTT client 266 may receive messages from the message broker that originate from network devices 280a and/or 280b, for example, by subscribing to one or more defined topics.

The system controller 250a may support an application programming interface (API) that may include set of well-defined commands and responses (generically referred to herein as and API or as "API messages") to interact with network devices 144, 280a and/or 280b. Service-based applications (e.g., software-based applications) provided by or that execute on the network devices 144, 280a, and/or 280b may use the API to interact with the system controller. API server 264 may operate as a point of origination and termination within the system controller 250a for these communications. For example, a network device 144, 280a, and/or 280b may execute one or more software-based applications that provide a defined set of services to a user. These services may be based at least in part on interactions with system controller 250a. For example, network device 144 may provide a software-based application to a user that allows a user to control lights or shades within the user environment 202a. Similarly, network device 280a may provide a software-based application to a user that allows a user to control lights or shades from a location external to the user environment. As another example, network device 280a may provide an alarm based service as described above.

To provide such services, the network devices may use the API of the system controller 250a to communicate API messages to the system controller 250a. For example, network device 144 may communicate an API message to local shell client 262, which may then forward that message to the API server 264 which may then interpret and execute the message. Similarly, network device 280a may communicate an API message through the message broker 270 to the MQTT client 266, which may then forward that message to the API server 264 which may then interpret and execute the message. To execute/interpret an API message, the API server 264 may communicate the message (or a translated form of the message) to core 252 to provide/execute the message, the API server may communicate with database 254 to retrieve and/or store information, and/or the API server may handle the message itself. Other examples are possible.

Similarly, to provide such services, the system controller 250a may communicate API messages to the network devices 144, 280a, and/or 280b. For example, core 252 may communicate information that is intended for the network devices by sending that information to the API server 264. This information may include responses to or results from messages received from the network devices and executed by core 252 (e.g., messages to control the control devices 220a). This information may include information core 252 retrieves from database 254 in response to messages received from the network devices. Similarly, API server 264 may retrieve information directly from database 254 in response to messages received from the network devices. As API server 264 receives information from core 252 and/or database 254, for example, it may format that information according to an appropriate API message(s) and then forward the messages to local shell client 262 for forwarding to network device 144, and/or forward the messages to MQTT client 266 for forwarding to the message broker 270 and to network devices 280a and/or 280b. Other examples are possible.

With respect to information flowing out of the system controller 250a to the network devices 144, 280a, and/or 280b, in some instances, the information may be responsive to messages received from the network devices, as indicated above. In some cases, API server 264 may communicate such responsive messages to both local shell client 262 and MQTT client 266, regardless of where the original message originated (i.e., from a network device via local shell client 262 or a network device via MQTT client 266). In other cases, the API server may forward the response messages to only one or the other of the local shell client 262 and MQTT client 266, depending on which interface the original message originated.

According to a further aspect of system controller 250a, core 252 may constantly report to API server 264 status and/or event based information that originates from within the load control system 210a. For example, the core 252 (i) may report to API server 264 events detected by control-source devices from within the user environment 202a (e.g., occupancy/vacancy as detected by sensor 110, light levels as detected by sensors 108 and 120, detection of buttons actuated on remote control devices 113 or wall panels/switches 113, etc.), (ii) may report to API server 264 changes in the states of the electrical loads (e.g., changes to light levels, shade levels, HVAC/thermostat levels/readings, etc.) that may result from messages from control-source devices, and (iii) may report to API server 264 changes in the states of the electrical loads due to time clock events, for example. The core 252 may also report to API server 264 changes to the configuration of the load control system, such as the addition of new control devices, the changing of or creation of associations between control-source and control-target devices, etc. In general, any such information the API server 264 receives from core 252, API server 264 may forward as an API message to local shell client 262 and/or MQTT client 266 for forwarding to network device 144 and the message broker 270 and thus network devices 280a and/or 280b. In this fashion, network devices may be kept apprised of the state of the load control system 210a in a "real-time" fashion without having to query the load control system for its state.

Referring now more specifically to MQTT client 266, the message broker 270 (note that one message broker 270 is shown in FIG. 2; nonetheless, one will recognize that system 200 may include multiple message brokers), and the network devices 280a and 280b, each network device 280a and 280b may include a client process that supports a respective connection 232a and 232b (e.g., a TCP/IP connection, although other connections may be used) with the message broker 270, and that may support over this connection the MQTT publish-subscribe-based messaging protocol with the message broker, for example. The message broker 270 may be one or more computing devices (e.g., one or more computing servers) that function as an MQTT message broker, supporting the MQTT publish-subscribe messaging protocol, for example. The computing devices of message broker 270 may include one or more general purpose processors, special purpose processors, conventional processors, digital signal processors (DSPs), microprocessors, microcontrollers, integrated circuits, programmable logic devices (PLD), field programmable gate arrays (FPGA), application specific integrated circuits (ASICs), or any suitable controller or processing device or the like (hereinafter collectively referred to as processor(s)) (not shown), for example. The processor(s) of message broker 270 may be configured to execute one or more software-based applications and/or firmware based modules that include instructions that when executed by the processor(s) may configure the processor(s) to perform signal coding, data processing, input/output processing, or any other function or operation that configures the message broker 270 to provide MQTT message broker functionality and operations as described herein. One will also recognize that features, functions, and processes described herein of the message broker 270 may also and/or alternatively be provided by hardware in addition to and/or as an alternative to software-based instructions and processes. The message broker 270 may also include one or more memory modules/devices (including volatile and non-volatile memory modules/devices) that may be communicatively coupled to the processor(s). The memory modules/devices may be implemented as one or more external integrated circuits (IC) and/or as one or more internal circuits of the processor(s). The one or more memory modules/devices may store the software-based applications and may also provide an execution space as the processors execute applications. The message broker 270 may also include one or more communication interfaces/transceivers/network interface devices (not shown) communicatively coupled to the processors and/or memory devices/modules. The communication interfaces may allow the message broker 270 to communicate over one or more wired and/or wireless communication networks, such as network 282 and 283.

As the MQTT clients 266 of the respective system controllers 250a and 250b establish respective connections 230a and 230b with the message broker 270 and form respective MQTT connections over connections 230a and 230b with the message broker, for example, the message broker may start a respective process (such as a software-based process) 272a and 272b, for example, with each MQTT client 266. Similarly, as each network device 280a and 280b establishes a respective connection 232a and 232b with the message broker 270, for example, the message broker may start a respective process (such as a software-based process) 274a and 274b with each network device. In accordance with one example of the MQTT protocol, the message broker 270 may receive respective API messages from the MQTT clients 266 via connections 230a and 230b at processes 272a and 272b respectively, and forward those messages to processes 274a and/or 274b. Processes 274a and 274b may subsequently forward the API messages over connections 232a and 232b respectively to network devices 280a and 280b. Similarly, the message broker 270 may receive respective API messages from the network devices 280a and 280b via connections 232a and 232b at processes 274a and 274b respectively, and forward those API messages to processes 272a and/or 272b. Processes 272a and 272b may subsequently forward the API messages over connections 230a and 230b to MQTT clients 266 respectively of the system controllers 250a and 250b. In general, network devices 280a and 280b may proceed through an authentication process with the message broker 270 before the message broker may forward messages between the network devices and system controllers.

In accordance with an example of the MQTT protocol, as the MQTT client 266 of system controller 250a, for example, receives API messages from the API server 264, it may communicate those messages over connection 230a to the message broker 270 by publishing the API messages to a defined topic "A". Assuming network device 280a, for example, desires to receive information from the system controller 250a, it may subscribe with the message broker 270 to that same topic "A". Having subscribed to topic "A", message broker 270 may forward the API messages it receives from system controller 250a over connection 232a at process 272a to network device 280a via process 274a. Similarly, for network device 280a to communicate an API message to the system controller 250a, it may communicate those messages over connection 232a to process 274a at the message broker 270 by publishing the API messages to a defined topic "B" (one will recognize topics A and B may the same or different). To receive API messages from network device 280a, MQTT client 266 of system controller 250a may subscribe with the message broker to topic "B". Having subscribed to topic "B", message broker 270 may forward the API messages it receives from network device 280a at process 274a to the MQTT client 266 of system controller 250a over connection 230a via process 272a. Other examples are possible.

With specific reference now to topics as described above, according to one example, each system controller 250a and 250b of system 200 may have an assigned communications address, such as a MAC address (media access control address) (or possibly more than one address). This may be the address assigned to the communication interface or transceiver or network interface device of the system controller 250a and 250b that supports connection 230a and 230b respectively with the message broker, for example (A MAC address will be used herein for description purposes. Nonetheless, a different address assigned to each system controller may alternatively be used in place of a MAC address as discussed herein (such as with topics)). The MAC address of each system controller 250a and 250b of system 200 may be different/unique. In this example, system controller 250a may have the MAC address "A1:B1:C1:D1:E1:F1" and system controller 250b may have the MAC address "A2:B2:C2:D2:E2:F2" (as shown by callouts 222a and 222b). MAC addresses are further discussed below. According to a further aspect of system 200, each system controller 250a and 250b may be assigned a Unique Identifier (ID) Value (Unique ID Value), which may be a random value. In this example, system controller 250a may have the Unique ID Value of "ABC123" and system controller 250b may have the Unique ID Value of "ABC789" (as shown by callouts 222a and 222b). These are only examples. According to a still further aspect of system 200, all systems controllers 250a and 250b of system 200 may be assigned a common universal identifier. In this example, each system controller 250a and 250b has the common universal identifier of "1201" (as shown by callouts 222a and 222b). Again, these are merely examples. (One will recognize that while a system controller may be described herein as having associated with it a unique identifier, MAC address, and universal identifier, these values may also be viewed in general as being associated with a system controller's respective load control system and/or respective user environment). Topics used by system controllers 250a and 250b and network devices 280a and 280b of system 200 may have a format that uses, for example, (i) the Unique ID Value assigned to a system controller 250a/250b, (ii) the universal identifier assigned to all system controllers, and (iii) one of several different topic identifiers/values, such as "Request" and "Response", although additional and/or other values may be used. As one example, the format of the topics used by system 200 may be of the form: "/u/Universal-Identifier/d/System-Controller-ID/Topic-Identifier", where Universal-Identifier may be "1201", System-Controller-ID may be "ABC123" or "ABC789", and Topic-Identifier may be "Request" or "Response" in this example. Again, this is merely an example and other variations are possible. For example, topics used by system controllers 250a and 250b and network devices 280a and 280b of system 200 may have a format that uses, for example, (i) the MAC address assigned to a system controller 250a/250b, (ii) the universal identifier assigned to all system controllers, and (iii) one of several different topic identifiers/values, such as "Request" and "Response", although additional and/or other values may be used. As one example, the format of the topics used by system 200 may be of the form: "/u/Universal-Identifier/d/MAC-Address/Topic-Identifier", where Universal-Identifier may be "1201", MAC-Address may be "A1:B1:C1:D1:E1:F1" or "A2:B2:C2:D2:E2:F2", and Topic-Identifier may be "Request" or "Response". In one aspect, these two examples are similar in that each uses a universal identifier, a unique identifier (e.g., a MAC address of a system controller or the Unique ID Value assigned to a system controller), and a topic identifier/value. For ease of description, example systems will be described herein using topics of the form: "/u/Universal-Identifier/d/System-Controller-ID/Topic-Identifier". Again, other variations are possible and may be used.

According to one example, each time the MQTT client 266 of system controller 250a sends an API message to the message broker 270, it may publish the API message to the broker together with the topic "/u/1201/d/ABC123/Response". Similarly, each time the MQTT client 266 of system controller 250b sends an API message to the message broker 270, it may publish the API message to the broker together with the topic "/u/1201/d/ABC789/Response". If network device 280a, for example, wishes to receive API messages from system controller 250a, for example, it may subscribe with the message broker to the topic "/u/1202/d/ABC123/Response" (one will recognize that network device 280a may only need to subscribe to a portion of this topic, such as "/u/#/d/ABC123/Response", where "#" represents a wildcard value). Similarly, if network device 280a, for example, wishes to receive API messages from system controller 250b, it may subscribe with the message broker to the topic "/u/1202/d/ABC789/Response" (or simply "/u/#/d/ABC789/Response", e.g.). In this fashion, as the message broker receives API messages published by the system controllers 250a and 250b, it may examine the associated topics, determine which network devices 280a and 280b may have subscribed to the topics (at least in part), and forward the messages via processes 272a/272b and 274a/274b. As can be seen, through the use of the System-Controller-ID, a network device 280a and 280b may receive API messages from a desired system controller 250a and 250b.

According to a further example, each time network device 280a, for example, wishes to send an API message to system controller 250a, it may publish the message to the message broker 270 using the topic "/u/1202/d/ABC123/Request". Similarly, each time network device 280a, for example, wishes to send an API message to system controller 250b, it may publish the message to the message broker 270 using the topic "/u/1202/d/ABC789/Request". In other words, through the use of the System-Controller-ID, a network device 280a and 280b may communicate with a desired system controller 250a and 250b. For system controller 250a to receive API messages from network device 280a, MQTT client 266 of system controller 250a may subscribe to the topic "/u/1202/d/ABC123/Request" (or simply "/u/#/d/ABC123/Request", e.g.). Similarly, for system controller 250b to receive API messages from network device 280a, MQTT client 266 of system controller 250b may subscribe to the topic "/u/1202/d/ABC789/Request" (or simply "/u/#/d/ABC123/Request", e.g.). In this fashion, as the message broker 270 receives API messages published by the network devices 280a and 280b, it may examine the associated topics, determine which system controllers may have subscribed to the topics (at least in part), and forward the messages via processes 274a/74b and 272a/272b. Hence, through the use of the System-Controller-ID, a network device 280a and 280b may send API messages to a desired system controller 250a and 250b.

As described above, the system controllers 250a and 250b may continuously publish API messages to the message broker 270 as events occur within the respective load control systems, in addition to publishing API messages that are responsive to commands from network devices. Network devices 280a and 280b that are subscribed to receive API messages from a respective system controller (e.g., that subscribe to the "Response" based topic and the System-Controller-ID of the system controller) may in turn continuously receive the API messages. If no network device 280a and 280b is subscribed to receive messages published by a respective system controller 250a and 250b, the message broker may simply discard the message. Multiple network devices 280a and 280b may also subscribe at the same time to receive API messages from a given system controller. As can also be seen from the above, a network device 280a and 280b may communicate specific commands to and/or request information from a specific system controller 250a and 250b by publishing an API message to the message broker using a "Request" based topic and the appropriate System-Controller-ID for that system controller. Similarly, the network device may receive a response to the API message from the respective system controller by subscribing with the message broker 270 for messages having the "Response" based topic and the appropriate System-Controller-ID.

While system 200 is described herein as being based on the MQTT protocol, other message based protocols may be used, such as the Advanced Message Queuing Protocol (AMQP).

Figure 3:
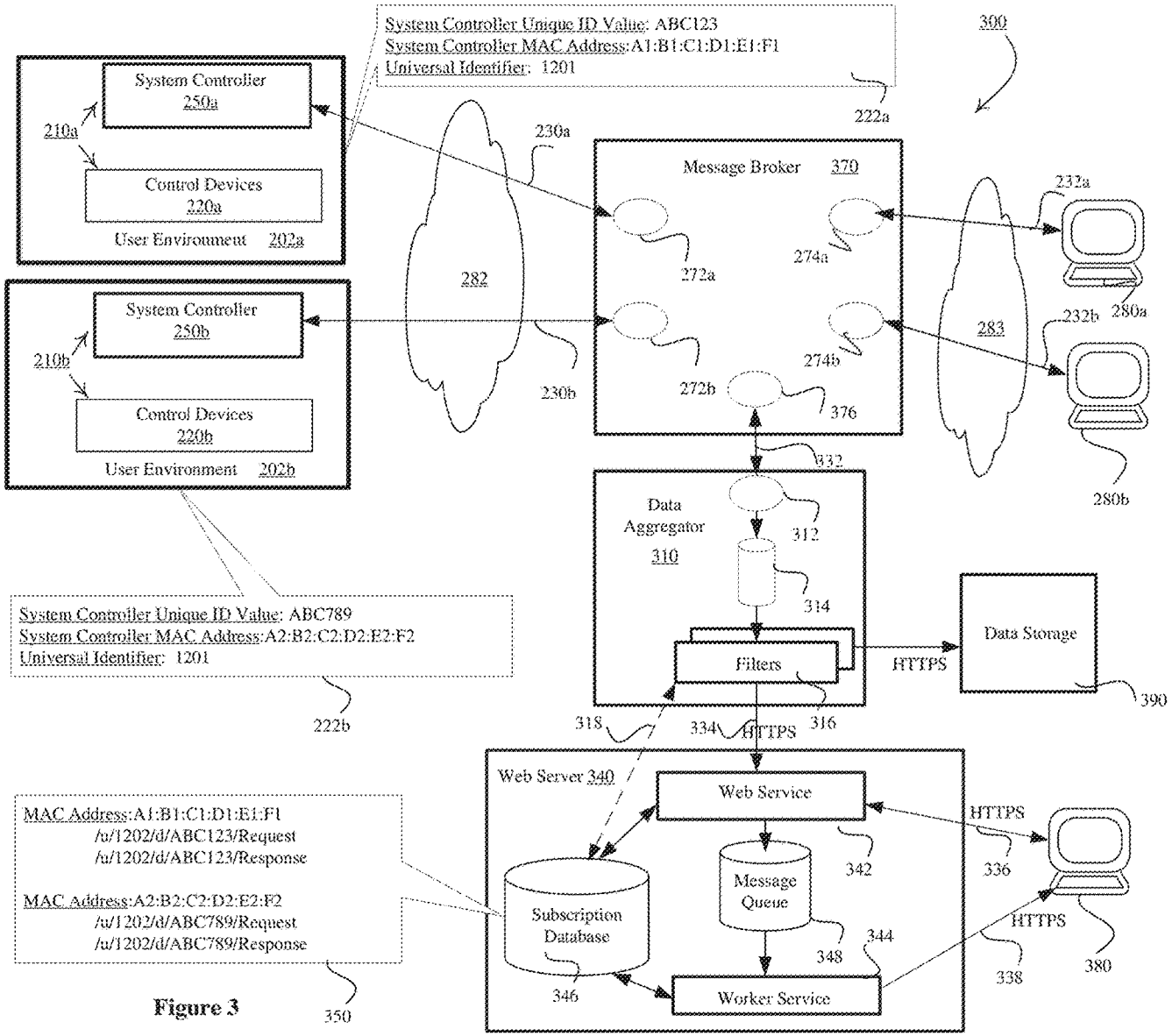
FIG. 3 is a system diagram that illustrates a system for communicating with and controlling a load control system using messaging based interfaces and/or HTTP based interfaces.

System 200 uses an MQTT message-based system for a network device 280a and 280b to communicate with a system controller 250a and/or 250b of a respective user environment 202a and 202b. Turning now to FIG. 3 there is shown an example system 300. While system 200 uses an MQTT message-based system for a network device 280a and 280b to communicate with a system controller 250a and/or 250b, system 300 allows a network device 380, for example, to communicate with a system controller 250a and/or 250b using an HTTP (Hypertext Transfer Protocol) based interface. Network device 380 may be similar to network devices 280a and 280b in that it may be a device in use by a user (e.g., a home-owner of a user environment) and/or may be a third-party integrator configured to provide a service(s) based on interactions with respective system controllers 250a and/or 250b through the API supported by these controllers. In particular, system 300 may allow a network device 380 to receive API messages published by respective system controllers 250a and 250b using an HTTP interface. The information of these API messages may include for example, event and status based information occurring in a respective load control system 210a and 210b and that is continuously published by the system controllers 250a and 250b to the message broker 370 (it may also include API messages that are responsive to messages from network devices). Example system 400 of FIG. 4, which is discussed below, shows an example system that further allows network device 380 to communicate API messages to (and receive responses from) respective system controllers 250a and 250b using an HTTP interface. While FIG. 3 shows only one network device 380, there may be numerous such devices in system 300.

System 300 may include one or more message brokers 370 (one shown here) that may operate similar to message broker 270 as described for system 200. System 300 may also include one or more user environments 202a and 202b and respective system controllers 250a and 250b (and associated control devices 220a and 220b) that may have MQTT interfaces with message broker 370, and may also include one or more network devices 280a and 280b that may communicate through MQTT interfaces with message broker 370. System controllers 250a and 250b, message broker 370, and network devices 280a and 280b may similarly operate as described for system 200. System 300 may now also include one or more data aggregators 310 (one shown here), one or more web servers 340 (one shown here), and one or more network devices 380 that may communicate with web server 340 (where the or more network devices are represented as network device 380 in FIG. 3).

Again, while system 300 is described herein as being based on the MQTT protocol, other message based protocols may be used, such as the Advanced Message Queuing Protocol (AMQP).

The data aggregator 310 may be one or more computing devices (e.g., one or more computing servers) that may include one or more general purpose processors, special purpose processors, conventional processors, digital signal processors (DSPs), microprocessors, microcontrollers, integrated circuits, programmable logic devices (PLD), field programmable gate arrays (FPGA), application specific integrated circuits (ASICs), or any suitable controller or processing device or the like (hereinafter collectively referred to as processor(s)) (not shown), for example. The processor(s) of data aggregator 310 may be configured to execute one or more software-based applications and/or firmware based modules that include instructions that when executed by the processor(s) may configure the processor(s) to perform signal coding, data processing, input/output processing, or any other function that configures the data aggregator to operate as described herein. One will also recognize that features, functions, and processes of data aggregator 310 described herein may also and/or alternatively be provided by hardware in addition to and/or as an alternative to software-based instructions and processes. Data aggregator 310 may also include one or more memory modules/devices (including volatile and non-volatile memory modules/devices) that may be communicatively coupled to the processor(s). The memory modules/devices may be implemented as one or more external integrated circuits (IC) and/or as one or more internal circuits of the processor(s). The one or more memory modules/devices may store the software-based applications and may also provide an execution space as the processors execute applications. Data aggregator 310 may also include one or more communication interfaces/transceivers/network interface devices (not shown) communicatively coupled to the processors and/or memory devices/ modules. The communication interfaces may allow data aggregator 310 to communicate over one or more wired and/or wireless communication networks (not shown) with the message broker 370 and the web server 340. The data aggregator 310 may also include one or more user interfaces such a display monitor, keyboard, mouse, speakers, audio receivers, etc.

The data aggregator 310 may include an MQTT client module 312 (also referred to herein as MQTT client), a pipe module 314 (also referred to herein as pipe), and a filters module 316 (also referred to herein as filters) (One will recognize that the names data aggregator, MQTT client, and pipe as used herein are for description purposes only). Each of these modules may be configured to operate as one or more software based processes within the data aggregator, although other configurations may be used. While data aggregator 310 is shown as having example modules 312, 314, and 316 the aggregator may include fewer, other, and/or additional modules. Starting with MQTT client 312, it may be configured to support a communications connection 332 with the message broker 370. This connection may be, for example, a TCP/IP based connection, although other connections may be used. On top of this connection the MQTT client 312 may support the MQTT publish-subscribe-based messaging protocol with the message broker 370, with the MQTT client 312 acting as a client to the message broker. As the MQTT client 312 of the data aggregator 310 establishes connection 332 with the message broker and forms an MQTT connection to the broker for example, the message broker may start a respective process 376 with the MQTT client 312. According to one example, MQTT client 312 may subscribe with the message broker 370 to the topic "/u/1202/d/#/Response" (where "#" represents a wildcard value). By subscribing to a topic that uses the Universal-Identifier (here "1201") common to all system controllers 250a and 250b, the message broker 370 may forward from respective processes 272a/272b to process 376 all API messages published by the system controllers 250a and 250b to the message broker 370 that use the "Response" based topic. In turn, process 376 may forward the API messages to MQTT client 312 via connection 332. One will recognize that other topics may also be used. For example, MQTT client 312 may also subscribe with the message broker 370 to the topic "/u/1202/d/#/Request" (or alternatively, to the topic "/u/1202/d/#/#"). Here, the message broker 370 may also forward from respective processes 274a/274b to process 376 (and thus the MQTT client 312) all API messages published by the network devices 280a and 280b to the message broker 370 that use the "Request" based topic. Again, these are merely examples and other mechanisms may be used for the message broker 370 to forward API messages to the data aggregator 310. For example, the data aggregator may subscribe to receive API messages from a specific set of system controllers, for example, by specifying the full topic used by the respective controllers (e.g., "/u/1202/d/ABC123/Response" and "/u/1202/d/ABC789/Response"). Assuming the data aggregator only subscribes to "Response" based topics from all system controllers 250a and 250b, as the message broker passes API messages to process 376, the process may in turn communicate the API messages to the MQTT client 312 via connection 332. Process 376 may also communicate, with the API messages, the full topic to which an API message was published by the respective system controller 250a and 250b (i.e., the topic may include the System-Controller-ID of the respective system controller, such as "/u/1202/d/ABC123/Request" or "/u/1202/d/ABC789/Request"). As the MQTT client 312 receives API messages (and the associated topics) from the message broker 370, it may forward the API messages/topics to pipe module 314.

Pipe module 314 may be configured to function as a data cache/message queue, for example, that receives API messages and possibly topics from MQTT client 312, that processes the API messages (e.g. aggregates several API messages into larger blocks for data efficiency), that places/writes the API messages in a message queue, and that controls the reading of the API messages from the message queue by filters 316 for further processing. According to another example, pipe module 314 may be multiple message queue, with MQTT client 312 putting API messages into respective ones of the queues. In this way, pipe module 314 may act as temporary storage until API messages are processed by filters 316, as described below. According to another aspect, depending on the number of user environments 202a and 202b/load control systems 210a and 210b in system 300, there may be multiple message brokers 370, with different message brokers servicing different system controllers 250a and 250b. Here, data aggregator 310 may have multiple MQTT clients 312, each to a respective message broker. According to this example, pipe module 314 may receive API messages from each MQTT client 312 and aggregate these messages into one message queue or multiple message queues (e.g., one message queue for each MQTT client) for processing by the filters 316.

Filters 316 may represent one or more modules (which may operate as one or more software-based processes for example) that read and/or receive API messages (and associated topics) from pipe module 314, that filter those API messages based on one or more criteria, and that then forwards resulting information to one or more destinations. In one aspect, there may be multiple filter modules executing at any given time, each analyzing the same API messages read/received from pipe module 314, and each searching for and analyzing specific data and routing resulting information to a respective destination. According to another aspect, assuming pipe module 314 is multiple message queues, each queue may have respective filter(s). The filters 316 may be dynamic in that an administrator may change the filters depending on a desired configuration of system 300. The filters 316 may filter based on specific fields of the API messages themselves and/or on the topics associated with respective API messages. Different filters may be configured to have different functions. For example, one filter may operate to simply remove/discard certain types of API messages (e.g., there may be certain status information produced by the system controllers 250a and 250b that are not needed by network device 380) and route the remaining API messages (and associated topics) to a certain destination. Another filter may be configured to operate to search for and detect certain API messages and/or topics and route those API messages (and associated topics) to a certain destination. Another filter 316 may be configured to perform operations on API messages read/received from pipe module 314 (such as performing statistical analysis on the API messages) and forward the results to a specific destination. One will recognize that other examples are possible.

According to example system 300, filters 316 may have a communications connection 334 with web server 340. This connection may be, for example, a TCP/IP or UDP/IP based connection, although other types of connections may be used. Web server 340 may support an HTTP/HTTPS (Hypertext Transfer Protocol/secure Hypertext Transfer Protocol) interface on this connection with standard methods (such as GET, PUT, POST, DELETE, etc.), although one will recognize that other interfaces may be used. As filters 316 receives API messages from pipe module 314, it may discard certain messages based on one or more fields of the messages and communicate the remaining API messages (together with their respective topics as published by the system controllers 250a and 250b, for example) to the web server 340 over connection 334. Filters 316 may do this by using standard HTTP methods, such as PUT commands, although other commands may be used. Again, data aggregator 310 may include other filters that route API messages/information to other destinations. As an example, system 300 also may also include a data storage system 390 that may receive information from filters 316 and store this information in a database. Database 390 may be flat database, relational/SQL database, NoSQL/non SQL database, and/or a time series database, etc., although any form of database(s) may be used. One will appreciate that filters 316 may communicate API messages to the web server 340 one at a time, or in batches on a periodic basis (such as every X seconds or minutes, every Y messages, and/or when Z bytes of messages are ready to be forwarded, etc.). Other variations are possible.

As noted above, pipe module 314 may be multiple message queues, each having respective filters 316. Here, each filter 316 may have a respective connection 334 with web server 340 and may be similarly configured to discard certain API messages received from its respective message queue and to communicate the remaining API messages to the web server 340 over its respective connection.

According to one specific example, one or more operations/functions of data aggregator 310 may be provided by Amazon Web Services, where API messages from the message broker 370 may fed to a Kinesis Stream consisting of one or more shards, and where Lambda function(s) may obtain the API messages from the Kinesis Stream, filter the API messages to discard certain messages, and forward the remaining API messages (and associated topics) over HTTP interface(s) 334 to the web server 340. Other examples are possible.

Turning now to web server 340, it may be one or more computing devices (e.g., one or more computing servers) that may include one or more general purpose processors, special purpose processors, conventional processors, digital signal processors (DSPs), microprocessors, microcontrollers, integrated circuits, programmable logic devices (PLD), field programmable gate arrays (FPGA), application specific integrated circuits (ASICs), or any suitable controller or processing device or the like (hereinafter collectively referred to as processor(s)) (not shown), for example. The processor(s) of web server 340 may be configured to execute one or more software-based applications and/or firmware based modules that include instructions that when executed by the processor(s) may configure the processor(s) to perform signal coding, data processing, input/output processing, or any other function that configures the web server 270 to function/operate as described herein. One will also recognize that features, functions, and processes described herein of the web server 270 may also and/or alternatively be provided by hardware in addition to and/or as an alternative to software-based instructions and processes. Web server 340 may also include one or more memory modules/devices (including volatile and non-volatile memory modules/devices) that may be communicatively coupled to the processor(s). The memory modules/devices may be implemented as one or more external integrated circuits (IC) and/or as one or more internal circuits of the processor(s). The one or more memory modules/devices may store the software-based applications and may also provide an execution space as the processors execute applications. Web server 340 may also include one or more communication interfaces/transceivers/network interface devices (not shown) communicatively coupled to the processors and/or memory devices/modules. The communication interfaces may allow web server 340 to communicate over one or more wired and/or wireless communication networks (not shown). Over these networks, web server 340 may support one or more connections 334 with the data aggregator 310, and may support respective connections 336 and 338 with respective network devices 380. The web server 340 may support HTTP/HTTPS based interfaces with standard methods on these connections, for example, to communicate with the data aggregator 310 and network devices 380. In one aspect, web server 340 may function as an HTTP publish-subscribe server.

Web server 340 may include a web service module 342 (also referred to herein as web service) and a worker service module 344 (also referred to herein as worker service) (One will recognize that the names web server, web service, and worker service as used herein are for description purposes only). Each of these modules may operate as one or more software based processes within the web server. A message queue 348, for example, may connect the web service module 342 and the worker service module 344. This message queues may be implemented as a Redis cache, although other implementations may be used. Web server 310 may also include one or more databases such as subscription database 346. Subscription database 346 may be flat database, relational/SQL database, NoSQL/non SQL database, and/or a time series database, etc., although any form of database(s) may be used. While web server 340 is shown as having example modules 342 and 344, message queue 348, and database 346, the server may have other configurations.

Beginning with subscription database 346, it may include at least one entry for each system controller 250a and 250b of system 300. As further described below, web service 342 may treat/use the MAC addresses of the system controllers 250a and 250b as topics or channels (as that term may be used for an HTTP publish-subscribe server) that network devices 380 may subscribe to, although this is one example and other examples are possible. Assuming this format is used, the subscription database 346 may include the MAC address for each system controller 250a and 250b and may further include and associate/relate with each MAC address the respective topics that the system controller publishes and/or subscribes to with the message broker 370. For example and a shown by callout 350, for system controller 250a the subscription database 346 may include the MAC address of the system controller ("A1:B1:C1:D1:E1:F1"), and may associate with this address one or more of the topics used by the system controller 250a (here, "/u/1202/d/ABC123/Request" and "/u/1202/d/ABC123/Response"). Similarly, for system controller 250b the subscription database 346 may include the MAC address of the system controller ("A2:B2:C2:D2:E2:F2"), and may associate with this address one or more of the topics used by the system controller 250b ("/u/1202/d/ABC789/Request" and "/u/1202/d/ABC789/Response"). A system administrator may configure and maintain this database. Hence, as new user environments 202 with respective system controllers 250 are added to system 300, the subscription database 346 may be updated to include the MAC address and associated topics of the new system controller. Again, this is one example and other examples are possible. As another variation, web service 342 may treat/use the System-Controller-IDs of the system controllers 250a and 250b as topics or channels that network devices 380 may subscribe to. Assuming this format is used, the subscription database 346 may include the System-Controller-ID for each system controller 250a and 250b and may further include and associate/relate with each System-Controller-ID one or more of the respective topics that the system controller publishes and/or subscribes to with the message broker 370. For example, the subscription database 346 may be configured as follows:

System-Controller-ID: ABC123
Topic: /u/1202/d/ABC123/Request
Topic: /u/1202/d/ABC123/Response
System-Controller-ID: ABC789
Topic: /u/1202/d/ABC789/Request
Topic: /u/1202/d/ABC789/Response Again, this is one example and the web service 342 may associate any value/identifier with respective system controllers 250a and 250b and use that value/identifier as a topic or channel, and associate that value/identifier with one or more of the topics used by the system controllers. For purposes of description, web service 342 will be described herein as using the MAC addresses of the system controllers 250a and 250b as topics/channels.

Turning to web service 342, as indicated it may treat each of the MAC addresses listed in the subscription database 346 as a topic or channel that a network device 380 may subscribe to via interface 336. Web server 340 may be configured to operate as follows. A network device 380 may desire to receive API messages published by system controller 250a, for example, to the message broker 370. To do this, network device 380 may communicate with web service 342 via connection 336 to subscribe to the MAC address of system controller 250a (i.e., subscribe to MAC address "A1:B1:C1:D1:E1:F1"). In subscribing to the MAC address with the web service 342, network device 380 may also provide the web service with a notification address (e.g., a uniform resource locator (URL)) to which the web server 340 may post any API messages. The web service may store this notification address in subscription database 346 together with an indication that the network device 380 has subscribed to the MAC address of the system controller 250a. In a similar fashion, the network device 380 may also communicate with web service 342 via connection 336 to unsubscribe to a MAC address of a system controller, such as system controller 250a. In turn, the web service may update the subscription database 346 to indicate that the network device 380 has unsubscribed to the MAC address of the system controller 250a. Web service 342 may store which network devices 380 have subscribed to which channels in other manners.

According to one example, web service 342 may receive over connection(s) 334 from the data aggregator 310 the API messages published by all system controllers 250a and 250b as described above (or a subset thereof if the filters 316 have removed certain API messages such as certain status messages). Again, these API messages may have topics associated with them of the form "/u/1202/d/ABC123/Response" and "/u/1202/d/ABC789/Response", as an example. As the API messages are received, the web service 342 may translate the topics to MAC addresses using the configuration information of the subscription database 346. For example, the web service 342 may translate the topic "/u/1202/d/ABC123/Response" of API messages from system controller 250a to the MAC address "A1:B1:C1:D1:E1:F1" of system controller 250a. The web service 342 may then determine whether any network device 380 has subscribed to this MAC address. If a network device 380 has subscribed to the MAC address, the web service 342 may write, for example, the API message together with its associated topic and/or MAC address to the message queue 348. On the contrary, if no network device 380 has subscribed to the API message, the web service 342 may discard the API message. As an alternative to translating topics of API messages received from the data aggregator 310 to MAC addresses as just described, as a network device 380 subscribes to a MAC address the web service 342 may use the subscription database 346 to translate the MAC address to a topic or a portion thereof (e.g., translate the MAC address "A1:B1:C1:D1:E1:F1" of system controller 250a to the topic "/u/1202/d/ABC123/Response"). As the web service receives from the data aggregator 310 the API messages published by the system controllers 250a and 250b, it may compare the topics associated with the messages to "topics" subscribed to by network devices 380. If a network device 380 has subscribed to the topic, the web service 342 may write the API message together with its associated topic and/or MAC address to the message queue 348. On the contrary, if no network device 380 has subscribed to the API message, the web service 342 may discard the API message. Other variations are possible. In general, through a MAC address as specified by a network device and through the System-Controller-ID portion of the topics associated with API messages, the web service, at least in part, may correlate/associate received API messages to the messages the network devices are looking to receive.

As described above, web service 342 may receive from the data aggregator 310 the API messages published by the system controllers 250a and 250b (or a subset thereof if the filters 316 have removed certain API messages), and may then determine or analyze each API message to determine whether any network device 380 has a subscription to receive the respective API message. As another variation, as filters 316 receives API messages from the pipe module 314, it may discard certain messages (such as certain status messages), and then periodically batch the remaining messages into blocks. How it batches messages into blocks may vary. Some examples may include (i) batching messages on a time basis (e.g., batch messages over X min periods), (ii) batching messages on a number of API messages (e.g., create blocks of X API messages), (iii) batching messages on a size basis (e.g., create blocks of X bytes or less), or some combination thereof. With respect to each batch of API messages, filters 316 may determine the topics associated with the messages, and communicate a list of these topics to the web service 342 over connection 334. For example, filters 316 may provide the full topics (e.g., "/u/1202/d/ABC123/Response" and "/u/1202/d/ABC789/Response") or a just a portion of the topics (e.g., just the System-Controller-IDs). As an alternative, filters 316 may have access to subscription database 346 (as shown by connection 318) and translate topics to MAC addresses and pass MAC addresses to the web service 342. Other examples are possible. Regardless, filters 316 may not forward the actual API messages at this time. Upon receiving the list of topics, web service 342 may determine for each topic whether a network device 380 is presently subscribed to the topic (e.g., by correlating topics with MAC addresses that have been subscribed to) and communicate back to filters 316 over connection 334 an indication of those topics that are subscribed to (or alternatively, not subscribed to). Upon receiving this communication from the web service 342, filters 316 may discard from the batched API messages those that are not subscribed to and forward the remaining API messages to the web service 316 over connection 334. Upon receiving the API messages, the web service 342 may write each API message together with its associated topic and/or MAC address to the message queue 348. Filters 316 and the web service 342 may then repeat the process, with filters 316 batching another set of API messages and communicating with web service to determine which associated topics are currently subscribed to. Other variations are possible. One advantage of this configuration is that less data needs to be communicated from the data aggregator 310 to the web server 340, providing more efficient communications.

According to a still further variation, each time a network device 380 subscribes with the web service 342 to a MAC address of a system controller 250 for example, web service 342 may translate that MAC address to a topic (e.g., for system controller 250a, it may translate the MAC address "A1:B1:C1:D1:E1:F1" to the topic "/u/1202/d/ABC123/Response"). Web service 342 may then communicate the topic to the filters 316 over connection 334, instructing filters 316 to forward any API message having the corresponding topic. As an alternative, assuming filters 316 have access to subscription database 346 for example, web service 342 may pass MAC addresses to filters 316, which may then translate the MAC addresses to topics. Other examples are possible. One will appreciate that if multiple network devices 380 subscribe to API messages from the same system controller, web service 342 may only communicate once with filters 316. Regardless, as filters 316 receives API messages from pipe module 314, it may discard certain messages (such as certain status messages), and then compare the topics of the API message to the topics provided to it by the web service 342 to determine whether a network device 380 has subscribed to receive the message. If a network device 380 has subscribed to the topic, the filters 316 may forward the API message (and it associated topic) to the web service 342 over connection 334. Web service 342 may then write the API message together with its associated topic and/or MAC address to the message queue 348. On the contrary, if no network device 380 has subscribed to the API message, the filters 316 may discard the API message. Similarly, each time a network device 380 unsubscribes with the web service 342 to a MAC address of a system controller 250, web service 342 may translate that MAC address to a topic and then communicate the topic to the filters 316 over connection 334, instructing filters 316 to stop forwarding related API messages. One will appreciate that if multiple network devices are subscribed to the same MAC address at the same time, web service 342 may not communicate this instruction to the filters 316 if other devices are still subscribed. Again, this is merely an example and other variations are possible.

Turning to worker service 344, it may read API messages from the message queue 348, determine the notification address of each network device 380 that subscribed to receive the API message, and use the notification address to communicate the API message to the respective network device over a respective connection 338 (one will recognize that the notification address may be different from the network device). The worker service 344 may determine notification addresses using the subscription database 346 as indicated above although other mechanisms may be used to determine the addresses. In communicating the API message to a network device, the worker service 344 may include the topic associated with the API message and/or the MAC address of the respective system controller. Thereafter, the network device 380 may receive and operate on the API message, for example.

While the web service 342 and worker service 344 are shown and described as communicating via message queue 348, this queue may not be required and the two modules may communicate in other fashions. In one aspect, however, message queue 348 may provide one mechanism of temporarily storing API messages in high data demand situations. Also, the use of MAC addresses, for example, rather than the noted "Request" and "Response" topics as a mechanism for network devices 380 to subscribe to API messages is not necessarily required and web service 342 and network devices 380 may be configured to subscribe to the noted topics directly (i.e., a network device 380 may subscribe to "/u/1202/d/ABC123/Response"). Nonetheless, the noted configuration of using MAC addresses or a variation thereof, for example, has at least one benefit in that the system controllers 250 and subscription database 346 may be updated at future times to use different topics. The network devices using MAC addresses (which may be static values), for example, that are correlated to the noted topics may allow topics to change without affecting service applications provided by network devices.

Again, a given network device 380 may subscribe to receive from web server 340 API messages produced by numerous system controllers. Similarly, numerous different network devices may subscribe to receive from web server 340 API messages produced by the same system controller.

Figure 4:
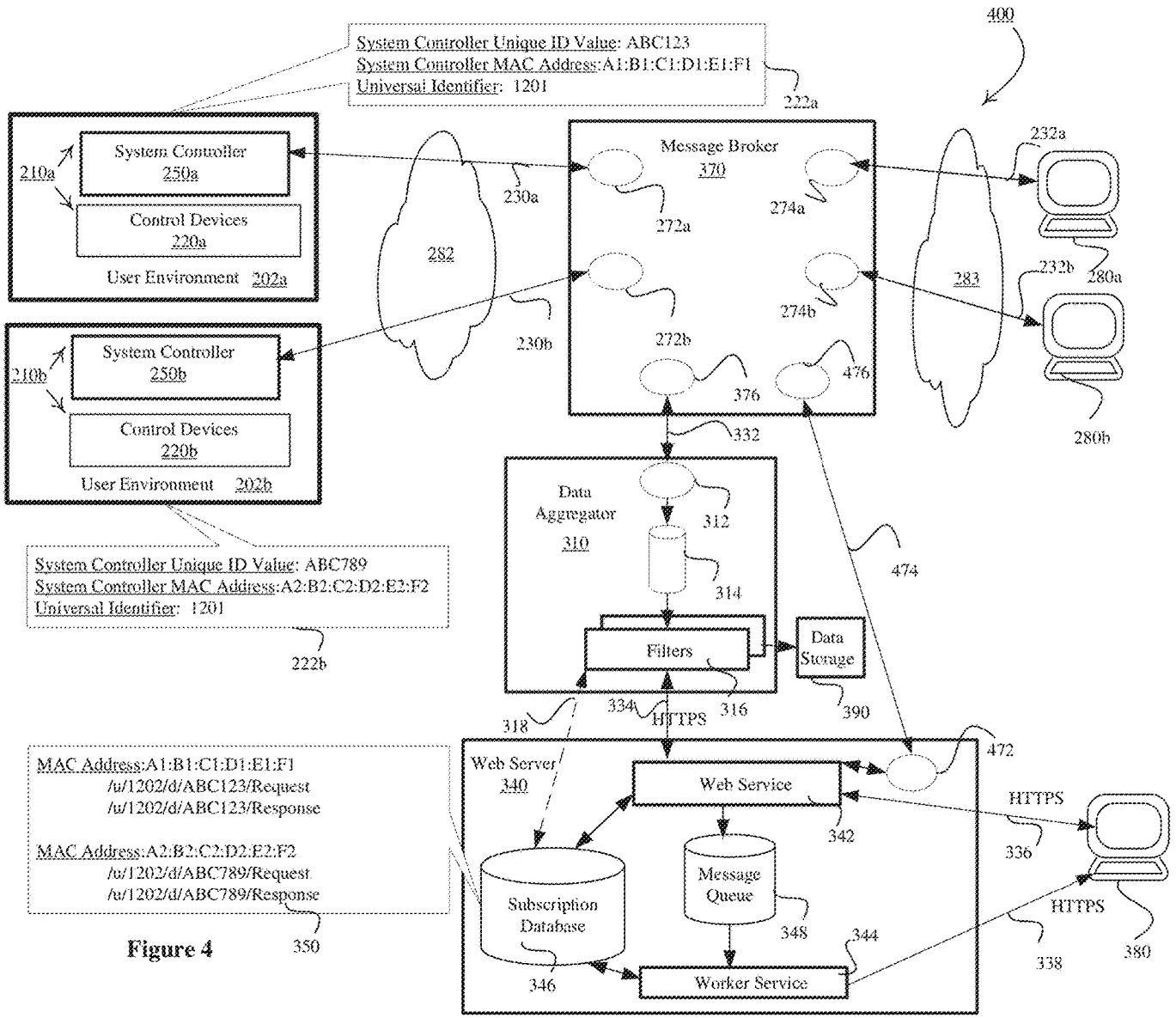
FIG. 4 is a system diagram that illustrates another system for communicating with and controlling a load control system using messaging based interfaces and/or HTTP based interfaces.

Turing now to FIG. 4, there is shown an example system 400. System 400 may be similar to system 300 but in addition to receiving API messages from system controllers 250a and 250b, network devices 380 may also communicate API messages to designated system controllers 250a and 250b (such as to control light levels in a respective user environments) using an HTTP interface, for example.

According to system 400, web server 340 may now also include an MQTT client module 472 that may support a communications connection 474 with the message broker 370. This connection may be, for example, a TCP/IP based connection, although other connections may be used. On top of this connection the MQTT client 472 may support the MQTT publish-subscribe-based messaging protocol with the message broker 370, with the MQTT client 472 acting as a client to the message broker, for example. As the MQTT client 472 of the web server 340 establishes connection 474 with the message broker and forms an MQTT connection to the broker, the message broker may start a respective process 476 with the MQTT client 472, for example.

To communicate an API message to a specific system controller 250, such as system controller 250a, a network device 380 may publish the API message over connection 336 to the web service 342 and in particular, may publish the message to the MAC address of system controller 250a (i.e., "A1:B1:C1:D1:E1:F1"). Noting that the network device has published the API message to the MAC address, web service 342 may use subscription database 346 to translate the MAC address to the "Request" topic associated with the MAC address (here, "/u/1202/d/ABC123/Request"). Thereafter, the web service may forward the API message and the "/u/1202/d/ABC123/Request" topic, for example, to the MQTT client 472. MQTT client 472 may in turn publish the API message over connection 474 to the message broker 370 using the topic "/u/1201/d/ABC123/Request". At the same time, MQTT client 472 may also subscribe over connection 474 with the message broker 370 to the "Response" topic associated with the MAC address of controller 250a (i.e., "/u/1202/d/ABC123/Response"), which may also be forwarded by the web service 342 to MQTT client 472, for example. By subscribing to the "Response" topic of system controller 250a, MQTT client 472 may receive from the system controller 250a any response to the API message.

Accordingly, as process 476 receives the API message from MQTT client 472, the message broker 370 may forward the API message to process 272a for forwarding to the system controller 250a (the controller 250a having subscribed to the topic "/u/1202/d/ABC123/Request" as discussed above). As the system controller 250a processes the API message, it may generate a response API message, which it may publish to the message broker 370 using topic "/u/1202/d/ABC123/Response", as described for system 200 and 300, for example. Because the MQTT client 472 subscribes to the topic "/u/1202/d/ABC123/Response", the message broker 370 may forward this response API message from process 272a to process 476, which may then forward the response API message to MQTT client 472 over connection 474. Upon receiving, for example, the response API message, MQTT client 472 may unsubscribe to the topic "/u/1202/d/ABC123/Response", and may forward the response API message to the web service 342. Web service 342 may thereafter translate the topic of the response API message from "/u/1202/d/ABC123/Response" back to the MAC address of the system controller 250a, and communicate the response API message to the network device 380 over connection 336. Again, other variations are possible, such as the network device 380 subscribing to the System-Controller-IDs rather than MAC addresses, for example.

According to a further aspect of system 400, web server 340 may have a plurality (two or more) of MQTT clients 472 with respective connections 474 to the message broker 370. The web service 342 may use respective ones of the MQTT clients 472, one at a time, to communicate API messages from network devices 380 to respective system controllers 250 and to receive responses thereto.

While system 400 is described herein as being based on the MQTT protocol, other message based protocols may be used, such as the Advanced Message Queuing Protocol (AMQP).

While system 300 and system 400 are described herein as including data aggregator 310, another variation of these systems may not include this module. Here, the message broker 370 may directly communicate API messages to the web server 340. Data aggregator 310 may not be needed, for example, if the message broker 370 is receiving a limited amount of information from the load control systems 210a and 210b, and/or if there is a limited number of load control systems providing information to the message broker. Similarly, variations of system 300 and system 400 may include data aggregator 310, but may not necessarily include filters 316 that are configured to remove API messages from the stream of API messages from pipe module 314. In other words, data aggregator 310 may forward all API messages to the web server 340 that it receives from the message broker rather than removing some messages. Nonetheless, one will recognize that the data aggregator and its respective filters module may provide one example mechanism for controlling the rate at which information flows into the web server 340 and the amount of data that flows into and needs to be communicated to the web server. In addition, while the system controllers 250a and 250b have been described herein as generally forwarding, in a non-selective fashion, large amounts of information/API messages to the message broker with the data aggregator then filtering this information, the system controllers may be configured to selectively forward only certain API messages to the message broker. However, this may not be desirable in that if it is later realized that other information may be needed/wanted from the system controllers, it may be difficult to access all of these systems and make the modification. The system controllers non-selectively forwarding large amounts of information/API messages to the message broker and the filters module 316 being configured to selectively discard certain API messages has one advantage in that if it is later realized that it may be desirable to have the filters 316 forward additional information or discard other information, an administrator may simply update the filters.

Figure 5:
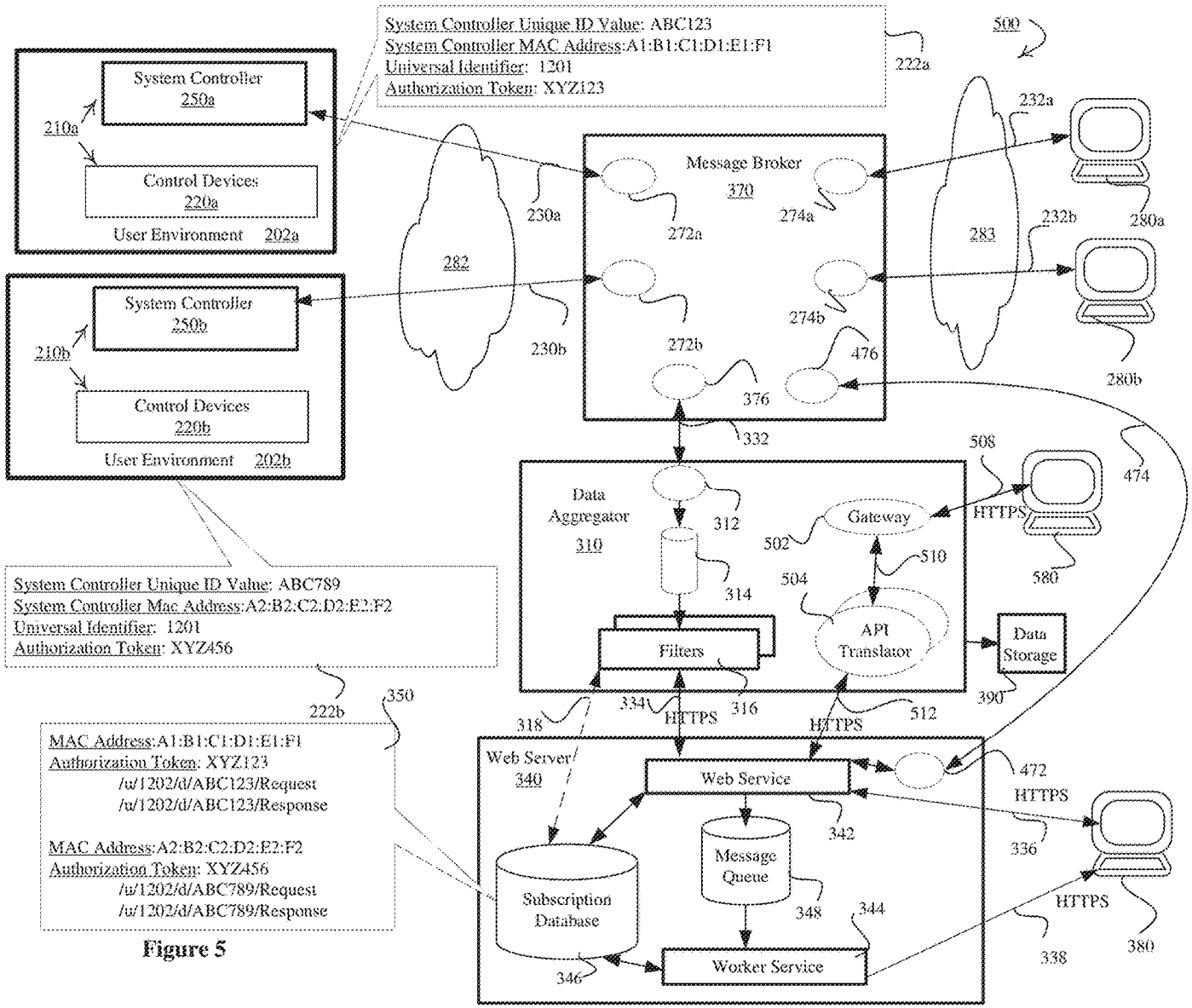
FIG. 5 is a system diagram that illustrates a further system for communicating with and controlling a load control system using messaging based interfaces and/or HTTP based interfaces.

Turning now to FIG. 5, there is shown an example system 500. System 500 is similar to system 400, for example, but may now also allow a network device 580 to communicate messages with (i.e., send messages to and receive messages from) designated system controllers 250a and 250b using an API that is different from the API supported by the system controllers. In other words, as discussed with respect to system 400, a network device 380 may communicate with system 400 using the API supported by the system controllers 250a and 250b. According to system 500, network device 580 may communicate over an HTTP interface with system 500 but now use a third-party API that may be specific to the network device, with system 500 translating between the API supported by the system controllers and the third-party API. For description purposes only, messages formatted according to the API supported by the system controllers 250a and 250b will be referred to herein as "API messages", and messages formatted according to the third-party API supported by the network controller 580 will be referred to herein as "third-party API messages".

Network device 580 may be similar to network devices 280a and 280b and network device 380 in that it may be a device in use by a user (e.g., a home-owner of a user environment) and/or may be a third-party integrator configured to provide a service(s) based on interactions with respective system controllers 250a and 250b. While FIG. 5 shows only one network device 580, there may be numerous such devices each configured to communicate with one or more system controllers, possibly at the same time.

As compared to system 400, data aggregator 310 of system 500 may now include a gateway module 502 (also referred to herein as gateway) and an API translator module 504 (also referred to herein as API translator) (One will recognize that the names gateway and API translator as used herein are for description purposes only). While gateway module 502 and API translator module 504 are shown as being part of data aggregator 310, these modules may alternatively be provided by one or more other computing devices such as by web server 340 or message broker 370, for example, or by another computing device(s) separate from any of message broker 370, data aggregator 310, or web server 340. Each of gateway module 502 and API translator module 504 may operate as one or more software based processes within the data aggregator, although other implementations are possible Beginning with gateway 502, it may be configured to support respective network communication connections 508 with network device 580 for each system controller 250a and 250b the network device is communicating with. Gateway 502 may support an HTTP/HTTPS based interface on connection 508 that may be used by network device 580 to communicate with gateway 502. As indicated, services provided by network device 580 may be based on a third-party API. As such, network device 580 may communicate to gateway 502 a third-party API message for a particular system controller 250a and 250b. Gateway 502 may be configured to then forward that third-party API message to the system controller as further described below. Similarly, if the system controller responds with an API message, that response message may be forwarded to the gateway 502, which may then forward the response message to the network device as a third-party API message. Similarly, network device 580 may communicate with gateway 502 to subscribe to receive API messages published by a particular system controller 250a and 250b. Gateway 502 may be configured to forward this subscription request to the web server 340. As the web server receives API messages from a subscribed to system controller, the web server may forward these messages to the gateway 502, which may then forward the message to the network device as third-party API messages. According to one example, gateway 502 may be agnostic to the specific third-party API used by network device 580, but may be configured such that the format of the third-party API used by the network device needs to be based on a standard. As one example, gateway 502 may be configured such that the third-party API may need to be a RESTful (representational state transfer) based API where, for example, network device 580 communicates with gateway 502 using standard methods (such as, for example, GET, PUT, POST, DELETE, etc.) and where, for example, system controllers 250a and 250b and control devices 220a and 220b, for example, are treated as resources. Again, this is one example and others are possible.

Turning to API translator 504, it may provide API translation services for system 500. In particular, API translator 504 may have a connection 510 with gateway 502. As gateway 502 receives a third-party API message from network device 580 that is destined for a particular system controller 250a or 250b, the gateway may forward that message to API translator 504. API translator 504 may be configured to then translate the third-party API message to an API message (i.e., API message supported by the system controllers) and forward the API message to the system controller. Similarly, assuming the system controller responds with an API message, that message may be forwarded to the API translator 504. The API translator 504 may be configured to then translate the API message to a third-party API message and forward the third-party API message to the gateway 502, which may then forward the message to the network device 580. Similarly, as gateway 502 receives from network device 580 a subscription request to receive API messages published by a particular system controller, such as system controller 250a, the gateway may forward that request to the web server, possibly through the API translator 504 for translation, if necessary. Assuming the web server receives at connection 334 API message(s) published by system controller 250a, the web server may forward those API message(s) to the API translator 504. The API translator 504 may be configured to then translate the API message(s) to third-party API message(s) and forward the third-party API message(s) to the gateway 502, which may then forward the message(s) to the network device 580.

According to one example, system 500 may include multiple API translators 504, each configured to translate messages between the API used by the system controllers and the third-party API used by the network device, and each having a respective connection 510 with gateway 502. As network device 580 desires to communicate with and/or receive messages from a particular system controller 250a or 250b, gateway 504 may use an "available" API translator 504 for that communication. In other words, a given API translator 504 may only support communications with a one system controller 250a and 250b at any given time. According, to one example, API translators 504 may statically exist (i.e., there is a defined number "running" or executing at any given time) and available/free translators may be used by gateway 502 as needed. According to another example, API translators may be created as needed by the gateway 502. According to this example, gateway 502 and API translator(s) 504 may be specific to a particular third-party API. As discussed below, additional instances of gateway 502 and API translator(s) 504 may be used to support additional third-party APIs.

Assuming system 500 includes multiple API translators 504, as further shown in FIG. 5 each API translator may have a respective communications connection 512 with web server 340 and in particular, with web service 342. This connection may be, for example, a TCP/IP or UDP/IP based connection, although other connections may be used. Web server 340/web service 342 may support an HTTP/HTTPS based interface on this connection with standard methods as discussed herein.

Reference will now be made to an example operation of system 500. To communicate a particular command or request, for example, to a specific system controller 250, such as system controller 250a, network device 580 may communicate a third-party API message to the gateway 502 via communications connection 508. The network device may communicate the message using a standard POST command, for example. With this third-party API message, the network device may include the MAC address of system controller 250a (i.e., "A1:B1:C1:D1:E1:F1") (although the System Controller Unique ID Value may also be used, for example). Upon receiving the message, the gateway 502 may forward the third-party API message (and MAC address) to a respective API translator 504 via a respective connection 510. Upon receiving the message, the API translator 504 may translate the third-party API message to an API message. Thereafter, the operation flow may proceed as similarly discussed with respect to FIG. 4, for example. The API translator 504 may next publish the API message over a respective connection 512 to the web service 342 and in particular, may publish the message to the MAC address of system controller 250a (i.e., "A1:B1:C1:D1:E1:F1"). Noting that the API translator has published the API message to the MAC address, web service 342 may use subscription database 346 to translate the MAC address to the "Request" topic associated with the MAC address (here, "/u/1202/d/ABC123/Request"). Thereafter, the web service may forward the API message and the "/u/1202/d/ABC123/Request" topic to the MQTT client 472. MQTT client 472 may in turn publish the API message over connection 474 to the message broker 370 using the topic "/u/1201/d/ABC123/Request". At the same time, MQTT client 472 may also subscribe over connection 474 with the message broker 370 to the "Response" topic associated with the MAC address of controller 250a (i.e., "/u/1202/d/ABC123/Response"). By subscribing to the "Response" topic of system controller 250a, MQTT client 472 may receive from the system controller 250a any response to the API message.

Accordingly, as process 476 of the message broker 370 receives the API message from MQTT client 472, the message broker may forward the API message to process 272a for forwarding to the system controller 250a (the controller 250a having subscribed to the topic "/u/1202/d/ABC123/Request" as discussed above). As the system controller 250a processes the API message, it may generate a response API message, which it may publish to the message broker 370 using topic "/u/1202/d/ABC123/Response", as described for system 200, 300, and 400 for example. Because the MQTT client 472 subscribes to the topic "/u/1202/d/ABC123/Response", the message broker 370 may forward this response API message from process 272a to process 476, which may then forward the response API message to MQTT client 472 over connection 474. Upon receiving the response API message, MQTT client 472 may unsubscribe to the topic "/u/1202/d/ABC123/Response", and may forward the response API message to the web service 342. Web service 342 may thereafter translate the topic of the response API message from "/u/1202/d/ABC123/Response" back to the MAC address of the system controller 250a, and communicate the response API message to the API translator 504 over connection 512.

Upon receiving the API response message from the web service 342, API translator 504 may translate the API message to a third-party API message (such as a response message) and forward the third-party API message over connection 510 to gateway 502. Thereafter, gateway 502 may forward the third-party API message to network device 580. Again, other variations are possible.

Similarly, for network device 580 to subscribe to receive API messages published by a system controller, such as system controller 250a, network device 580 may communicate with gateway 502 via communications connection 508 to subscribe to the MAC address of system controller 250a, for example. Upon receiving the subscription request, the gateway 502 may forward the request to a respective API translator 504 via a respective connection 510, which may then forward the request over a respective connection 512 to the web service 342, translating the request if necessary. Alternatively, the gateway 502 may forward the subscription request directly to the web service. Regardless, the operation flow may then proceed as similarly discussed with respect to FIG. 3, for example. As the web service 342 receives via connection 334 from data aggregator 310 API messages published by system controller 250a, the web service may determine that a network device, such as network device 580, has subscribed to receive these API messages as discussed herein. The web service 342 may in turn then forward these API messages (together with its associated topic and/or MAC address, for example) to a respective API translator 504 via a respective connection 510. Alternatively, the web service 342 may forward these API messages to the worker service 344 (such as through message queue 348), which may in turn forward the API messages (together with its associated topic and/or MAC address, for example) to a respective API translator 504 via a respective connection 510. Other variations are possible. Upon receiving an API message from the web service 342, API translator 504 may translate the API message to a third-party API message and forward the third-party API message over a respective connection 510 to gateway 502. Thereafter, gateway 502 may forward the third-party API message to network device 580. In communicating the third-party API message to a network device, the message may include the topic associated with the API message and/or the MAC address of the respective system controller 250a. Again, other variations are possible.

As indicated above, according to the example shown in FIG. 5 gateway 502 and API translator(s) 504 may be specific to a particular third-party API. According to a further aspect of system 500, the system may support multiple different third-party APIs. Here, system 500 may include multiple instances/pairs of gateway 502 and API translator(s) 504, with each gateway/API translator(s) pair supporting a respective third-party API. Depending on which API is used by a network device 580, the device may communicate with a corresponding gateway (e.g., each gateway may have a respective address/URL to which the network device communicates).

According to one specific example, one or more of gateway 502 and API translator(s) 502 may be provided by Amazon Web Services, where gateway 502 may be an Amazon API Gateway, and where each respective instance of an API translator may be a respective Lambda function configured to perform API translation as discussed herein and to communicate with web server 340 as discussed herein. Here, the Amazon API Gateway may expose endpoints to network devices 580, and Lambda functions that are configured as described herein may be assigned to respective gateway endpoints.

Referring now to a still further aspect of systems 300, 400, and 500, as discussed herein web server 340 may treat/use the MAC address, for example, of the system controllers 250a and 250b as topics or channels that network devices 380 and 580 may subscribe to, and/or publish messages to, for example. The subscription database 346 may include the MAC address of the system controllers, and may associate with this address one or more of the topics used by the system controllers 250a and 250b, as shown by callout 350. Again, this is one example.

According to a further example, authorization/access tokens may also be associated with respective system controllers 250a and 250b, and these tokens then associated with one or more of the topics used by the system controllers, with systems 300, 400, and 500 using the tokens in a similar way as to how MAC addresses may be used as described herein. For example, for security purposes in order for a network device 380 or 580 (i.e., third-party) to communicate with web server 340 or gateway 502 to gain access to a user environment 202a or 202b/load control system 210a or 210b, the network device may need to include with the HTTP messages, for example, an authorization/access token that can be used by web server 340 and/or gateway 502 to ensure the network device is permitted access to a user environment 202a or 202b/load control system 210a or 210b. A user (such as a homeowner) of the user environments/load control systems may obtain such tokens using, for example, an OAuth (e.g., OAuth 2.0) based service. Such a service may be provided separate from systems 300, 400, and 500. In the process of the user obtaining such a token, it may be stored in the subscription database 346, for example, and also provided to the third-party and used by the third-party and the web server 340 and/or gateway 502 for authentication/authorization purposes.

In this aspect, authorization tokens may be viewed as being associated with users. According to an aspect of systems 300, 400, and 500 these tokens may also be associated with system controllers. For example, assume that a user/homeowner of user environment 202a obtains a token "XYZ123" through an OAuth based service and assume that a user/homeowner of user environment 202b obtain a token "XYZ456" through an OAuth based service. In addition to using these tokens for security purposes, these tokens may be stored, for example, in the subscription database 346 (or alternatively, stored in another database such as an authorization database with database 346 having links to the tokens as stored in the authorization database) and associated with the respective system controllers 250a and 250b and thus associated with one or more of the topics used by the system controllers, as shown in callout 350 of FIG. 5.

As discussed with respect to system 300 of FIG. 3, in order for a network device 380 to receive API messages published by system controller 250a, for example, it may subscribe to MAC address "A1:B1:C1:D1:E1:F1" as discussed herein. With respect to authorization tokens, as the network device 380 communicates an HTTP message to the web server 340 to subscribe to receive API messages from system controller 250a, the web server 340 may treat/use the authorization token within the HTTP message (i.e., "XYZ123") as a request to subscribe to the authorization token, with system 300 now using the token in a similar way to how it used MAC addresses in order to determine that API messages published by the system controller 250a should be forwarded to the network device.

Similarly, as discussed with respect to system 400 of FIG. 4, in order for a network device 380 to communicate an API message to system controller 250a, for example, it may publish the message to the MAC address of the system controller. With respect to authorization tokens, as the network device communicates an HTTP message to the web server to publish an API message to the system controller 250a, the web server 340 may treat/use the authorization token within the HTTP message (i.e., "XYZ123") as a request to publish the API message to the authorization token, with system 400 now using the token in a similar way to how it used MAC addresses in order to communicate API messages with the system controller 250a.

Similarly, as discussed with respect to system 500 of FIG. 5, in order for a network device 580 to communicate a third-party API message to system controller 250a, for example, it may communicate the MAC address of the system controller to the gateway 502. With respect to authorization tokens, as the network device 580 communicates an HTTP message (that includes the third-party API message) to the gateway, the gateway may forward the authorization token from the HTTP message (i.e., "XYZ123") to the API translator 504, which may translate the third-party API message to an API message. As the API translator 504 communicates an HTTP message to the web server 340 to publish the API message to the system controller 250a, it may include the token with the HTTP message (e.g., for authorization purposes). The web server 340 may thereafter treat/use the authorization token within the HTTP message (i.e., "XYZ123") as a request to publish the API message to the authorization token, with system 500 now using the token in a similar way to how it used MAC addresses in order to communicate API messages with the system controller 250a. Authorization tokens may also be used in a similar fashion in system 500 for a network device 580 to subscribe to receive API message published by a system controller. Again, other example process flows are possible.

In general, one will recognize that functions and operations described herein as the message broker 370, data aggregator 310, and web server 340 may each be performed on different computing devices or the same computing device or some combination thereof. One or more of these modules may also be cloud based systems. Similarly, one will recognize that functions and operations described herein as being performed by the message broker 370, data aggregator 310, or web server 340 may be performed by the other modules. For example, web server 340 may provide filters 316 rather than the data aggregator 310. Furthermore, while functions and operations are described herein as being performed by the message broker 370, data aggregator 310, and web server 340, functions and operations may be performed by additional modules. For example, the web service 342 and the worker service 344 may be distributed across multiple computing devices. Subscription database 346 may be a database management system separate from the web server 340, etc. Other variations are possible.

Figure 6A:
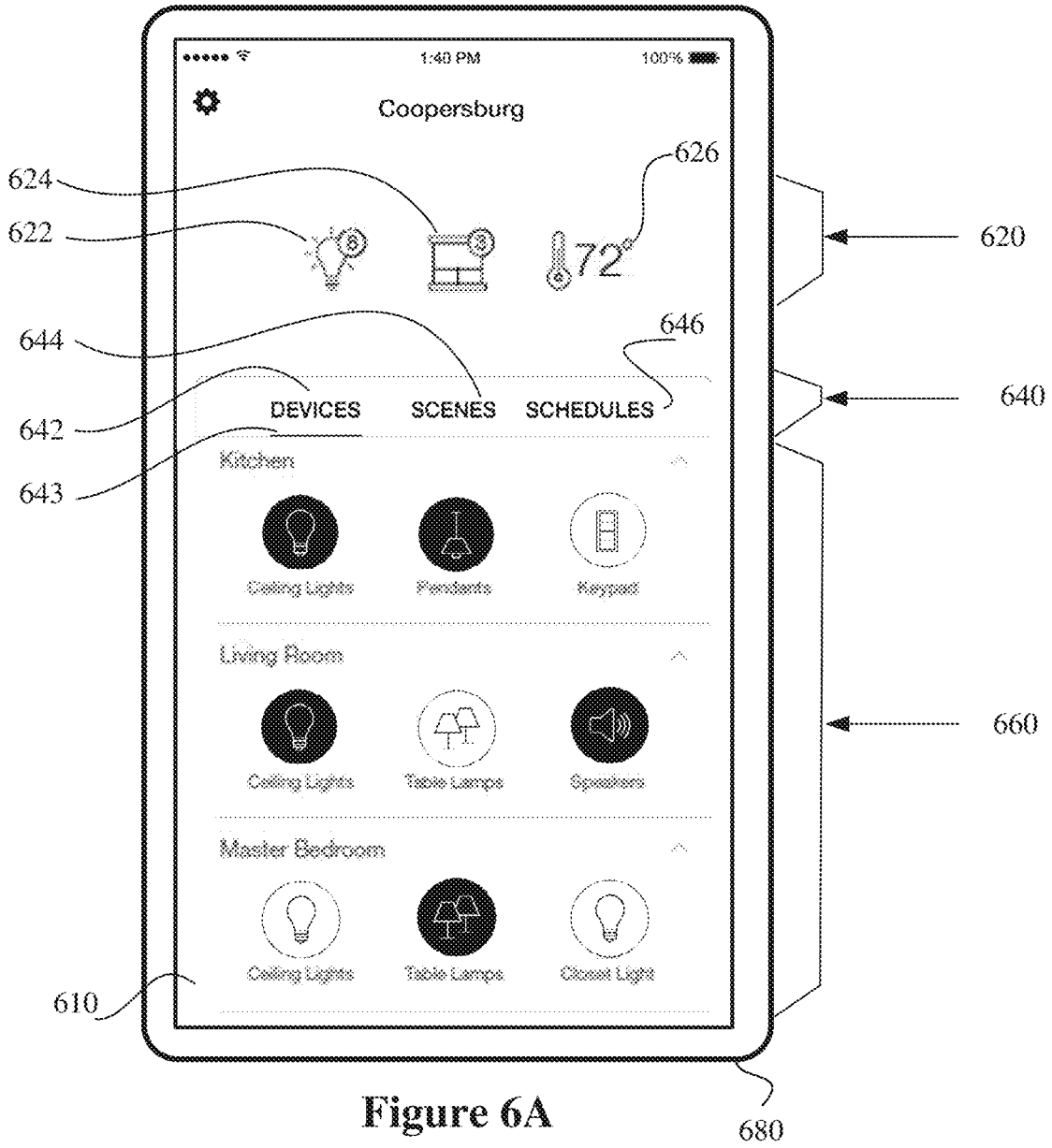
FIGS. 6A-6Z and 6AA show example graphical user interfaces of an application that may allow a user to determine information on and to control a load control system and/or control devices.
Figure 6B:
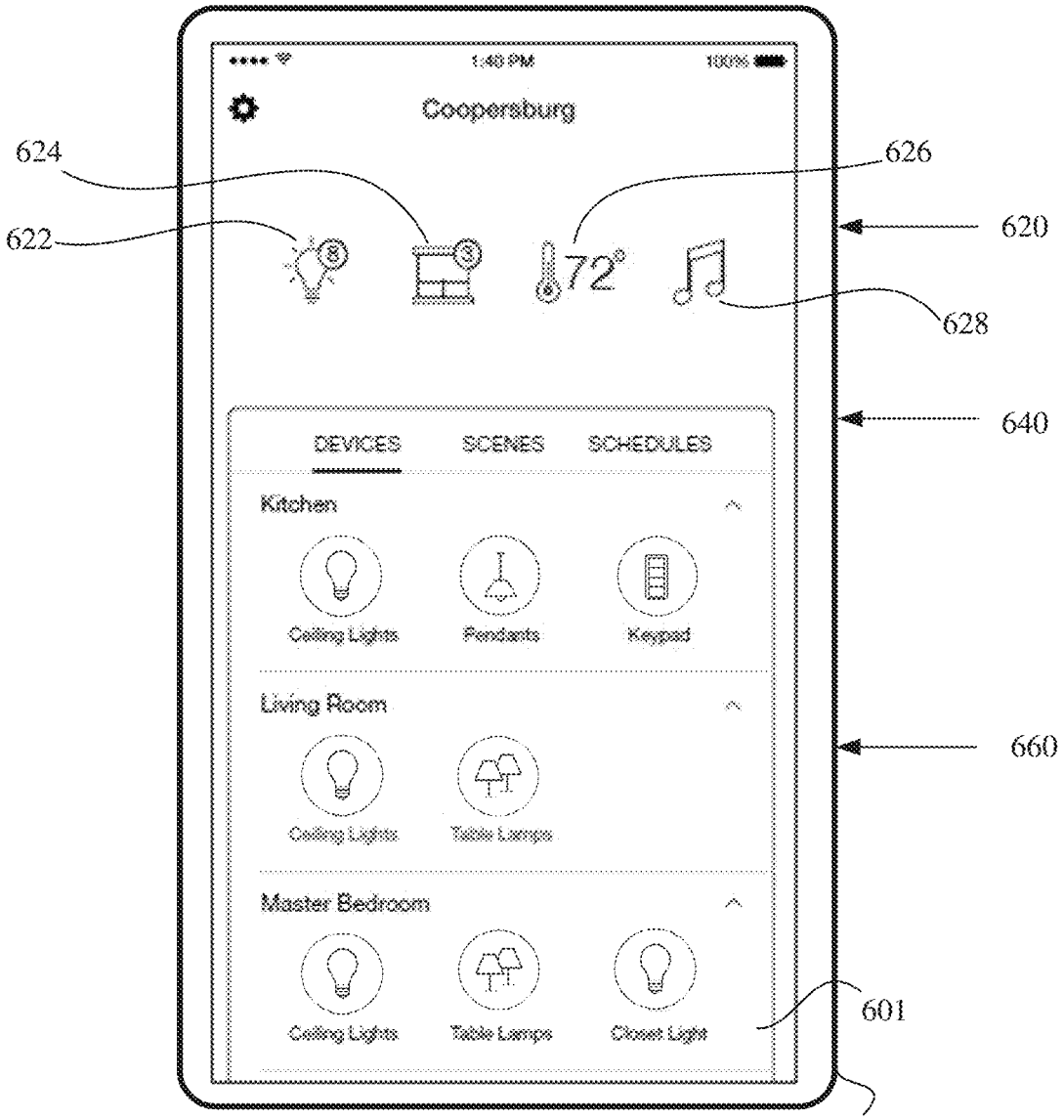
Figure 6C:
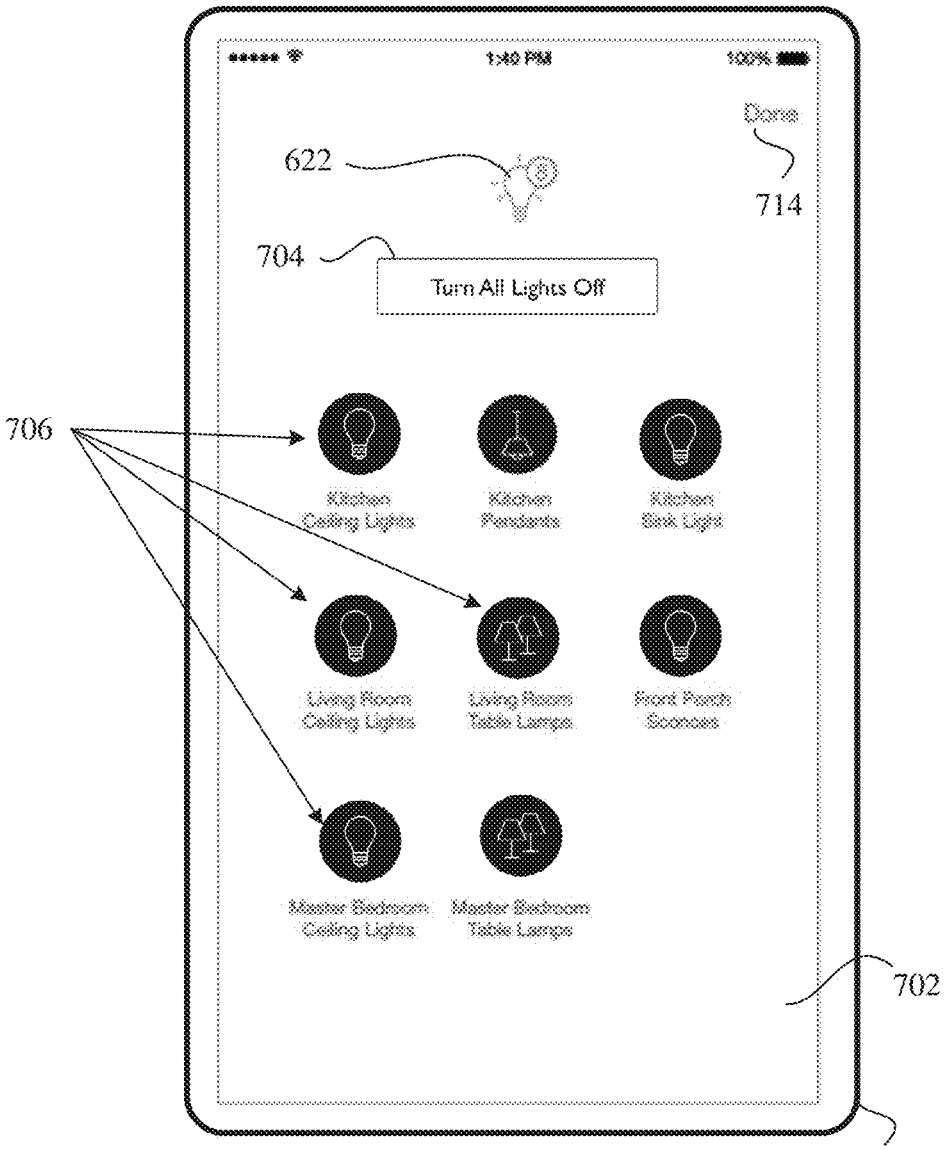
Figure 6D:
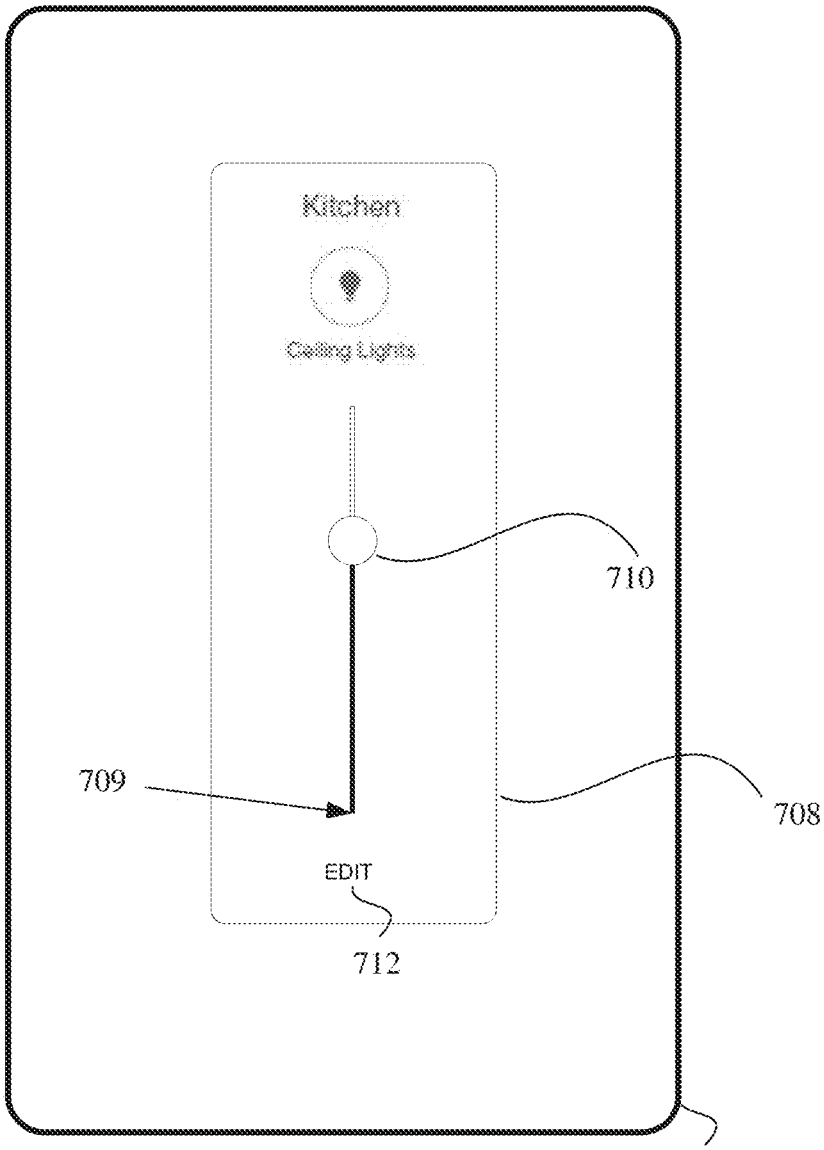
Figure 6E:
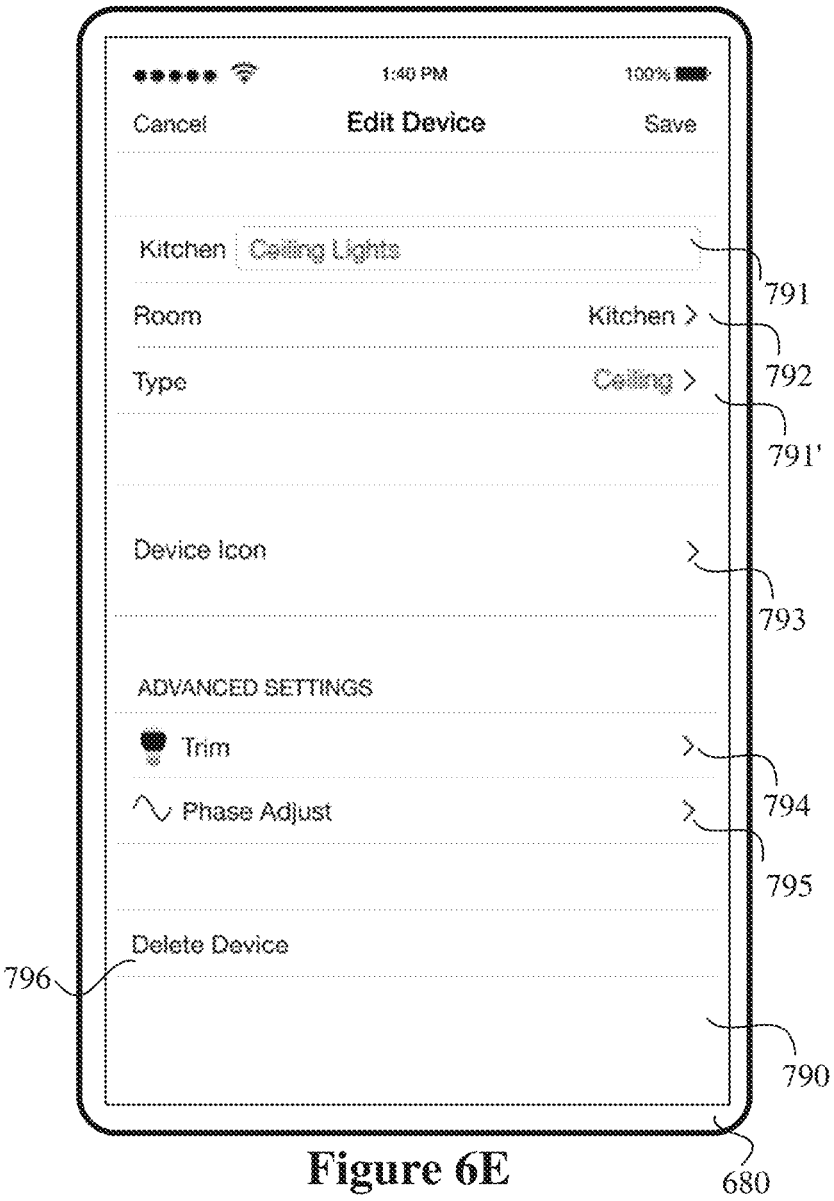
Figure 6F:
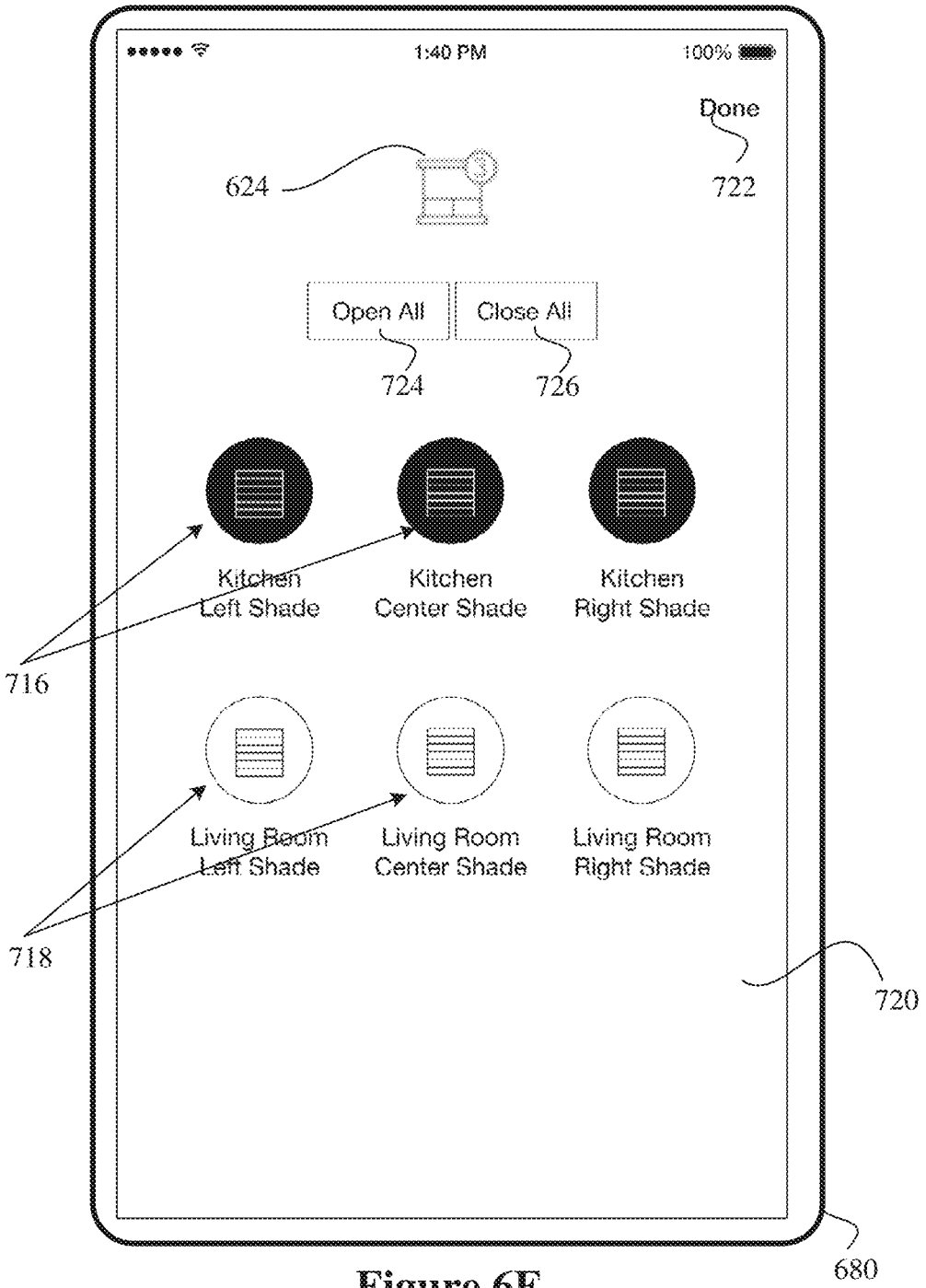
Figure 6G:
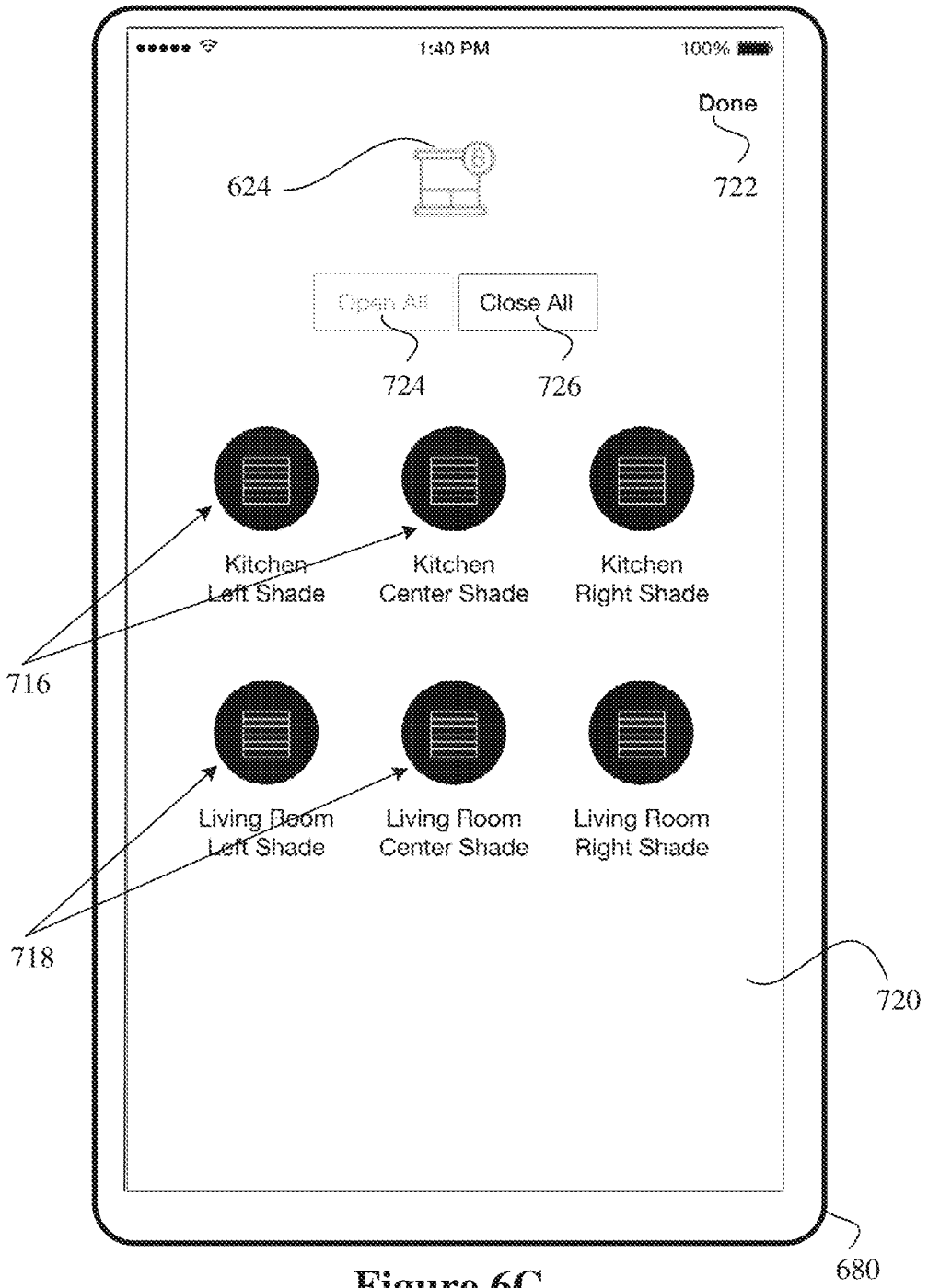
Figure 6H:
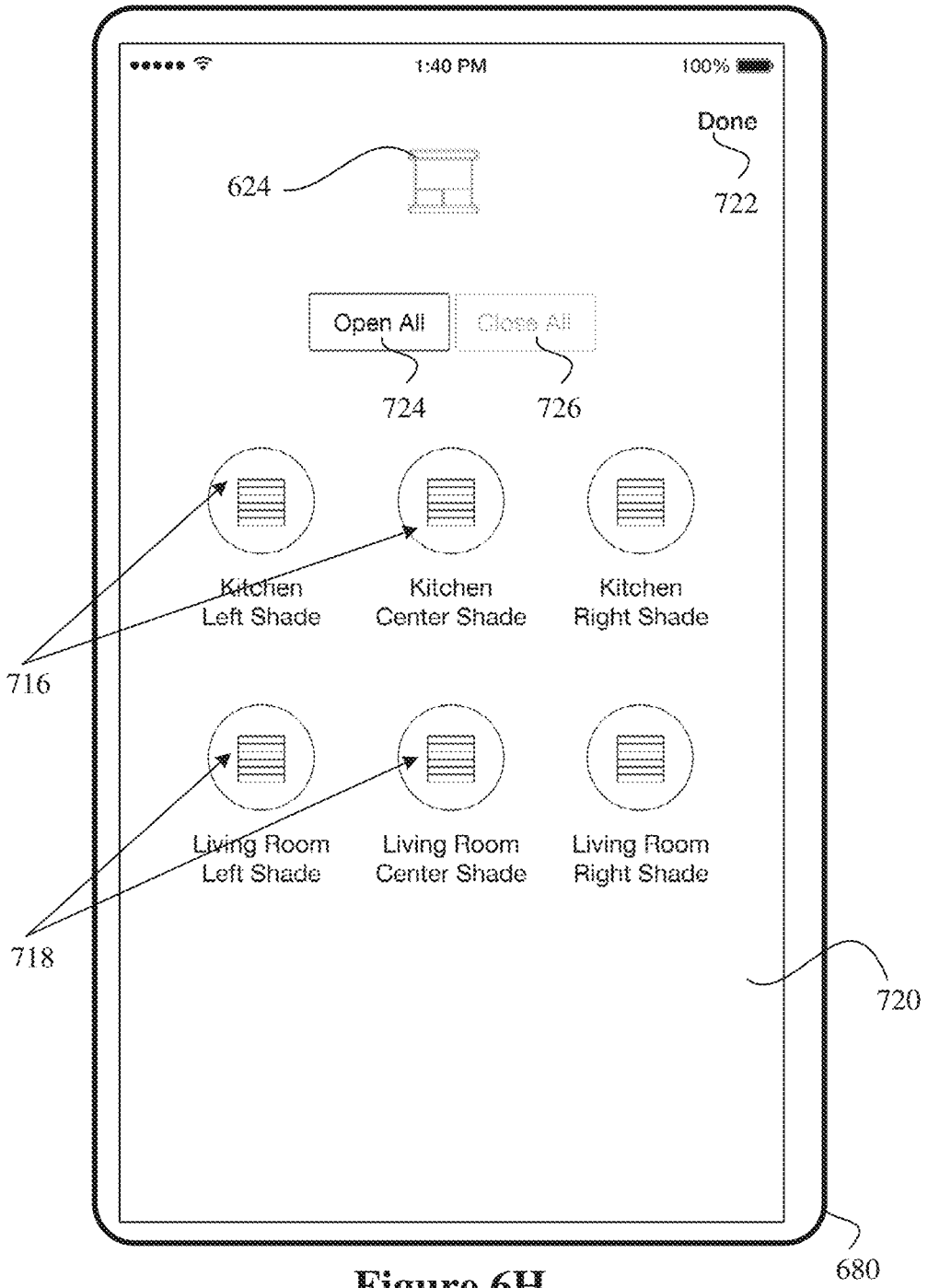
Figure 6I:
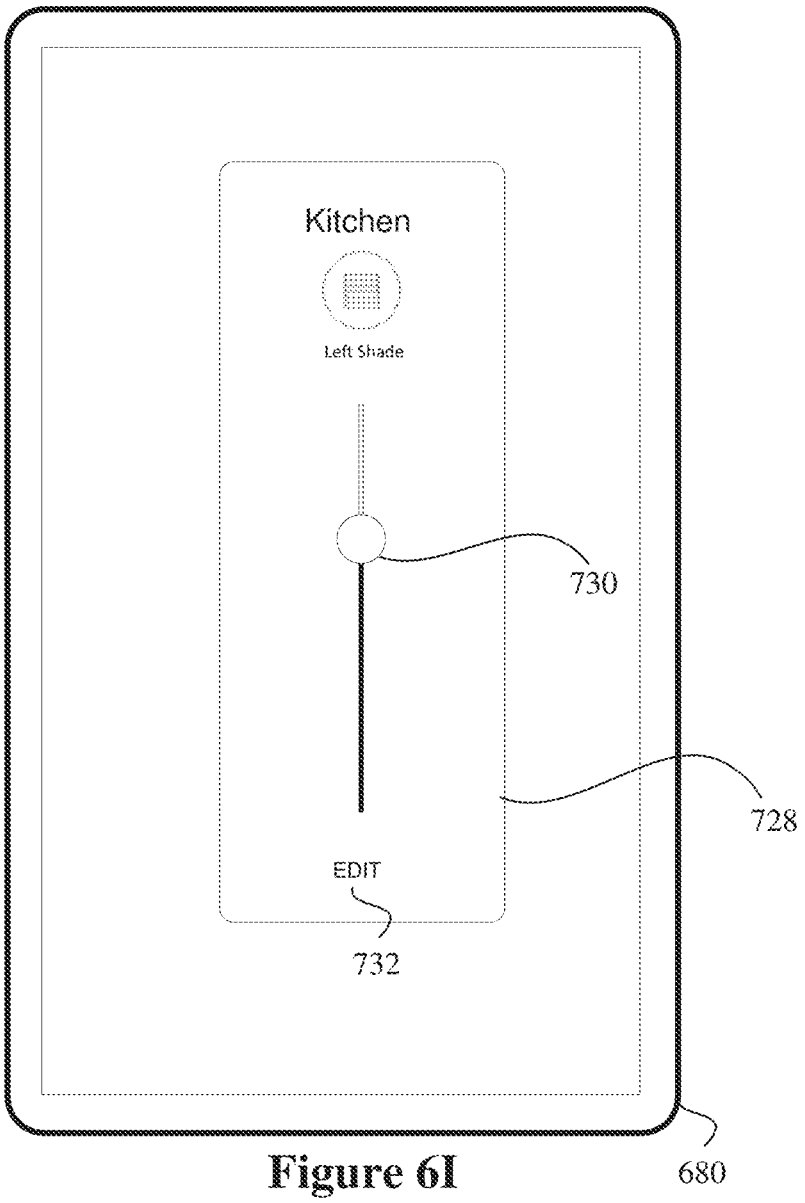
Figure 6J:
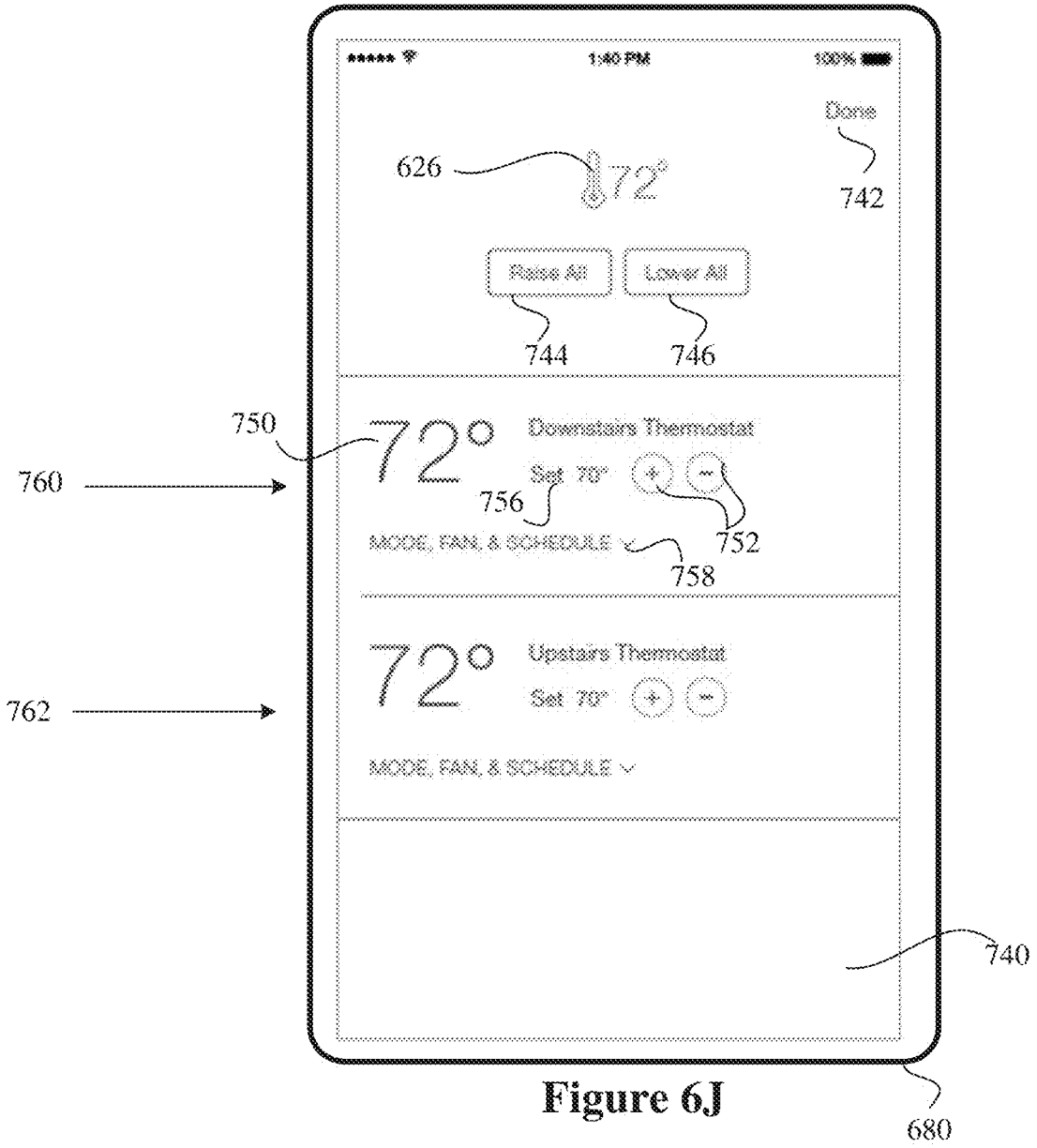
Figure 6K:
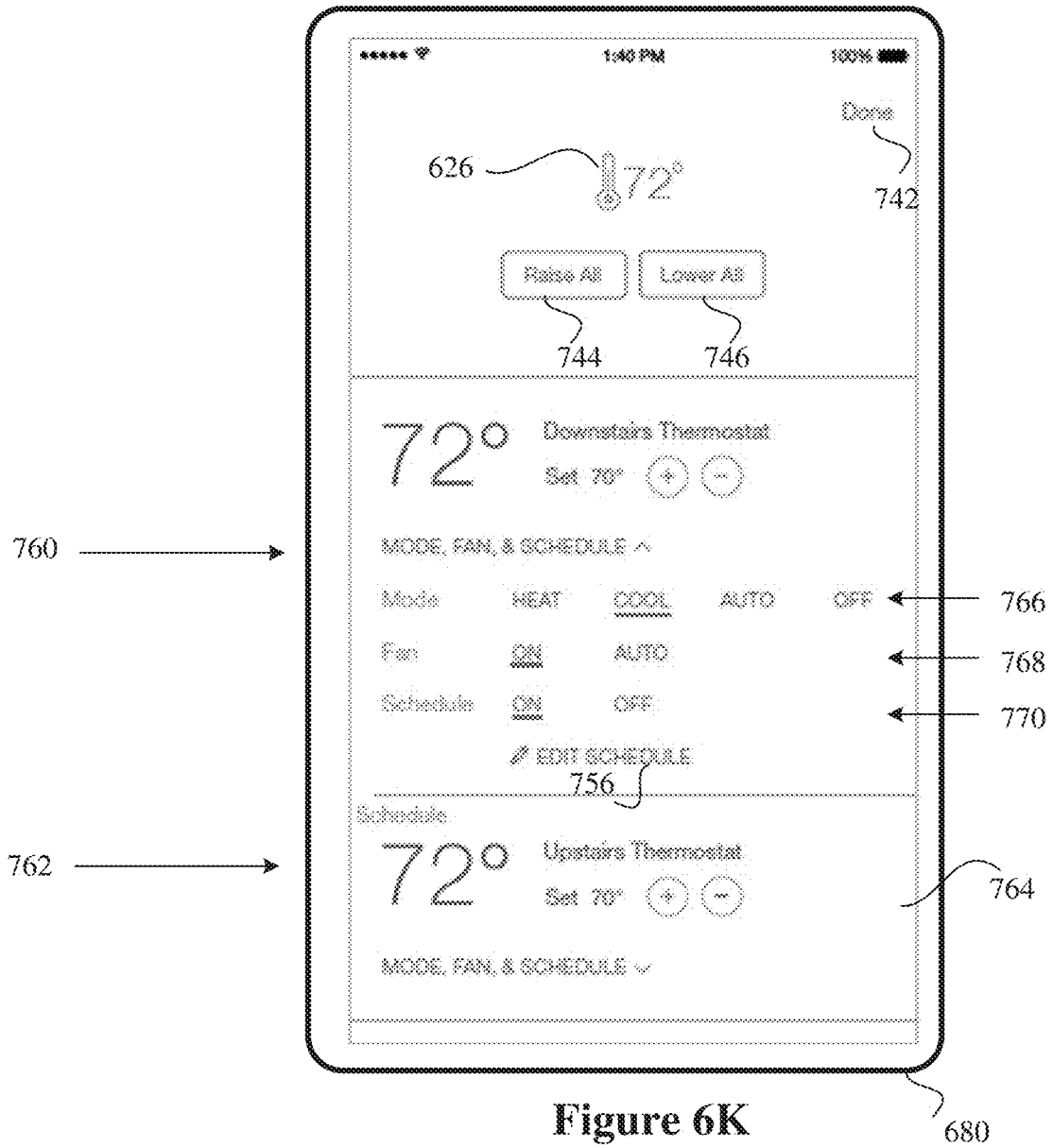
Figure 6L:
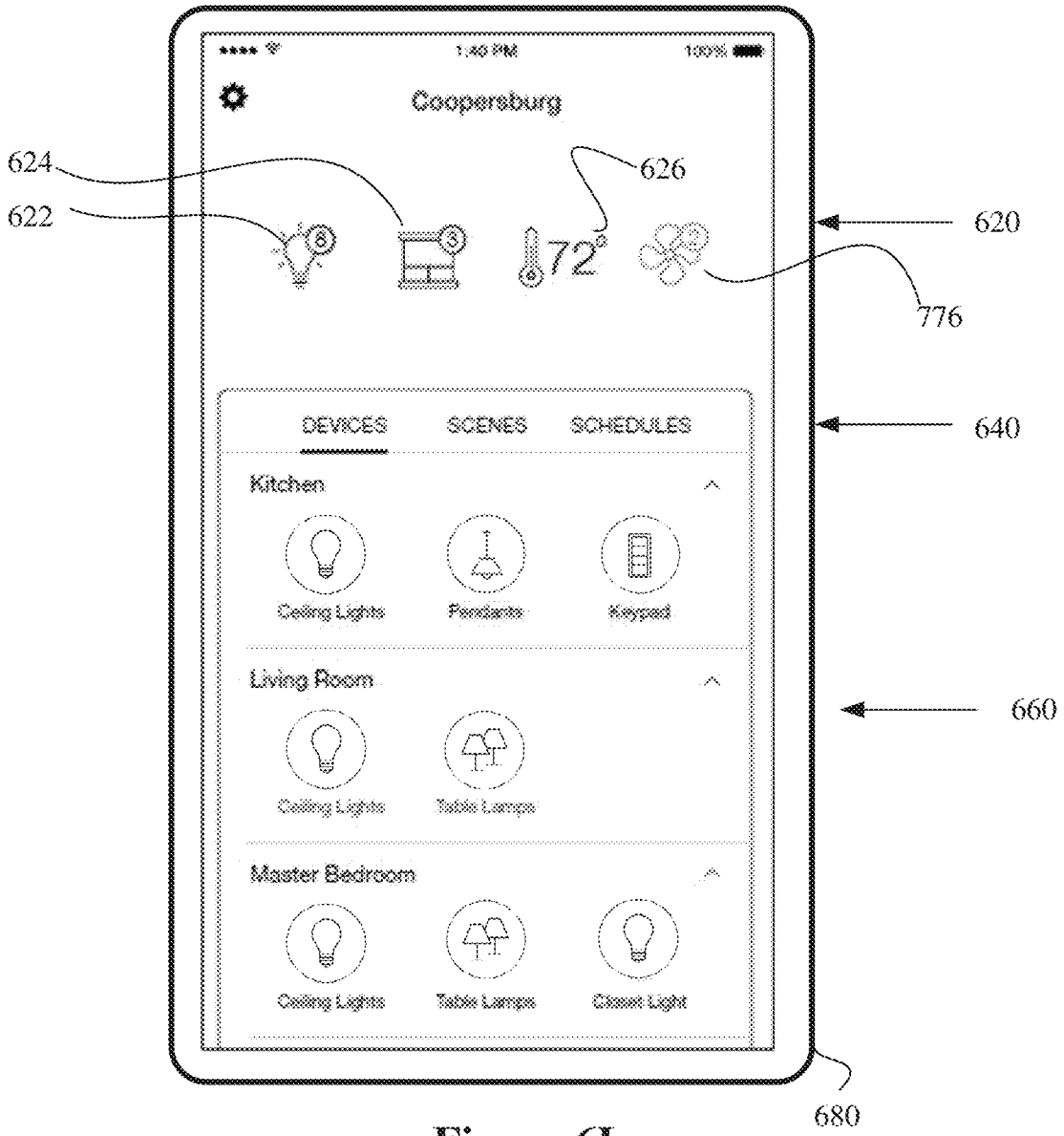
Figure 6M:
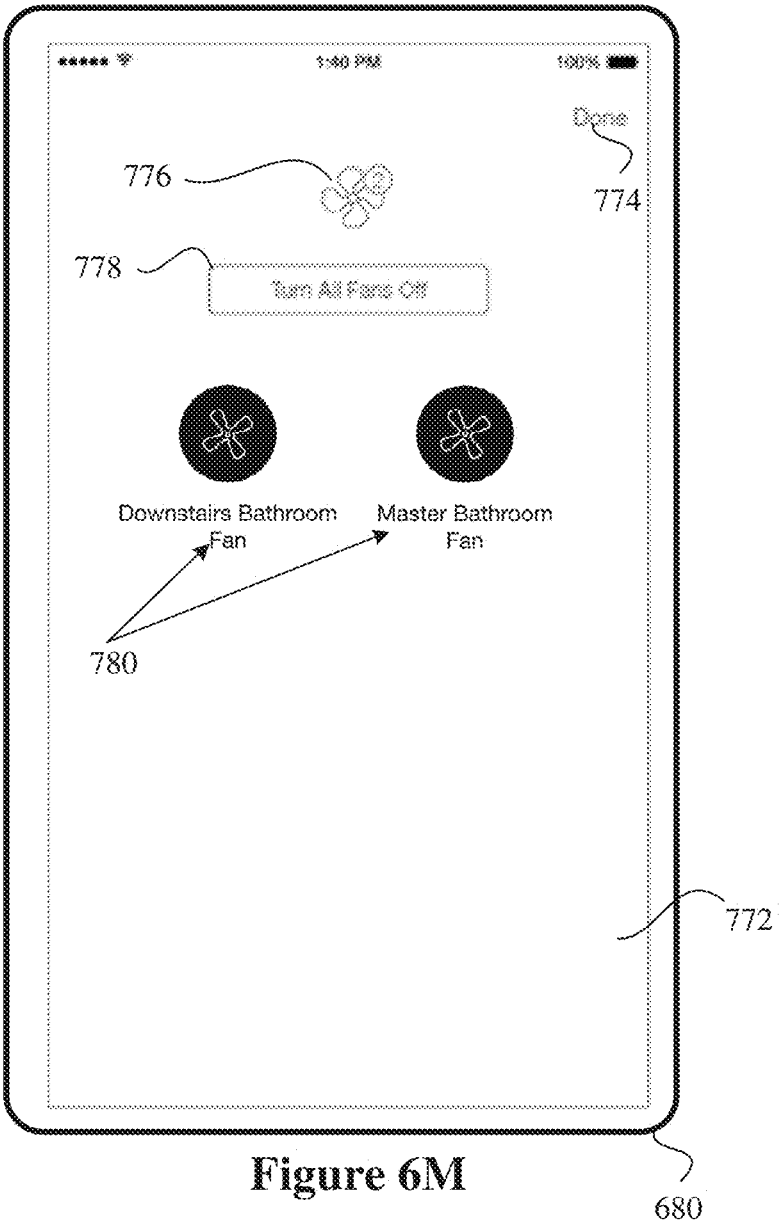
Figure 6N:
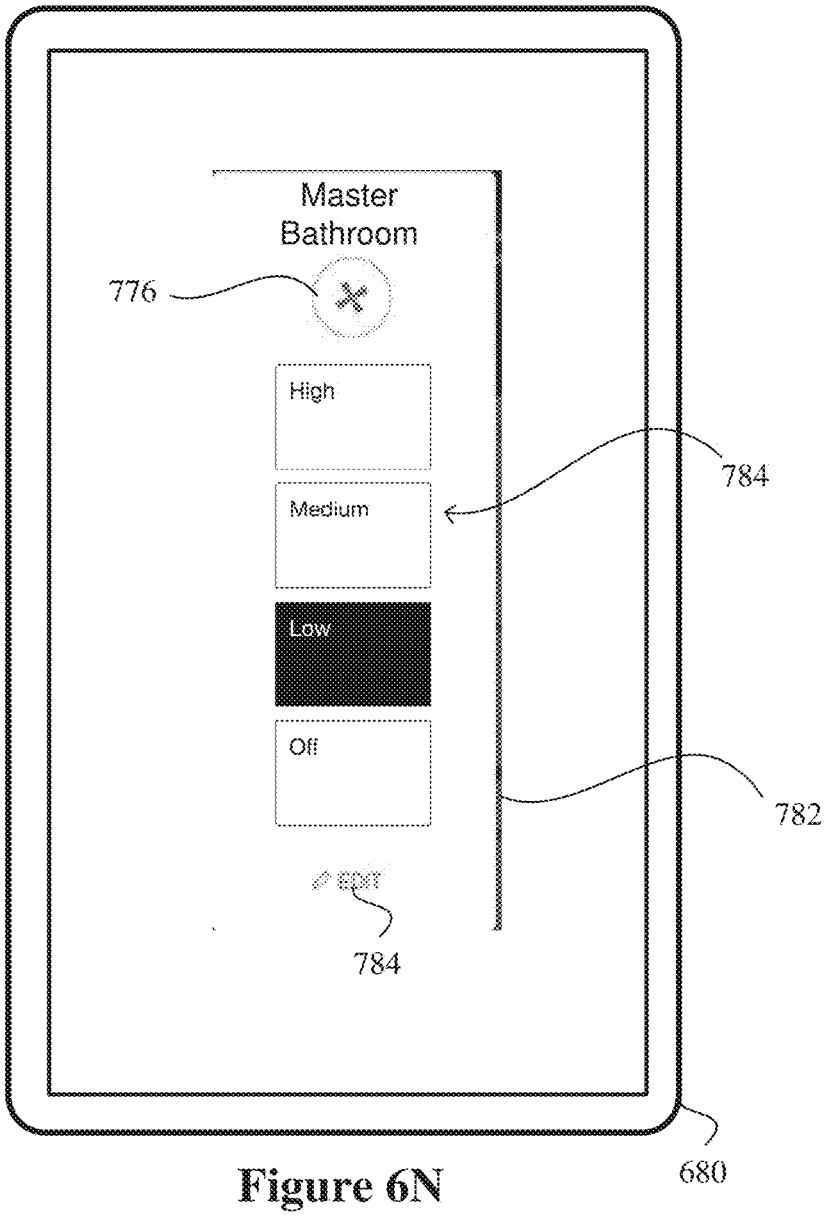
Figure 6O:
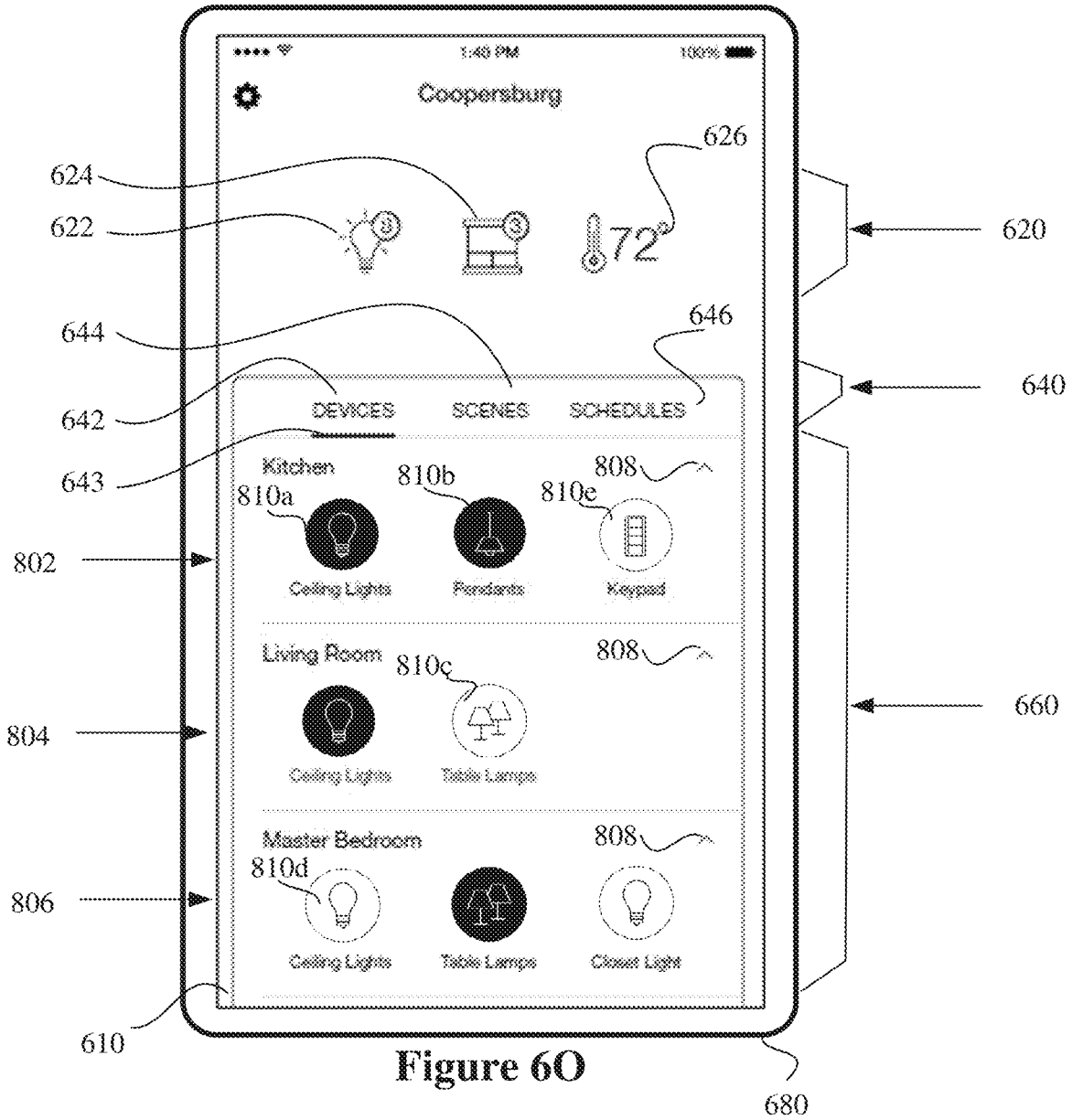
Figure 6P:
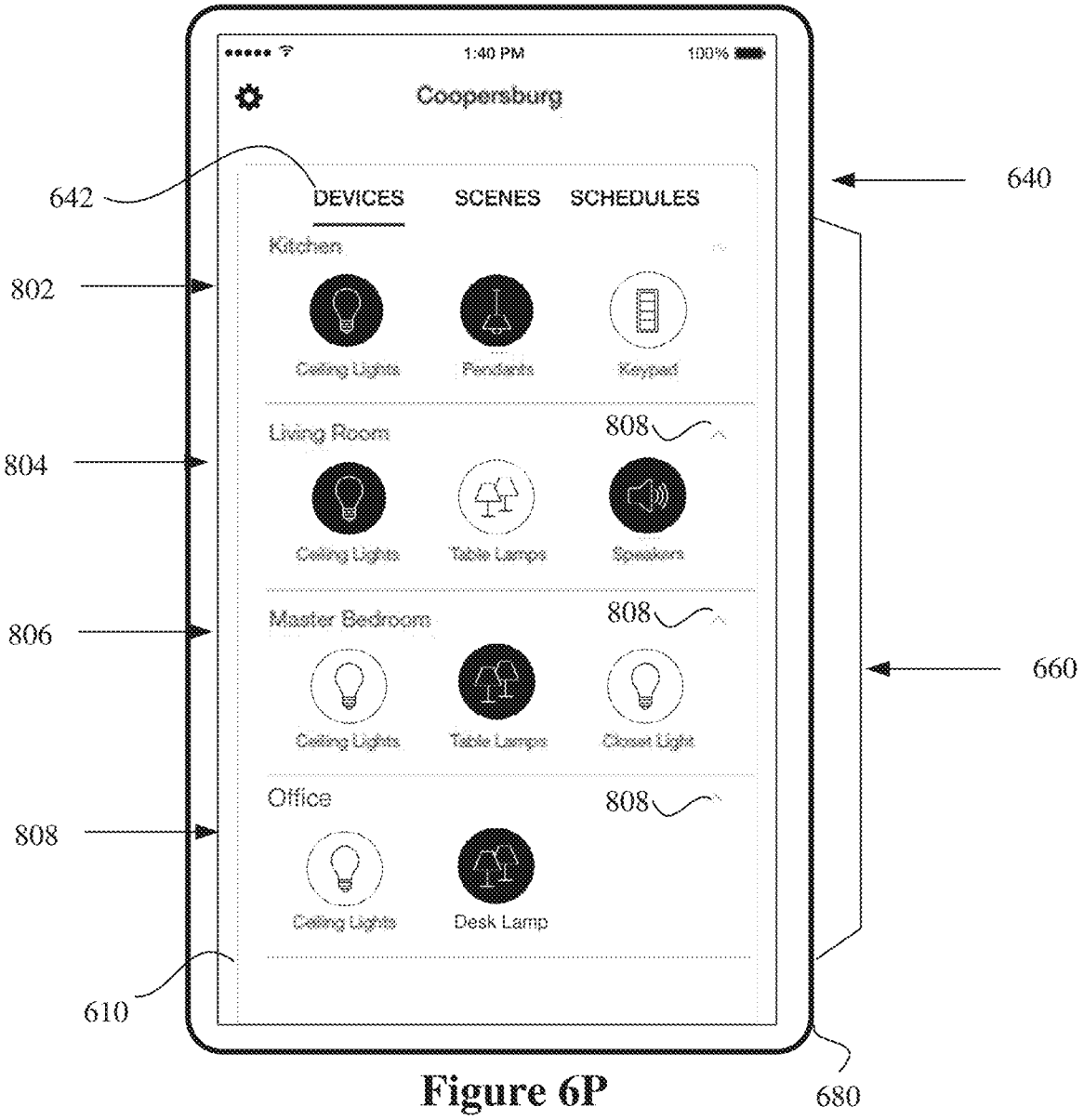
Figure 6Q:
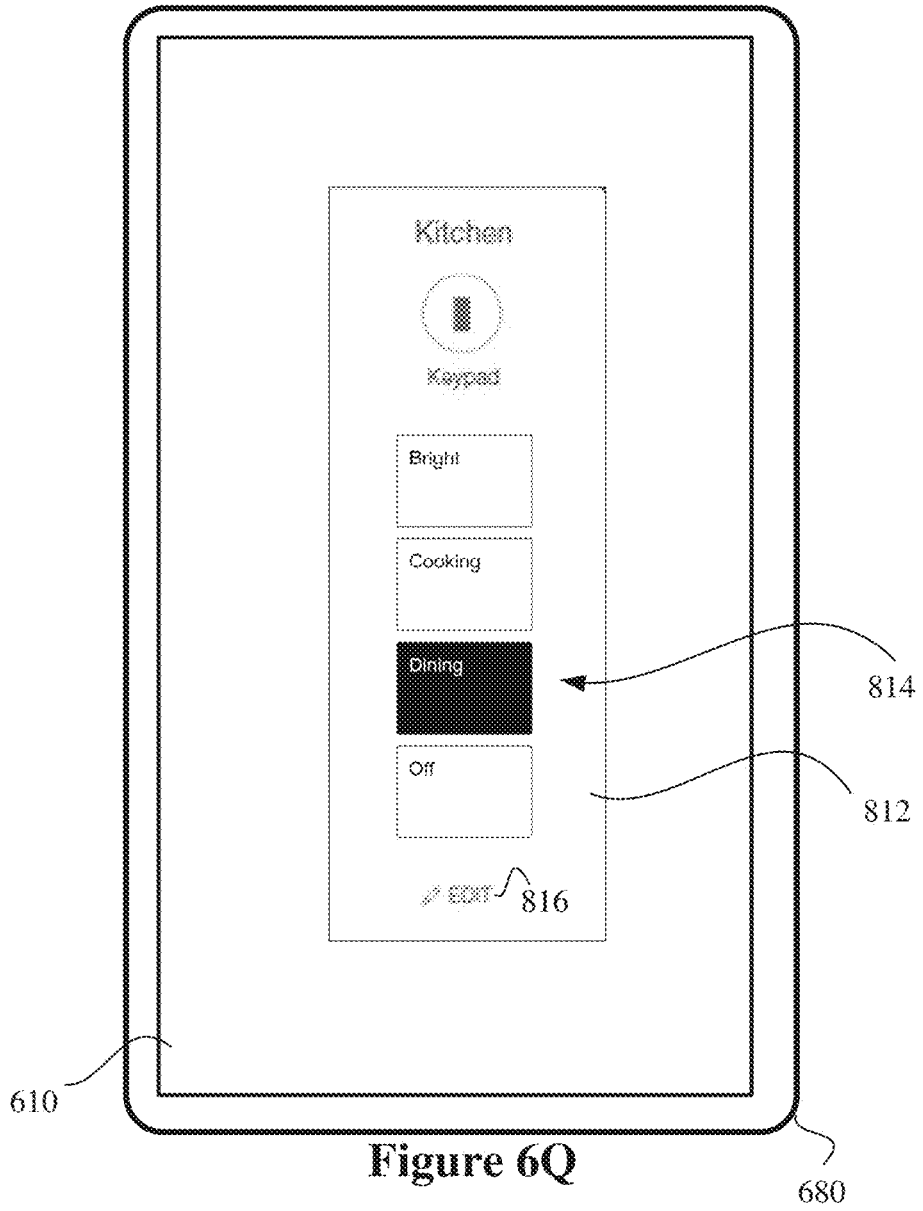
Figure 6R:
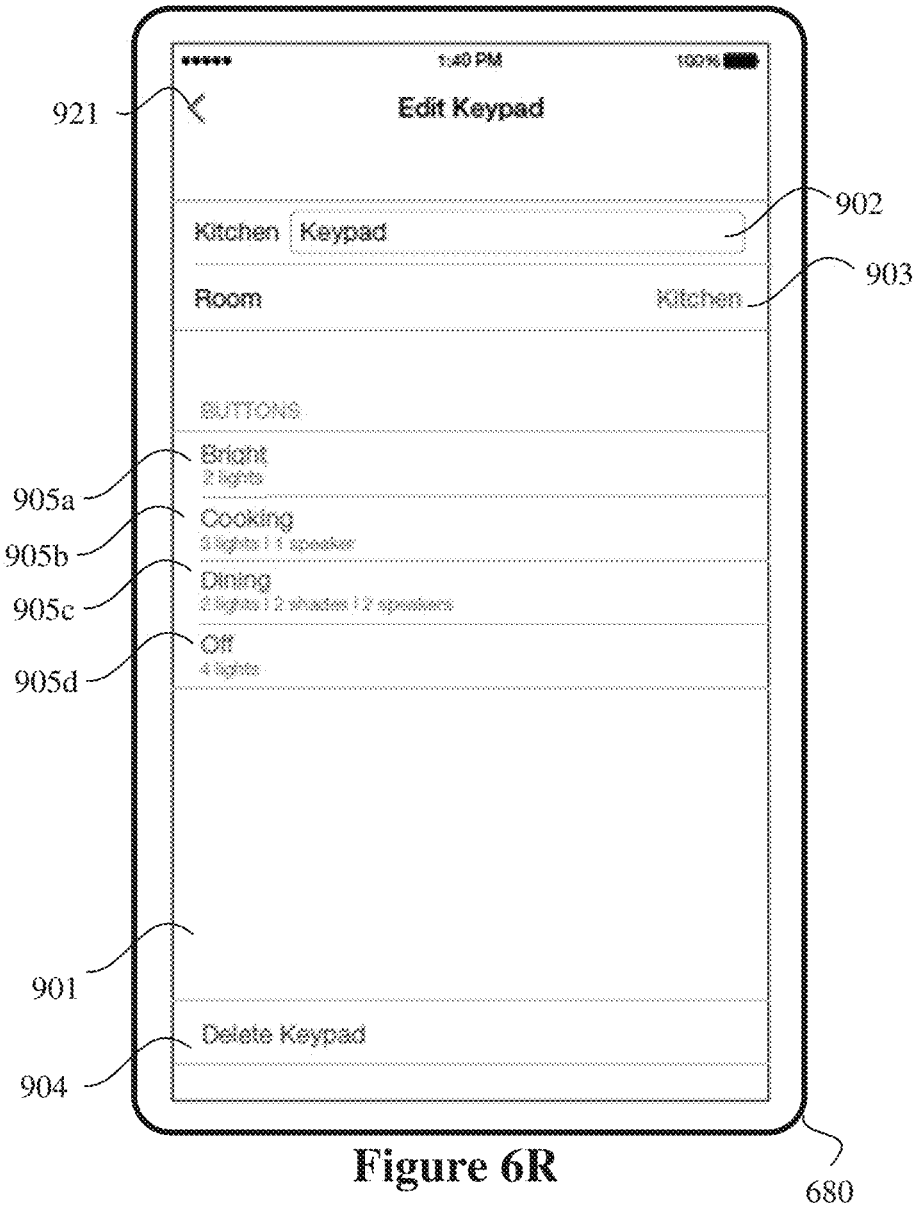
Figure 6S:
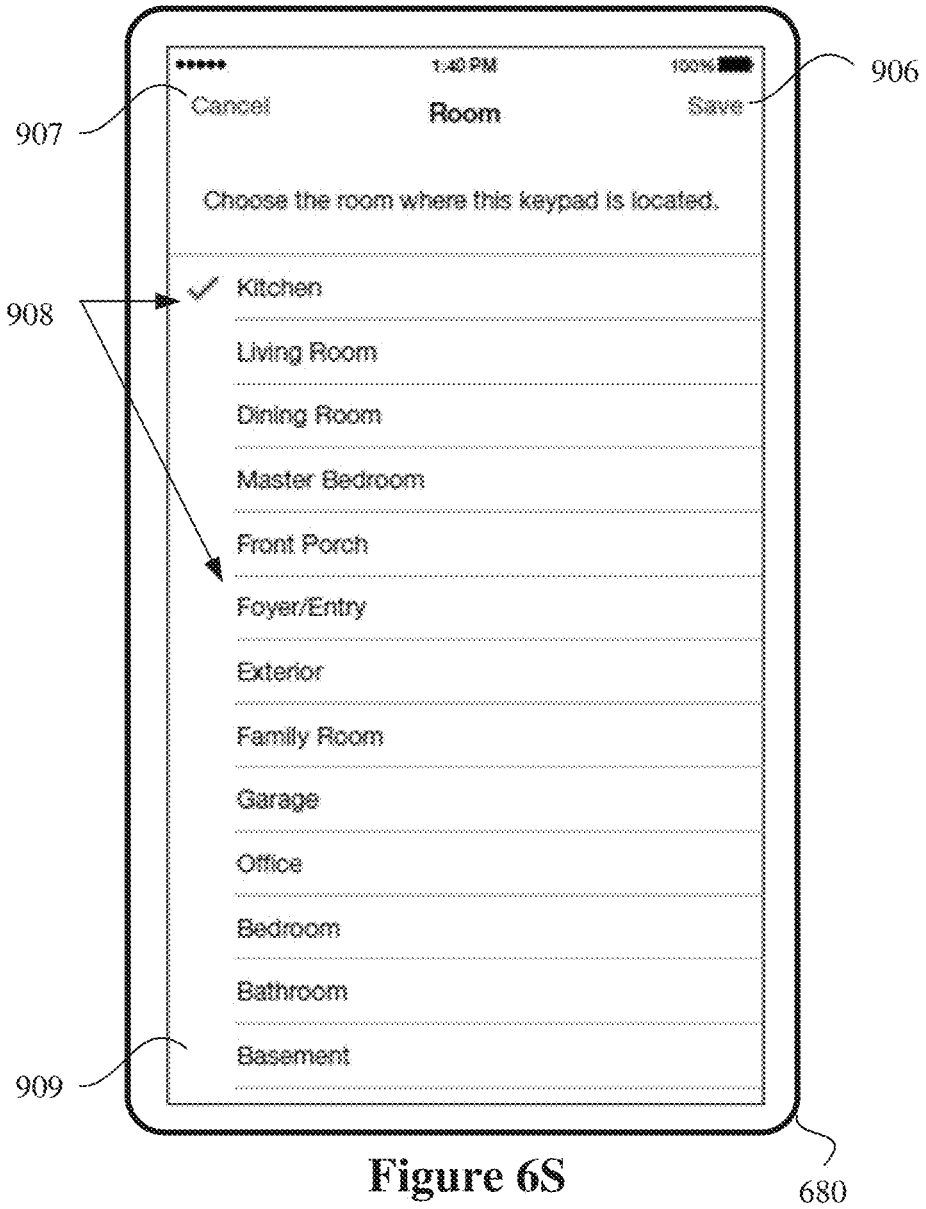
Figure 6T:
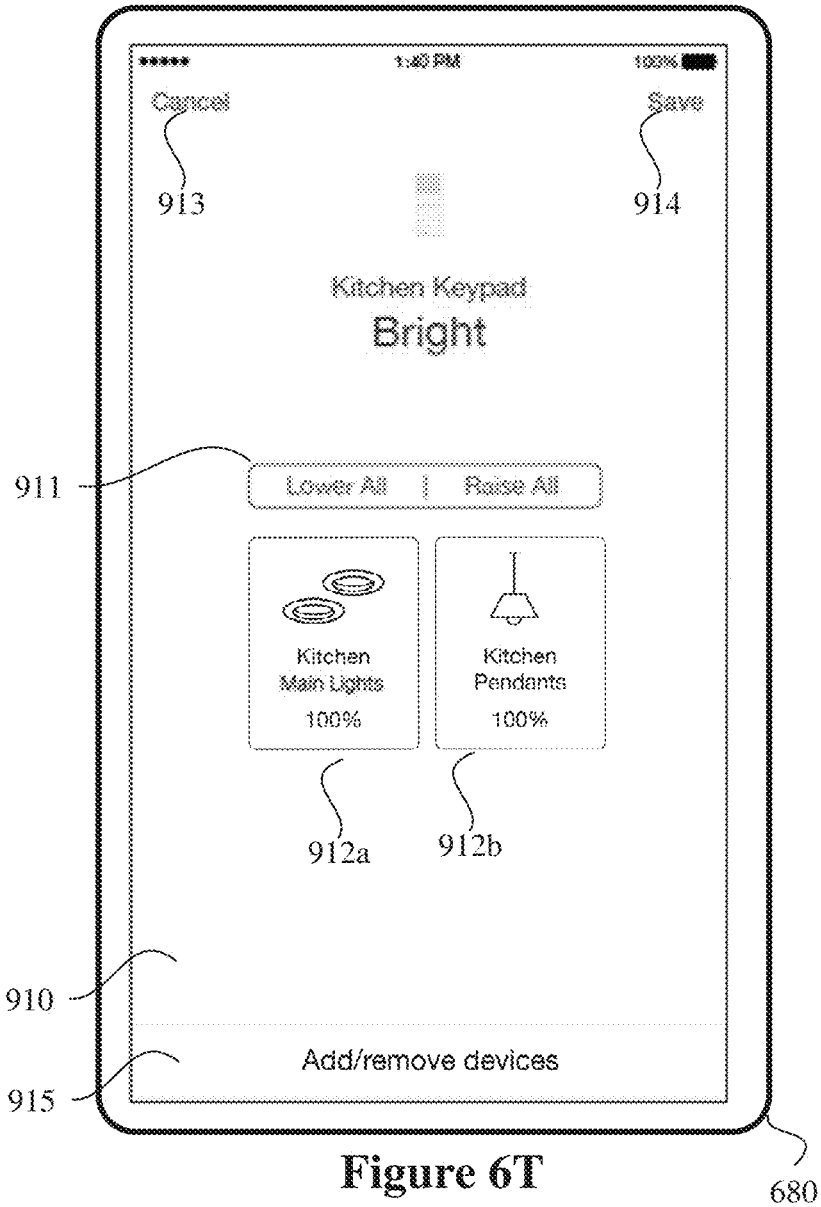
Figure 6U:
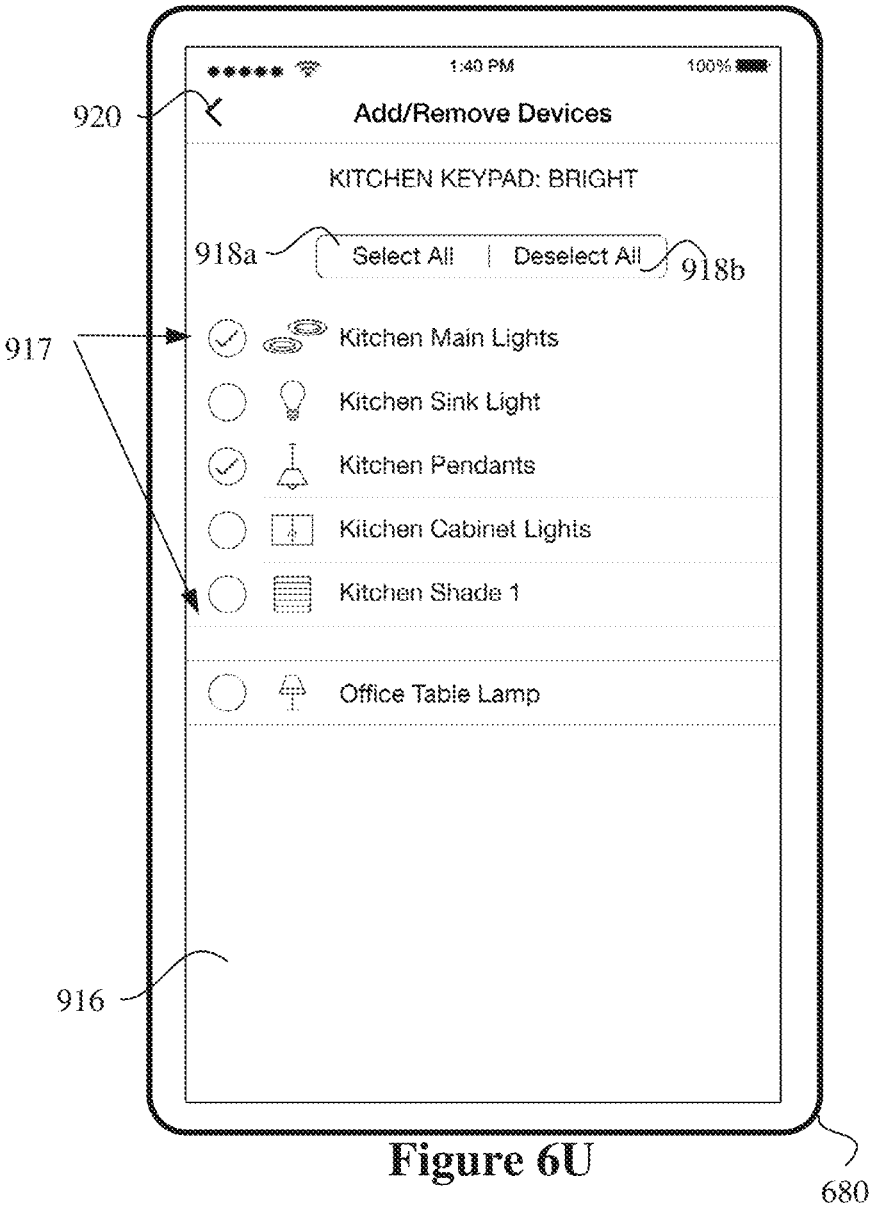
Figure 6V:
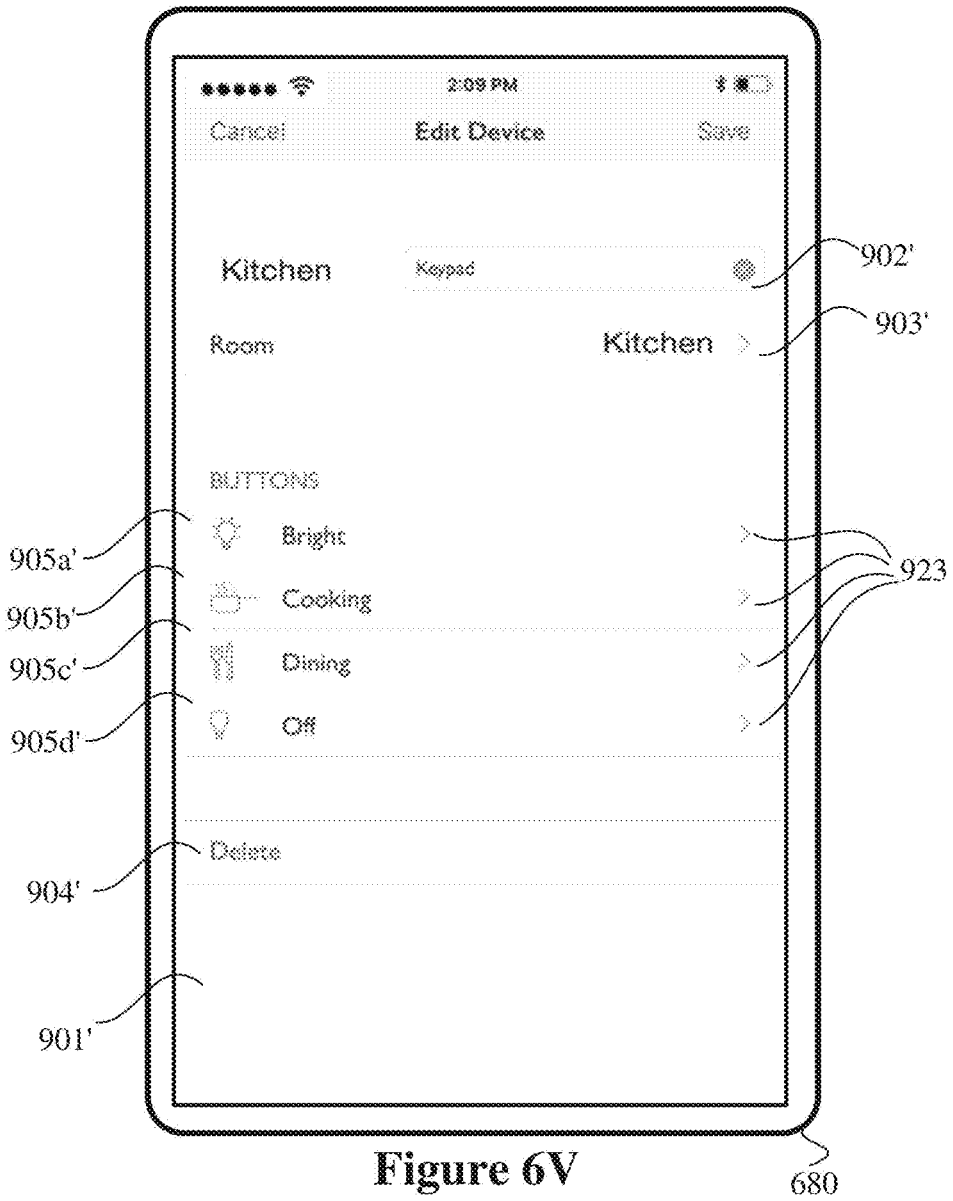

With reference now to FIGS. 6A-V an example control application 1103 (FIG. 12) is now described that may execute at least in part on a network device 680. Network device 680 may be similar to any of network devices 144, 280a-280b, 380, and 580 as described herein and may be a personal computer (PC), a laptop, a tablet, a smart phone, or equivalent device, for example, although it may also be another type of computing device. The control application may be a graphical user interface (GUI) based application that may provide a GUI based interface/GUI based "window(s)" to a user via the network device 680 and that may allow a user of the network device to interact with, control, and/or configure control devices within a user environment (such as control devices 220a of user environment 202a). For description purposes only, load control system 210a of user environment 202a and the communication systems described with respect to FIG. 2-FIG. 5 will be used herein as an example load control system and communication system to describe the control application. Nonetheless, the features and functions of the control application 1103 described herein are applicable to other types of control devices, load control systems, and communication systems. As an example, the user environment 202a may be a residence or home and the user of the network device 680 may a residence of the home. Nonetheless, the example control application may be also applicable to other types of user environments such as a building, hotel, etc.

Figure 12:
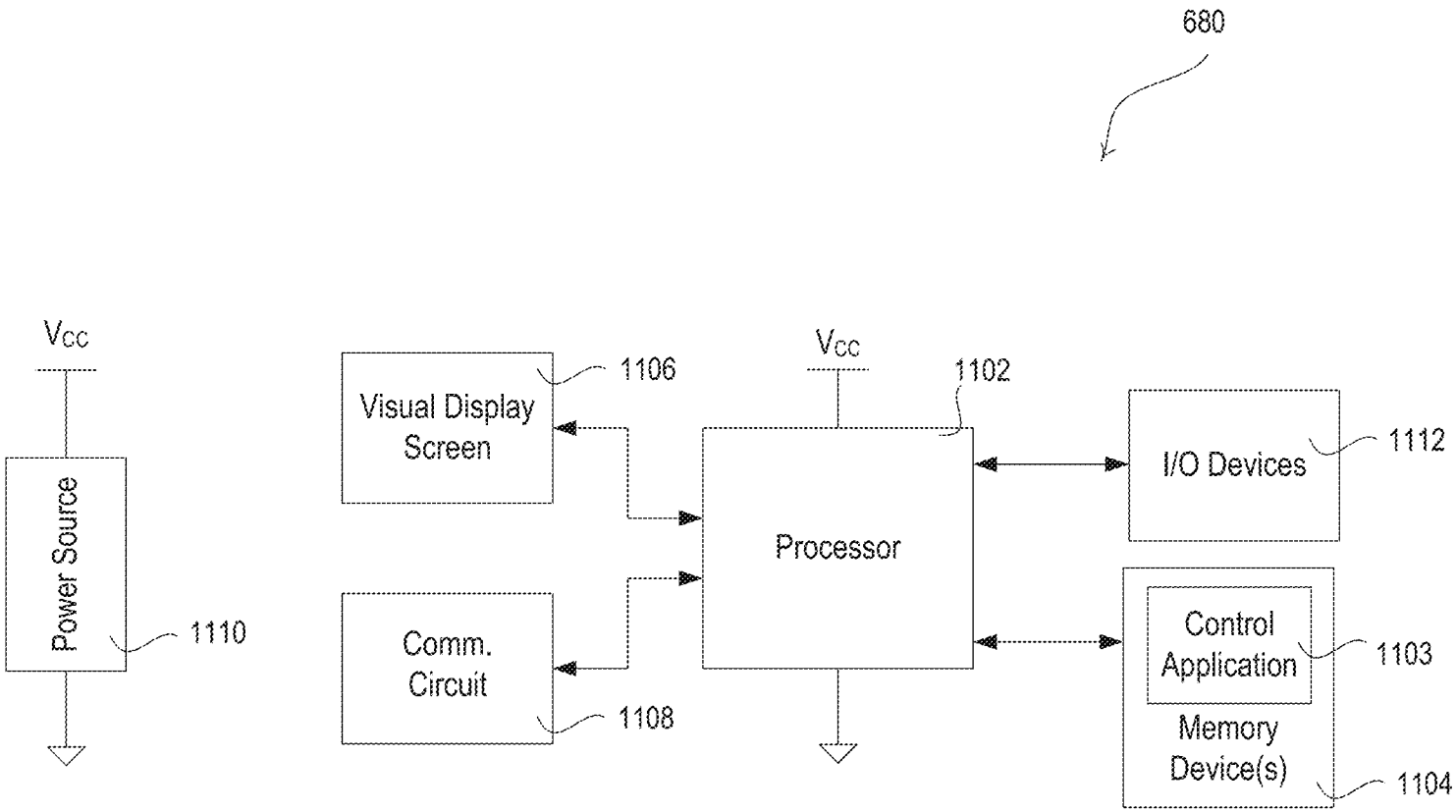
FIG. 12 is a block diagram of an example network device.

FIG. 12 shows an example block diagram of network device 680 (this diagram may also apply to any of network devices 144, 280a-280b, 380, and 580, for example). Network device 680 may include one or more general purpose processors, special purpose processors, conventional processors, digital signal processors (DSPs), microprocessors, microcontrollers, integrated circuits, programmable logic devices (PLD), application specific integrated circuits (ASICs), or the like and/or may further include other processing element(s) such as one or more graphic processors (hereinafter collectively referred to as processor(s) 1102). Processor(s) 1102 may control the functionality of the network device and may execute the control application 1103, in addition to other software applications such an operating system(s), database management systems, etc., to provide features and functions as describe herein. The processor(s) 1102 may also perform signal coding, data processing, power control, input/output processing, and any other functionality that enables the network device 680 to perform as described herein. The network device 680 may also include one or more memory modules/devices 1104 (including volatile and non-volatile memory modules/devices) which may be non-removable memory modules/devices and/or a removable memory modules/devices. Memory modules/devices 1104 may be communicatively coupled to the processor(s) 1102. Non-removable memory modules/devices 1104 may include random-access memory (RAM), read-only memory (ROM), a hard disk(s), or any other type of non-removable memory storage. Removable memory modules/devices 1104 may include a subscriber identity module (SIM) card, a memory stick, a memory card, or any other type of removable memory. The one or more memory modules/devices 1104 may store the control application 1103 and may also provide an execution space as the processor(s) execute the control application. Network device 680 may also include a visual display screen(s)/terminal(s) 1106 that may be communicatively coupled to the processor(s) 1102. Together with processor(s) 1102, visual display screen(s) 1106 may display information to the user via one or more GUI based interfaces/GUI based "window( )" as described herein. The display screen(s) 1106 and the processor(s) 1102 may be in two-way communication, as the display screen 1106 may include a touch sensitive visual screen module configured to receive information from a user and providing such information to the processor(s) 1102 Network device 680 may also include one or more input/output (I/O) devices 1112 (e.g., a keyboard, a touch sensitive pad, a mouse, a trackball, audio speaker, audio receiver, etc.) that may be communicatively coupled to the processor(s) 1102. The I/O devices may allow the user to interact with the control application 1103, for example. Network device 680 may further include one or more transceivers/communications circuits (collectively, communications circuit(s) 1108) for communicating (transmitting and/or receiving) over wired and/or wireless communication networks, for example. The communications circuit(s) 1108 may include an RF transceiver(s) or other circuit(s) configured to perform wireless communications via an antenna(s). Communications circuit(s) 1108 may be in communication with processor(s) 1102 for transmitting and/or receiving information. Each of the modules within the network device 680 may be powered by a power source 1110. The power source 1110 may include an AC power supply and/or DC power supply, for example. The power source 1110 may generate a supply voltage $V_{CC}$ for powering the modules within the network device 680.

In addition to including GUI based software modules, for example, that provide the graphical features and visual images described herein, the control application 1103 may also include a logic engine(s) for providing features of the GUI and features of the application in general as described herein. The GUI based software modules and/or logic engine may be one or more software based modules that include instructions, for example, that are stored on and/or execute from one or more tangible memory devices/modules of the network device as indicated above. Features of the control application may also and/or alternatively be provided by firmware and/or hardware in addition to/as an alternative to software based modules. Again, network device 680 is an example and the control application may execute on other types of computing devices.

As indicted, network device 680 may be similar to any of network devices 144, 280a-280b, 380, and 580 as described herein. Accordingly, the control application may communicate with system controller 250a of the user environment 202a via a network local to the user environment (such as a Wi-Fi network) similar to device 144 as described herein, may communicate with system controller 250a using a message based protocol (e.g., MQTT) and a message broker (e.g., message broker 270) similar to network devices 280a-280b as described herein, and/or may communicate with system controller 250a using an HTTP based interface similar to network device 380 and/or network device 580 as described herein. Nonetheless, one will recognize that the control application 1103/network device 680 may communicate with system controller 250a using other communication systems and/or protocols, etc. In addition, the control application 1103 is described herein as being a self-contained application that executes on the network device and communicates messages with the system controller 250a, for example. In other words, logic of the control application and generated graphics associated with the application are described herein as executing from the network device. Nonetheless, features and/or graphics of the control application may be implemented in other fashions, such as a web hosted application with the network device interfacing with the web hosted application using a local application (e.g., a web browser or other application) for providing features and functions as described herein.

In general, while user environment 202a may include control devices 220a that the control application/network device 680 may interact with, control, and/or configure via system controller 250a, the user environment may also include other types of control devices that may be, for example, Wi-Fi enabled and/or HomeKit enabled control devices for example (e.g., devices that are configured to communicate via wireless and/or wired based networks). For description purposes only, such other control devices (i.e., control devices to which the control application/network device 680 does not communicate with via the system controller) will be referred to herein as Wi-Fi enabled and/or HomeKit enabled control devices. Nonetheless, one will recognize that the features described herein are not limited to only Wi-Fi enabled and/or HomeKit enabled control devices. Examples of such other control devices may include lighting control devices/bulbs, thermostats, fans, etc. Network device 680 and these Wi-Fi enabled control devices, for example, may be configured to directly communicate with each other without having to communicate through system controller 250a (e.g., if the network device is also HomeKit enabled), and/or may communicate via one or more cloud based servers, for example, again without communicating through system controller 250a. According to one aspect of the control application 1103 described herein, assuming the network device is configured to communicate with such Wi-Fi enabled control devices (e.g., via HomeKit), for example, the control application may be configured to also interact with, control, and/or configure these devices, in addition to control devices 220a. In so doing, the control application may combine within the graphical interfaces described herein information obtained from such Wi-Fi enabled devices, for example, and information obtained on control devices 220a that are controlled by the system controller 250a. The control application may also provide interfaces that allow a user to control both Wi-Fi enabled control devices, for example, and control devices 220a that are controlled by the system controller. For ease of description, the control application will be described herein as interacting with control devices 220a of load control system 210a. Nonetheless, similar functionality as described herein may also apply to Wi-Fi enabled devices that are not controlled via the system controller 250a and to which the network device may directly and/or indirectly communicate with. Which types of devices the control application is interacting with may not be readily apparent to the user. One will also recognize that the control application described herein may alternatively only control Wi-Fi enabled devices, for example, that the network device is configured to directly and/or indirectly control/interact with. Again, one will further recognize that while control application 1103 is described herein in the context of load control system 210a and communication systems such as those described in reference to FIG. 2-FIG. 5, the features and functions of the control application are applicable to other types of control devices, load control systems, and communication systems including for example, Wi-Fi enabled and/or HomeKit enabled systems As one example, the network device 680 may display to a user via a visual display screen an icon associated with the control application. The network device may detect the selection of the icon by the user (such as detecting the using touching the icon) and in response, may start (which may also be referred to herein as launching, running, executing, activating and/or invoking) the control application (One will recognize that the control application may be started in other ways, including the network device being configured to automatically start the application upon being reset and/or powered on). In response to being started or launched, the control application (in addition to performing security/authentication procedures, for example) may communicate one or more messages to the system controller 250a, for example, to obtain/request/query for various information, such as status/state and/or configuration information of the load control system 210a, and use this information to initially generate and display to the user via the display screen of the network device 680 a graphical user interface, such as interface 610 of FIG. 6A. Again, at starting, for example, the control application may also communicate with Wi-Fi enabled devices, for example, the network devices has been configured to communicate with. Thereafter, the control application may continue to request and/or receive various information from the system controller 250a at various times depending on what information the control application may need to display to the user and/or is being generated by the system controller. (Again, the control application may also communicate with Wi-Fi enabled devices in a similar fashion.) Upon receiving information requests from the control application (such as requests for status and configuration information), system controller 250a may respond by communicating with control devices 210a and/or database 254, for example, to determine and provide the requested information and respond to the control application with one or more response messages. In addition to determining status and configuration of the load control system, for example, the control application may also allow a user to communicate messages to the system controller 250a to modify, edit or change the configuration and/or state of the load control system 250a as further described herein. In addition, the system controller 250a may also asynchronously provide status and configuration information to the control application (e.g., provide an indication of status/state changes of control devices without the control application querying for such changes). The control application may use this information to update various graphical user interfaces displayed to the user via the network device 680. (Again, Wi-Fi enabled devices and the control application/network device may interact in similar fashions). Again, the control application/network device 680 and system controller 250a may communicate using mechanisms as discussed above with reference to FIGS. 2-5.

Before turning to various graphical user interfaces the control application may provide to a user, a description of example types of information the control application may request/receive from the system controller 250a, for example, to generate interfaces is first discussed. One will recognize that these are examples and other types of information may be provided. In addition to receiving such information from the system controller, the control application may also alter such information at the system controller, as described below.

The control application may request/obtain from the system controller 250a information related to the configuration and current state/status of load control system 210a. Such information provided by the system controller 250a may include the specific control devices that are part of the load control system 210a including an identifier that indicates the type of the control device The specific control device types may include one or more lighting control devices (referred to herein also as lighting devices) that each directly controls one or more respective electrical lighting loads/lights, one or more temperature control devices (such as and hereinafter also referred to as a thermostat device(s)) that directly control respective HVAC systems, one or more ceiling fan devices (also referred to herein as fan devices) that each directly controls one or more respective fans (e.g., on, off, fan speed), one or more audio control devices (e.g., a speaker system), and one or more window shade devices that each directly controls positions or levels of one or more respective shades (One will recognize that while shade devices and shades are discussed herein as an example of motorized window treatments and window covering, other types of motorized window treatments and window coverings are possible such as drapes, curtains, blinds, etc.). The control devices may also include one or more keypads, such as wall-mounted keypads, tabletop keypads, and/or remote-control/handheld keypads and devices. As an example, a given keypad may include one or more actuators such as buttons (although other types of actuators are possible), and may be configured to control one or more control devices/electrical loads (e.g., lighting control devices/lighting load(s), HVAC system(s), shade(s), fan(s), and/or speaker(s), etc.). In general, a keypad may include different types of actuators such as on/off actuators, raise lower actuators for lights or shades, fan speed actuators, scene actuators, etc. A scene actuator may set one or more control devices/electrical loads controlled by the keypad to a pre-set configuration.

The control devices may also include one or more occupancy/vacancy sensors and/or one or more vacancy only sensors. As an example, an occupancy/vacancy sensor may signal to other control devices a detected occupancy event/condition and a detected vacancy event/condition (e.g., after detecting an occupancy event). The sensor may signal these events by generating an occupancy signal(s)/message(s) when the sensor detects an occupancy event, by generating periodic occupancy signal(s)/message(s) as it detects a continued occupancy event, and/or by generating vacancy signal(s)/message(s) when it detects a vacancy event (e.g., after detecting an occupancy event). As another example, it may signal a vacancy event by ceasing to generate periodic occupancy signal(s)/message(s). A vacancy only sensor may signal to other control devices a detected vacancy event/condition (e.g., after detecting an occupancy event). It may signal these events by generating vacancy signal(s)/message(s) when it detects a vacancy event (e.g., after detecting an occupancy event). In this example, the sensor may still generate a signal(s)/message(s) when it detects an occupancy event, but control devices may not be responsive to such signals. As another example, a vacancy only sensor may signal a vacancy event by ceasing to generate periodic occupancy signal(s)/message(s). One will recognize that these are examples and sensors may operate in other ways based on detected occupancy/vacancy events. One will also recognize that when a sensor detects an occupancy and/or vacancy event, it may communicate these events in various ways such as communicating signals or messages, etc. Such signals etc. may be communicated via wireless communications, wired communications, optical communications, etc. Other examples are possible. For ease of description, occupancy/vacancy sensors and vacancy only sensors are referred to herein collectively as occupancy sensors and a sensor is referred to as generating signals when detecting occupancy and/or vacancy events.

Load control system 210a may be configured such that one or more control devices 220a may be responsive to the signals from a given occupancy sensor (e.g., be responsive to occupancy and/or vacancy events detected by the sensor). For example, load control system 210a may be configured such that one or more lighting control devices may be responsive to occupancy and vacancy signals from a given occupancy sensor. For example, in response to an occupancy signal from an occupancy sensor, a given lighting control device that is off (i.e., its respective lighting load(s) are in an off state) may turn its respective lighting load(s) on and in particular, may set the lighting load(s) to a defined lighting/dimming level(s). In response to a vacancy signal, the given lighting control device, when on, may turn its respective lighting load(s) off or may reduce their lighting level(s) to a defined lighting/dimming level(s). As another example, load control system 210a may be configured such that one or more lighting control devices may be responsive only to occupancy signals from a given occupancy sensor. As a further example, load control system 210a may be configured such that one or more lighting control devices may be responsive only to vacancy signals from a given occupancy sensor. For example, in response to an occupancy signal from an occupancy sensor, a given lighting control device may ignore the signal. In response to a vacancy signal, the given lighting control device, when on, may turn its respective lighting load(s) off or may reduce their lighting level(s) to a defined lighting/dimming level(s). How a given lighting control device responds to occupancy and/or vacancy signals from a given occupancy sensor may be stored at the sensor and conveyed to the lighting control device as part of the signals, may be stored at the lighting control device itself, and/or may be stored at the system controller 250a, for example, which may receive the occupancy and vacancy signals and may subsequently control the lighting control device. One will recognize that a given lighting control device may be responsive to signals from more than one occupancy sensor. Similarly, multiple lighting control devices may be responsive to signals from the same occupancy sensor, and may each be configured to react differently to the signals. One will also recognize that load control system 210a may be configured such that other control devices (e.g., fan devices, shade devices, thermostat devices, and audio devices, etc.) may be responsive to occupancy and/or vacancy signals from an occupancy sensor(s). In general, an occupancy sensor may be a standalone device, that is, a device that is separate from the control devices (such as lighting control devices) that may be responsive to the signals generated by the sensor. As another example, an occupancy sensor may be integrated with another control device, such as a lighting control device. The control device in which the sensor is integrated may be responsive to signals generated by the sensor and/or control devices separate from the control device in which the sensor is integrated may be responsive to signals generated by the sensor. One will recognize other examples are possible. One will recognize that load control system 210a may include other types of control devices.

The information provided by the system controller 250a may also include for each control device a location indicator that may indicate a location of the device within the user environment 202a and/or the location of the electrical loads the device controls. This indicator may be in the form of a location name (e.g., a text string) and/or an indicator that may be translated into a location name (e.g., a text string), although other mechanism may be used. For example, assuming the user environment is a home, possible locations may include standard locations like "kitchen," "living room," "family room," "dining room," "master bedroom," "bedroom," "master bathroom," "bathroom," "basement," "front porch," etc. Locations may also include sub-locations in a room like "basement—sitting area," "basement—game area," basement—work area," basement—storage area," etc. Locations may also include user defined/customized locations like: "Mary's bedroom," "John's bedroom," etc. The location of a control device may be programmed into load control system 210a (and stored in database 254, for example) by a user when installing the system within the user environment 202a. One will recognize these are examples.

For lighting control devices, the information provided by the system controller 250a may also include a type indicator that may indicate a type of a lighting load(s) (also referred to herein as a light(s)) controlled by the control device. A type of a lighting load may include, for example, the function/purpose of the lighting load within its defined location and/or indicate/suggest a specific location of the lighting load within its defined location (e.g., ceiling light vs floor lamp). A type indicator may be in the form of a name/function (e.g., a text string) and/or an indicator that may be translated into a name/function (e.g., a text string), although other mechanism may be used. As an example, assuming the user environment 202a is a home, standard types may include ceiling or overhead light, chandelier, pendant(s), table lamp(s), floor lamp(s), sconce(s), sink light(s) (e.g., for a kitchen or bathroom), island light(s) (e.g., for a kitchen), closet light(s), etc. Types may also include user defined/customized types. The type of lighting load may be programmed into load control system 210a (and stored in database 254, for example) by a user when installing the system within the user environment 202a. One will recognize these are examples. Types may also apply to other control devices such as fans, shades, and keypads. Again, the type indicator may provide an indication of a specific function and or location within the device's defined location. Other example types may include "left shade," "right shade," "center shade," "wall keypad," "tabletop keypad," etc.

The information provided by the system controller 250a may also include an indication of an icon to be used with applications (such as the control application) to graphically represent the control device on a graphical interface. The type of icon to associate with a device may be programmed into load control system 210a (and stored in database 254, for example) by a user or automatically when installing the system within the user environment 202a.

The information provided by the system controller 250a may also include a current status/state and/or configuration of one or more of the control devices. For example, for a lighting control device the status information may include whether the respective lighting load(s) are in an on or off state, and if in the on state whether it is a dimmed state and possibly further the dimming level. For a shade device, the status information may include whether the respective shade(s) are open/up, closed/down, partially open/up, and if partially open/up its actual level. For a thermostat device and its respective HVAC system, the status information may include the setpoint/target temperature of the system, the present room temperature as measured by the thermostat device, the current mode setting (e.g., heat, cool, auto, off), the current fan setting (e.g., on, auto), and schedule information (e.g., on vs off, assuming the thermostat device is programable to have schedules). For a ceiling fan device, the status information may include whether the respective fan(s) are in an on or off state, and if in the on state possibly the fan speed. For an audio control device (e.g., a speaker system), the status information may include whether the device is on/playing music for example, or off and/or muted. For a keypad device such as a wall mounted, tabletop, and/or handheld/remote keypad, the status information may include which actuator of the device was last actuated (i.e., is currently activated) and if the keypad has one or more actuators corresponding to scenes, the configuration of each scene (e.g., what control devices are part of the scene, the settings of these devices for the scene such as light levels or fan speeds, etc.). The control application may allow the user via the network device to modify these scenes and to create new scenes. For an occupancy sensor, the status information may include, for example, whether the sensor has detected an occupancy event/condition and/or is in an occupancy state, has detected a continued occupancy event/condition and/or is in a continued occupancy state, and/or has detected a vacancy condition and/or is in a vacancy state. Again, these are examples and other information is possible.

As another example, the system controller 250a may maintain information related to one or more pre-programmed scenes that may be actuated by a user from an application, such as the control application 1103. A scene may be, for example, certain settings for one or more lights, shades, etc. The system controller 250a may maintain respective scene configuration information in database 254. The control application may obtain from the system controller information related to these pre-programmed scenes and as further described below, thereafter allow the user via the network device to a select a given scene, resulting in the control application instruction the system controller to configure control devices 220a according to the selected scene (e.g., set one more light levels, fan speeds, shade levels, etc.). As also described below, the control application may allow a user to modify the pre-programmed scenes maintained by the system controller and to create and store at the system controller new scenes that may subsequently be selected by the user.

As a still further example, the system controller 250a may maintain various timeclock schedules where a schedule may be, for example, a certain setting for one or more control devices (e.g., lights, shades, etc.) that the system controller automatically configures based on a schedule. The system controller 250a may maintain respective timeclock schedules in database 254 and the status of these schedules, such as whether a given schedule is active, inactive, or disabled. The control application may obtain from the system control information related to these timeclock schedules and as further described below, thereafter allow the user via the network device to modify these schedules and to create new schedules.

Turning now to FIG. 6A, there is shown a graphical user interface 610 that may be initially displayed by the control application to a user via network device 680 upon the application initially starting (such as by the user selecting and starting the application at the network device). Again, information displayed in user interface 610 may be based on information obtained by the control application from the system controller 250a upon the application being started. User interface 610 may include three sections (which may also be referred to herein as panes or areas or spaces) including a status section (or pane) 620, a menu selection section (also referred to herein as a menu selection pane, a tab section or a tab pane) 640, and an information section (or pane) 660. As further described below, status section 620 may provide the user with a status/state of control devices 220a within the load control system 210a. Menu selection section 640 may provide the user with selectable tabs (here, three tabs are shown including a "Devices" tab 642, a "Scenes" tab 644, and a "Schedules" tab 646 although the section may include fewer or additional tabs, including the three tabs being in an order different than that shown). Section 640 may be scrollable left to right for example to display additional tabs, for example. The control application may change and/or display the information in section 660 depending on which tab is selected and thus, section 660 may be depend upon the selected tab. In general, information section 660 may provide the user with different status information and controls for controlling and/or configuring load control system 210a. In the example of FIG. 6A, the Devices tab 642 is active (as shown by the under-bar 643, although other means may be used such as reverse highlighting, etc. to indicate which tab is currently active). Here, section 660 shows information corresponding to the Devices tab 642. Upon the control application starting, it may default user interface 610 to the Devices tab 642 being active, although one of the other tabs may also be the default-active tab.

Beginning with section 620, as indicated this section may display the status/state of one or more control devices 220a within the load control system 210a. In this example, the control application displays three icons each indicating different status information. Icon 622 may be referred to herein as a lighting devices icon that indicates to the user the number of lighting control devices with respective lighting loads within the load control system that are currently on. Icon 624 may be referred to herein as a shades devices icon that indicates to the user the number of shade devices with respective shades within the load control system that are currently open/up (where open/up may be any shade state other than fully closed/down). Icon 626 may be referred to herein as a thermostat devices icon that indicates to the user a current temperature in the user environment 202a. One will recognize that fewer and/or additional icons conveying additional and/or other information to a user may be displayed by the control application in section 620. For example, FIG. 6B shows another example graphical user interface 601 that includes an icon 628 that may be referred to herein as an audio devices icon that may indicate to the user a status of audio devices within the load control system, such as whether any audio devices are currently on/playing music and/or the number of devices that are currently on/playing music. The control application may be configured such that section 620 is "scrollable" by the user (such as left to right or up/down) in order to display additional icons. As another example, section 620 may be configured such that there are multiple rows of icons displayed at one time to a user. As another example, section 620 may include what is referred to herein as a fans icon 776 as shown in FIG. 6L that may indicate to the user a status of fan devices within the load control system, such as the number of fans that are currently on. Section 620 may also be configurable by the user of the application such that only certain icons and corresponding status information are shown to the user, while others are not. According to another example, if there is no status to report for a given load control device (such as all lighting devices are off), the control application may not display the corresponding icon at all. Other examples are possible. Reference will now be made in further detail to representative icons that may be displayed by the control application in section 620

Beginning with icon 622, as indicated it may be a lighting devices icon that indicates to the user the number of lighting control devices with respective lighting loads within the load control system 210a that are currently on. The control application may determine this number based on information obtained from the system controller 250a. A given lighting control device may control more than one lighting load and may control these loads in unison (or may individually control these loads to different states). According to one example, the control application may view a given lighting control device and its respective lighting loads as one device. In this example, as long as one lighting load controlled by the lighting control device is in an on state, the control application may count this as one (1) with respect to the number associated with icon 622, regardless of the number of controlled loads that are actually controlled by the device (and that may actually be on). Nonetheless, one will recognize that the number associated with icon 622 may represent the actual number of lighting loads controlled by each lighting control device. Here, the control application may view each lighting load controlled by a given lighting control device individually. In this example, the number associated with icon 622 may be representative of each lighting load. Hence, if two lighting loads controlled by a lighting control device are in an on state, the control application may count this as two (2) with respect to icon 622. For description purposes, the control application is described herein from the perspective of a lighting control device, where the lighting control device and its respective lighting loads are treated as a single unit. In this example of FIG. 6A, the control application has determined based on information received from the system controller 250a that eight lighting control devices have loads currently on (where on may include a lighting load in a dimmed state and/or a fully on state). The control application may indicate this determination to the user through the displayed number "8" associated with the icon 622 as shown in FIG. 6A (although one will recognize that other variations are possible such as displaying the word "eight", or a symbol that represents 8, such as 8 dots, etc.). As one example, the control application may actually perform the count to determine the number 8 based on information received from the system controller (e.g., search the list of lighting control devices and determine how many are in an on state) or the system controller may perform the count and report the resulting value to the control application. Other variations are possible. In addition to displaying the number of lighting control devices determined to be currently on (i.e., that have at least one of its respective lighting loads on), the control application may actively update the number (increment/decrement) that is displayed by icon 622 based on, for example, the system controller 250a actively monitoring the on/off state of lighting control devices in the user environment (e.g., as a result of a user in the environment turning lights on and off) and asynchronously reporting (such as in "real-time" or as the state change event occurs) this information to the control application. As another alternative, the control application, subsequent to being started, may periodically request from system controller 250a the status of the lighting control devices and/or lighting loads and update the number displayed by icon 622 based on the response from the system controller 250a. In this fashion, icon 622 allows a user to quickly and easily determine from network device 680 whether any lighting loads are on in the user environment. If no lighting loads are determined to be currently on, the control application may display the value "0" with icon 622, may display no value with the icon, may not display the icon at all (thereby indicating no lighting control devices are on, etc.). Other variations are possible. For example, rather than displaying a number with icon 622, the control application may display the icon when any lighting load is on and not display the icon when all lighting loads are off. As a still further example, icon 622 may indicate the number of lighting control devices having respective lighting loads in the off state.

Icon 622 may also be selectable by the user. Upon detecting/determining that the user has selected icon 622, the control application may display to the user via network device 680 the graphical user interface 702 as shown in FIG. 6C. Interface 702 may continue to display to the icon 622 and the number of lighting control devices having at least one lighting load determined to be currently on. Interface 702 may also include a "Turn All Lights Off" icon 704 (although other text and/or icons may be used), which may be selectable by the user. Interface 702 may also include a respective icon 706 for each lighting control device having lighting loads that are currently on (Again, according to this example, the control application may be configured to treat a lighting control device and its respective lighting load(s) as one unit, collectively representing the unit as one icon. As an alternative, each lighting load controlled by a lighting control device may be represented by an icon in interface 702, or some combination thereof). Each of these icons may also be selectable by the user. In this example, eight icons 706 are shown in connection with the value "8" as shown with icon 622. The control application may use the location indicator associated with each lighting control device to display with each icon an indication of the respective device's/lighting load's location in the user environment (in this example, textual information such as, "Kitchen," "Living Room," "Front Porch," and "Master Bedroom" are used, although other mechanisms are possible such as segregating icons by location, similar to section 660 of FIG. 6A but only displaying icons for devices currently on). The control application may also use the type indicator associated with each lighting control device to display in connection with each icon a further indication of the device's/lighting load's location and/or function (in this example, textual information such as, "Ceiling Lights," "Pendants," "Sink Light," "Sconces," and "Table Lamps" are used, although other mechanisms are possible). As further shown in FIG. 6C, different icons may be used for various lighting control devices/lighting loads (here, example icons representative of a pendant, table lamp, sconce, and light bulb are used and other icons are possible). As indicated, the system controller may provide an indication of the type of icon the control application should use. As another example, the control application may use the location indicator and/or type indicator associated with each lighting control device, for example, to determine which icon to use. In general, the control application's use of textual information and customized icons allows the user to more easily determine the actual lighting control device/lights in the user environment the icon refers to.

According to a further aspect of interface 702, in a similar fashion to the control application actively updating the number displayed by icon 622 based on, for example, the system controller 250a actively monitoring the state of lighting control devices in the user environment, the control application may actively update the icons 706 displayed to the user as lighting control devices in the user environment change state from on to off and off to on (i.e., as lighting loads controlled by the device change state). In other words, as a lighting control device turns its respective lighting load(s) on (e.g., at least one of the loads), the control application may receive an indication of this change from the system controller 250a (for example, automatically or in response to a query by the control application) and display to the user an additional icon 706 in interface 702 that is associated with the lighting control device (in addition to incrementing the number associated with icon 622). Similarly, as a lighting control device turns all its respective lighting load(s) off, the control application may receive an indication of this change from the system controller 250a and remove from interface 702 the icon 706 associated with the lighting control device (in addition to decrementing the number associated with icon 622). As another example, rather than remove the icon from interface 702, the control application may change the appearance of the icon (e.g., change its color or contrast as compared to other icons) to signify off. If interface 702 is subsequently closed and then returned to by the user, the control application may now not display the icon. Other variations are possible.

Turning now to icon 704, as indicated, this icon may be selectable by the user and may allow the user to turn off all lighting control devices and thus lighting loads that are currently on in the load control system 210a. Upon detecting/determining that the user selected the icon, the control application may communicate one or more messages to the system controller 250a instructing the system controller to turn all lighting control devices/lights off. Once completed, the system controller 250a may provide a response to the control application (automatically or in response to a query, for example) indicating that the lighting control devices are now off. In response, the control application may change the number associated with icon 622 to "0" for example (or show no value for example), and remove all icons 704 from interface 702 or change the appearance of the icons, for example. The control application may also deactivate icon 704 since all lighting control devices/lights are off (where deactivating may include making the icon non-selectable by a user and/or changing the appearance of icon 704 such as by changing its color or contrast as compared to other icons, removing the icon from interface 702, etc.). Once a lighting control device returns to the on state (such as by a user in the user environment 202a turning a light on), in addition to incrementing the number associated with icon 622 to "1" for example, and displaying an icon 704 in interface 702 representing the lighting control device, the control application may also activate/re-activate icon 704 (where activating the icon may include making the icon selectable by a user and/or changing the appearance of icon 704 such as by changing its color or contrast as compared to other icons, displaying the icon in interface 702, etc.). One will recognize that other examples are possible such as interface 702 also/alternatively including a "Turn All Lights On" icon, which upon selection, may cause the control application to communicate one or more messages to the system controller to turn all lights in the user environment to an on state (or a pre-programmed set of lights to an on state). Again, such an action by a user may cause the control application to increment the number associated with icon 622 and to display respective icons 706 accordingly. As an alternative and/or in addition to selecting icon 704, icons 706 may also be selectable by the user and allow the user to individually control the lighting control devices and thus lights/lighting loads associated with the icons (One will recognize that as an alternative, if the control application is configured to show icons 706 in a fashion that indicates the respective lighting control device is off, the icon may continue to be selectable by the user to also control the device.) Upon detecting/determining that the user selected a given one of the icons 706, the control application may display to the user an interface to control the respective device.

For example, assuming the control application detects/determines that the user selects the icon 706 labeled "Kitchen Ceiling Lights," the control application may display the control interface 708 shown in FIG. 6D (in this example, the lights are controlled as one to a common state). Control interface 708 may be shown alone or superimposed over interface 702, for example. One will recognize that control interface 708 is an example and other controls are possible. The control application may determine based on information provided by the system controller (e.g., from the type indicator) whether the "Kitchen Ceiling Lights" are configured as dimmable lights or simply on/off lights etc. and based on that determination may display an appropriate control interface. In this example, the "Kitchen Ceiling Lights" may be configured as dimmable lights and as such, the control application may display control interface 708 with a movable/slide-able actuator 710 (e.g., a vertically movable actuator) that may be actuated/moved by the user. The control application may initially display the actuator 710, as in this example, to provide an indication to the user of a current dimming state of the lights (e.g., the actuator is approximately mid-way along its possible path). Based on detecting movement of actuator 710 by the user (such as raising or lowering the intensity of the lights, turning the lights off, etc.), the control application may communicate one or more messages to the system controller 250a to instruct the controller to reconfigure the lighting control device/lights based on the user's instructions. If the user turns the lights off such as by moving the actuator 710 to its lowest most position at 709, this update may be reflected in icon 622 (e.g., decrementing the number) and interface 702 as similarly discussed above by removing or altering the appearance of the icon 706 corresponding to the "Kitchen Ceiling Lights." As shown in FIG. 6D, control interface 708 may also include a selectable "Edit" icon 712 that when selected, may cause the control application to display a user interface that may allow a user to reconfigure the respective lighting control device/lights (here, the "Kitchen Ceiling Lights"). For example, referring to FIG. 6E, there is shown an example configuration interface 790 the control application may display to a user upon detecting selection of the "edit" icon 712. Interface 790 may include a field 791 and/or an actuator/icon 791' configured to enable a user to change the type indicator (here "Ceiling Lights") associated with the lighting control device, (e.g., through a drop-down menu of defined types obtained via actuation of actuator 791', a free text field 791, etc.) Interface may also include an actuator/icon 792 configured to enable a user to change the location indicator (here, "Kitchen") associated with the lighting control device (e.g., through a drop-down menu of defined locations obtained via actuation of actuator 792). Interface 790 may include an actuator/icon 793 configured to enable a user to change the icon associated with the lighting control device/lights (e.g., through a drop-down menu of defined icons obtained via actuation of actuator 793). The interface may include an actuator/icon 794 configured to enable a user to adjust or configure the trim level of the lighting control device/lights, such as a low-end trim level (e.g., a minimum light level the light(s) may be controlled to and/or a high-end trim level (e.g., a maximum light level the light(s) may be controlled to) (e.g., through a drop-down menu of defined trim levels obtained via actuation of actuator 794). Interface 790 may include an actuator/icon 795 configured to enable a user to adjust or configure whether the lighting control device controls the dimming level of its respective light(s) via either forward phase dimming or reverse phase dimming (e.g., through a drop-down menu obtained via actuation of actuator 795). Again, the control application may display editable features of a lighting control device (such as trim and phase) based on a determination that the lighting control device controls dimmable light(s). The interface may also include a "Delete Device" icon 796. Actuation of this icon 796 may cause the control application to instruct the system controller to remove the lighting control device from the load control system. Assuming the user makes changes to the lighting control device via interface 790, once done the user may select "Save" or "Cancel" (although other mechanisms may be used) as shown in the interface to return to control interface 708 for example and to save or not save the changes/configurations. Any saved changes made by the user regarding the editing of the lighting control device may be communicated by the control application to the system controller, which may then reconfigure the lighting control device accordingly. One will recognize that control interface 708 and configuration interface 790 are examples and other controls are possible. A user may exit control interface 708 by touching an area of the display screen of network device 680 outside of the interface 708. Other examples are possible.

As another example of a control interface to control a lighting control device, assume that interface 702 includes an icon 706 for a table lamp in the master bedroom, that the icon is labeled "Master Bedroom Master Reading," and that the control application detects/determines that the user selects this icon 706 from interface 702. In response thereto, the control application may display the example control interface 2100 shown in FIG. 10A. One will again recognize that control interface 2100 is an example and other control interfaces are possible. One will further recognize that control interface 2100 may be displayed to a user in response to other actions by the user via other interfaces and/or in response to other determinations made by the control application and/or system controller. The control application may determine based on information provided by the system controller (e.g., from the type indicator) whether the "Master Bedroom Master Reading" table lamp is configured as a dimmable lighting load or simply an on/off lighting load etc. and based on that determination may display an appropriate control interface. In this example, the "Master Bedroom Master Reading" table lamp may be configured as dimmable lighting load and as such, the control application may display control interface 2100 to provide dimming control. According to this example, control interface 2100 may include an actuator 2102 (which may be referred to herein as a dimming actuator for example) that is movable/slide-able (e.g., vertically movable) along control line 2108c, an increase actuator 2104a and a decrease actuator 2104b, and an on/off actuator 2106.

Figure 10A:
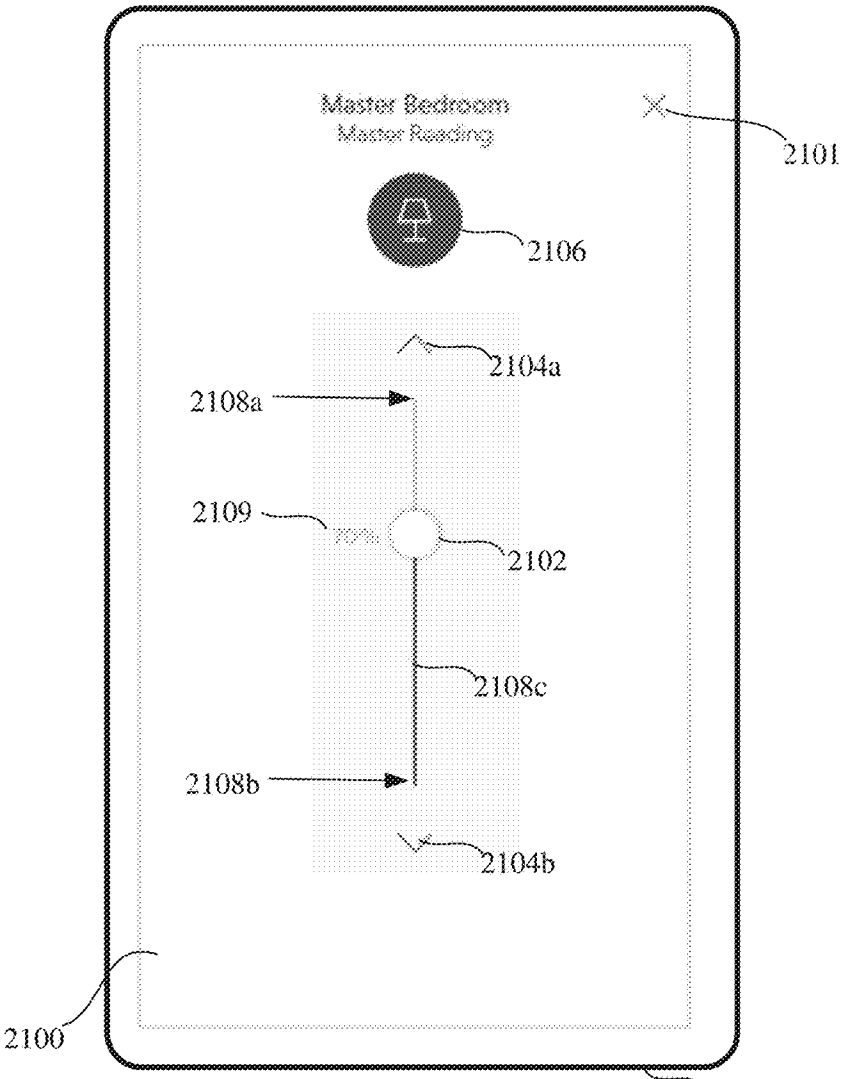
FIGS. 10A-10C show further example graphical user interfaces of an application that may allow a user to determine information on and to control a load control system and/or control devices.
Figure 10B:
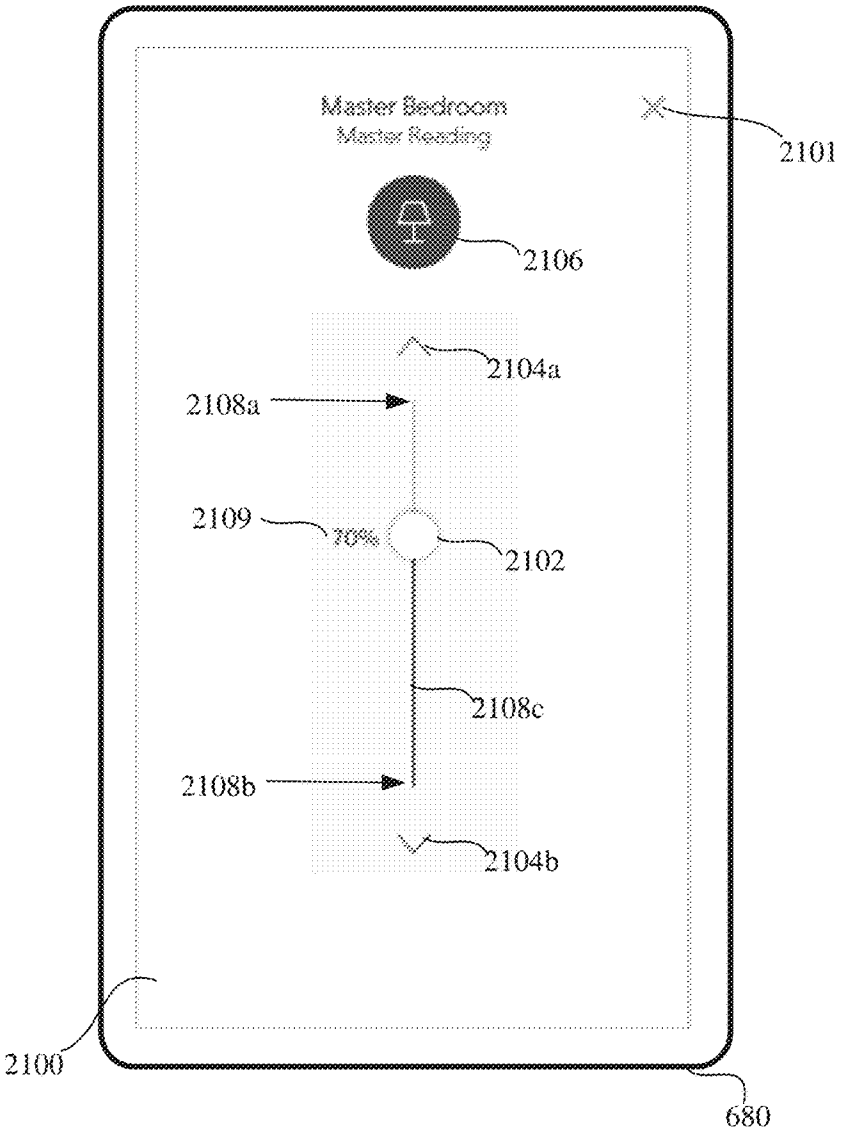
Figure 10C:
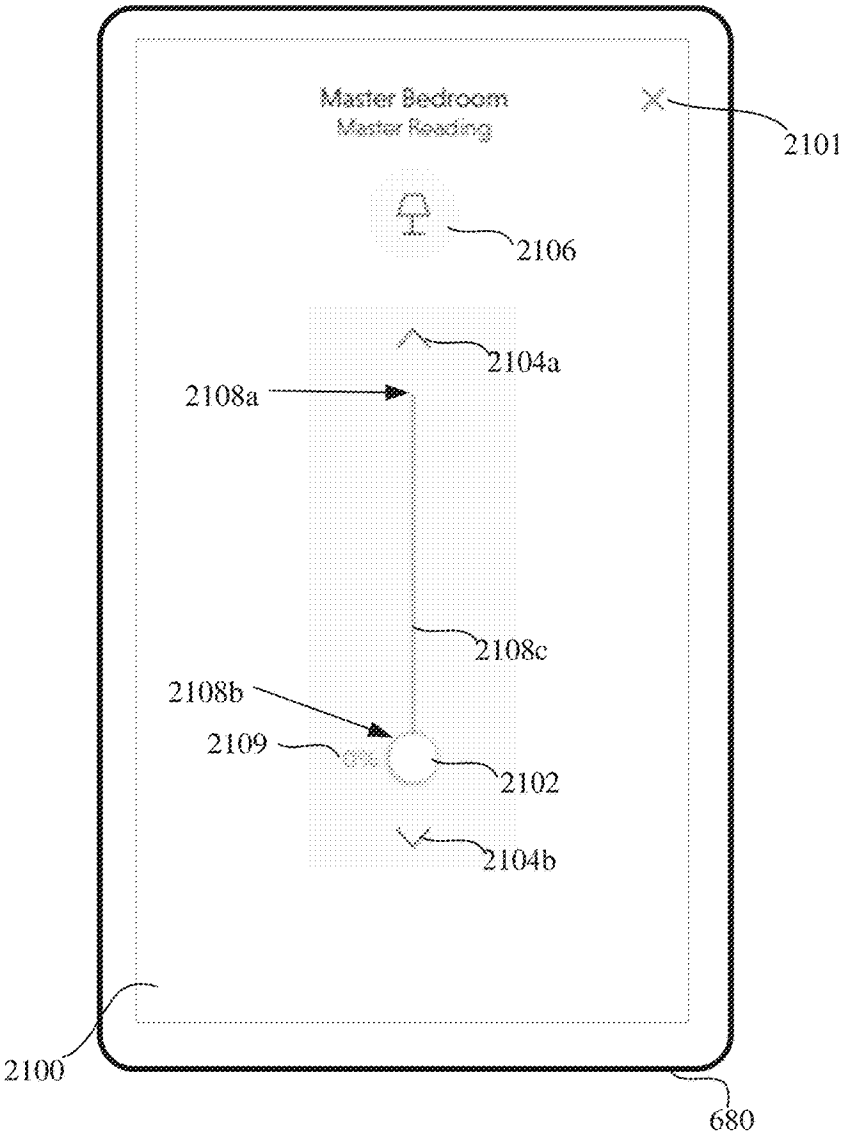

Beginning with actuator 2106, as shown in this example it may be displayed as an icon that resembles the icon shown in interface 702, although one will recognize that other icons and/or controls may be used. Actuator 2106 may be selectable by a user to turn the lighting control device (and thus the respective light(s)/lighting load(s)) on and off. According to one example, the control application may display the appearance of actuator 2106 differently based on the on/off state of the lighting load (e.g., change the icon's color or contrast). For example, FIGS. 10A and 10C (as discussed below) show an example that uses reverse contrast to show the on/off states, with FIG. 10A showing actuator 2106 in a state that represents that the lighting load is on, and with FIG. 10C showing the actuator 2106 in a state that represents that the lighting load is off. One will recognize that other examples are possible.

Turning to actuator 2102, it may be an actuator that is movable/slide-able (e.g., a vertically movable, although one will recognize that actuator 2102 may alternatively be horizontally moveable, for example) along control line 2108c and that allows a user to increase the intensity/intensity level or brightness of the lighting load (e.g., by moving the actuator vertically upward towards position 2108a) or decrease the intensity of the lighting load (e.g., by moving the actuator vertically downward towards position 2108b). Actuator 2102 may allow a user to control the intensity of the lighting load from a maximum intensity such as 100% (position 2108a) to a minimum intensity, which may be 0% (position 2108b) and which thereby may turn the lighting load off. In other words, moving actuator 2102 to position 2108b may turn the lighting load off. The control application may display the position of actuator 2102 along control line 2108c to represent the current relative intensity of the lighting load. The control application may also display with actuator 2106 an indicator 2109 that numerically represents the current intensity of the lighting load, here shown as a numerical percentage value 70% although other example numerical representations may be used. As one example, indicator 2109 may vary in value between 0% to 100%, with 0% representing off. The control application may also dynamically vary the value of indicator 2109 as the user moves actuator 2102 vertically upward and downward. As also shown in FIG. 10A, the portion of control line 2108c that lies below the actuator 2102 may be shown in a different intensity or line thickness, for example (here a greater intensity/line thickness) than the portion of the control line 2108c that lies above the actuator 2102

Similar to actuator 2102, increase actuator 2104a and decrease actuator 2104b may also enable a user to increase and decrease, respectively, the intensity of the lighting load. As one example, each of actuators 2104a and 2104b may be selectable in a single action (e.g., by a click and release of a mouse button, or a touch and release of the display screen of network device 680). Here, each individual actuation of increase actuator 2104a may increase the intensity of the lighting load by a defined amount (e.g., 1%) and similarly, each individual actuation of decrease actuator 2104b may decrease the intensity of the lighting load by a defined amount (e.g., 1%). The defined amount may be user definable. As another example, each of actuators 2104a and 2104b may be selectable for a prolonged duration (e.g., by a press and prolonged release of a mouse button, or a prolonged touch of the display screen of network device 680). Here, the actuation may cause the intensity to increase/decrease until the mouse button is released or the touch of the screen is removed, for example. According to one example, as a user selects the increase actuator 2104a or the decrease actuator 2104b, the control application may also automatically move actuator 2102 in the up or down direction, respectively, and update the value of indicator 2109 accordingly.

In general, upon the control application initially detecting/determining that the user selects the icon 706 labeled "Master Bedroom Master Reading" from interface 702 for example, it may initially display the actuator 2102 and the actuator 2106 of control interface 2100 to provide an indication to the user of a current on/off state and dimming state of the lighting load. For example, assuming the lighting load is on and is in a dimmed state of 70% intensity, the control application may display the control interface 2100 as shown in FIG. 10A, with actuator 2106 shown to indicate the lighting load is on and with actuator 2102 at a relative position along control line 2108c to represent 70% intensity and with the value of indicator 2109 showing the value 70% for example. Similarly, assuming the lighting load is off, the control application may display the control interface 2100 as shown in FIG. 10C, with actuator 2106 shown to indicate the lighting load is off and with actuator 2102 at position 2108b to represent 0% intensity/the lighting load is off, and with the value of indicator 2109 showing the value 0% for example. With reference to indicator 2109, initially the value may be displayed in one intensity and/or color, such as shown in FIGS. 10A and 10C. Once the user (and/or as the user) selects any of actuators 2102, 2104a, 2104b, and/or 2106 for example, the control application may increase the intensity (or change the color) of indicator 2109, as shown in FIG. 10B, with the increased intensity. At a defined time after the user stops altering the dimming state and/or the on/off state of the lighting load (or when the user stops actuating any of the actuators), the control application may return indictor 2109 to a reduced intensity as shown in FIG. 10A (and/or revert the color back to the initial color). One will recognize that other examples are possible.

In general, if the lighting load is in an on state as shown in FIG. 10A and the user actuates actuator 2106 to turn the lighting load off, the control application may display control interface 2100 as shown in FIG. 10C, with actuator 2106 displayed to show the lighting load is off and with actuator 2102 automatically moved to position 2108b and indicator 2109 set to 0% to show an off state. Similarly, if the lighting load is in an off state as shown in FIG. 10C and the user actuates actuator 2106 to turn the lighting load on, the control application may display control interface 2100 as shown in FIG. 10A, with actuator 2106 displayed to show the lighting load is on and with actuator 2102 automatically moved to a relative position along control line 2108c to show the current intensity of the lighting load and with indicator 2109 displaying the intensity value (here, the system controller and/or control application, for example, may maintain a last set dimming level and/or a preferred dimming level and may automatically set the dimming level of the lighting load to this value upon the lighting load being turned on). Similarly, if the lighting load is in an on state as shown in FIG. 10A and the user actuates actuator 2106 or 2108b to turn the lighting load off (i.e., dim to 0%), the control application may display control interface 2100 as shown in FIG. 10C, with actuator 2106 displayed to show the lighting load is off and with actuator 2102 shown in position 2108b and the value of indicator 2109 set to 0% to show an off state. Similarly, if the lighting load is in the off state as shown in FIG. 10C and the user actuates actuator 2106 or 2108a to turn the lighting load on (i.e., increase the intensity), the control application may display control interface 2100 as shown in FIG. 10A, with actuator 2106 displayed to show the lighting load is on and with actuator 2102 moved to an intensity position along control line 2108c as selected by the user and the value of indicator 2109 showing the current intensity value. One will recognize that other examples are possible.

Overall, based on detecting the selection/movement of actuator 2102 and/or actuators 2104a and 2104b by the user (such as raising or lowering the intensity of the lighting load, turning the lighting load off, etc.), and/or detecting the selection of actuator 2106 by the user (such as turning the lighting load on and off), the control application may communicate one or more messages to the system controller 250a, for example, to instruct the controller to reconfigure the lighting control device/lighting load(s) based on the user's instructions. Again, if the user turns the lighting load off or on, this update may be reflected in icon 622 (e.g., decrementing/incrementing the number), etc. A user may exit control interface 2100 by selecting icon 2101, for example. Other examples are possible.

According to another example, a lighting control device may control a lighting load (or a plurality of lighting loads), where the lighting load may include a plurality of multi-colored LEDs (light emitting diodes), although one will recognize that other types of lighting loads configured to emit colors of various color temperatures may be used. In other words, the lighting load may include within a single package, for example, a number of differently colored emission LEDs and may be configured such that the chromaticity output of the LEDs is mixed to produce light having varying chromaticity coordinates (i.e., color points) within a color gamut formed by the various LEDs that make up the lighting load. As one example, a lighting load may include one or more red LEDs, one or more green LEDs, one or more blue LEDs, and one or more white, or substantially white LEDs (such as yellow and/or mint green LED(s)), which may be collectively referred to herein as a RGBW lighting load. Although an RGBW lighting load is described herein with a combination of four LEDs of certain colors, this is for example purposes and other combinations of LEDs (e.g., more or less LEDs and/or different color LEDs) may be used. Similarly, although an RGBW lighting load is described herein as having one or more white LEDs, other colored LEDs may be used instead, such as yellow or mint green LED(s). Again, RGBW LED lighting loads will be used herein for description purposes only, and other types of lighting loads configured to produce light of varying color temperatures may be used.

A lighting control device and such a respective lighting load may be configured to produce white or near-white light of varying brightness/intensities within a range of correlated color temperatures (CCTs) ranging from "warm white" (e.g., roughly 2600 K-3700 K), to "neutral white" (e.g., 3700 K-5000 K) to "cool white" (e.g., 5000 K-8300 K), for example (e.g., produce light of varying chromaticity coordinates that lie along the black body locus or curve). As a further example, such a lighting control device and its respective lighting load may be further configured to produce any color of varying brightness/intensities within the color gamut formed by the various LEDs that make up the lighting load.

According to a still further example described herein, such a lighting control device and its respective lighting load may be configured to one of two states or modes, including a non-vibrancy state/mode and a vibrancy state/mode (e.g., where the system may automatically select for a user a certain vibrancy level). The chromaticity coordinates of the mixed color output of the lighting load may be the same (or approximately the same) between the two modes (e.g., when in a non-vibrancy mode versus a vibrancy mode). However, the intensities of the various LEDs (and thus the intensities of the wavelengths that are produced by the LEDs) may be varied between the two modes such that in the vibrancy mode, the intensity of the white LED(s) for example, may be reduced (such as to 0%, for example) as compared with the non-vibrancy mode, with the intensities of the remaining red, green, and/or blue LEDs adjusted to maintain the same color output (or approximately the same) between the two modes. Similarly, non-vibrancy mode may increase the intensity of the white LED(s) (with the intensities of the remaining red, green, and/or blue LEDs adjusted to maintain the same color output (or approximately the same color output) as when in the vibrancy mode).

As such, as described herein, vibrancy mode may, for example, increase the intensity of one or more wavelengths produced by the red, green, and/or blue LEDs thereby causing certain objects within a space to look more "vibrant". In other words, vibrancy mode, as described herein, may tune the individual colors that make up the light at a given color. When vibrancy is adjusted, the color of the light (e.g., the chromaticity coordinates or the CCT value) may remain unchanged or substantially unchanged. Adjusting vibrancy may, however, adjust the contribution of the individual LEDs making up the given light output at a given color. Hence, the light reflected off of objects in the space may be more vibrant as vibrancy is increased (vibrancy mode), and similarly less vibrant as vibrancy is decreased (non-vibrancy mode). In addition, adjusting vibrancy may adjust spectral power distribution (SPD) of the light. For example, as vibrancy increases, an SPD curve of the emitted light (e.g., relative intensity vs wavelength) may become sharper and/or may result in individual colors on the objects appearing more vibrant when the light reflects off of them. Hence, according to one example as described herein, the difference between the vibrancy and non-vibrancy modes may be the intensity setting of the white LED(s)/the amount the white LED(s) contribute to the mixed color output of the lighting load, with the white LED(s) contributing less in vibrancy mode as compared to non-vibrancy mode (as another example, if mint green LEDs are used, for example, instead of white LEDs, the intensity setting of the mint green LED(s)/the amount the mint green LED(s) contribute to the mixed color output of the lighting load may be less in vibrancy mode as compared to non-vibrancy mode). One will recognize that other examples are possible. One example of a lighting control device and respective lighting load as described above is a luminaire or lamp as provided by Lutron Ketra. Another example of such a lighting control device and respective lighting load is described as illumination device 38 of U.S. Patent Application Publication Number 2018/0077770, the contents of which are hereby incorporated by reference in their entirety. One will recognize that other examples lighting control device and respective lighting loads are possible.

As referred to herein, vibrancy mode may be referred to as a high vibrancy mode or a vibrancy "on" setting, and non-vibrancy mode may be referred to as a low vibrancy mode or a vibrancy "off" setting (which may be a "normal" setting).

Figure 11A:
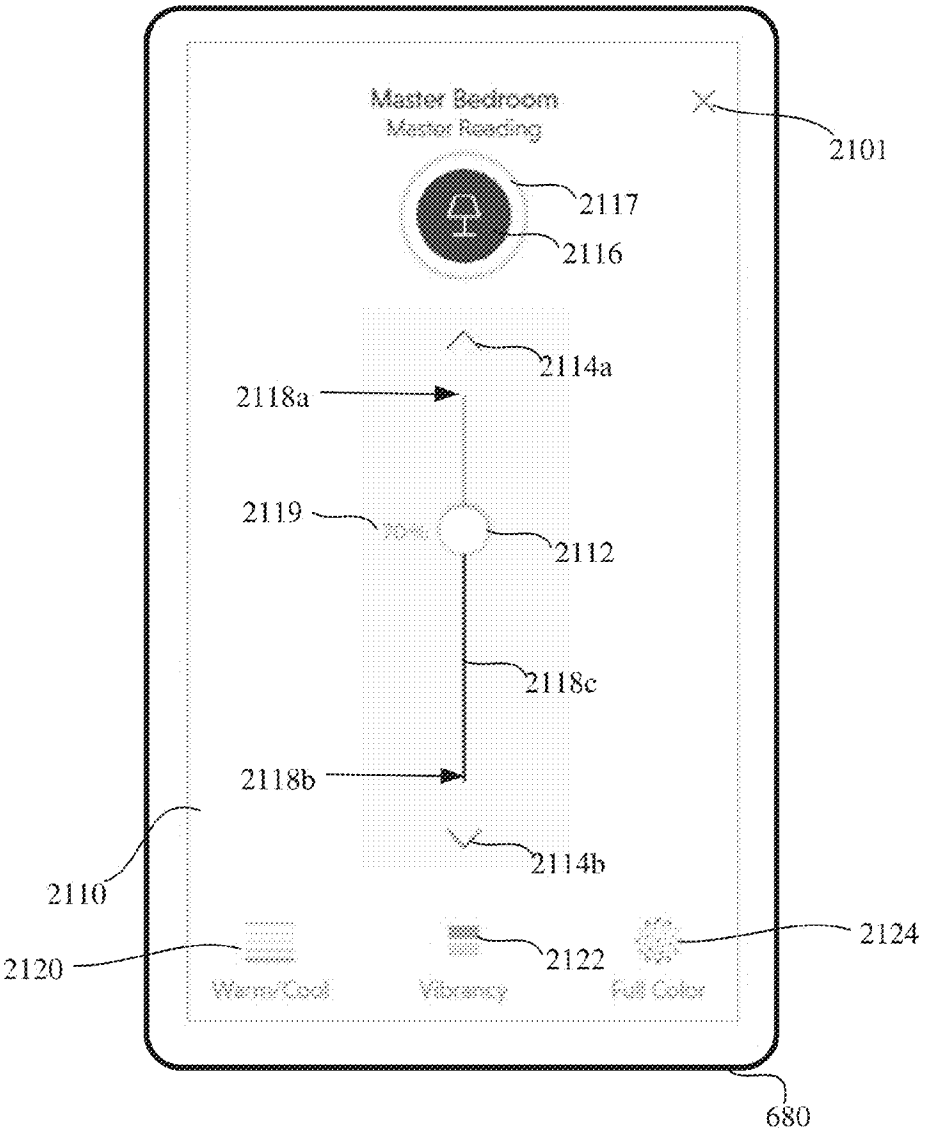
FIGS. 11A-11Q show further example graphical user interfaces of an application that may allow a user to determine information on and to control a load control system and/or control devices.

Assuming now that the "Master Bedroom Master Reading" table lamp icon of interface 702, for example, corresponds to a lighting control device that controls a RGBW lighting load as described above, upon the control application detecting/determining that the user selects the "Master Bedroom Master Reading" table lamp icon from interface 702, the control application may display the example control interface 2110 shown in FIG. 11A. One will again recognize that control interface 2110 is an example and other control interfaces are possible. One will further recognize that control interface 2110 may be displayed to a user in response to other actions by the user via other interfaces and/or in response to other determinations made by the control application and/or system controller. The control application may determine based on information provided by the system controller (e.g., from the type indicator, etc.) that the "Master Bedroom Master Reading" table lamp is configured as a dimmable RGBW LED lighting load and based on that determination may display control interface 2110. As one for example, as noted above the system controller may provide information on each lighting control device to the control application. This information may include for an RGBW control device/lighting load its current status/state and/or configuration. For example, the information may include for an RGBW lighting control device/lighting load(s) whether the lighting load(s) are in an on or off state, and if in the on state whether it is a dimmed state and possibly further the dimming level, what color point and/or CCT value the load is set or configured to, whether the control device is in vibrancy mode, etc. Control interface 2110 may be similar to control interface 2100 and may include an actuator 2112 (which may be referred to herein as a dimming actuator for example) (and control line 2118c with ends 2118a and 2118b) and my further include actuators 2114a and 2114b that operate similar to actuator 2102 and actuators 2104a and 2104b, respectively, and enable a user to control the intensity/brightness/dimming state of the lighting load as described above (i.e., change the intensity/brightness of the color being produced by the lighting load).

Figure 11B:
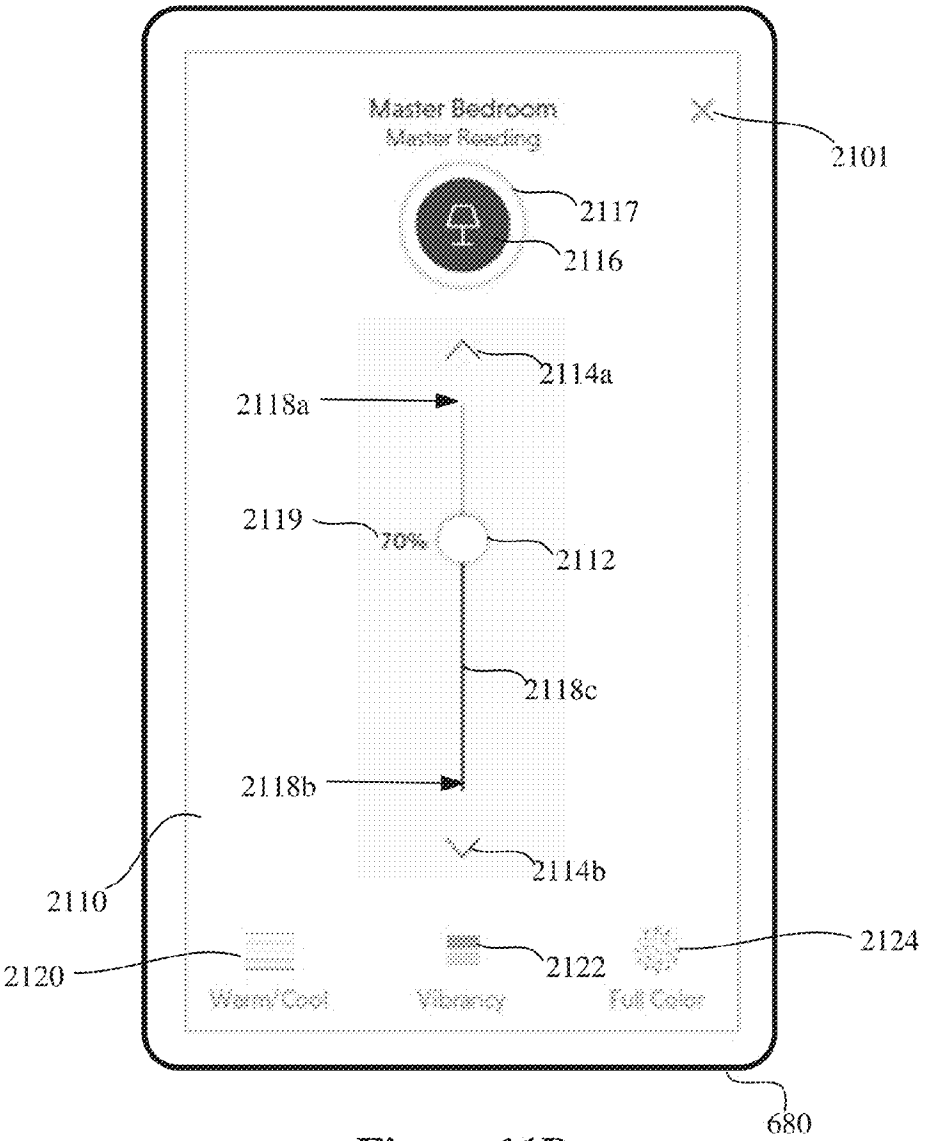
Figure 11C:
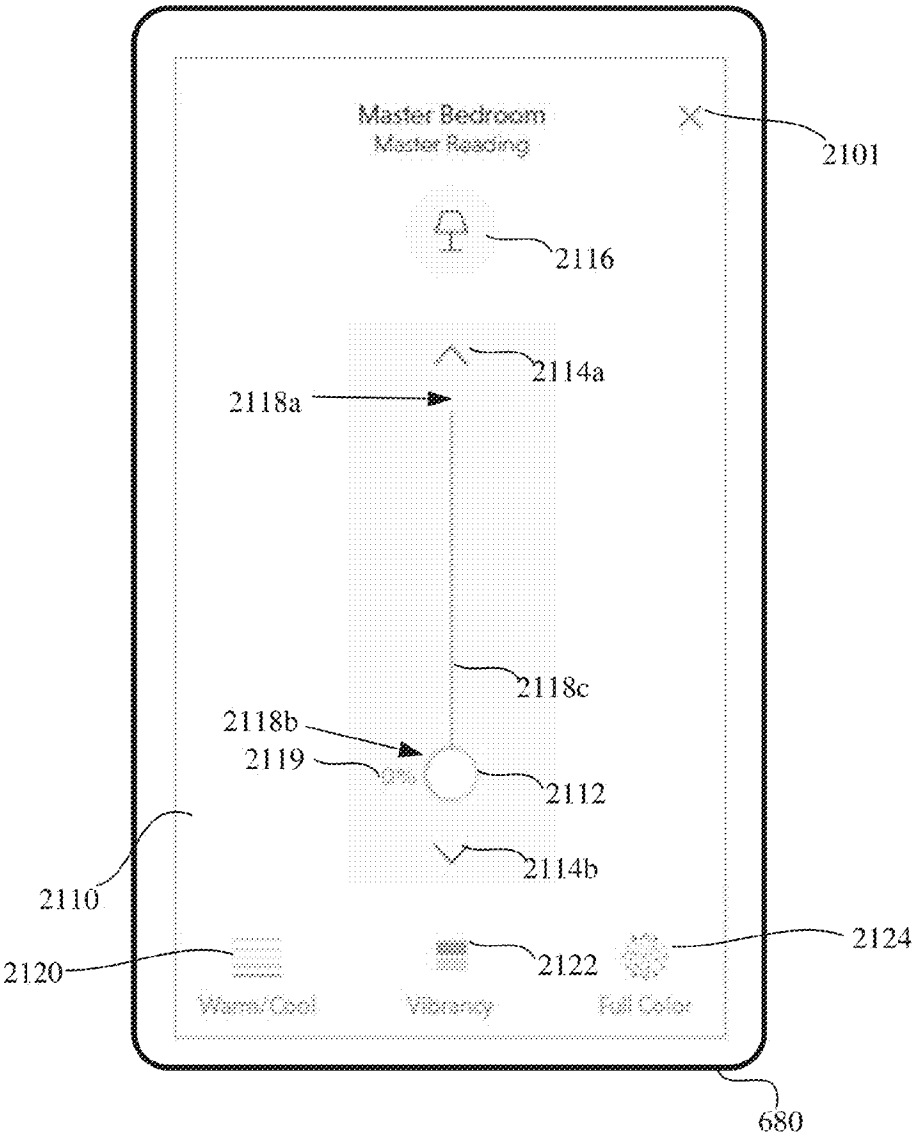

Control interface 2110 may also include an actuator 2116 that similar to actuator 2106, may be selectable by a user to turn the lighting control device (and thus the respective lighting load(s)) on and off. Again, the control application may display the appearance of actuator 2116 differently based on the on/off state of the lighting load, with FIG. 11A showing actuator 2116 in a state that represents that the lighting load is on, and with FIG. 11C showing the actuator 2116 in a state that represents that the lighting load is off. One will recognize that other examples are possible. According to a further aspect of this example, when the lighting load is in an on state as shown in FIG. 11A, the actuator 2116 may further include an indicator 2117 (which may be referred to herein as a color indicator for example). In this example, indicator 2117 is shown as a circle that surrounds the actuator 2116. Nonetheless, one will recognize that other indicators may be used including different geometric shaped indicators such as a square or triangle that surrounds actuator 2116, or an indicator that is next to actuator 2116 rather than surrounding it, or an indicator that is at a different location within control interface 2110. The control application may display indicator 2117 in any of a plurality of different colors and in particular, may display the color of indicator 2117 to match (or to substantially match) or represent the color currently being produced by the lighting load. In this fashion, the user is provided with an indication as to the current color setting of the lighting load. As shown in FIG. 11C, the control application may not display indicator 2117 when the lighting load is off. Again, as the lighting load is moved between an on and off state such as through the actuation of actuator 2116 or moving actuator 2112 (either directly or through actuators 2114a and 2114b) to and from position 2118b, the control application may change the appearance of actuator 2116 (between an on/off state) and display or not display indicator 2117. One will recognize that as an alternative to and/or in addition to displaying the "actual" color being produced by the lighting load through indictor 2117, the control application may also display in control interface 2110 for example, chromaticity coordinates (such as x and y coordinates) or the CCT value (when applicable) of the color being produced by the lighting load. One will recognize that other examples are possible.

With reference to indicator 2119 (which is similar to indicator 2109) and as discussed above, initially the value of the indicator may be displayed in one intensity, such as shown in FIGS. 11A and 11C. Once the user selects any of actuators 2112, 2114a, 2114b, and/or 2116, the control application may increase the intensity of indicator 2119, as shown in FIG. 11B. At a defined time after the user stops altering the dimming state and/on/off state of the lighting load, the control application may return indictor 2119 to a reduced intensity.

As similarly discussed with reference to interface 2100, based on detecting the selection/movement of actuator 2112 and/or actuators 2114a and 2114b by the user (such as raising or lowering the intensity of the lighting load, turning the lighting load off, etc.), and/or detecting the selection of actuator 2116 by the user (such as turning the lighting load on and off), the control application may communicate one or more messages to the system controller 250a, for example, to instruct the controller to reconfigure the lighting control device/lighting load(s) based on the user's instructions. Again, if the user turns the lighting load off or on, this update may be reflected in icon 622 (e.g., decrementing/incrementing the number), etc. A user may exit control interface 2110 by selecting icon 2101, for example. Other examples are possible.

According to a further aspect of control interface 2110, the interface may include a "Warm/Cool" actuator 2120, a "Vibrancy" actuator 2122, and a "Full Color" actuator 2124 (one will recognize that labels other than "Warm/Cool", "Vibrancy," and "Full Color" may be used). Each of actuators 2120, 2122, and 2124 may be selectable by a user.

Beginning with "Vibrancy" actuator 2122, upon detecting selection of this actuator by a user the control application may communicate one or more messages to the system controller 250a, for example, to instruct the system controller to configure the lighting control device/lighting load to enter a vibrancy mode (e.g., turn vibrancy to an on setting or to a high mode). As indicated above, vibrancy mode may not change (or substantially change) the color point/chromaticity coordinates of the color being produced by the lighting load, but may alter the contribution/intensity of each of the RGBW LEDs in generating the colored light, which may include reducing the intensity/contribution of the white LED(s) for example (e.g., setting the intensity of the white LEDs to 0%), thereby making certain objects in a space more vibrant. One will recognize this is one example, and vibrancy may be achieved in other manners. The one or more messages communicated by the control application to the system controller may include a command to enter vibrancy mode, may include a command with specified intensity settings for each of the various RGBW LEDs, etc., although other examples are possible. In general, the degree to which the intensities of the various RGBW LEDs is varied when entering vibrancy mode may be a predefined amount and in addition, may be dependent upon the color point/chromaticity coordinates of the color currently being produced by the lighting load. For example, the closer the color of the light being produced by a lighting load is to the black body curve (i.e., when the lighting load is producing white light), there may be a greater ability to place the lighting load in vibrancy mode (as compared to when the color of the light is further away from the black body curve).

Figure 11D:
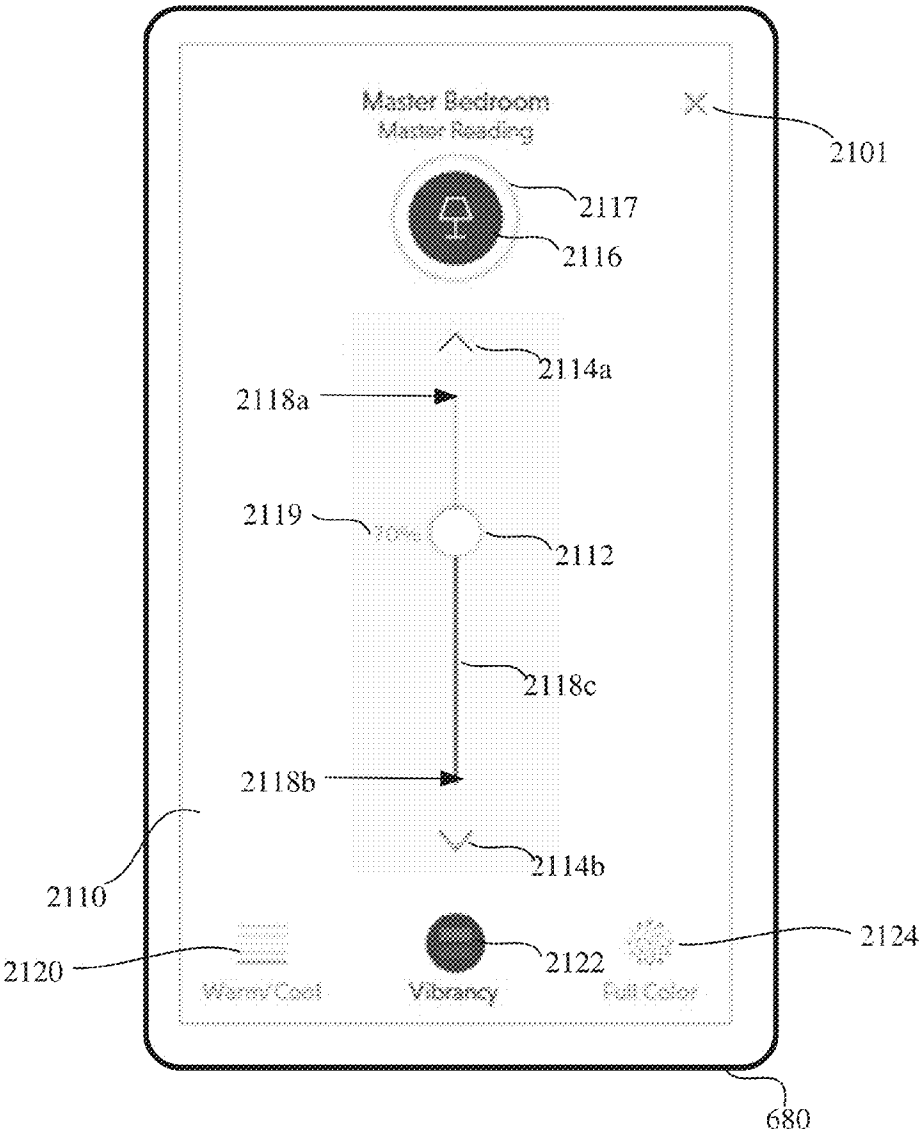

In response to detecting selection of the "Vibrancy" actuator 2122, the control application may display the appearance of actuator 2122 differently based on whether the lighting control device is or is not in vibrancy mode (e.g., change the actuator's color or contrast). For example, FIGS. 11A and 11D show an example that uses reverse contrast to show the states of the vibrancy mode, with FIG. 11A showing vibrancy mode deactivated (low vibrancy mode/off), and with FIG. 11D showing the vibrancy mode activated (high vibrancy/on). One will recognize that other examples are possible. When vibrancy mode is activated, upon detecting a further selection of actuator 2122 by a user the control application may communicate one or more messages to the system controller 250a to instruct the controller to configure the lighting control device/lighting load to deactivate vibrancy mode (e.g., set vibrancy to an off-setting or to a low mode), thus maintaining the color output of the lighting load, but increasing the contribution of the white LED(s) for example (for example, something other than 0%) as compared to when vibrancy mode is activated. This state may be referred to herein as a "normal" setting. Again, upon the control application initially detecting/determining that the user selects the icon 706 labeled "Master Bedroom Master Reading" from interface 702 for example, it may initially display the actuator 2122 as vibrancy mode being activated or not activated, depending on the current state of the lighting control device as reported by the system controller. In addition, even when the lighting control device is in an on state and is in vibrancy mode with actuator 2116 and actuator 2122 as shown in FIG. 11D, upon the lighting load being turned off, the control application may display actuator 2122 as vibrancy mode being off, as shown in FIG. 11C. One will recognize that other examples are possible.

Reference is now made to "Warm/Cool" actuator 2120 and "Full Color" actuator 2124. "Warm/Cool" actuator 2120 may allow a user to control the lighting control device such that the lighting load produces light (e.g., white or near white light) at a user selected color point along the black body curve. "Full Color" actuator 2124 may allow a user to control the lighting control device such that the lighting load produces light at a user selected color point of any of a plurality of colors that may lie within the color gamut formed by the various RGBW LEDs, for example, that make up the lighting load.

Figure 11E:
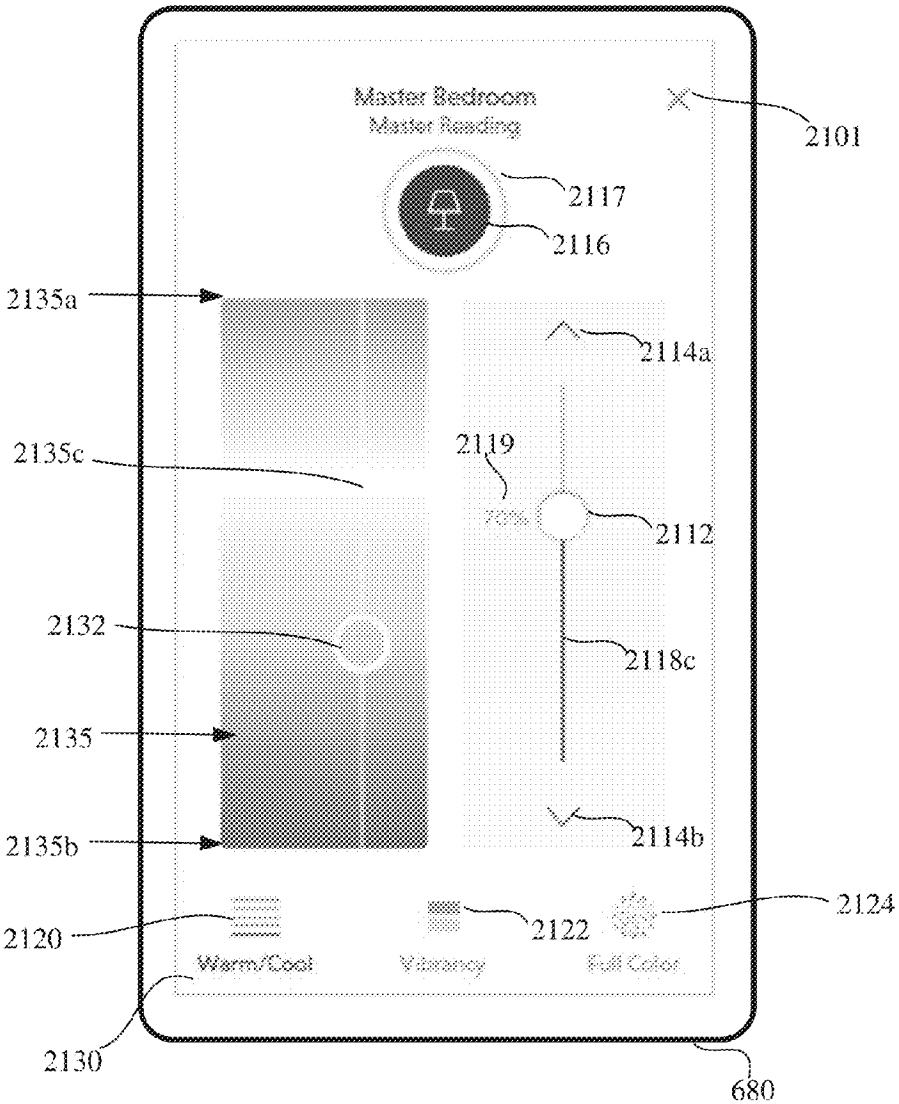

Beginning with "Warm/Cool" actuator 2120, upon detecting that a user has selected the actuator (such as from interface 2110 (or from interface 2140 of FIGS. 11J-11N as discussed below), the control application may display control interface 2130 as shown in FIG. 11E, with the "Warm/Cool" actuator 2120 now being shown as activated (here, reverse contrast is used to show "Warm/Cool" actuator 2120 as being activated, although other examples are possible). Control interface 2130 may continue to include actuators 2112, 2114a, and 2114b (together with indicator 2119) that allow a user to control the intensity of the lighting load and also provide the user with the current dimming state of the lighting load. Control interface 2130 may also continue to include actuator 2116 that enables to the user to turn the lighting control device/lighting load on and off. Control interface 2130 may also continue to include indicator 2117 to provide the user with an indication of the current color being produced/rendered by the lighting load. According to this example, control interface 2130 may also include a pallet 2135 showing a range of colors ranging from cool colors at end 2135a to warm colors at end 2135b of the pallet. These colors may correspond to colors that lie along the black body curve. In particular, pallet 2135 may show colors along a range of correlated color temperatures (CCTs) ranging from "warm white" (e.g., roughly 2600 K-3700 K) at 2135b, to "neutral white" (e.g., 3700 K-5000 K) to "cool white" (e.g., 5000 K-8300 K) at 2135a. As one example, the range may be from 1400K to 7000K, although other examples are possible.

Superimposed over pallet 2135 may be an actuator 2132 that is movable/slide-able (e.g., here vertically movable) along control line 2135c and in particular, that is movable/slide-able along pallet 2135 between different CCTs along the black body curve. Accordingly, actuator 2132 may allow a user to configure the lighting control device such that the lighting load produces colored light at a color point along the black body curve. Assuming the lighting load is producing light at a color point along the black body curve at a time actuator 2120 is selected by a user, the control application may display actuator 2132 at a relative point along control line 2135c/pallet 2135 as shown in FIG. 11E to indicate the color being produced by the lighting load. Similarly, indicator 2117 may also display the corresponding color. Alternatively, if the lighting load is not configured to produce light at a color point along the black body curve (or is out of range of pallet 2135) (or if the lighting load is off, for example) at a time actuator 2120 is selected by a user, the control application may not display actuator 2132. The control application may continue to display indicator 2117 to correspond to the color being produced by the lighting load (assuming the lighting load is on). As another example, regardless of the setting of the lighting load, the control application may not initially display actuator 2132 upon selection of actuator 2120.

Figure 11F:
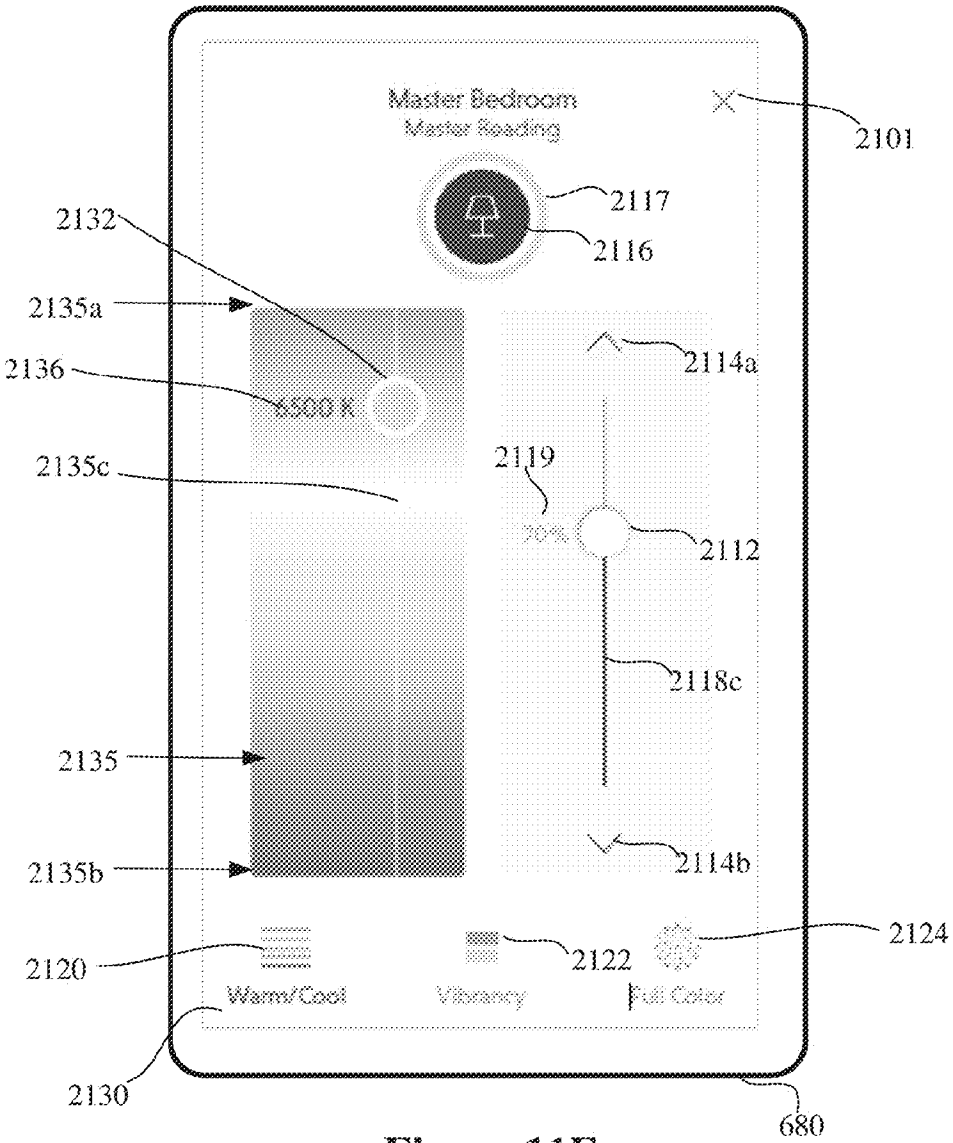
Figure 11G:
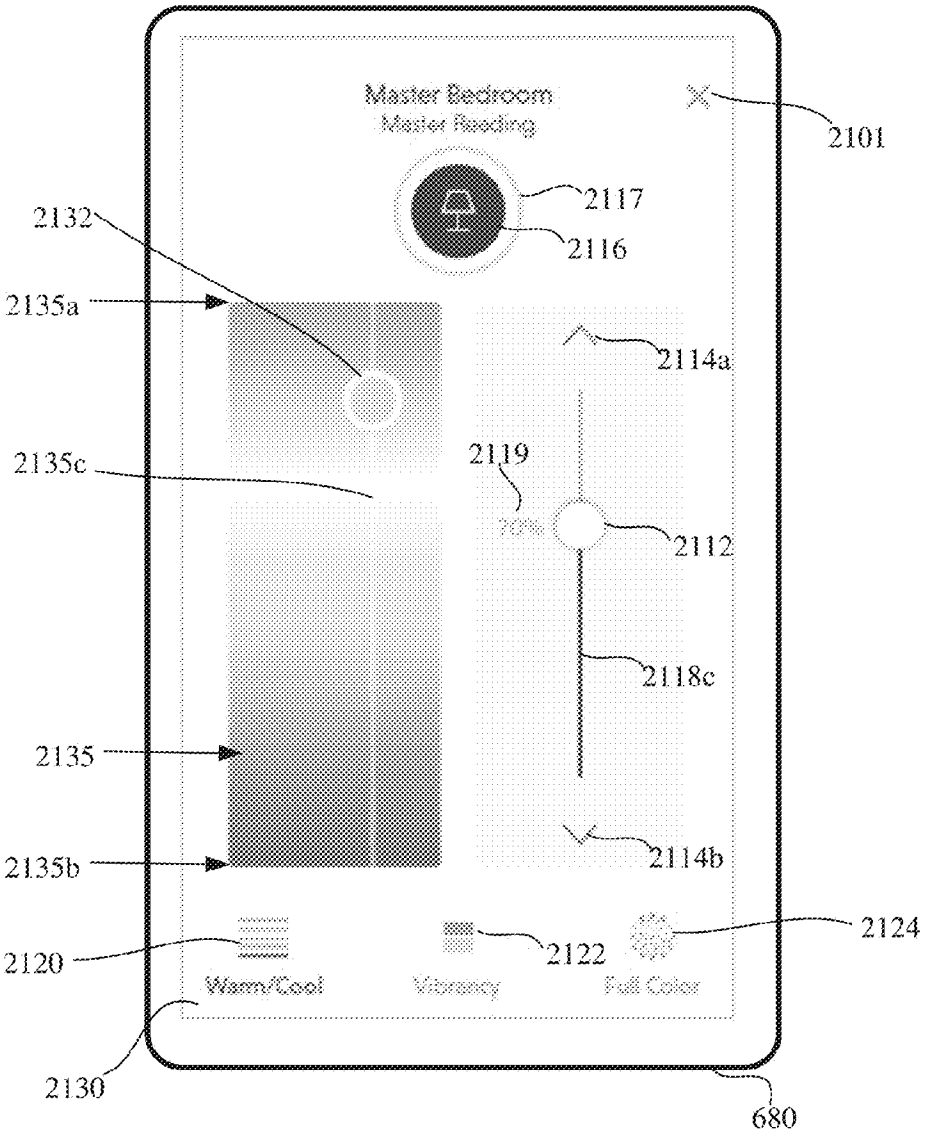

Assuming that upon actuator 2120 being actuated by a user from control interface 2110 that the control application initially displays control interface 2130 as shown in the FIG. 11E with actuator 2132 displayed, for example, and assuming a user next selects/moves actuator 2132 along control line 2135c (such as via a mouse or via touch) to set the lighting load to a new CCT along the black body curve, the control application may display an indicator 2136 together with the actuator as shown in FIG. 11F. As another example, assuming actuator 2132 is not initially shown when actuator 2120 is selected by a user, selecting pallet 2135 (e.g., via mouse or touch) by the user may cause the actuator 2132 and indicator 2136 to appear at a location along line 2135c relative to where the user touches pallet 2135 and/or at a location relative to the CCT the lighting load is currently providing. One will recognize that other examples are possible. The indicator 2136 may display a numerical value (in this example, 6500 K) that corresponds to the CCT value the actuator 2132 is currently set to. As the user moves the actuator 2132 along the control line 2135c, the control application may dynamically update indicator 2136 to correspond to the setting of the actuator. In addition and as shown in FIG. 11F, as the user moves the actuator 2132 along the control line 2135c, the control application may dynamically update indicator 2117 to correspond to the color at which the actuator 2132 is currently set to. According to a further example and as shown in FIG. 11F, the control application may also increase the size of indicator 2117. In this example, indictor 2117 is shown as a circle where the weight of the line forming the circle is heavier or larger or thicker in FIG. 11F as compared to FIG. 11E for example. One will recognize that other examples are possible. In this fashion, the control application may provide an additional mechanism to show the user the color the lighting load is being set to and also indicate to the user that the color is being changed. According to a still further example, at a set time duration after which the user stops actuating actuator 2132 and/or upon the user no longer selecting the actuator, the control application may remove indicator 2136 from the control interface and return indicator 2117 to a smaller size/lighter weight, as shown in the example of FIG. 11G. One will recognize that indictor 2136 may include or be a different value, such as chromaticity coordinates (such as x and y coordinates) of the color being produced by the lighting load. Similarly, rather than increase the size of indicator 2117 as actuator 2132 is moved in order to display a color to the user, other mechanisms may be used to show the color to the user, such as by rendering actuator/icon 2116 in the color as the actuator is activated.

According to a still further example, assuming the lighting load is off when a user selects actuator 2120 thereby causing control interface 2130 to be displayed by the control application, a user selecting pallet 2135 (e.g., via mouse or touch) may cause the lighting load to turn on (such as to full intensity, to an intensity to which the lighting load was previously set to, or to a preferred intensity level of the user, etc.), and with the appearance of actuator 2116 changing to an on state, indicator 2117 being displayed, and with actuator 2112 being displayed at the present intensity level. Similarly, actuator 2132 and/or indicator 2136 may appear at a location along line 2135c relative to where the user touches pallet 2135 and/or at a location relative to the CCT the lighting load was previously set to, or to a preferred CCT value of the user, although other examples are possible, and with the lighting load being controlled to this color (again, with indicator 2117 also indicating the color). Thereafter, a user may move actuator 2132 as described above.

As similarly discussed above, based on detecting the selection/movement of actuator 2132, the control application may communicate one or more messages to the system controller 250a, for example, to instruct the controller to reconfigure the lighting control device/lighting load(s) based on the user's instructions.

Figure 11H:
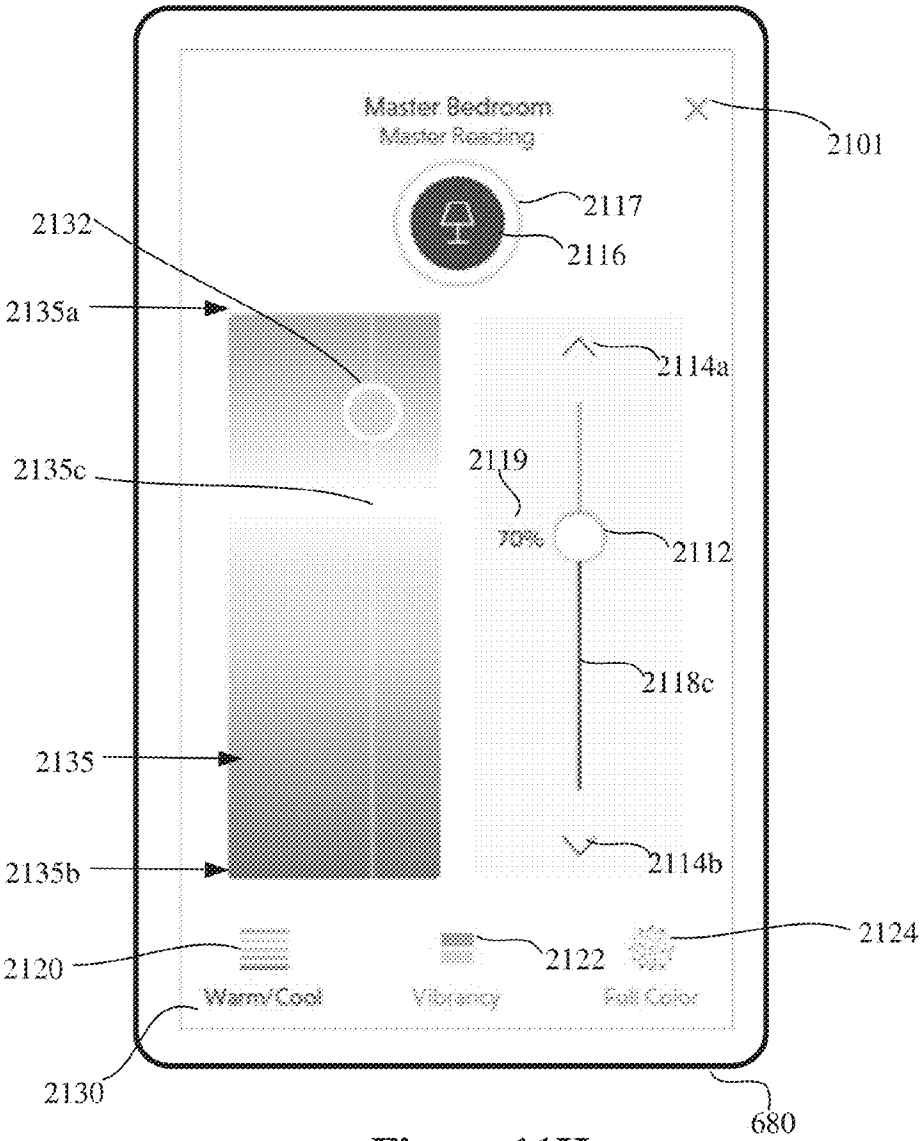
Figure 11I:
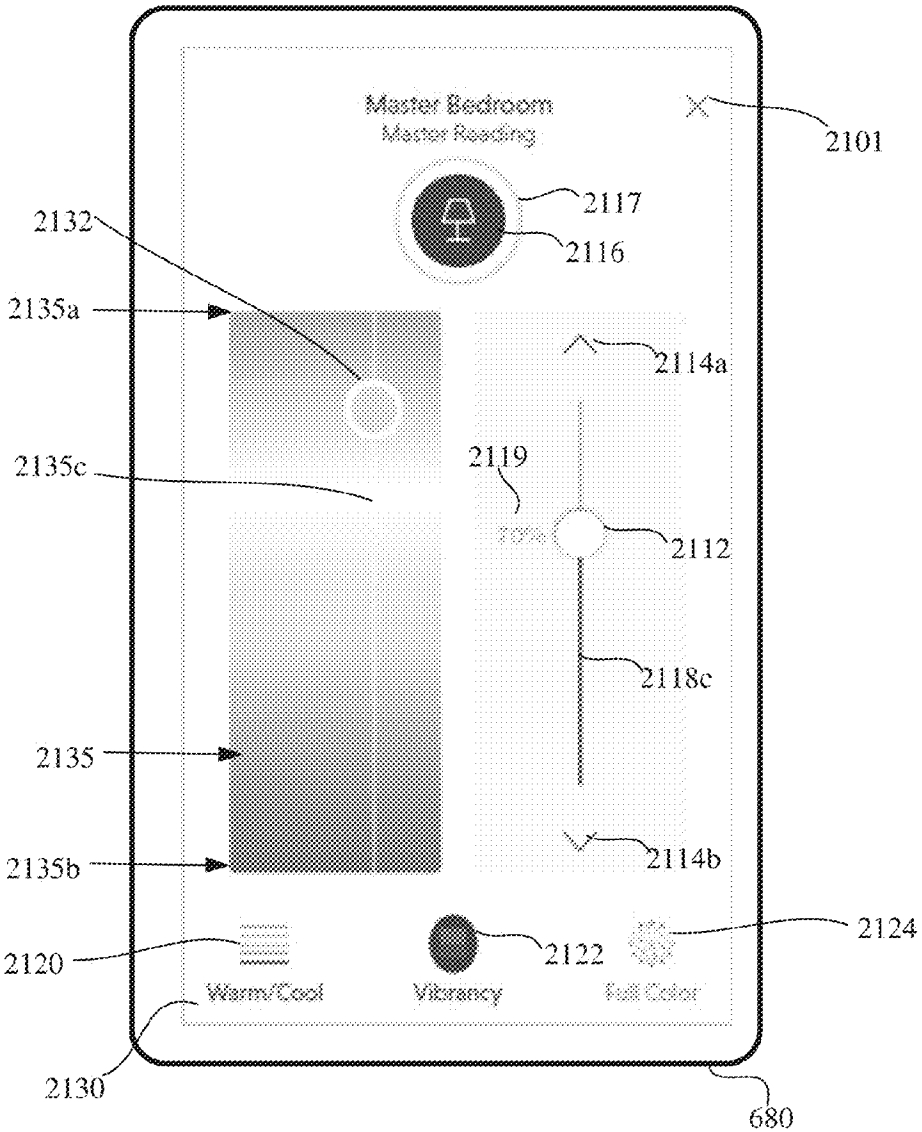

As shown in FIG. 11H while the lighting load is set to a color point along the black body curve, a user may also actuate from control interface 2130 any of actuators 2112, 2114a, and/or 2114b to control the dimming state/intensity of the lighting load. Again, as this occurs, the control application may increase the intensity of indicator 2119 as shown in FIG. 11H. Similarly, as shown in FIG. 11I, while the lighting load is set to a color point along the black body curve, a user may also actuate from control interface 2130 the "Vibrancy" actuator 2122 to configure the lighting control device/lighting load to enter vibrancy mode. As indicated above, vibrancy mode may not change (or substantially change) the color point/chromaticity coordinates/CCT value of the color being produced by the lighting load, but may alter the contribution of each of the RGBW LEDs in generating the colored light, which may include reducing the intensity/contribution of the white LED(s) for example, thereby making certain objects in a space more vibrant. In response to detecting selection of the "Vibrancy" actuator 2122, the control application may display the appearance of actuator 2122 to show it is activated, as shown in FIG. 11I, and communicate one or more messages to the system controller 250a, for example, to instruct the system controller to configure the lighting control device/lighting load to enter a vibrancy mode. While the "Vibrancy" actuator 2122 is activated and a user modifies the color and or intensity of the lighting load via control interface 2130, the color rendered by the lighting load may continue to be in the "vibrant" state/vibrancy mode. Similarly, a user may deactivate vibrancy mode from control interface 2130 thus returning to a normal setting (thus maintaining the color output of the lighting load, but increasing the contribution of the white LED(s) for example). Lastly, assuming a user turns the lighting load off (such as through any of actuators 2116, 2112, 2114a, and/or 2114b) as described herein while control interface 2130 is displayed, the control application may automatically display control interface 2110 as shown in FIG. 11C. One will recognize that other examples are possible. One will also recognize that actuator 2124 may be activated from control interface 2130, resulting in the control application displaying control interface 2140, for example, as discussed below.

Figure 11J:
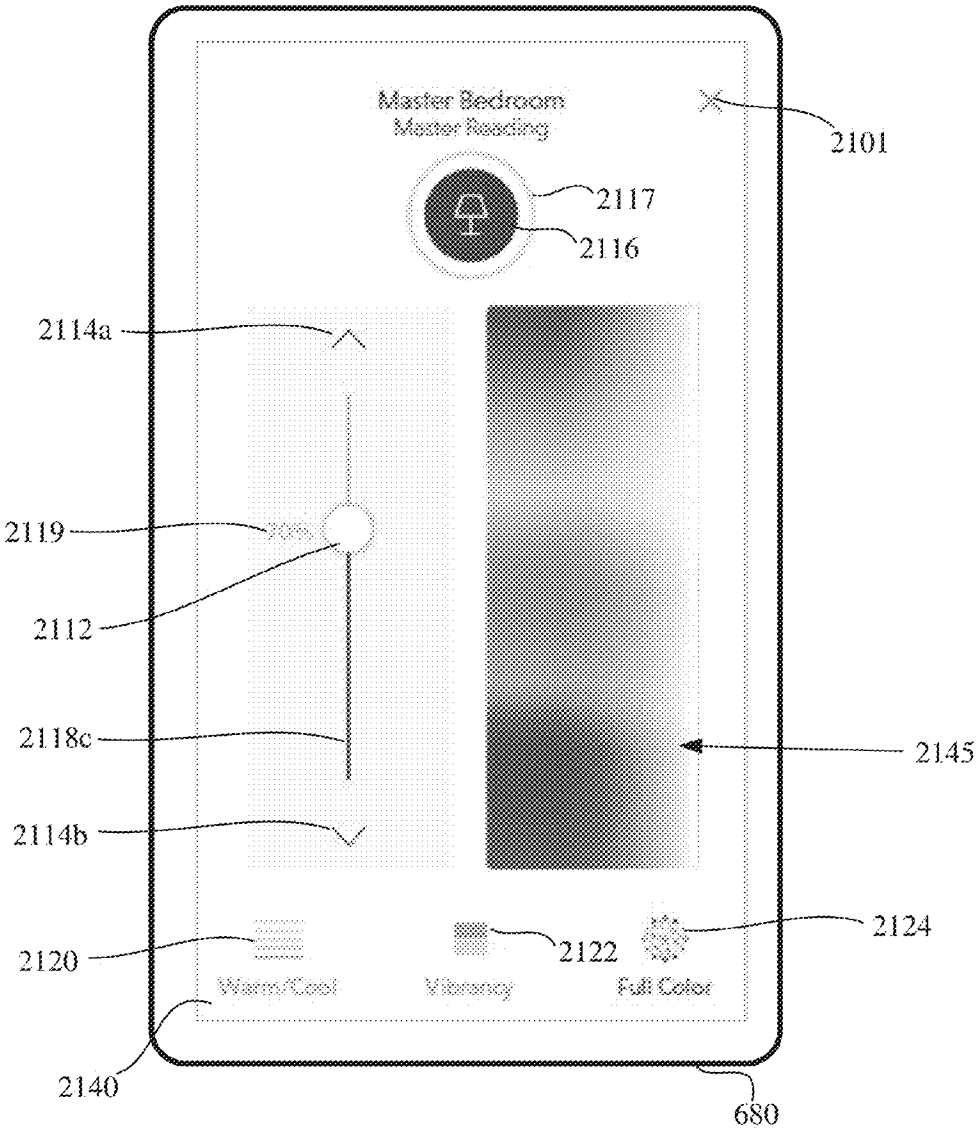

Turning now to "Full Color" actuator 2124, upon detecting that a user has selected the actuator (such as from interface 2110 or interface 2130), the control application may display control interface 2140 as shown in FIG. 11J, with the "Full Color" actuator 2124 now being shown as activated (here, reverse contrast is used to show Full Color actuator 2124 as being activated, although other examples are possible). Control interface 2140 may continue to include actuators 2112, 2114a, and 2114b (together with indicator 2119) that allow a user to control the intensity of the lighting load and that also provide the user with the current dimming state of the lighting load. Control interface 2140 may also continue to include actuator 2116 that enables to the user to turn the lighting control device/lighting load on and off. Control interface 2140 may also continue to include indicator 2117 to provide the user with an indication of the current color being produced/rendered by the lighting load. According to this example, control interface 2140 may also include a pallet 2145 showing a plurality of colors that lie within the color gamut formed by the various RGBW LEDs, for example, that make up the lighting load.

Figure 11K:
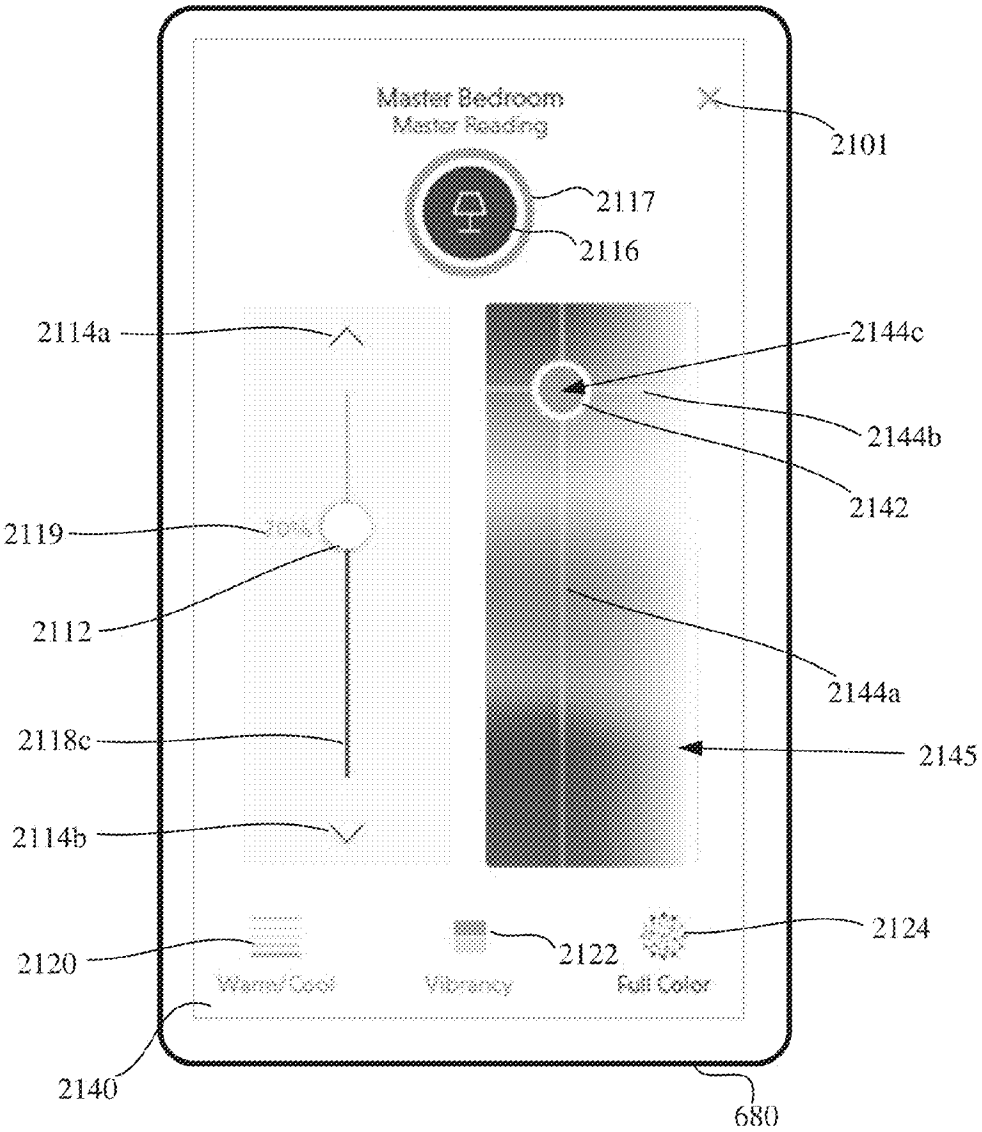

As shown in FIG. 11K, superimposed over pallet 2145 may be an actuator 2142 that is movable/slide-able by the user to any of a plurality of locations/colors within pallet 2145. The control application may display together with actuator 2142 two perpendicular control lines 2144a and 2144b that intersect at the center 2144c of the actuator 2142. The control application may move control lines 2144a and 2144b and the intersection point with the actuator 2142 as it is moved by a user within pallet 2145. These control lines may also assist the use in moving actuator 2142 either horizontally or vertically. Accordingly, actuator 2132 may allow a user to configure the lighting control device such that the lighting load produces colored light at a color point that lies within the color gamut formed by the various RGBW LEDs, for example, that make up the lighting load. Upon actuator 2124 being actuated by a user such as from control interface 2110 or 2130 for example, the control application may initially display control interface 2140 without actuator 2142 and without control lines 2144a and 2144b, as shown in FIG. 11J (such as if the lighting load is off, or even when the lighting load is presently on). Indicator 2117 may continue, however, to be displayed to the user (assuming the lighting load is on), showing the color the lighting load is currently providing. As another example, upon actuator 2124 being actuated by a user the control application may display actuator 2142 and control lines 2144a and 2144b at a relative point within pallet 2145 to indicate the color being produced by the lighting load. Again, indicator 2117 may also display the corresponding color.

Figure 11L:
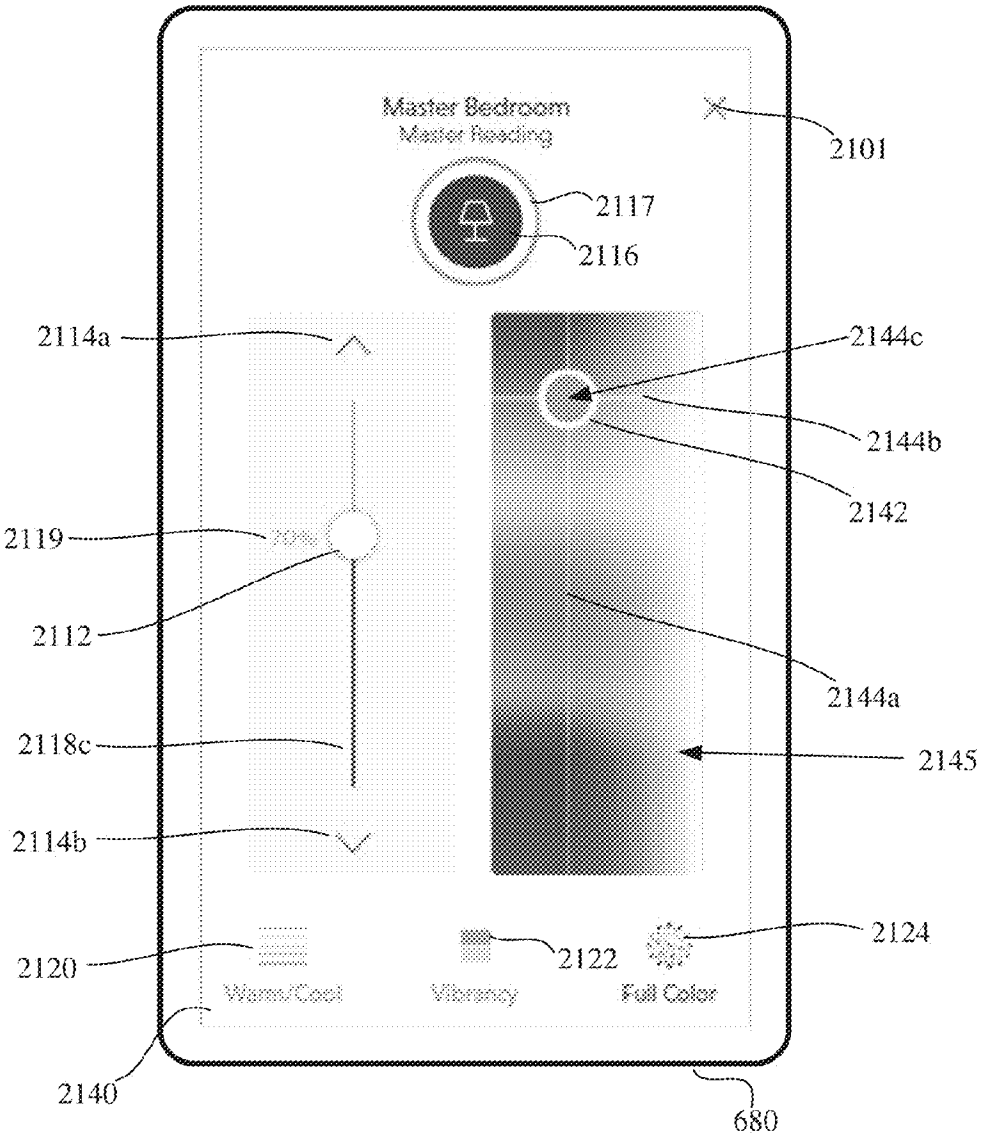

Assuming that upon actuator 2124 being actuated by a user from control interface 2110 or 2130, for example, that the control application initially displays control interface 2140 as shown in FIG. 11J and that the lighting load is producing a blue based color at that time, for example, as a user touches or activates a mouse over pallet 2145, for example, the control application may display actuator 2142 and control lines 2144a and 2144b at a point relative to the activation point. Thereafter, the control application may move the actuator 2142 and control lines 2144a and 2144b according to the user action as shown in FIG. 11K (assuming the user move the actuator 2142 towards an orange based color, for example). As the user moves actuator 2142 over pallet 2145 to set the lighting load to a new color point within pallet 2145, the control application may display an indicator (not shown in FIG. 11K) together with the actuator. The indicator may display a numerical value that corresponds to chromaticity coordinates (such as x and y coordinates) of the color point the actuator is set to, for example, although other values may be used. As the user moves the actuator 2142 over pallet 2145, the control application may dynamically update this indicator to correspond to the setting of the actuator. In addition and as shown in FIG. 11K, as the user moves the actuator 2142 over the pallet 2145, the control application may dynamically update indicator 2117 to correspond to the color at which the actuator 2142 is currently set to. According to a further example and as shown in FIG. 11K, the control application may also increase the size of indicator 2117 (in this example, indictor 2117 is shown as a circle where the weight of the line forming the circle is heavier or larger or thicker in FIG. 11K as compared to FIG. 11J for example). In this fashion, the control application may provide an additional mechanism to show the user the color the lighting load is being set to. According to a still further example, at a set time duration after which the user stops actuating actuator 2142 and/or upon the user no longer selecting the actuator, the control application may return indicator 2117 to a smaller size/lighter weight, as shown in the example of FIG. 11L, continuing to show actuator 2142 and control lines 2144a and 2144b at the new color point, for example. One will recognize that rather than increase the size of indicator 2117 as actuator 2142 is moved in order to display a color to the user, other mechanisms may be used to show the color to the user, such as by rendering actuator/icon 2116 in the color as the actuator is activated.

According to a still further example, assuming the lighting load is off when a user selects actuator 2124 thereby causing control interface 2140 to be displayed by the control application, a user selecting pallet 2145 (e.g., via mouse or touch) may cause the lighting load to turn on (such as to full intensity, to an intensity to which the lighting load was previously set to, or to a preferred intensity level of the user, etc.), and with the appearance of actuator 2116 changing to an on state, indicator 2117 being displayed, and with actuator 2112 being displayed at the present intensity level. Similarly, actuator 2142 and control lines 2144a and 2144b may appear at a location relative to where the user touches pallet 2145 and/or at a location relative to the color the lighting load was previously set to, or to a preferred color value of the user, although other examples are possible and with the lighting load being controlled to this color (again, with indicator 2117 also indicating the color). Thereafter, a user may move actuator 2142 as described above.

As similarly discussed above, based on detecting the selection/movement of actuator 2142, the control application may communicate one or more messages to the system controller 250a, for example, to instruct the controller to reconfigure the lighting control device/lighting load(s) based on the user's instructions.

Figure 11M:
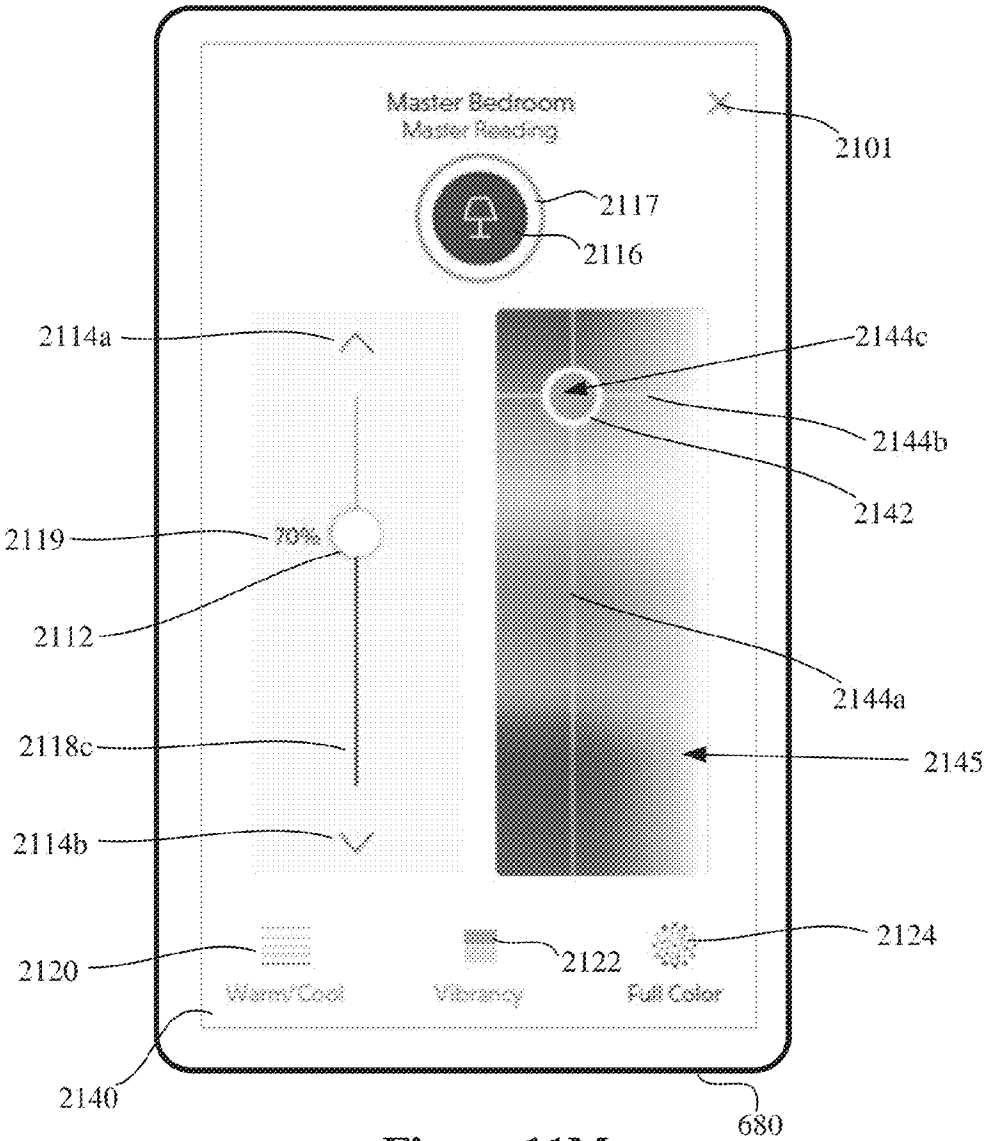
Figure 11N:
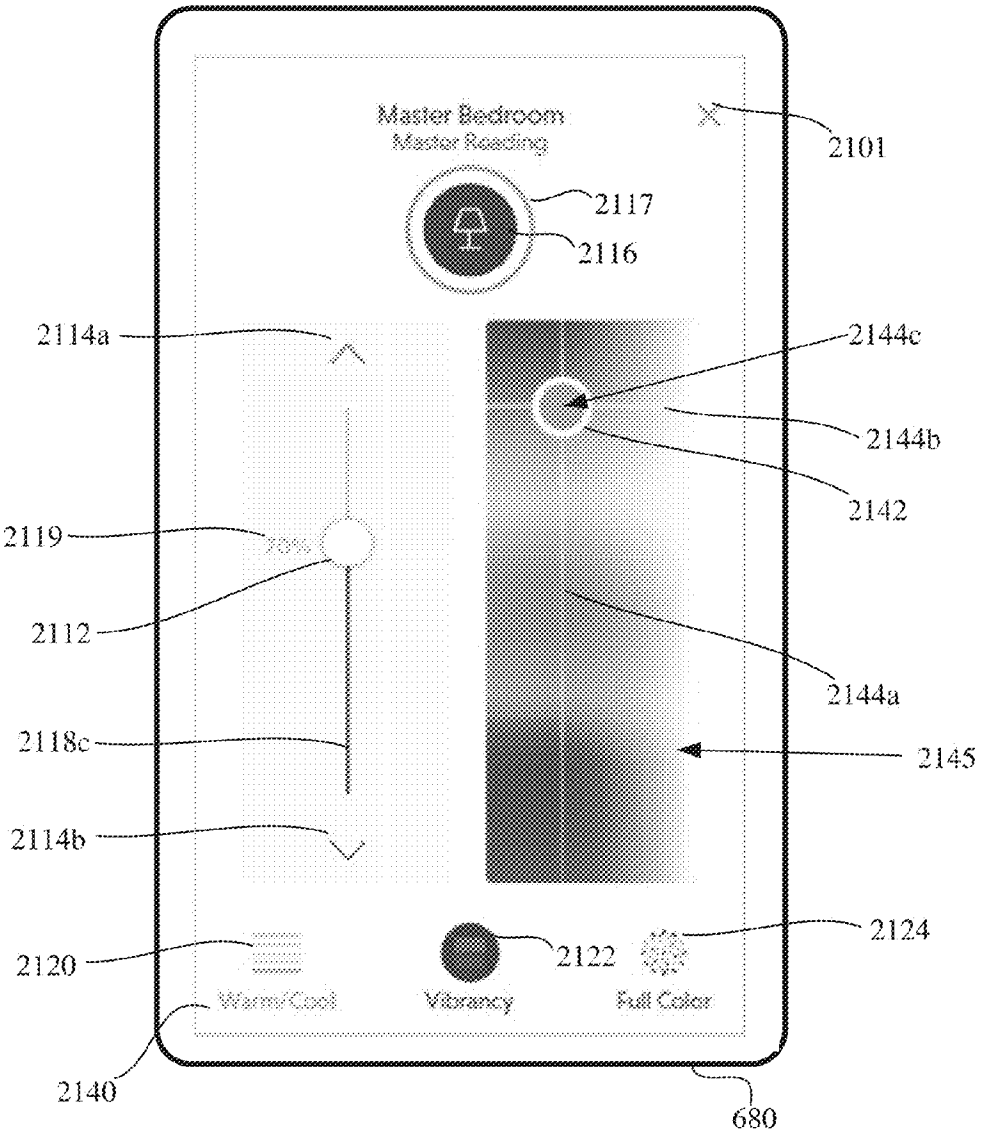

As shown in FIG. 11M, while the lighting load is set to a color point using control interface 2140, a user may also actuate from control interface 2140 any of actuators 2112, 2114a, and/or 2114b to control the dimming state/intensity of the lighting load. Again, as this occurs, the control application may increase the intensity of indicator 2119 as shown in FIG. 11M. Similarly, as shown in FIG. 11N, while the lighting load is set to a color point using control interface 2140, a user may also actuate from control interface 2140 the "Vibrancy" actuator 2122 to configure the lighting control device/lighting load to enter vibrancy mode. As indicated above, vibrancy mode may not change (or substantially change) the color point/chromaticity coordinates of the color being produced by the lighting load, but may alter the contribution of each of the RGBW LEDs in generating the colored light, which may include reducing the intensity/contribution of the white LED(s) for example, thereby making certain objects in a space more vibrant. In response to detecting selection of the vibrancy actuator 2122, the control application may display the appearance of actuator 2122 to show it is activated, as shown in FIG. 11N and communicate one or more messages to the system controller 250a, for example, to instruct the system controller to configure the lighting control device/lighting load to enter a vibrancy mode. While the "Vibrancy" actuator 2122 is activated and a user modifies the color and or intensity of the lighting load via control interface 2140, the color rendered by the lighting load may continue to be in the "vibrant" state/vibrancy mode. Similarly, a user may deactivate vibrancy mode from control interface 2140 thus returning to a normal setting (thus maintaining the color output of the lighting load, but increasing the contribution of the white LED(s) for example as compared to when vibrancy mode is activated). Lastly, assuming a user turns the lighting load off (such as, for example, through any of actuators 2116, 2112, 2114a, and/or 2114b) as described herein while control interface 2140 is displayed, the control application may automatically display control interface 2110 as shown in FIG. 11C. One will recognize that other examples are possible. One will also recognize that actuator 2120 may be activated from control interface 2140, resulting in the control application displaying control interface 2130 for example.

According to another example with respect to vibrancy control via the "Vibrancy" actuator 2122 and pallet 2145 that allows a user to configure a lighting load to any of a plurality of colors that lie within the pallet, vibrancy control may be limited to colors that are within a predefined range of colors within the pallet. For example, referring to the color palette 2245, the vibrancy control may be limited to a predefined set of colors on the right side of the palette (i.e., white colors). The predefined colors may be the 10% or 20% of colors on the right side of the palette. The "Vibrancy" actuator 2122 and thus vibrancy control may be disabled when the user selects colors in the palette that are outside of this predefined set of colors, as it may not be possible to render these colors in multiple ways using, for example, different intensities of RGB and white LEDs. Assuming a lighting load includes additional LEDs, for example, of other colors, a broader range of pallet 2245 may allow actuation of the "Vibrancy" actuator 2122.

One will recognize that if a lighting control device/lighting load is in vibrancy mode when the control application displays any of control interfaces 2110, 2130, or 2140, for example, the "Vibrancy" actuator 2122 may be shown as being activated.

Referring now to a further example with respect to "Vibrancy" actuator 2122, upon detecting selection of this actuator by a user the control application may display to a user an interface (not shown) that may include, for example, three actuators labeled for example, "High", "Low", and "Cancel". Selection of "Cancel" by a user may cause the control application to close the interface and return the user to the control interface from which the "Vibrancy" actuator 2122 was selected. Upon detecting that a user has selected the "High" actuator, the control application may communicate one or more messages to the system controller 250a, for example, to instruct the system controller to configure the lighting control device/lighting load to enter a vibrancy mode (or a "high" vibrancy mode, or an "on" setting). Vibrancy mode according to this example may include setting the lighting load to produce light at 3000K, for example (although other color temperatures may be used) and to set the intensity of the lighting load to 100% (although other intensities may be used). In this mode, generating light at 3000K may include generating the color with the red, green, and/or blue LED(s) for example, and reducing the intensity/contribution of the white LED(s) for example (as compared to when the "Low" actuator is selected) (e.g., setting the intensity of the white LEDs to 0%), thereby making certain objects in a space more vibrant. Upon selection of the "High" actuator, the control application may again display the control interface from which the "Vibrancy" actuator 2122 was selected, with actuator 2116 set to show the lighting load is "on", with indicator 2117 set to a color to correspond to 3000K, and with "Vibrancy" actuator 2122 set to show that vibrancy mode is activated (e.g., as shown in FIG. 11D). If the "Vibrancy" actuator 2122 was selected from control interface 2130, the control application may show actuator 2132 at a position along control line 2135c/pallet 2135 that corresponds to 3000K. If the "Vibrancy" actuator 2122 was selected from control interface 2140, the control application may show actuator 2142 and control lines 2144a and 2144b at a position in pallet 2145 that corresponds to 3000K. Assuming a user next changes the color being produced by the lighting load via control interface 2130 or 2140, the color produced by the lighting load may still be produced in "High" vibrancy mode, i.e., a reduced intensity/contribution of the white LED(s) for example (as compared to the "Low" vibrancy mode).

As an alternative, upon detecting that a user has selected the "Low" actuator, the control application may communicate one or more messages to the system controller 250a, for example, to instruct the system controller to configure the lighting control device/lighting load to enter a non-vibrancy mode (or a "low" vibrancy mode, or an "off" setting, or to a normal setting). Non-vibrancy mode according to this example may include setting the lighting load to produce light at 3000K, for example (i.e., a same color temperature as the "High" mode" although other color temperatures may be used) and to set the intensity of the lighting load to 100% (i.e., a same intensity as the "High" mode" although other intensities may be used). In this mode, as compared to the "High" vibrancy mode, generating light at 3000K may include generating the color with the red, green, and/or blue LED(s) for example, and using an increased intensity/contribution of the white LED(s) for example, thereby making certain objects in a space less vibrant (as compared to High vibrancy mode). Upon selection of the "Low" actuator, the control application may again display the control interface from which the "Vibrancy" actuator 2122 was selected, with actuator 2116 set to show the lighting load is "on", with indicator 2117 set to a color to correspond to 3000K, and with "Vibrancy" actuator 2122 set to show that vibrancy mode is de-activated (e.g., as shown in FIG. 11A). If the "Vibrancy" actuator 2122 was selected from control interface 2130, the control application may show actuator 2132 at a position along control line 2135c/pallet 2135 that corresponds to 3000K. If the "Vibrancy" actuator 2122 was selected from control interface 2140, the control application may show actuator 2142 and control lines 2144a and 2144b at a position in pallet 2145 that corresponds to 3000K. Assuming a user next changes the color being produced by the lighting load via control interface 2130 or 2140, the color produced by the lighting load may still be produced in "Low" vibrancy mode, i.e., an increased intensity/contribution of the white LED(s) for example (as compared to the "High" vibrancy mode). One will recognize that other variations are possible.

Figure 11O:
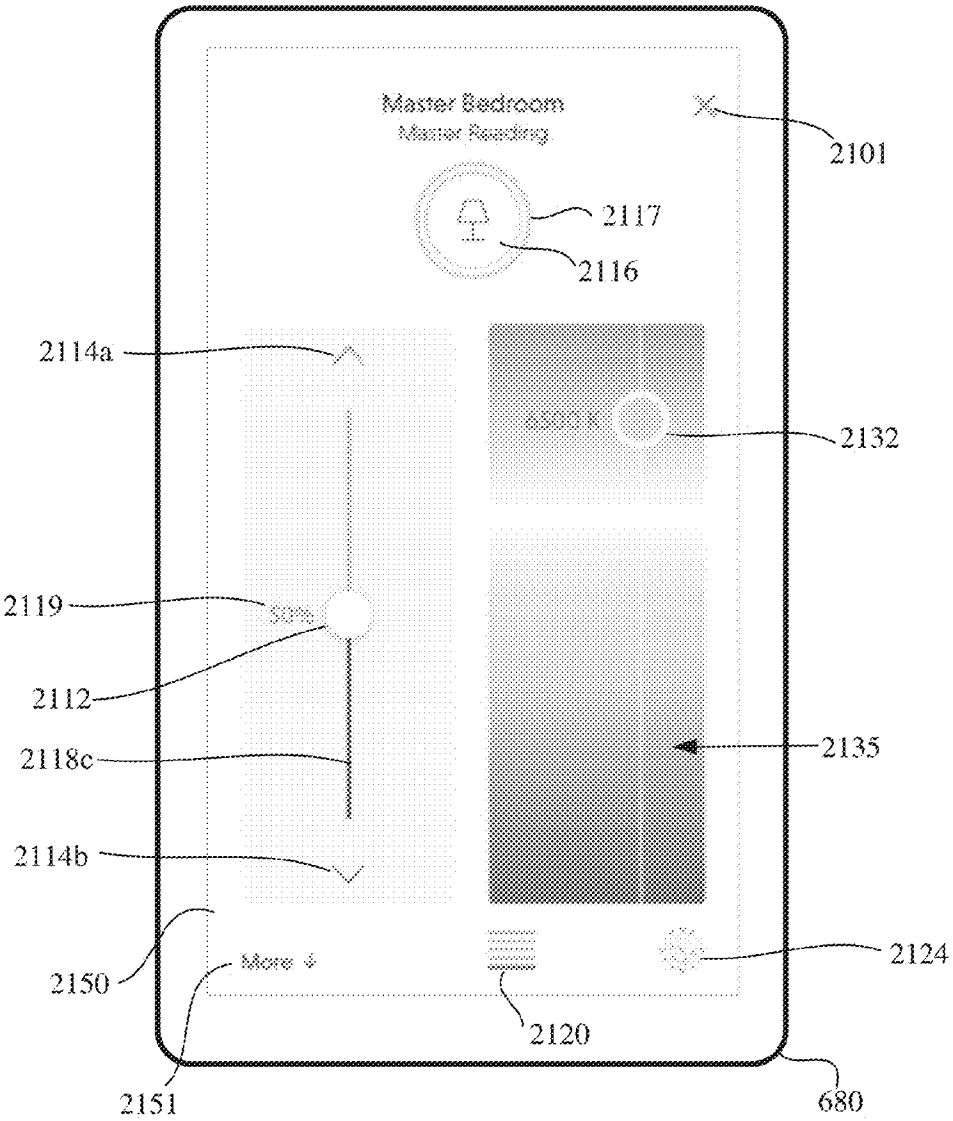

Referring now to FIG. 11O there is shown another example control interface 2150. Control interface 2150 may be similar to, and operate similar to, control interfaces 2110, 2130, and 2140 for example. For example, control interface 2150 may include an actuator 2116 for controlling/indicating the on/off state of a lighting control device/lighting load as described herein, and may include an indicator 2117 for indicating the color a lighting load is currently configured to produced, as described herein. Control interface 2150 may further include actuators 2112, 2114a, and 2114b, for example, for controlling the intensity level of a lighting load as described herein. Control interface 2150 may further include "Warm/Cool" actuator 2120 and "Full Color" actuator 2124 as described herein. As one example, actuation of "Warm/Cool" actuator 2120 may cause the control application to display in control interface 2150 a pallet 2135 together with actuators 2112, 2114a, and 2114b, for example (as shown in FIG. 11O). Actuation of actuator 2132 by a user may allow a user to configure the lighting load to produce a color along the black body curve, for example, as described herein, with indicator 2117 indicating that color as described herein. Similarly, actuation of "Full Color" actuator 2124 may cause the control application to display in control interface 2150 a pallet 2145 together with actuators 2112, 2114a, and 2114b, for example (similar to control interface 2140). Actuation of actuator 2142 of pallet 2145 by a user may allow a user to configure the lighting load to produce any of a plurality of colors within a color gamut, for example, as described herein, with indicator 2117 indicating that color as described herein.

Figure 11P:
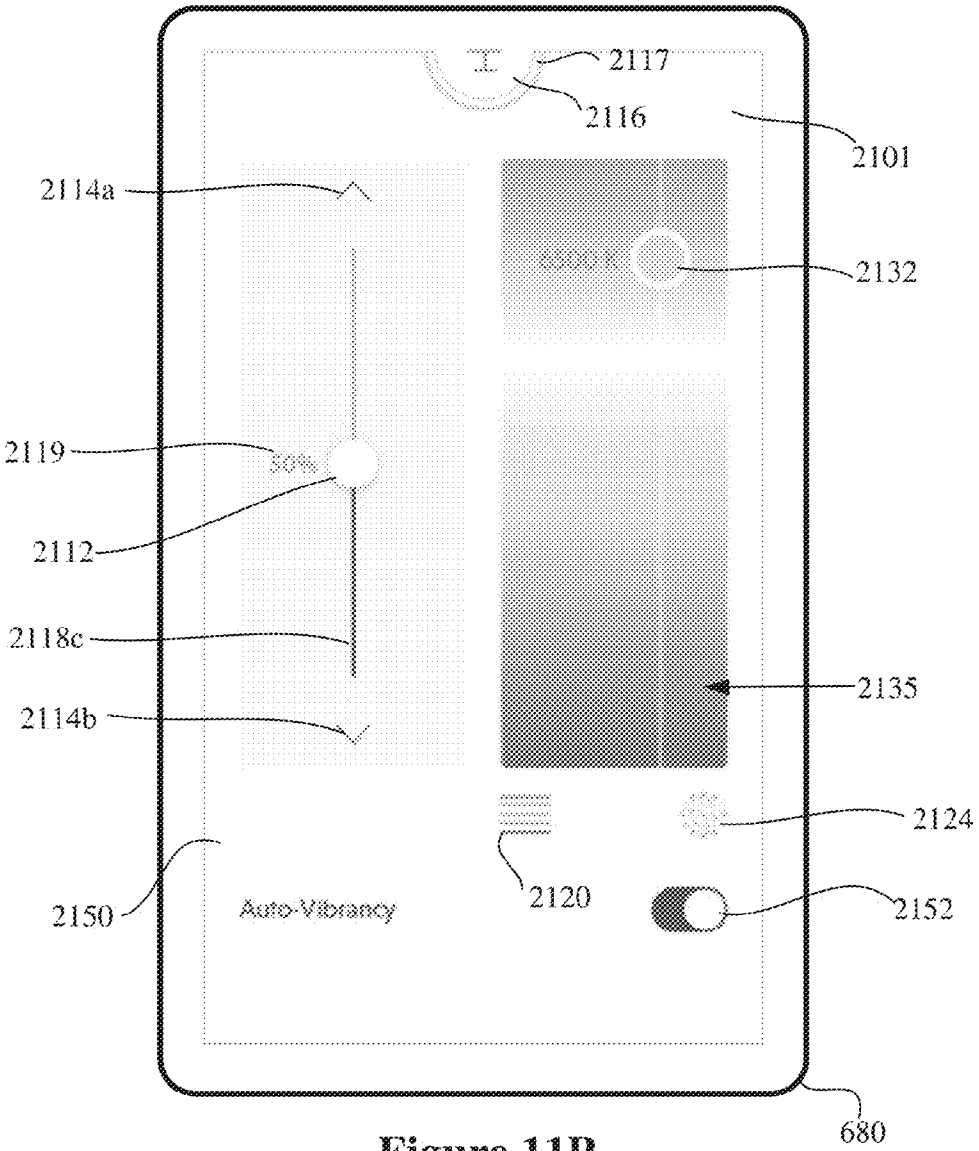

According to a further aspect of this example, control interface 2150 may include a "More" actuator 2151 (shown in FIG. 11O together with pallet 2135). The "More" actuator 2151 may also be shown when pallet 2145 is displayed in control interface 2150. Upon detecting selection of actuator 2151, the control application may expand control interface 2150 to include an "Auto-Vibrancy" actuator 2152 as shown in FIG. 11P. In this example, control interface 2150 is scrolled upward as "Auto-Vibrancy" actuator 2152 is displayed, although other examples are possible. A similar action may occur when the control application is displaying pallet 2145 and the "More" actuator 2151 is actuated.

The "Auto-Vibrancy" actuator 2152 (also referred to herein as an auto actuator) may be enabled and disabled by a user to enable/disable (e.g., turn on/off) what may referred to as an "auto-vibrancy" feature as described herein. In this example of FIG. 11P, the "Auto-Vibrancy" actuator 2152 is shown as being actuated/enabled, which may be the default state. According to this example, when the "Auto-Vibrancy" actuator 2152 is enabled (i.e., is on), the control application may cause (e.g., by communicating one or messages to the system controller 250a) the color rendering index (CRI) value for the lighting control device/lighting load to be automatically configured at the color the lighting control device/lighting load is configured to produce. For example, given a certain color point (whether selected via pallet 2135 or pallet 2145, for example), the "Auto-Vibrancy" actuator 2152 being enable may automatically configure the lighting load to increase the CRI value of the light being produced by the lighting load at that color to be greater than or equal to a CRI threshold value, which may be greater than or equal to 90.

Specially, a light output of a lighting load may be measured by a color rendering index (CRI) value. The CRI value may be a measurement of the lighting load's ability to reveal the actual color of objects as compared to an ideal light source (e.g., natural light). A higher CRI value may be a desirable characteristic of a user. For example, a lighting load with a higher CRI value may provide light such that the objects within a space reflect light at a natural color. Assuming a lighting load is an RGBW LED lighting load as described herein, for example, each of the respective LEDs that are comprised within the RGBW lighting load may be defined by a certain CRI value. In addition, an RGBW lighting load, for example, itself may be defined by a CRI value (e.g., a CRI value that indicates a summary or average CRI of each of the respective LEDs comprised within the lighting load). CRI values may be in the range of 0 to 100, inclusively. For example, the lowest possible CRI value may be 0 and the highest possible CRI value may be 100. Not all lighting loads may be configurable to all CRI values for a given produced color. The control application may be used to configure a CRI value of a lighting load(s) at a given color. A CRI value greater than or equal to a threshold (e.g., a CRI value of 90) may be desirable and may be referred to herein as "optimal", "optimized", or "maximized". That said, other ranges (e.g., smaller and/or larger ranges) may also be considered "optimal", "optimized", or "maximized". Hence, as described herein, the control application may increase or attempt to increase the CRI value of a lighting load at a given selected colors to a value greater than or equal to a threshold CRI value. For example, the threshold CRI value may be 90. One will appreciate, however, that the threshold CRI value may be other values. For example, the CRI threshold value may be a value which may be considered a desirable threshold that a system may attempt to achieve given the certain characteristics of the load control system and/or lighting control devices (e.g., quality of the LEDs used in a lighting load). As described herein, optimizing the CRI value towards or above the threshold CRI value may be referred to as optimizing the CRI value.

Hence, again, when the "Auto-Vibrancy" actuator 2152 is enabled, the control application may automatically configure the lighting load (based on determining that the actuator is enabled and by communicating one or more messages to the system controller 250a for example) such that the CRI value of the light output of the lighting load at a given selected color is greater than or equal to a CRI threshold value, (e.g., greater than or equal to 90) (which may be referred to herein as optimizing the CRI value towards or greater than the CRI threshold value). In certain instances (e.g., for a certain color point or CCT) the CRI value may be unable to be a value that is greater than or equal to the CRI threshold value. In those instances, the "Auto-Vibrancy" actuator 2152 being enabled may cause the lighting control device to increase the CRI value of the light output of the lighting load towards (e.g., as close as possible to) the CRI threshold value. As similarly described herein, when the "Auto-Vibrancy" actuator 2152 is enabled as determined by the control application, as a user selects colors via pallets 2135 and/or 2145, the control application, system controller, and/or lighting control device may cause the CRI value of the light output of the lighting load to be optimized as the user makes changes (e.g., achieve a CRI value that is greater than or equal to 90).

Figure 11Q:
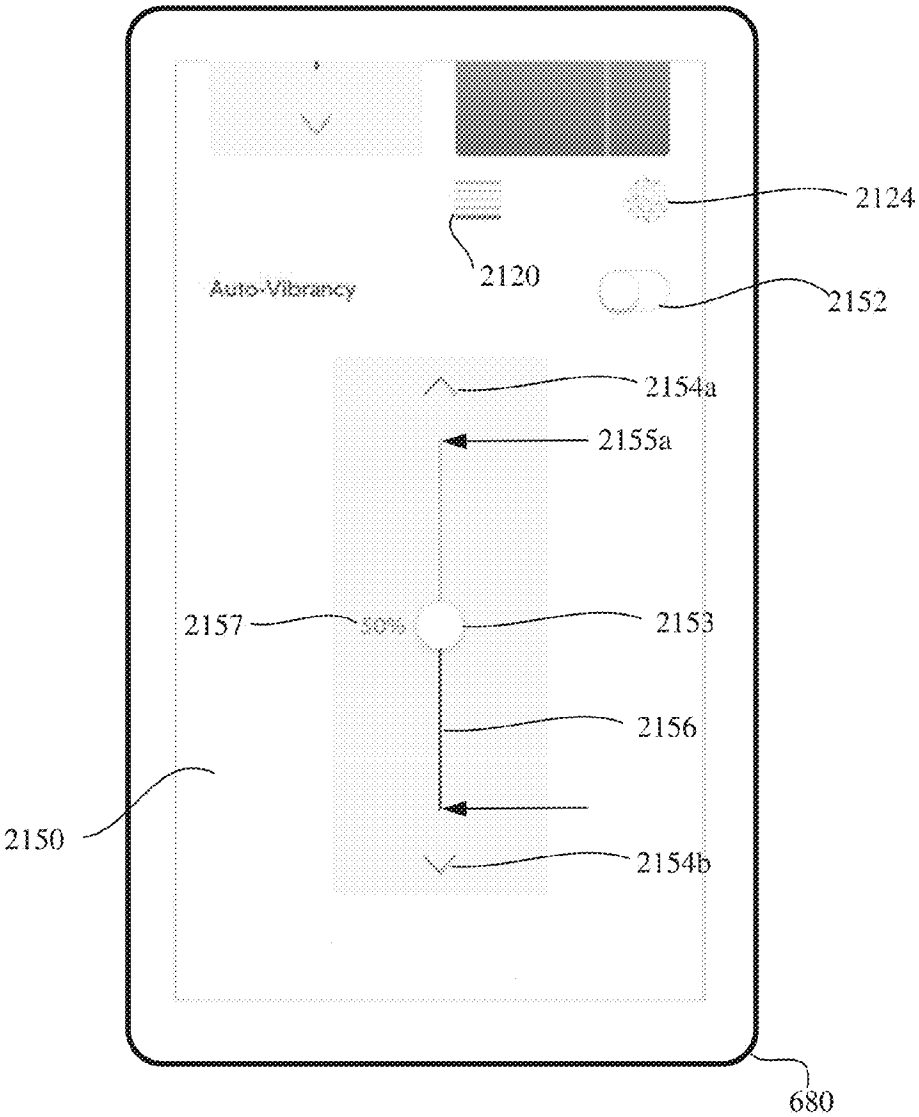

According to a further aspect of this example, the "Auto-Vibrancy" actuator 2152 may be disabled by a user as shown in FIG. 11Q. Upon detecting/determining that a user has disabled actuator 2152, the control application may further expand control interface 2150 to display actuator 2153 (which may be referred to herein as a vibrancy actuator for example) that is movable/slide-able (e.g., vertically movable) along control line 2156, an increase actuator 2154a and a decrease actuator 2154b.

As noted, actuator 2153 may be movable/slide-able (e.g., a vertically movable, although one will recognize that actuator 2153 may alternatively be horizontally moveable, for example) along control line 2156 and may allow a user to increase the relative vibrancy/vibrancy level of the light being output by a lighting load (e.g., by moving the actuator vertically upward towards position 2155a) or decrease the vibrancy/vibrancy level of the light being output by a lighting load (e.g., by moving the actuator vertically downward towards position 2155b). As similarly described herein, altering the vibrancy of a given lighting load may cause the color of the light produced by a lighting load to remain the same or substantially the same, but may alter the contributions of the individual LEDs making up that light to make objects more or less vibrant. Actuator 2153 may allow a user to control the vibrancy/vibrancy level of the lighting load from a relative maximum level such as 100% (position 2155a) to a minimum level such as 0% (position 2155b). Hence, as actuator 2153 is moved towards position 2155a, an object may become increasingly more vibrant and similarly, as actuator 2153 is moved towards position 2153b, an object may become decreasingly less vibrant. The control application may display the position of actuator 2153 along control line 2156 to represent the current relative vibrancy level of the lighting load. The control application may also display with actuator 2153 an indicator 2157 that numerically represents the current vibrancy level of the lighting load, here shown as a numerical percentage value 50% although other example numerical representations may be used. The control application may also dynamically vary the value of indicator 2157 as the user moves actuator 2153 vertically upward and downward. As also shown in FIG. 11Q, the portion of control line 2156 that lies below the actuator 2153 may be shown in a different intensity or line thickness, for example (here a greater intensity/line thickness) than the portion of the control line 2156 that lies above the actuator 2153

Similar to actuator 2153, increase actuator 2154a and decrease actuator 2154b may also enable a user to increase and decrease, respectively, the vibrancy of the lighting load. As one example, each of actuators 2154a and 2154b may be selectable in a single action (e.g., by a click and release of a mouse button, or a touch and release of the display screen of network device 680). Here, each individual actuation of increase actuator 2154a may increase the vibrancy of the lighting load by a defined amount (e.g., 1%) and similarly, each individual actuation of decrease actuator 2154b may decrease the vibrancy of the lighting load by a defined amount (e.g., 1%). The defined amount may be user definable. As another example, each of actuators 2154a and 2154b may be selectable for a prolonged duration (e.g., by a press and prolonged release of a mouse button, or a prolonged touch of the display screen of network device 680). Here, the actuation may cause the vibrancy level to increase/decrease until the mouse button is released or the touch of the screen is removed, for example. According to one example, as a user selects the increase actuator 2154a or the decrease actuator 2154b, the control application may also automatically move actuator 2153 in the up or down direction, respectively, and update the value of indicator 2157 accordingly. Upon disabling "Vibrancy-Actuator" 2152, the control application may position actuator 2153 along control line 2156 to represent the current vibrancy level of the lighting load, and may configure the value of indicator 2157 accordingly. One will recognize that as a user alters the vibrancy level, the CRI value of a light load may move below the CRI threshold value.

According to one example, when "Vibrancy-Actuator" 2152 is disabled, actuators 2153, 2154a, and 2154b may only be enabled when the control interface 2150 is displaying pallet 2135. When the control interface is displaying pallet 2145 for example, vibrancy control via actuators 2153, 2154a, and 2154b may be disabled. Alternatively, when the control interface is displaying pallet 2145, vibrancy control via actuators 2153, 2154a, and 2154b may be limited to colors that are within a predefined range of the color gamut. For example, referring to the color palette 2145 vibrancy control may be limited to a predefined set of colors on the right side of the palette (i.e., white colors). The predefined colors may be the 10% or 20% of colors on the right side of the palette. Actuators 2153, 2154a, and 2154b and thus vibrancy control may be disabled when the user selects colors in the palette that are outside of this predefined set of colors, as it may not be possible to render these colors in multiple ways using, for example, different intensities of RGB and white LEDs. Assuming a lighting load includes additional LEDs, for example, of other colors, a broader range of pallet 2245 may allow for vibrancy control via actuators 2153, 2154a, and 2154b.

Again, as similarly described herein, as a user changes the color of a lighting load via pallet 2135 and/or pallet 2145 (or a portion thereof) for example, the control application may cause the lighting load (via messages communicated to the system controller 250a for example), to produce light with a vibrancy level based on the setting of actuator 2153. Similarly, assuming "Vibrancy-Actuator" 2152 is disabled and a user selects a desired vibrancy level (at a selected color) via actuator 2153 for example (thereby causing a lighting load to render light at that color and vibrancy level), upon the control application detecting the "Vibrancy-Actuator" 2152 being enabled, the control application may communicate one or more messages to system controller 250a. For example, to cause the lighting control device/lighting load to alter the light output of the lighting load such that the CRI value of the light output/lighting load is greater than or equal to the CRI threshold value. Other examples are possible.

One will recognize that the example control interfaces shown in FIGS. 10A-10C and FIGS. 11A-11Q may be activated from other graphical user interfaces, including for example, other graphical user interfaces described herein, including, for example, the control interfaces being activated from an icon representing a lighting control device that is currently in an off state (as compared to selecting an icon from interface 702 that shows control device in an on state).

Returning to FIG. 6C, once a user is done with interface 702, the user may select icon 714 (the "Done" icon although icons may be used). Upon detecting/determining that the user selected icon 714, the control application may once again display interface 610 to the user, as shown in FIG. 6A.

Turning now to icon 624 of FIG. 6A, as indicated this icon may be a shades devices icon that indicates to the user the number of shade devices with respective shades within the load control system 210a that are currently open/up (where open/up may be any shade state other than a fully closed position) (One will recognize that while shades icon 614 is discussed herein as being associated with shades, it may also be associated with drapes, curtains, or blinds, for example, and other types of window coverings. Alternatively, section 620 may include other icons for such devices.) Similar to lighting control devices, a given shade device may control more than one shade (e.g., if multiple shades covering several different windows are linked together as one) and may control these shades in unison (or may possibly be configured to individually control these shades to different states). According to one example, the control application may view a given shade device and its respective shades as one device. In this example, if multiple shades controlled by the shade device are in an open/up state, the control application may count this as one (1) with respect to the number associated with icon 624, regardless of the number of shades that are actually controlled by the device. Nonetheless, one will recognize that the number associated with icon 614 may represent the actual number of shades controlled by each lighting control device. Here, the control application may view each shade controlled by a given shade device individually. In this example, the number associated with icon 624 may be representative of each shade. Hence, if two shades controlled by a shade device are in an open/up state, the control application may count this as two (2) with respect to icon 624. For description purposes, the control application is described herein from the perspective of a shade device, where the shade device and its respective shades are treated as a single unit. The control application may determine the number of shades that are currently open/up based on information obtained from the system controller 250a. In this example, the control application has determined based on information received from the system controller 250a that three shade devices have respective shades currently open/up (where open/up may include a shade in a partially open/up state). Again, the control application and/or the system controller may perform the count to determine this number, for example. The control application may indicate this determination to the user through the displayed number "3" associated with the icon 624 as shown in FIG. 6A, although again, the control application may display the number in other fashions. In addition to displaying the number of shade devices with shades determined to be currently open/up, as similarly discussed with lighting control devices icon 622, the control application may actively update the count displayed by icon 624 based on, for example, the system controller 250a actively monitoring the state of shades in the user environment (e.g., as a result of a user in the environment raising and lowering the shades for example) and report this information to the control application either asynchronously and/or as a result of the control application requesting from system controller 250a the status of the control devices/shades, for example. In this fashion, icon 624 may allow a user to quickly and easily determine from network device 680 whether any shades are open/up in the user environment. If no shades are determined to be currently open/up, the control application may display the value "0" with icon 624, may display no value with the icon, may not display the icon at all (thereby indicating no shades are open/up, etc.). Other variations are possible. For example, rather than displaying a number with icon 624, the control application may display the icon when any shades are open/up and not display the icon when all shades are down/closed. As a still further example, icon 624 may indicate the number of shades that are currently down/closed.

Icon 624 may also be selectable by the user. Upon detecting/determining that the user has selected icon 624, the control application may display to the user via network device 680 graphical user interface 720 as shown in FIG. 6F. Interface 720 may continue to display to the user the icon 624 and the number of shade devices with shades currently determined to be open/up. Interface 720 may also include an "Open All" icon 724 (although other text and/or icons may be used) and/or may also include a "Close All" icon 726 (although other text and/or icons may be used), both of which may be selectable by the user. Interface 720 may also include a respective icon 716 for each shade device having a respective controlled shade that is currently open/up (Again, according to this example, the control application may be configured to treat a shade device and its respective shade(s) as one unit, collectively representing the unit as one icon. As an alternative, each shade controlled by a shade device may be represented by an icon in interface 720, or some combination thereof). Each of these icons 716 may also be selectable by the user. In this example, three icons 716 are shown in connection with the value "3" as shown with icon 624. According to a further and/or alternative example and as shown in FIG. 6F, interface 720 may also include a respective icon 718 (here three are shown) for each shade device in the load control system where its respective controlled shade(s) is currently closed/down. Each of these icons 718 may also be selectable by the user. The control application may provide a visual indication to a user as to the state of all shades in the load control system. Assuming the control application is configured to operate as in FIG. 6F (i.e., both icons 716 and 718 being shown), the control application may use one or more visual tools/indicators in displaying the respective icons 716 and 718 to indicate which shade devices of the load control system have shades that are open and which have shades that are closed. As one example, the control application may change the appearance of the icons for open shades vs closed shades, such as using different colors and/or contrast between the icons as in the example of FIG. 6F. As another and/or additional example, the control application may use different icons for open shades vs closed shades. In one example, icons representing open shades may have icons showing partially open shades and icons representing closed shades may have icons showing closed shades. Other examples are possible.

Similar to the lighting control devices of FIG. 6C, the control application may also use the location indicator and/or type indicator to display with each icon 716 and 718 an indication of the respective shade device's/shade's location and/or function in the user environment (in this example, textual information such as, "Kitchen Left Shade," "Kitchen Center Shade," "Kitchen Right Shade," "Living Room Left Shade," "Living Room Center Shade," and "Living Room Right Shade" are used, although other mechanisms are possible such as segregating icons by location, similar to section 660 of FIG. 6A).

Similar to the lighting control devices of FIG. 6C, the control application may actively update icons 716 and 718 in user interface 720 as the respective shades in the user environment change state. For example, if the 'Kitchen Left Shade" is moved from an open state/position to a closed state/position by a user in the kitchen, the control application may receive an indication of this change from the system controller 250a (for example, automatically or in response to a query by the control application) and change the respective icon in display 720 to have the appearance of an icon as represented by icons 718. In addition, the control application may decrement the count associated with icon 624. Similarly, if the 'Living Room Left Shade" is moved from a closed state/position to an open state/position by a user in the kitchen, the control application may receive an indication of this change from the system controller 250a and change the respective icon in display 720 to have the appearance of an icon as represented by icons 716. In addition, the control application may increment the count associated with icon 624.

Turing now to icon 724 of user interface 720, it may allow a user to open all shades within the load control system 210a.

Upon detecting/determining that the user selected icon 724, the control application may communicate one or more messages to the system controller 250a instructing the system controller to open all shades. Once completed, the system controller 250a may provide a response to the control application (either automatically or in response to a query by the control application, for example) indicating that the shades are now open. According to one example, "opening" all shades may result in the system controller controlling each shade to its respective fully open state. According to another example, the system controller, may example, may store for each shade a defined position (e.g., a user defined position) the shade should be moved to in response to an "Open All" request. Other variations are possible. In response, the control application may display an example interface as shown in FIG. 6G. Specifically, the control application may change the number value associated with icon 624 to indicate a new number of shade devices having respective shades that are open (6 in this example), and may change the appearance of icons 716/718 as necessary to represent open shades (in the example of FIG. 6G, all shade icons 716/718 are shown as open shades). Note that in FIG. 6G icon 724 may be deactivated by the control application since all shades are open (where deactivating may include making the icon 724 non-selectable by a user and/or changing the appearance of icon 724 such as by changing its color or contrast as compared to other icons, removing the icon from interface 720, etc.). If a shade is subsequently closed (such as by a user in the user environment 202a closing a shade), in addition to decrementing the number associated with icon 624 to "1" for example, and changing an icon in interface 720 accordingly to show a closed shade, the control application may also activate/re-activate icon 724 (where activating the icon may include making the icon selectable by a user and/or changing the appearance of icon 724 such as by changing its color or contrast as compared to other icons, displaying the icon in interface 720, etc.). As for icon 726, it may allow a user to close all shades within the load control system 210a. Upon detecting/determining that the user selected icon 726, the control application may communicate one or more messages to the system controller 250a instructing the system controller to close all shades. Once completed, the system controller 250a may provide a response to the control application (either automatically or in response to a query by the control application, for example) indicating that all shades are now closed. In response, the control application may display an example interface as shown in FIG. 6H. Specifically, the control application may change the number value associated with icon 624 to "0" for example or show no value at all as here, and may change the appearance of icons 716/718 as necessary to represent closed shades (in the example of FIG. 6H, all shade icons 716/718 are shown as closed shades). Note that icon 726 may be deactivated by the control application since all shades are closed. If a shade is subsequently opened (such as by a user in the user environment 202a opening a shade), in addition to incrementing the number associated with icon 624 to "1" for example, and changing an icon in interface 720 accordingly to show an opened shade, the control application may also activate/re-activate icon 726. One will recognize that upon initially displaying interface 720 upon a user selection icon 624 from interface 610, the control application may activate/deactivate icons 724 and 726 depending upon the open/close state of shades in the load control system 210a.

As an alternative to selecting icons 724 and/or 726, a user may select any of icons 716/718 to individually control the shade devices and thus shades. Upon detecting/determining that the user selected a given one of the icons 716/718, the control application may display to the user an interface to control the respective shade device and thus shade(s). For example, assuming the control application detects/determines that the user selects in interface 720 the icon 716 labeled "Kitchen Left Shade," the control application may display the control interface 728 shown in FIG. 6I (in this example, if there is more than one shade controlled by the control device, the shades may be controlled to a common state). Control interface 728 may be shown alone or superimposed over interface 720, for example. One will recognize that control interface 728 is an example and other controls are possible. Here, control interface 728 is shown with a vertically movable/slide-able actuator 730 that may be actuated by the user (again, the control application may determine, based on information provided by the system controller (e.g., from the type indicator), an appropriate control interface to display to the user to control the selected device based on capabilities of the device). The control application may display the actuator 730 as in this example to provide an indication to the user of the respective shade's position (i.e., the actuator is approximately mid-way along its possible path to represent the shade(s) is partially closed/down, for example). Based on detecting movement of the actuator 730 by the user (such as raising or lowering the shades, etc.), the control application may communicate one or more messages to the system controller 250a to instruct the system controller to reconfigure the "Kitchen Left Shade" based on the user's instructions. If the user closes the shade(s), this update may be reflected in icon 624 (e.g., the number value displayed being decremented) and in interface 720 (e.g., the appearance of the icon) as similarly discussed above. Similarly, if a shade(s) is initially closed and is now opened via actuator 730, this update may be reflected in icon 624 (e.g., the number value displayed being incremented) and in interface 720 (e.g., the appearance of the icon) as similarly discussed above. As shown in FIG. 6I, control interface 728 may also include a selectable "Edit" icon 732 that when selected, may cause the control application to display a user interface that will allow a user to reconfigure parameters associated with the Kitchen Left Shade. A user may exit control interface 728 by touching an area of the display screen of network device 680 outside of the interface 728. Other examples are possible.

Again, user interface 720 of FIG. 6F is one example. As another example, upon detecting that a user selected icon 624, the control application may only display in graphical interface 720 a respective icon 716 for each shade device having a respective shade that is currently open/up and may only include a "Close All" icon 726 to close the respectively open shades (i.e., interface 720 may not include icons 718 representing currently closed shades and/or control icon 724). As another example, as indicated above shades icon 624 may alternatively show the number of shades that are currently closed/down. In this example, upon detecting that a user selected icon 624, the control application may only display in graphical interface 720 a respective icon 718 for each shade device having a respective shade that is currently closed/down and only include the "Open All" icon 724 to open the respectively closed shades (i.e., interface 720 may not include icons 716 representing currently open shades and/or control icon 726). Further examples are possible. For example, interface 720 may operate as shown in FIG. 6F with icon 624 showing the number of open shades, and both icons 716 and 718 present to show the status of all shades.

However, interface 720 may not include the "Open All" icon 724 and/or the "Close All" icon 726.

Returning to FIG. 6F, once a user is done with interface 720, the user may select icon 722 (the "Done" icon although icons may be used). Upon detecting/determining that the user selected icon 722, the control application may once again display interface 610 to the user, as shown in FIG. 6A.

Turning now to icon 626 of FIG. 6A, as indicated this icon may be a thermostat devices icon that indicates to the user a current temperature in the user environment 202a. In particular, load control system 210a may include one or more thermostat devices that control respective HVAC systems. The control application may determine a current temperature in the user environment 202a using information obtained from the system controller 250a based on the system controller's interactions with the thermostat device(s). Based on the current temperature(s) obtained from the system controller, the control application may determine a representative temperature reading for the user environment and indicate this reading to the user by displaying/associating this reading (in this example, 72 degrees) with the icon 626 as shown in FIG. 6A. As one example, when the load control system includes a single HVAC system, the current temperature indicated by the control application through icon 626 may be the current temperature as measured by the corresponding thermostat device. When the load control system includes two or more HVAC systems, the current temperature indicated by the control application through icon 626 may be the current temperature indicated by one of the thermostat devices, the choice of which by the control application may be based on information received from the system controller as which to use, and/or information associated with the respective thermostat devices. For example, assuming the user environment has a downstairs and an upstirs HVAC system, the control application may always use the current temperature indicated by the downstairs thermostat, may use the current temperature indicated by the downstairs thermostat during the day (e.g., where "day" may be provided by the system controller, such as 6 AM to 8 PM), and use the current temperature indicated by the upstairs thermostat during the evening (e.g., where "evening" may be provided by the system controller, such as 8 PM to 6 AM), etc. Other variations are possible including the control application allowing a user to select which of the thermostat devices to use and possibly when (one example of this is discussed in reference to FIG. 6K). As another example, the control application may use an average (as determined by the control application and/or system controller for example) of the respective current temperatures as measured by the respective thermostat devices of each HVAC system. One will recognize that other mechanisms and/or mathematical formulas may be used to determine the temperature associated with icon 626 when there are multiple HVAC systems. As a further example (not shown in the Figures), in addition to associating/displaying a current temperature with icon 626 the control application may also display an indication of the current heat and/or cool setpoint temperate to which a thermostat device is set to. When there are multiple thermostat devices/HVAC systems, the control application may make a determination as to which setpoint temperate(s) to use in a similar fashion as the current temperature. One will recognize that the temperature values provided with icon 626 may be in Fahrenheit or Celsius, and may be configurable by the user.

For explanation purposes only, it will be assumed that the load control system 250a includes two HVAC systems (an upstairs and a downstairs system) each with a respective thermostat device and that the control application displays the current temperature reading of the downstairs system with icon 626. In addition to displaying the current temperature, as with lighting devices icon 622 the control application may actively update the current temperature displayed by icon 626 based on, for example, the system controller 250a actively monitoring the current temperature measured by the downstairs thermostat and reporting this information to the control application either asynchronously and/or as a result of the control application requesting from system controller 250a the status of the downstairs thermostat device, for example. In this fashion, icon 626 may allow a user to quickly and easily determine from network device 680 a current temperature in user environment 202a.

Icon 626 may also be selectable by a user. Upon detecting/determining that the user has selected icon 626, the control application may display to the user via network device 680 a graphical user interface 740 as shown in FIG. 6J. Interface 740 may continue to display to the user icon 626 and the current temperature reading. Interface 740 may also include a "Raise All" icon 744 (although other text and/or icons may be used) and/or may also include a "Lower All" icon 746 (although other text and/or icons may be used), both of which may be selectable by the user and may allow the user to control the thermostat devices of the load control system in tandem/together as discussed below. Interface 740 may also include a respective information section (also referred to herein as a pane) for each thermostat device in the load control system. In this example with the load control system 210a including two thermostat devices, each device may have a respective information section or pane 760 and 762 that provide respective status information and controls for each thermostat device/HVAC system. In the event a load control system has more than two thermostat device/HVAC systems, the control application may be configured to make information sections 760 and 762 scrollable by the user (such as vertically scrollable) to display additional information sections or panes, one for each system. In one aspect, information sections 760 and 762 allow a user to control the respective thermostat devices separately. As further shown in FIG. 6J, control application may use the location indicator and/or type indicator associated with each thermostat device to display in connection with each thermostat device in information sections or panes 760 and 762 an indication of the respective device's location in the user environment (in this example, textual information such as, "Downstairs Thermostat" and "Upstairs Thermostat" are used, although other mechanisms are possible). In general, the control application's use of textual information may allow the user to more easily determine the actual thermostat device/HVAC system in the user environment the information in sections 760/762 refer to.

Using information section or pane 760 as an example, the control application may display for a thermostat/HVAC system a current temperature reading 750 (here, 72 degrees) as determined by the respective thermostat device. Again, as a respective thermostat device determines a change in the current temperature reading in the user environment and the system controller 250a reports this change to the control application (automatically or in response to a query by the control application for example), the control application may actively update the current temperature reading 750 displayed to the user. The control application may also display the setpoint temperature(s) 756 (here, 70 degrees) the respective thermostat device is configured to control its respective the HVAC system to. Assuming the HVAC system has four modes including a heat mode, a cool mode, an auto mode and an off mode, none, one or more setpoint temperature(s) 756 may be shown. For example, if the thermostat is set to off, no set point temperature may be shown. If the thermostat is set to heat mode or cool mode, one setpoint temperature 756 may be shown representing the temperature the HVAC system is set to heat or cool to, respectively. If the thermostat is set to auto mode, two setpoint temperatures may be shown representing the temperature the HVAC system is set to heat to and set to cool to. Indications may also be provided to the user as to which of the two temperatures is the heat to temperature and which is the cool to temperature. The information section 760 may also include selectable icon controls 752 (two pairs if two set point temperatures are shown) that allow a user to adjust the setpoint temperature(s) 756 of the thermostat device. In this example, "+" and "−" controls are used to respectively raise and lower the setpoint temperature 756. One will recognize that other control types may be used. Each actuation of the "+" control by a user may raise the setpoint temperature 756 by a predetermined number of degrees (such as one degree). Similarly, each actuation of the "−" control by a user may lower the setpoint temperature 756 by a predetermined number of degrees (such as one degree). Upon detecting/determining that the user selected one of the respective "+" and "−" controls of icon 752, the control application may communicate one or more messages to the system controller 250a instructing the system controller to adjust the setpoint temperature of the thermostat device. Changes in the setpoint temperature(s) may also be reflected in setpoint temperature(s) 756 of interface 740.

The information section 760 may also include a selectable "carrot" 758, for example. Upon detecting/determining that the user selected carrot 758, the control application may expand information section 760 to display additional controls/information to the user as shown in user interface 764 of FIG. 6K (again, the controls displayed by the control application may be based on capabilities/functionality of the thermostat device as determined from information provided by the system controller). According to this example, user interface 764 may include three control sections that may allow a user to further control the Downstairs thermostat/HVAC system. These control sections may include a mode control 766 that may allow a user to select any of a heat mode, cool mode, auto mode, and off mode for example of the HVAC system as described above. The control application may display with the mode control 766 the current mode of the HVAC system (here, cooling) as determined from the system controller. The control sections may further include a fan control 768 that may allow a user to turn the HVAC fan on and off. The control application may display with the fan control 768 the current fan setting of the HVAC system (here, On) as determined from the system controller. Assuming the thermostat device/HVAC system is programmable, the control sections may further include a schedule control 770 that may allow a user to turn the schedule on and off. The control application may display with the schedule control 770 the current schedule status (here, On) as determined from the system controller. Upon detecting/determining that the user selected any one of these controls (e.g., by touching the word "HEAT," or "AUTO," or "OFF," etc.), the control application may communicate one or more messages to the system controller 250a instructing the system controller to adjust/reconfigure the thermostat device. User interface 764 may further include a selectable "Edit" icon 756 that when selected, may cause the control application to display a user interface that will allow a user to reconfigure the schedule of the thermostat device. For example, the user may be able to adjust on/off times, heating and cooling setpoint temperatures, etc., with the control application communicating this information to the system controller 250a.

Turning again to FIG. 6J and the "Raise All" icon 744 and "Lower All" icon 746, these controls may allow the user to raise and lower respectively the setpoint temperature(s) 756 of the respective thermostat devices of the load control system in tandem/together. One will recognize that other control types may be used. Each actuation of icon 744 by a user may raise the respective setpoint temperature(s) 756 (which may be different for each thermostat) of each thermostat device by a predetermined number of degrees (such as one degree). Similarly, each actuation of icon 746 by a user may lower the respective setpoint temperature(s) 756 of each thermostat device by a predetermined number of degrees (such as one degree). If an HVAC system is set to auto mode, both setpoint temperatures of that system may move in tandem, for example. For example, assume that the downstairs thermostat device/HVAC system (represented by section or pane 760) has a setpoint temperature of 70 degrees and that the upstairs thermostat device/HVAC system (represented by section or pane 762) has a setpoint temperature of 74 degrees. An actuation of icon 744 by a user may raise the setpoint temperature of the downstairs thermostat device/HVAC system to 71 degrees and may raise the setpoint temperature of the upstairs thermostat device/HVAC system to 75 degrees (assuming each actuation of icon 744 makes a one-degree change). Similarly, again assuming that the downstairs thermostat device/HVAC system has a setpoint temperature of 70 degrees and that the upstairs thermostat device/HVAC system has a setpoint temperature of 74 degrees, an actuation of icon 746 by a user may lower the setpoint temperature of the downstairs thermostat device/HVAC system to 69 degrees and may lower the setpoint temperature of the upstairs thermostat device/HVAC system to 73 degrees (assuming each actuation of icon 746 makes a one degree change). Upon detecting/determining that the user selected one of the respective icons 744 and 746, the control application may communicate one or more messages to the system controller 250a instructing the system controller to adjust the setpoint temperatures of the thermostat devices. Changes in the setpoint temperatures may be reflected in setpoint temperature(s) 756 of each device.

With further reference to FIG. 6J, if a given user environment includes temperature devices of different types, the appearance of sections 760 and 762 may be different for each temperature device. Again, the control application may make this determination from information received from the system controller, for example, and/or for information stored at the network device. According to a further aspect of the control application, when load control system 250a includes multiple HVAC systems, as noted above the temperature associated with icon 626 may correspond to one of the systems. According to one example, the control application may use the temperature associated with the first or top thermostat device/HVAC system as shown in interface 740 (here, the thermostat device/HVAC system represented by section 760). According to a further aspect of the control application, a user may change the order of sections 760 and 762 displayed in interface 740 (e.g., A user may touch a given section for at least a defined period of time. Upon detecting the touching, the control application may active the section and allow the user to drag the section up or down, for example, to thus change the ordering). Upon changing the order, the control application may now have the temperature associated with icon 626 track the new top section. One will recognize that the order in which the sections 760 and 762 should be displayed and which of the sections icon 626 should track may be stored at the network device and/or the system controller. One will also recognize that other variations are possible, including for example, the temperature associated with icon 626 tracking the last of sections 760 and 762.

Once a user is done with interface 740, the user may select icon 742 (the "Done" icon although icons may be used). Upon detecting/determining that the user selected icon 742, the control application may once again display interface 610 to the user, as shown in FIG. 6A.

As indicated, section 620 of user interface 610 of FIG. 6A may also include other icons such as a fans icon 776 as shown in FIG. 6L that may indicate to the user a status of fan devices within the load control system 210a, such as the number of fans that are currently on. Similar to lighting control devices, a given fan device may control more than one fan and may control these fans in unison. According to one example, the control application may view a given fan device and its respective fans as one device. In this example, as long as one fan controlled by the fan device is in an on state, the control application may count this as one (1) with respect to the number associated with icon 776, regardless of the number of fans that are actually controlled by the device. Nonetheless, one will recognize that the number associated with icon 776 may represent the actual number of fans controlled by each fan device. Here the control application may view each fan controlled by a given fan device individually. In this example, the number associated with icon 776 may be representative of each fan. Hence, if two fans controlled by a fan device are in an on state, the control application may count this as two (2) with respect to icon 776. For description purposes, the control application is described herein from the perspective of a fan device, where the fan device and its respective fans are treated as a single unit. The control application may determine the number of fans that are currently on based on information obtained from the system controller 250a. Again, the control application and/or the system controller may perform the count to determine this number, for example. In this example, the control application has determined based on information received from the system controller 250a that two fan devices have respective fans that are currently on (where on may include a fan at any speed other than off). The control application may indicate this determination to the user through the displayed number "2" associated with the icon 776 as shown in FIG. 6L. In addition to displaying the number of fan devices with respective fans determined to be currently on, similar to lighting control devices icon 622 the control application may actively update the number displayed with the fans icon 776 based on, for example, the system controller 250a actively monitoring the state of fans in the user environment (e.g., as a result of a user in the environment adjusting the fans) and report this information to the control application either asynchronously and/or as a result of, for example, the control application requesting from system controller 250a the status of the fans and/or control devices in general. In this fashion, the fans icon 624 may allow a user to quickly and easily determine from network device 680 whether any fans are on in the user environment. If no fans are determined to be currently on, the control application may display the value "0" with icon 776, may display no value with the icon, or may not display the icon at all (thereby indicating no fans are on, etc.). Other variations are possible. For example, rather than displaying a number with icon 776, the control application may display the icon when any fan is on and not display the icon when all fans are off. As a still further example, icon 776 may indicate the number of fan devices with respective fans that are all in the off state.

Icon 776 may also be selectable by the user. Upon detecting/determining that the user has selected icon 776 from user interface 620, the control application may display to the user via network device 680 the graphical user interface 772 as shown in FIG. 6M. Interface 772 may continue to display to the user icon 776 and the number of fan devices with fans currently determined to be on. Interface 772 may also include a "Turn All Fans Off" icon 778 (although other text and/or icons may be used), which may be selectable by the user. Interface 772 may also include a respective icon 780 for each fan device that has respective fans determined to be on (Again, according to this example, the control application may be configured to treat a fan device and its respective fan(s) as one unit, collectively representing the unit as one icon. As an alternative, each fan controlled by a fan device may be represented by an icon in interface 702, or some combination thereof). Each of these icons may also be selectable by the user. In this example, two icons 780 are shown in connection with the value "2" as shown with icon 776. The control application may use the location and/or type indicator associated with each fan device to display in connection with each icon an indication of the respective fan device's/fan's location in the user environment (in this example, textual information such as, "Downstairs Bathroom Fan," and "Master Bedroom Fan" are used, although other mechanisms are possible such as segregating icons by location, similar to section 660 of FIG. 6A but only displaying icons for devices currently on). Similar to interface 702, the control application may actively update icons 780 displayed to the user as fans in the user environment change state from on to off and off to on. For example, as a fan controlled by a fan device is turned on by a user in the user environment for example, the control application may receive an indication of this change from the system controller 250a (for example, automatically or in response to a query by the control application) and display to the user an additional icon 780 in interface 772 that is associated with the fan device of the fan, and also increase the number value by "1" shown by icon 776. Similarly, as a fan controlled by a fan device is turned off, the control application may receive an indication of this change from the system controller 250a and remove from interface 772 the icon 780 associated with the fan device or change the appearance of the icon (e.g., change its color or contrast as compared to other icons) when all fans controlled by the fan device are off, as similarly discussed above. Other variations are possible. For example, the control application may configure interface 772 similar to interface 720 of FIGS. 6F-6H and show all fan devices in the load control system (both on and off), including the state of each fan device as similarly described for shades, and also allow a user to control fan devices as similarly described for shades in FIGS. 6F-6H. Turning now to icon 778, as indicated, this icon may be selectable by the user and may allow the user to turn off all fan devices and thus fans that are currently on in the load control system 210a. Upon detecting/determining that the user selected the icon, the control application may communicate one or more messages to the system controller 250a instructing the system controller to turn all the fans off. Once completed, the system controller 250a may provide a response to the control application (automatically or in response to a query, for example) indicating that the fan devices are now off. In response, the control application may change the number associated with icon 776 to "0" for example (or show no value for example), and remove or change the appearance of icons 780 from interface 772, for example. The control application may also deactivate icon 778 since all fan devices/fan are off (where deactivating may include making the icon non-selectable by a user and/or changing the appearance of icon 778 such as by changing its color or contrast as compared to other icons, removing the icon from interface 772, etc.). Once a fan device returns to the on state (such as by a user in the user environment 202a turning a fan on), in addition to incrementing the number associated with icon 776 to "1" for example, and displaying an icon 780 in interface 772 representing the fan device, the control application may also activate/re-activate icon 778 (where activating the icon may include making the icon selectable by a user and/or changing the appearance of icon 778 such as by changing its color or contrast as compared to other icons, displaying the icon in interface 772, etc.). One will recognize that other examples are possible such as interface 772 also/alternatively including a "Turn All Fans On" icon, which upon selection, may cause the control application to communicate one or more messages to the system controller to turn all fans in the user environment to an on state (or a pre-programmed set of fans to an on state). Again, such an action by a user may cause the control application to increment the number associated with icon 622 and to display respective icons 780 accordingly. Other examples are possible.

As an alternative to selecting icon 778, icons 780 may also be selectable by the user and allow the user to individually control the fan device and thus fan(s) associated with the icon. (One will recognize that if the control application is configured to show icons 780 in a fashion that indicates the respective fan device is off, the icon may continue to be selectable by the user to control the device.) Upon detecting detecting/determining that the user selected a given one of the icons 780, the control application may display to the user an interface to control the respective fan device/fan(s).

For example, assuming the control application detects/determines that the user selected in interface 772 the icon 780 labeled "Master Bathroom Fan" (in this example, the fan device may control one respective fan), the control application may display the control interface 782 shown in FIG. 6N. Control interface 782 may be shown alone or superimposed over interface 772, for example. One will recognize that control interface 782 is an example and other controls are possible. The "Master Bathroom Fan" may be a multi-speed fan and as such, the control application (determining that the fan is a multi-speed fan such as from its type indicator) may display a control interface 782 as shown here with multiple fan speed actuators 784 that may be actuated by the user (i.e., the control application may determine, based on information provided by the system controller (e.g., from the type indicator), an appropriate control interface to display to the user to control the selected fan device/fan based on capabilities of the fan device/fan). The control application may display the actuators 784 to provide an initial indication to the user of the current fan speed of the fan controlled by the fan device (e.g., the low speed actuator is highlighted in this example). Based on the detecting selection of one of the actuators 784 by the user, the control application may communicate one or more messages to the system controller 250a to instruct the system controller to reconfigure the fan device based on the user's instructions. If the user turns the fan device/fan off, this update may be reflected in icon 776 (e.g., by decrementing the count by 1) and in interface 772 as discussed above by removing or altering the appearance of the icon 780 corresponding to the "Master Bathroom Fan," for example. As shown in FIG. 6N, control interface 782 may also include a selectable "Edit" icon 784 that when selected, may cause the control application to display a user interface that may allow a user to reconfigure parameters associated with the respective fan device/fan. A user may exit control interface 782 by touching an area of the display screen of network device 680 outside of the interface 782. Other examples are possible.

Returning to FIG. 6M, once a user is done with interface 772, the user may select icon 774 (the "Done" icon although other icons may be used). Upon detecting/determining that the user selected icon 774, the control application may once again display interface 610 to the user, as shown in FIG. 6A.

As indicated above, section 620 may show additional status information than that discussed herein. For example, the control application may include in section 620 one or more icons to indicates alerts and/or system notifications, such as an indication of low batteries/a number of low batteries in the load control system (assuming, for example, a control device(s) have batteries), an indication that an alarm is going off in the user environment 202a (e.g., a smoke alarm, carbon monoxide detector alarm, home security alarm), an indication of communication errors (e.g., that the system controller cannot communicate with one or more control devices), etc. Any such icons may be selectable by a user resulting in the control application displaying to the user an interface that will provide additional information and/or system controls, for example. Assuming the load control system includes occupancy sensors for example, the control application may include in section 620 an icon providing an indication of occupancy status in the user environment 202a. Such an icon may simply provide an indication of occupied/unoccupied and/or may provide an indication of a number of people present in the user environment 202a. Selection of such an occupancy icon may cause the control application to display to the user an interface that provides additional information such as which rooms in the user environment are occupied and/or unoccupied assuming, for example, that various rooms have occupancy sensors. One will recognize that the control application may determine occupancy in other fashions such as by detecting a change in status of control devices like lights, fans, shades, etc. from user actuated controls within the user environment, by sensors tracking doors opening/closing, etc. As another example, scenes maintained by the system controller may include a "Vacation Mode," an "Away Mode" (which may be a scene when occupants left home for the day), a "Home Mode" (which may be a scene when occupants have returned home for the day), in addition to other scenes, etc. Accordingly, the control application may include in section 620 one or more icons providing an indication as to which mode/scene is currently active in the environment. Selection of such an icon(s) may cause the control application to display to the user an interface that allows, for example, the user to change the mode/scene. Again, other examples are possible.

Turning now to FIG. 6O and sections 640 and 660, upon determining/detecting that a user has selected the Devices tab 642 (or as a default configuration), the control application may provide an indication that the tab is active (e.g., as shown by the under-bar 643, although other means may be used such as reverse highlighting, etc.) and may display icons within information section 660 where the icons may represent one or more of the control devices of the load control system 210a. According to one example, all control devices may be displayed in section 660. According to another example, certain control devices such as thermostat devices or handheld/remote-control keypads configured to only turn lighting load(s) on/off and/or to control the dimming levels of the lighting loads, for example, may not be displayed in this section. According to another example, the control application may be configurable by a user, thereby allowing a user to decide whether such control devices are to be shown in section 660. As indicated above, upon the control application being started, it may default to the Devices tab 642.

According to one example, when the Devices tab 642 is active, the control application may subdivide section 660 into one or more panes (here three panes are shown, 802, 804, and 806). Each pane may represent a location within the user environment 202a. The control application may determine the locations based on information received from the system controller 250a, such as the location indicators associated with the various control devices. The control application may provide an indication with each pane as to the location it represents. Here, textual labels are used, although other mechanism may also be used. In the example of FIG. 6O, the control application may label pane 802 as "Kitchen," label pane 804 as "Living Room," and label pane 806 as "Master Bedroom." Within each pane 802, 804, and 806 the control application may further display a respective icon (such as icons 810a-810d) for control devices when the control device and/or the load(s) it controls are located within the respective location that the pane represents. As shown, different icons may be used for different types of control devices. According to one example, icons for certain control devices may appear in multiple panes 802, 804, and/or 806. As an example, if a determination of whether to display in a certain pane an icon for a given control device is based on a location of the control device, the icon may appear in the one pane corresponding to that location. If, however, a determination of whether to display an icon for a control device in a certain pane is based on a location of the loads the control device controls and those loads are in multiple locations, the icon may be displayed in each respective pane corresponding to the location. For description purposes the former example may be assumed. Other variations are possible. Again, the system controller may provide an indication of the type of icon the control application should use for each control device. As another example, the control application may use information provided by system controller on each control device to determine which icon to use (e.g., for a fan type device use a fan icon, for a shade type device use a shade icon, for a lighting control device use a light-based icon, for a keypad device use a keypad icon, etc.) The control application may further associate with each icon an indication of the control device's and/or its respective load(s)' specific location/function as similarly discussed herein. For example, pane 802 has three different displayed icons each with a respective textual identifier ("Ceiling Lights," Pendants," and "Keypad."). According to a further aspect of interface 610, the order of panes 802, 804, and 806 may be statically defined. According to a further aspect, the control application may enable a user to change the order of panes 802, 804, and 806 (e.g., A user may touch a given pane for at least a defined period of time. Upon detecting the touching, the control application may active the pane and allow the user to drag the pane up or down, for example, to thus change the ordering. Other variations are possible). One will recognize that the order in which the panes 802, 804, and 806 are to be displayed may be stored at the network device and/or the system controller. One will also recognize that other variations are possible.

The control application may initially display a maximum number of icons (here three, for example) in each pane. If a given location has more than three control devices, the pane may include a "carrot" 808, for example. Upon detecting/determining that the user has activated/selected a carrot 808, the control application may expand the respective pane to display additional icons representing additional control devices in the location. Selection of the carrot 808 a second time may collapse the pane back to the three icons. As another example, the control application by default may display in each pane all icons for all control devices in a given location. Here, actuation of "carrot" 808 may collapse the pane to show no icons and selection of the carrot 808 a second time may expand the pane to show all icons. Other examples are possible. Furthermore, section 660 may be scrollable (e.g., vertically scrollable) to display additional panes representing additional locations. According to one example, referring to FIG. 6P there is shown an example user interface with information section 660 scrolled revealing another pane 808 corresponding to an "Office" location within the user environment 202a and having respective icons representing additional control devices located in the Office. In this example, as section 660 is scrolled to reveal additional panes below "Master Bedroom" pane 806, section 660 may expand, with section 620 scrolling off of/being remove from the display interface of the network device and section 660 consuming this space, and additional pane(s) (here pane 808) appearing below pane 806. Scrolling here may be referred to as scrolling down or downward scrolling for discussion purposes only. This "downward" scrolling may be achieved for example by "swiping" one's finger vertically upward along interface 610, by selecting a downward pointing arrow, etc. as in known in the art. Continued "downward" scrolling of section 660 may cause the panes at the top of the section (here "Kitchen" pane 802) to disappear from section 660 and for additional panes to appear at the bottom (below "Office" pane 808) of the section 660, assuming there are additional panes. Similarly, as section 660 is scrolled in the reverse direction (referred to herein as scrolling up, or upward scrolling for discussion purposes only, and which may be achieved for example by "swiping" one's finger vertically downward along interface 610, by selecting an upward pointing arrow, etc. as in known in the art) to possibly reveal panes such as pane 802 that may have been scrolled off of section 660, panes at the bottom of section 660 may disappear from section 660 (such as pane 808) and additional panes may appear at the top of section 660. Continued "upward" scrolling may cause section 660 to collapse as the top pane (here "Kitchen" pane 802) is reached, and for section 620 to be re-displayed, with interface 610 once again appearing as shown in FIG. 6O. According to another example, section 620 may not scroll off of the display interface 610 but rather, may be minimized as further discussed below with reference to FIGS. 7A and 7B. According to another example, in addition to or as an alternative to the above, selecting the Devices tab 642 (such as by "touching" or "tapping") in the FIG. 6O configuration may cause section 660 to expand and section 620 to disappear as shown in FIG. 6P. Again, section 660 may then be scrollable. Similarly, selecting the Devices tab 642 (such as by "touching" or "tapping") in the FIG. 6P configuration may cause section 660 to collapse and section 620 to be re-displayed as shown in FIG. 6O.

According to a further aspect of the Devices tab 642, the control application may display the icons in section 660 in a fashion to provide an indication of the status/state of the corresponding control device as similarly discussed herein. For example, the control application may change the appearance of the icon (e.g., change its color and/or contrast as compared to other icons) to signify the status/state of the corresponding control device (and/or the state of its respective controlled load(s)) as describe herein. For example, with respect to lighting control devices as represented by icons 810a-810d, icons 810a-810b are shown in the example of FIG. 6O as indicating that the lighting load(s) of the corresponding control devices are on and icons 810c-810d are shown in as indicating that the lighting loads of the corresponding control devices are all off. Color and/or contrast may be used in a similar fashion for icons representing other types of control devices. According to another example, different icons may be used for a given type of device to represent different states, such as shown in FIG. 6F with icons 716 representing open shades and icons 718 representing closed shades. Other examples are possible. According to a further aspect of section 660, the control application may dynamically change the appearance of icons in section 660 as the state/status of the corresponding control devices/loads change (e.g., if a light is turned off by a user in the user environment, the control application may change the appearance of a lighting control device icon in section 660 to show the changed state as similarly described herein). In general, the state/status of control devices as shown by the icons in section 660 may match the status/state of control devices as represented by the icons in section 620 and the interfaces that correspond to these icons.

According to a further aspect of Devices tab 642, the icons shown in section 660 may be selectable by a user. Upon determining/detecting that a user has selected a given icon, the control application may display to the user a control interface to control the respective device as similarly shown and discussed with respect to FIGS. 6D, 6E, 6I, 6N, 10A-10C, and/or 11A-11N for example.

As a further example, assume that icon 810e of FIG. 6O represents a keypad control device having four buttons, for example, and that is located in the Kitchen and that the keypad is configured to control one or more control devices such as one or more lighting control devices/lighting loads, shades, and speakers, and is programmed with a set of scenes (e.g., a set of buttons that each controls/configures a respective scene). These scenes may include, for example, an "Off" scene that turns the lighting loads off, a "Dining" scene that sets the lighting loads, shades, and speakers to a predefined state for eating, a "Cooking" scene that sets the lighting loads and speakers to predefined settings conducive to cooking, and a "Bright" scene that sets the lighting loads to a fully on state. This is merely an example. Responsive to the control application determining/detecting that a user has selected icon 810e of FIG. 6O, the control application may display to the user a control interface, such as control interface 812 of FIG. 6Q. Using information provided by the system controller 250a on the keypad control device, the control application may display control interface 812 such that the interface is representative of the actual keypad. For example, control interface 812 may have multiple selectable scene actuators 814 (here shown as buttons for example) each representative of and labeled as one of the scenes of the actual keypad. The control application may further display the actuators 814 to provide an indication to the user as to the current scene setting of the keypad (i.e., here the "Dining" button is shown as selected, for example). Based on detecting/determining that a user has selected one of the scene actuators 814, the control application may communicate one or more messages to the system controller 250a to instruct the controller to reconfigure the keypad/corresponding lighting loads, shades, and/or speakers based on the user's instructions, thereby setting the corresponding lighting loads, shades, and/or speakers of the Kitchen to the selected scene. As further shown in FIG. 6P, control interface 812 may also include a selectable "Edit" icon 816 that when selected, may cause the control application to display a user interface that may allow a user to reconfigure the scenes of the actual keypad control device (e.g., change one or more of the scene configurations) by communicating one or more messages to the system controller 250a. These changes may also be reflected in control interface 812. Before turning to the "Edit" icon, according to one example, if a given location (such as the Kitchen in this example) includes multiple keypad control devices that are all configured the same (e.g., each keypad includes the same number of scene buttons and controls the same electrical loads, and actuation of the same button on any given keypad results in the same scene across the loads), the control application may only display one icon 810e in pane 802 (according to this example), representing of all of the keypad control devices. Editing the keypad as discussed below may result in the control application/system controller reconfiguring each of the keypad control devices within the load control system to the same configuration. According to a further example, the control application may display the keypad icon 810e of pane 802 differently (e.g., change the icons color and/or contrast) depending on whether a scene other than the Off scene is currently active, as compared to when the Off scene is active. Other variations are possible.

Turing to the "Edit" icon 816, upon determining/detecting that a user has selected the icon, the control application may display to the user via a visual display of network device 680 the example configuration interface 901 shown in FIG. 6R. Interface 901 may include a first section 902 related to the type indicator associated with the keypad control device, for example, and that may allow the user via the control application to change the type indicator (here, "Keypad") associated with the keypad control device(s). Section 902 may be, for example, a drop-down menu, and/or free text field, etc. Interface 901 may also include a section 903 related to the location indicator associated with the keypad control device, for example, and that may allow the user via the control application to change the location indicator (here, "Kitchen") associated with the keypad control device. According to this example, the keypad control device is currently indicated as being located in the "Kitchen." The word "Kitchen" may be a selectable icon that allows the user to change the location associated with the device, although other mechanisms may be used. Upon determining/detecting that a user has selected the "Kitchen" icon 903, the control application may display to the user an example interface 909 as shown in FIG. 6S. The control application may list in interface 909 a selection of possible locations/rooms 908 to associate with the keypad control device. As shown, the control application may provide an indication of the location currently associated with the keypad control device. In this example, a "check" mark is shown next to "Kitchen," although other mechanisms may be used. Any one (or possibly more) of the locations/room 908 may be selectable by the user. Upon detecting determining that the user selected a new location/room, the control application may associate a "check" mark with new location for example, possibly removing the "check" mark from the prior location (as another example, a given "checked" location may need to be selected by the user to un-select the location. Other variations are possible). Although not shown, interface 909 may allow a user to specify a location not shown in list 908. Once done, the user may select either of the "Cancel" icon 907 or the "Save" icon 906. Selection of the "Cancel" icon 907 may cause the control application to not save any changes made by the user via interface 909 and return the user to interface 901. Selection of the "Save" icon 906 may cause the control application to save any changes made by the user via interface 909 and return the user to interface 901.

Returning to FIG. 6R, if the user changed the location associated with the keypad device via interface 909, that location may be reflected in section 903. Interface 901 may also include a respective pane or section 905a-905d, each corresponding to one of the scene actuators/buttons of the keypad device. Each pane 905a-905d may include a name associated with the respective scene (here again, "Bright," "Cooking," Dining," and "Off"). The name may be a selectable icon, although mechanisms may be used. Each pane may also include a brief description of the control devices (lights, speakers, shades) associated with the scene (i.e., an indication as to which control devices are controlled by a given scene). By selecting one of the icons in panes 905a-905d, a user may change the scene assigned to the respective button of the keypad control device. For example, upon detecting/determining that the user selected the "Bright" icon to change the Bright scene, the control application may display to the user the example configuration interface 910 shown in FIG. 6T. Interface 910 may include a respective icon 912a and 912b corresponding to the control devices (lighting, shade, speaker, etc.) associated with the selected scene (here, two icons respective lighting control devices/lighting loads are shown) and possible settings of each device/load for the scene (here, each lighting load is set to 100% for the scene). Icons 912a and 912b may be selectable icons that upon selection by the user, allows the user, via an interface, to individually control, for example, the settings (e.g., dimming level, shade level, etc.) for that respective control device/load. Because the Bright scene contains lighting devices, example interface 910 may also include selectable control icon 911, selection of which by the user may allow the user to change the dimming level (up and down) of the displayed lighting control devices/loads 912a and 912b in tandem/together. Any changes to the dimming levels may be reflected in icons 912a and 912b. Interface 915 may also include a selectable icon 915 that allows the user to add and/or remove control devices associated with the Bright scene.

For example, upon detecting/determining that the user selected icon 915, the control application may display to the user the example configuration interface 916 shown in FIG. 6U. The control application may list in interface 916 possible control devices/loads 917 in the load control system 210a that may be controlled by the keypad and that the user may associate/add to and/or remove from the current scene (here, the Bright scene). According to one example, control devices/loads 917 that are located in the same room as the keypad may be listed first (here, Kitchen devices) followed by other control devices/loads in the load control system (here, Office Table Lamp). As show, the various control devices/loads 917 may be selectable/un-selectable by the user (selected control devices/loads 917 being designated by a "check" mark for example) to add/remove the devices from the scene. Interface 916 may further allow the user to configure levels (e.g., dimming levels, shade levels, etc.) for each selected device, such as by selecting the icon associated with the control device and an additional interface being shown. Interface 916 may further include control icons 918a and 918b a selection of which may allow a user to select all displayed control devices, or unselect all control devices. Once done, the user may select "carrot" 920 (although other mechanisms may be used) to return to interface 910 of FIG. 6T. Upon returning to interface 910, the interface may include icons 912a/912b reflective of choices made in interface 916. Once done, the user may select either of the "Cancel" icon 913 or the "Save" icon 914. Selection of the "Cancel" icon 913 may cause the control application to not save any changes made by the user via interface 910 and return the user to interface 901. Selection of the "Save" icon 906 may cause the control application to save changes made by the user via interface 910 and return the user to interface 901.

Referring again to interface 901, it may also include a "Delete keypad" icon 904. Actuation of this icon may cause the control application to instruct the system controller to remove the keypad control device from the load control system. Assuming the user makes changes to the keypad scenes, once done the user may select "carrot" 921 (although other mechanisms may be used) to return to either interface 812 or 610 for example. Any changes made by the user regarding the editing of the keypad control device may be communicated by the control application to the system controller, which may then reconfigure the load control system accordingly, including the keypad control device(s). In addition, if a keypad control device's location is changed such as through interface 909, the control application may move the respective icon in the Devices tab 642 to a new pane representative of the new location, for example. Similarly, if a keypad control device is removed from the load control system, the corresponding icon may be removed from the Devices tab 642, for example.

According to a further aspect, a keypad control device may communicate with other control devices to effectuate a scene. These other control devices may have respective icons as discussed herein, such as in Devices tab 642, for example. The control application may change the appearance of such icons as described herein as a scene is controlled via interface 812 or the actual keypad control device. Similarly, actuating a scene via interface 812 or an actual keypad control device may cause the control application to update the number values represented by the icons of section 620 for example, as a control device's state changes as describe herein. Other variations are possible.

One will recognize that the interfaces of FIG. 6R-FIG. 6U are examples and other variations are possible. For example, responsive to a user selecting the "Edit" icon 816 of control interface 812 of FIG. 6Q, the control application may display to the user via a visual display of network device 680 the example configuration interface 901' shown in FIG. 6V. Similar to interface 901 of FIG. 6R, interface 901' may include a first section/field 902', for example, related to the name associated with the keypad control device, for example, and that may be configured to enable the user via the control application to change the name (here, "Keypad") associated with the keypad control device. Interface 901' may also include an/actuator 903', for example related to the location indicator associated with the keypad control device, for example, and that may be configured to enable the user via the control application to change the location indicator (here, "Kitchen") associated with the keypad control device (e.g., by providing access to a menu/drop down menu). Interface 901' may also include a respective panes or sections 905a'-905d', each corresponding to one of the scene actuators/buttons of the keypad device. Each pane 905a'-905d' may include a name associated with the respective scene (here again, "Bright," "Cooking," Dining," and "Off") . Each pane may be selectable (such as via a respective icon or carrot 923). Interface 901' may also include a "Delete" icon 904', that may be similar to Delete icon 904.

Figure 6W:
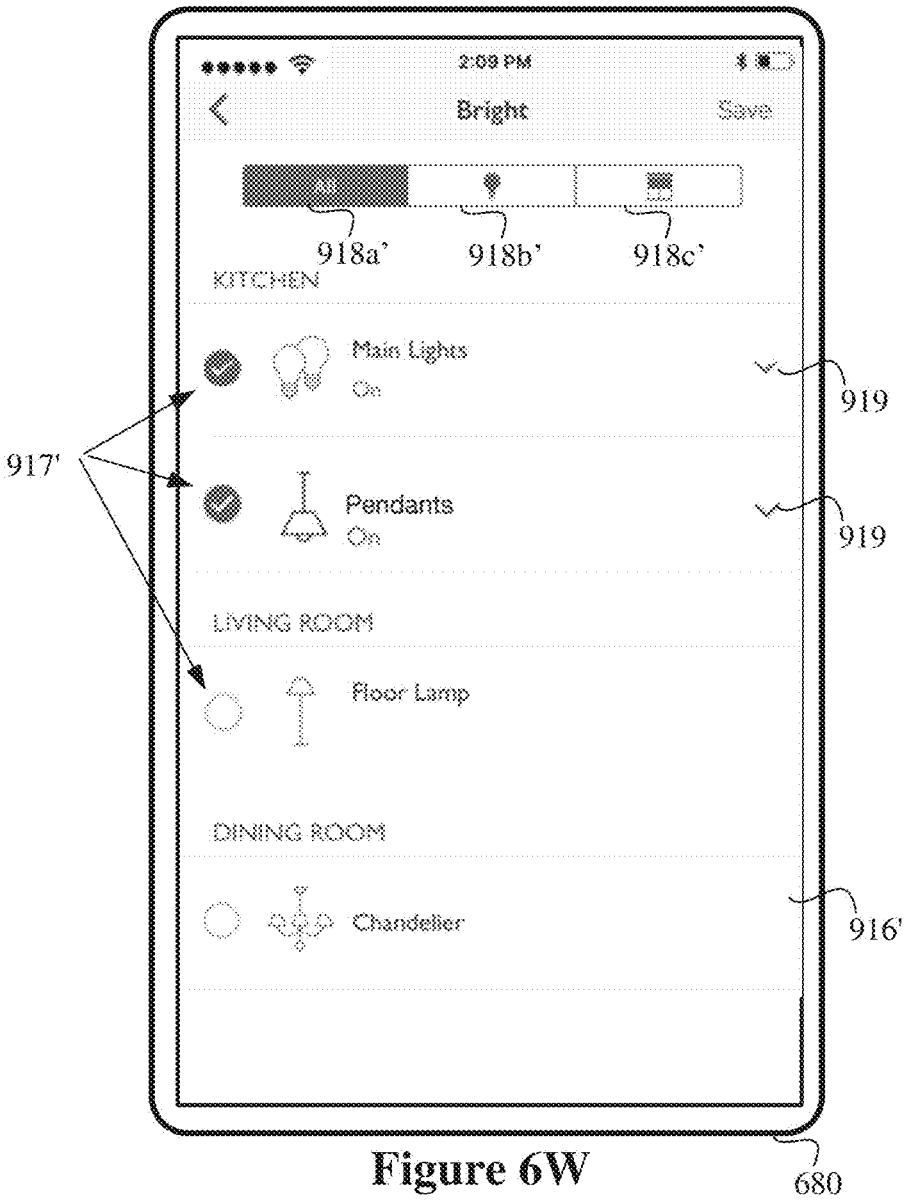
Figure 6X:
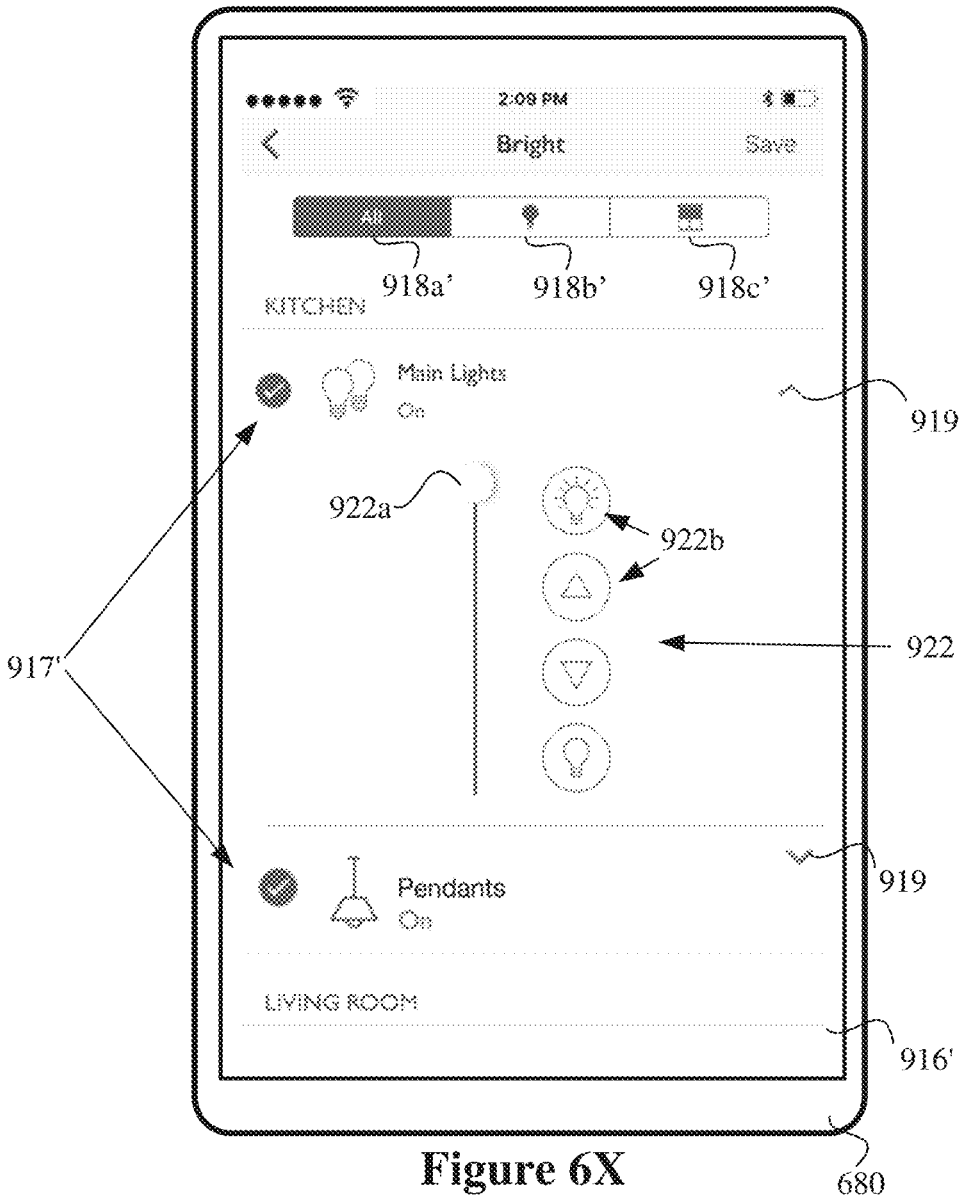

Assuming the control application detects a selection of one of the icons 923, a user may change the scene assigned to the respective button of the keypad control device. For example, upon detecting/determining that the user selected the icon 923 associated with the "Bright" scene, the control application may display the example configuration interface 916' shown in FIG. 6W. The control application may list/display in interface 916' possible control devices/loads 917' in the load control system 210a that may be controlled by the keypad and that the user may associate/add to and/or remove from the current scene (here, the Bright scene) (interface 916' may be scrollable). According to this example, control devices/loads 917' are separated by location (e.g., "Kitchen", "Living Room", "Dining Room", etc.). As show, the various control devices/loads 917' may be selected/unselected by the user (selected control devices/loads 917' being designated by a "check" mark for example) to add/remove, respectively, the control devices from the scene. For selected control devices that are part of a scene (here, the "Main Lights" and the "Pendants"), the control application may also display the level of the device with respect to the scene (here, both devices are shown to be fully "On" as part of the Bright scene (similar indicators may be shown for other control devices/loads such as shades). For selected control devices that are part of a scene (here, the "Main Lights" and the "Pendants"), interface 916' may also include a respective icon or carrot 919, for example, to configure the level of the device. For example, in response to the control application detecting that a user has selected icon 917 associated with the "Main Lights," the control application may expand interface 916' to display a control interface 922 as shown in the example of FIG. 6X. Here, control interface 922 is shown with a vertically movable/slide-able actuator 922a that may be actuated/slid by the user to change the light level, and also includes a set of buttons/actuators 922b (here four—one to set the level to fully on, one to raise the level, one to lower the level, and one to set the level to off, for example) that may be actuator to set the level (other variations are possible). The control application may display the actuator 922a, for example, to provide an indication to the user of the respective device's current setting (here, fully On). Responsive to a user selecting the actuators 922a and/or 922b, the control application may change the displayed level setting from "On" to a value representative of the new level as set by the user. Upon detecting a further selection of icon 919 associated with the "Main Lights", the control application may collapse interface 916' as shown in FIG. 6W.

Interface 916' may also include example selectable icons/actuators 918a', 918b', and 918c' (although fewer and/or additional icons may be shown). These icons may allow a user to more easily display control devices of interest in interface 916'. For example, icon 918a' may be toggled between selected and unselected. When selected, the control application may display "All" control devices, for example, within the load control system. Unselecting icon 918a', may cause the control application to display no control devices. Icon 918b' may also be toggled between selected and unselected. When icon 918b' is selected, the control application may deactivate selection of icon 918a' (if selected) for example, and only display in interface 916' the lighting control devices that are part of the load control system. When icon 918b' is unselected, the control application may remove from interface 916' the lighting control devices. Similarly, icon 918c' may be toggled between selected and unselected. When icon 918c' is selected, the control application may deactivate selection of icon 918a' (if selected) for example, and only display in interface 916' the shade devices that are part of the load control system. When icon 918c' is unselected, the control application may remove from interface 916' the shade devices. One will recognize that both icon 918b' and 918c' may be selected such that both lighting control devices and shade devices are displayed. One will recognize that other variations are possible. A user may or may not save changes made via interface 916' as similarly discussed above. Any changes made by the user regarding the editing of the keypad control device may be communicated by the control application to the system controller, which may then reconfigure the load control system accordingly. Similarly, changes may be reflected in other interfaces as discussed herein.

The interfaces of FIGS. 6Q-6X may be applicable to various types of keypads, including handheld remote keypads that control scenes.

Overall, the Devices tab 642 allows a user to easily determine the control devices within different locations of the user environment, to determine the status of the control devices, and to easily control the devices.

Figure 6Y:
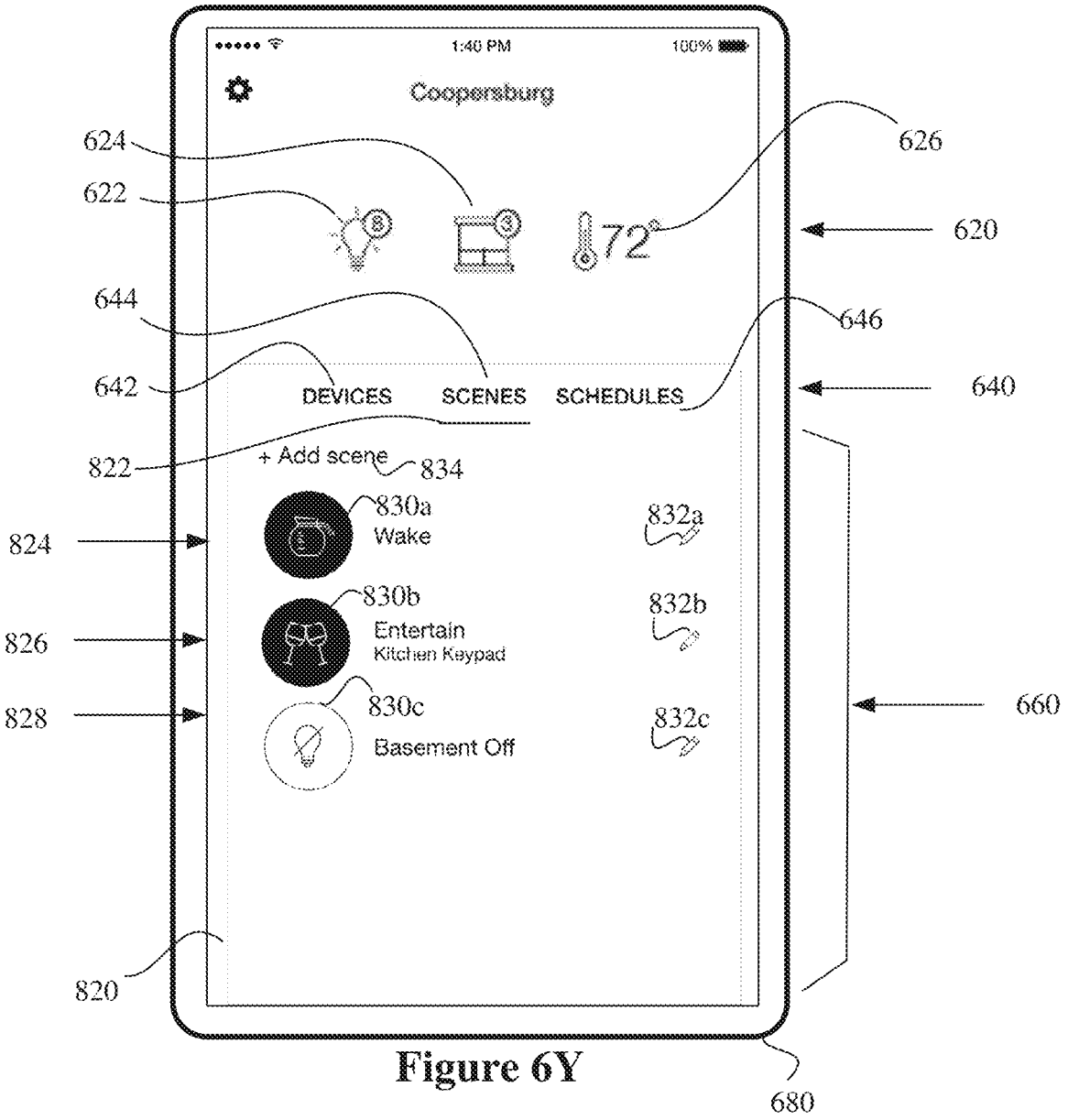

Turning now to FIG. 6Y, upon determining/detecting that a user has selected Scenes tab 644, the control application may display an example interface 820. Interface 820 may be similar to interface 610, continuing to display section 620 and respective status information, and with the Scenes tab now shown as active (e.g., as shown by the under-bar 822, although other means may be used such as reverse highlighting, etc.). When the Scenes tab is selected, the control application may configure section 660 to display information presenting one or more scenes that may be activated by the user. Specifically, as indicated above the system controller 250a may maintain information related to one or more pre-programmed scenes that may be actuated by a user from the control application. Each scene may include a scene name, certain settings (e.g., dimming levels) for one or more lights, certain setting for one or more shades, etc. Other examples are possible. The control application may obtain information on each scene from the system controller 250a and display respective information on these scenes to the user in information section 660.

As shown in FIG. 6Y, the control application may subdivide section 660 into multiple panes (here three panes are shown, 824, 826, and 828). Each pane may represent and/or contain information on each scene maintained by the system controller. For example, within each pane 824, 826, and 828 the control application may display a selectable icon (such as icons 830a-c) representative of the scene and may further display information (such as textual information like "Wake," "Entertain," and "Basement Off") that may provide a description of the scene. Again, different icons may be used for different scenes and the system controller may provide the control application with an indication of which icon to display, for example. If there are more scenes than can fit in section 660, the section may be vertically scrollable, for example, to display additional scenes, similar to the description of FIGS. 6O and 6P as described above.

According to a further aspect of the Scenes tab 644, the control application may display the icons 830a-830c in section 660 in a fashion to provide an indication of the status/state of the scene, i.e., whether the scene is activated or is not activated. For example, the control application may change the appearance of the icon (e.g., change its color and/or contrast as compared to other icons) to signify the status/state of the corresponding scene.

Upon determining/detecting that a user has selected a given icon 830a-830c, the control application may communicate one or more messages to the system controller indicating the scene was selected or unselected (to either activate or deactivate the scene). The system controller may in turn configure respective control devices according to the scene being activated or deactivated (e.g., turned on or off). As devices change states due to changing scenes, the control application may update section 620 accordingly.

As further shown in FIG. 6Y, each scene may also include a selectable "pencil" icon 832a-832c, for example, that when selected may cause the control application to display to the user an interface that will allow the user to reconfigure the scene. Reconfiguring a scene may include adding and/or removing one or more control devices from the scene, altering settings (such as dimming levels) of one or more control devices that are part of the scene, deleting a scene, etc. Thereafter, the control application may communicate the changes via one or more messages to the system controller.

As also shown in FIG. 6Y, section 660 may include an "Add scene" icon 834, for example, that when selected by a user, may cause the control application to display to the user an interface that will allow the user to create a new scene. Creation of a new scene may cause the control application to communicate one or more messages to the system controller indicating/defining the new scene and may further cause the control application to add the scene to section 660 such that the user may activate the scene. One will recognize that other variations are possible.

Figure 6Z:
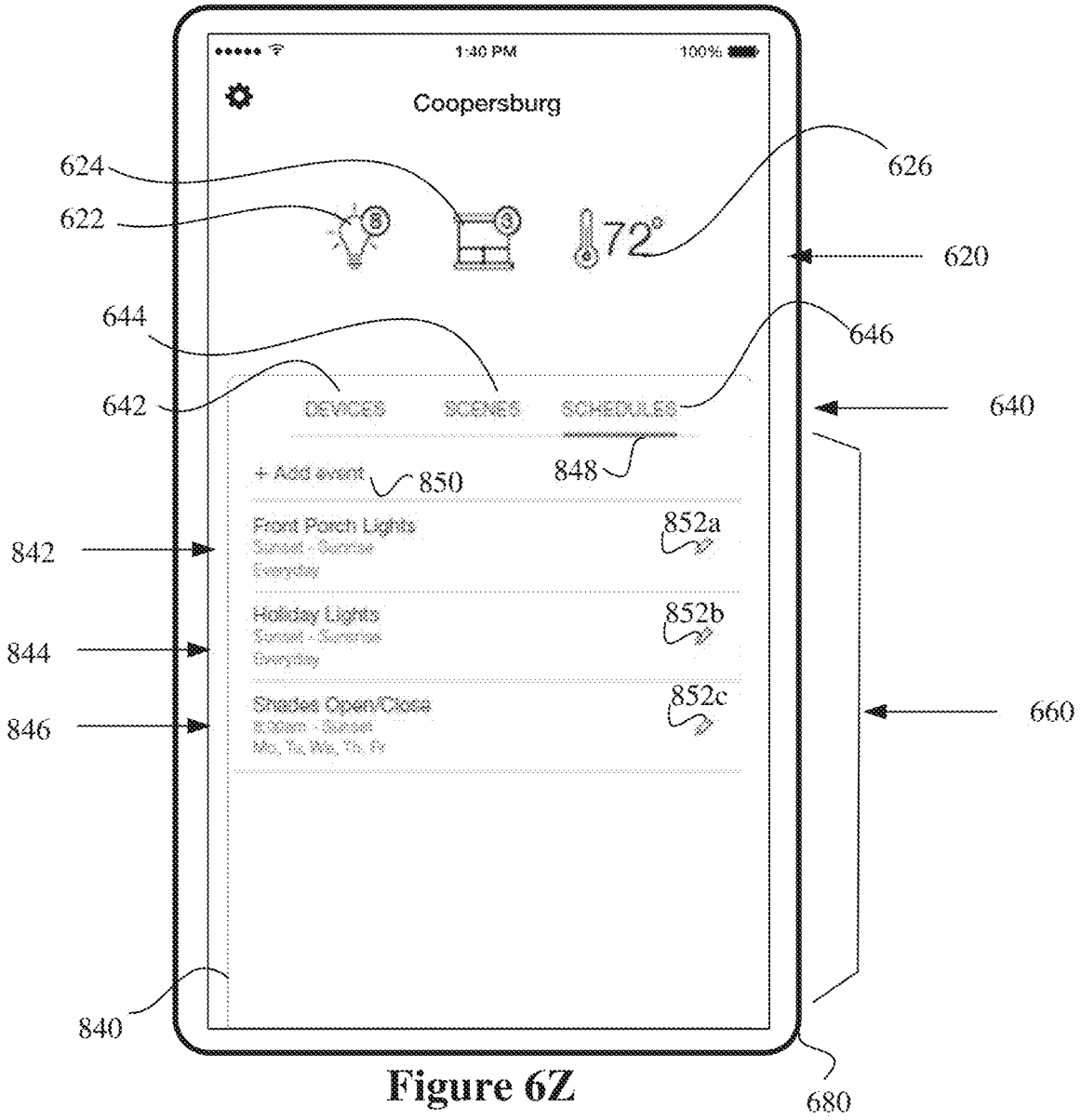
Figure 6A:
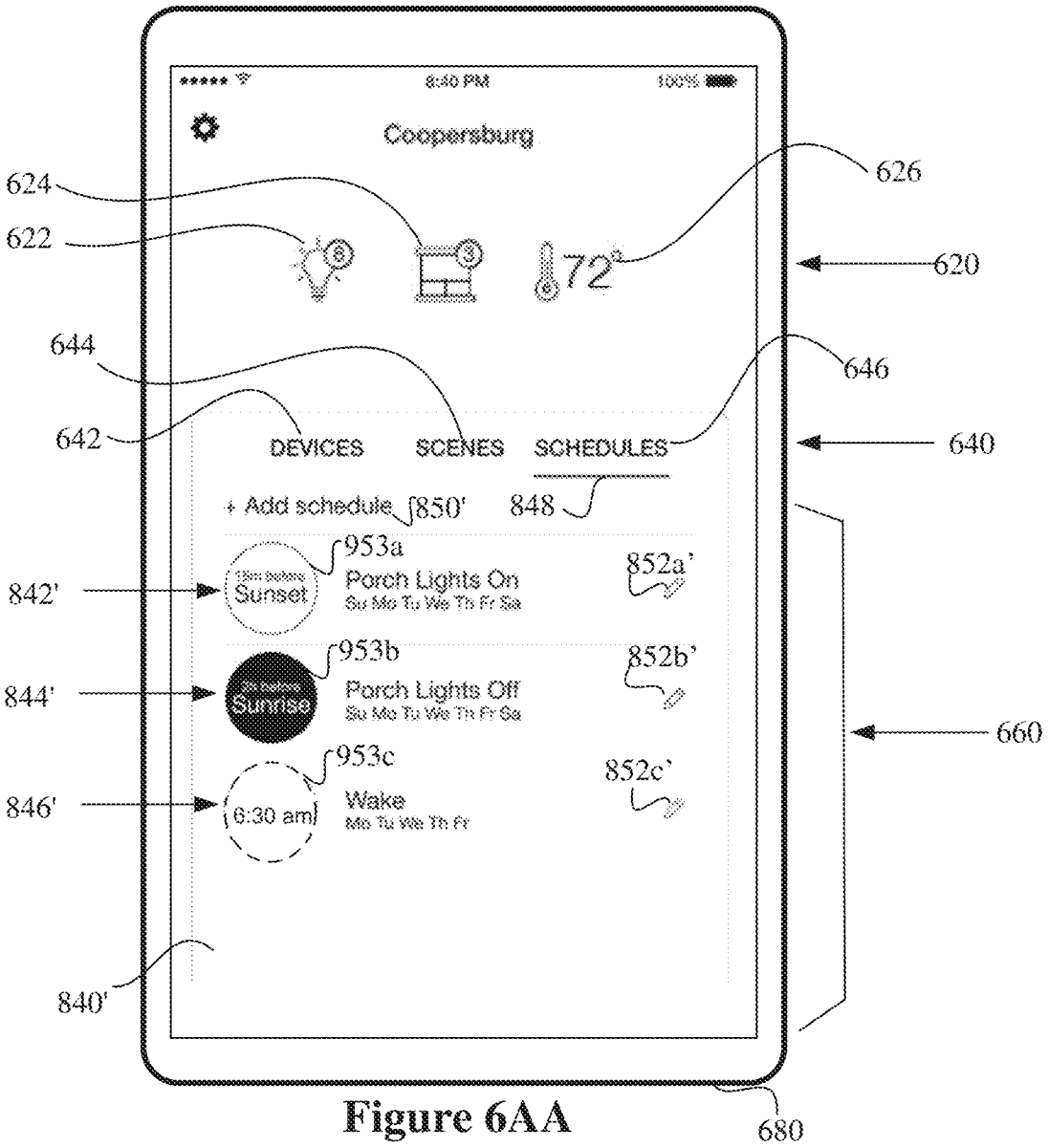

Turning now to FIG. 6Z, upon determining/detecting that a user has selected Schedules tab 646, the control application may display an example interface 840 to the user. Interface 840 may be similar to interface 610, continuing to display section 620 and respective status information, and with the Schedules tab now shown as active (e.g., as shown by the under-bar 848, although other means may be used such as reverse highlighting, etc.). When the Schedules tab is selected, the control application may configure section 660 to display information corresponding to one or more timeclock schedules that the system controller is configured to perform. Specifically, as indicated above the system controller 250a may maintain information related to one or more pre-programmed timeclock schedules that the system controller may automatically perform. Each schedule may include a schedule name, certain settings (e.g., dimming levels) for one or more lights, certain setting for one or more shades, and times/dates as to when the system controller should activate/deactivate the schedule, etc. Other examples are possible. The control application may obtain information on each schedule from the system controller and display respective information on these schedules to the user in information section 660.

As shown in FIG. 6Z, the control application may subdivide section 660 into multiple panes (here three panes are shown, 842, 844, and 846). Each pane may represent and/or contain information on each schedule maintained by the system controller. For example, within each pane 842, 844, and 846 the control application may display information (such as textual information like "Front Porch Lights," "Holiday Lights," and "Shades Open/Close") that may provide a description of the schedule. The information may further include a description of when the respective schedule is to be activated. If there are more schedules than can fit in section 660, the section may be vertically scrollable, for example, to display additional schedules similar to the description of FIGS. 6O and 6P as described above As further shown in FIG. 6Z, each schedule may also include a selectable "pencil" icon 852a-852c, for example, that when selected, may cause the control application to display to the user an interface that may allow the user to reconfigure the schedule. Reconfiguring a schedule may include adding and/or removing one or more control devices from the schedule, altering settings (such as dimming levels) of one or more control devices that are part of the schedule, deleting a schedule, changing timing of the schedule, etc. Thereafter, the control application may communicate the changes via one or more messages to the system controller for implementation. Other variations are possible.

For example, referring to FIG. 6AA there is shown another example interface 840' with the Schedules tab active. Interface 840' may be similar to interface 840, with section 660 subdivided into one more panes (here three panes are shown, 842', 844', and 846'). Each pane may represent and/or contain information on each schedule maintained by the system controller. For example, within each pane 842', 844', and 846' the control application may display information (such as textual information like "Porch Lights On," "Porch Lights Off," and "Wake") that may provide a description of the schedule. The information may further include a description of when the respective schedule is to be activated with respective to days of the week (for example, the "Wake" schedule is scheduled for weekdays only). According to this example, the control application may also display for each schedule a respective icon 953a, 953b, and 953c. The control application may display in connection with each icon/schedule (such as inside the icon) the time as to when the schedule is to activate/start running. According to this example, a user may configure a schedule to activate relative to astronomical time (e.g., relative to sunrise and sunset) or relative to a set clock time (e.g., 9:00 AM). In this example, the "Porch Lights On" and "Porch Lights Off" schedules are astronomical schedules configured to activate relative to sunset and sunrise, respectively. As a result, these schedules may start at different clock times each day as the year progresses since sunset and sunrise may change day to day. In this example, the "Wake" schedule is relative to clock time and starts the same static time each weekday at 6:30 am. As further shown in FIG. 6AA, each schedule may also include a selectable "pencil" icon 852a'-852c', for example, that when selected, may cause the control application to display to the user an interface that may allow the user to reconfigure the schedule.

According to one example, the control application may display schedules in section 660 in order of time as the schedules are set to activate/start running. Hence, the current schedule or next to activate/run schedule (if there is no current schedule) may be shown first (e.g., at the top of section 660), followed by the next schedule to activate, etc. As a schedule completes (ends), the control application may remove the schedule from the top of the list and shift up the other schedules, possibly moving the removed schedule to the bottom of the list (other orderings are possible). Because some schedules may be relative to astronomical time, the control application may change the ordering of the displayed schedules from day to day throughout the year since these schedules do not start at the same static set time each day.

According to a further aspect of interface 840', the control application may display to the user the state of a given schedule, where there may be one or more possible states. As one example, there may be three states including (i) a deactivated state, where the schedule is not set to activate/run at its designated time (e.g., a schedule may be deactivated because the user deactivated the schedule, or because the schedule is not set to activate on the current/present day of the week, etc.), (ii) an activated-match state, where the schedule is set to activate or is currently activated at its designated time and all control devices that are part of the schedule are currently in a state that matches the schedule, and (iii) an activated-un-match state, where the schedule is set to activate or is currently activated at its designated time but all control devices that are part of the schedule are currently not in a state that matches the schedule. One will recognize that fewer or additional states are possible. According to one example, the control application may use icons 953a-953c to indicate to the user the state of each schedule, such as by changing the icon, changing the appearance of the icon such as through color or reverse highlighting, etc. In this example, assuming it's a Saturday at 3 PM, the sun is out, and the porch lights are off, the "Porch Lights On" schedule may be shown first/at the top of section 660 as being the next to activate, followed second by the "Porch Lights Off" schedule, and third by the "Wake" schedule. The control application may show the icon 953a of the "Porch Lights On" schedule as the schedule being in the activated-un-match state because the scheduled is set to activate at sunset but the porch lights are off and thus do not currently match the configuration of the schedule (the state of this schedule may change to the activated-match state once the porch lights are on). The control application may show the icon 953b of the "Porch Lights Off" schedule as the schedule being in the activated-match state because the schedule is set to activate at sunrise and the porch lights, currently being off, matches the configuration of the schedule. The control application may show the icon 953c of the "Wake" schedule as the schedule being in the deactivated state in that the schedule is not configured to run on weekends, for example. This is one example, and other examples are possible.

As also shown in FIG. 6Z and FIG. 6AA, section 660 may include an "Add event" icon 850 or "Add schedule" icon 850' for example that when selected, may cause the control application to display to the user an interface that will allow the user to create a new schedule. Creation of a new schedule may cause the control application to communicate one or more messages to the system controller indicating/defining the new schedule and may further cause the control application to add the schedule to section 660.

One will recognize that sections/panes 620, 640, and 660 of the graphical interfaces shown in FIGS. 6A, 6O, 6Y, and 6Z for example, may be shown in different orders. For example, the graphical interfaces describe herein have section 620 vertically positioned over section 640, and section 640 vertically positioned over section 660 when displayed on a visual display of a network device 680. As another example, section 640 may be vertically positioned over section 660, and section 660 may be vertically positioned over section 620 when the sections are displayed on a visual display of a network device 680. Other orders are possible. As another example, section 620 may be a vertically oriented pane/section compared to a horizontally oriented pane (i.e., the icons may be positioned vertically, rather than horizontally). Here, pane 620 may be position to the left or right of panes 620 and 640 for example.

Nonetheless, as discussed herein, status section 620 may provide a user with an aggregated summary of the load control system 210a, and the respective icons may provide a user with access to control devices the user may more likely want to control as compared to other devices. Hence, having section 620 positioned over sections 640 and 660 (i.e., at the top of a visual display of a network device 680) may make this section more easily accessible to the user.

One will recognize that in addition to the above description, other examples are possible. For example, referring to FIG. 7A, there is shown another example graphical user interface 1510 that may be initially displayed by the control application to a user via network device 680 upon the application initially starting. Interface 1510 may be similar to interface 610 as shown in FIG. 6A, for example, and may include three sections or panes including a status section 620, a menu selection section/tab section 640, and in information section 660. According to this example and as similarly discussed above, section 620 of interface 1510 may include one or more icons indicating different status information of one or more control devices 220a within the load control system 210a. Here, a lighting devices icon 1522, shades devices icon 1524, and a thermostat devices icon 1526 are shown, although as discussed above, additional and/or other and/or fewer icons may be shown such as an audio devices icon and/or a fan devices icon depending on the control devices 220a within the load control system 210a. Section 620 may be configured to be scrollable by the user (such as left to right or up/down) in order to display additional icons and/or may be configured such that there are multiple rows of icons displayed at one time to a user, again depending on the control devices 220a within the load control system 210a. According to this example, the status of respective devices may be shown by the control application to a user via a numerical value and/or text associated with the icon and in particular, may be shown below the icon (here, "10 On", "3 Open", "Currently"), as compared to a number, for example, imposed on the icon as shown in FIG. 6A. As another example, lighting devices (and similarly fan devices) in an "off" state may have the status shown as "0 On" or "All Off". Shade devices in a closed state may have the status shown as "0 Open" or "All Closed", for example. Again, other variations are possible including the format used in FIG. 6A for example. The icons shown in section 620 may be selectable by a user as discussed above, with the control application taking the user to subsequent user interfaces (such as interface 702 of FIG. 6C in response to selection of icon 1522). Similarly, the status information associated with each icon may be dynamically/actively updated by the control application as the status of control devices change.

Figure 7A:
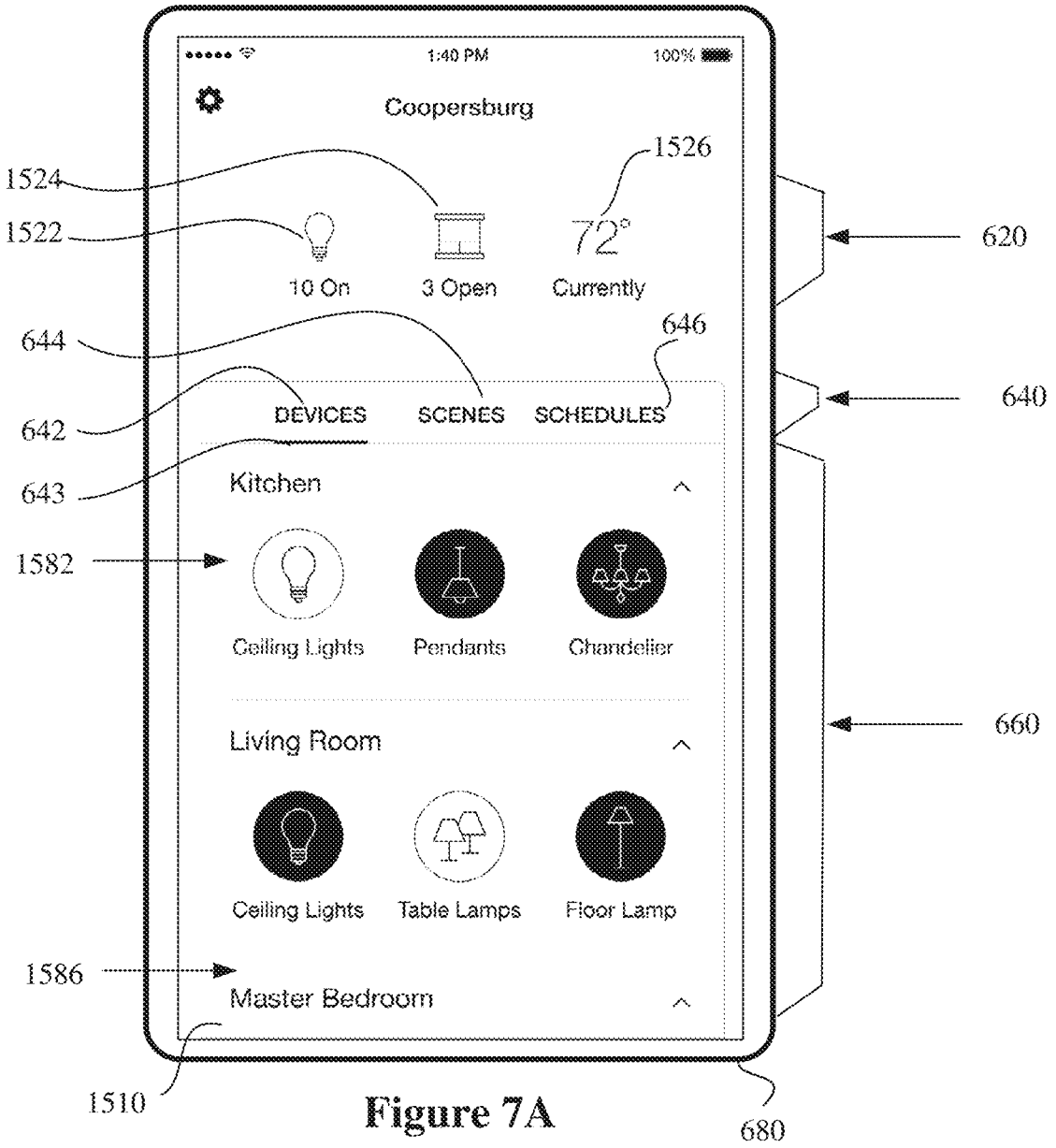
FIGS. 7A-7B show further example graphical user interfaces of an application that may allow a user to determine information on and to control a load control system and/or control devices.
Figure 7B:
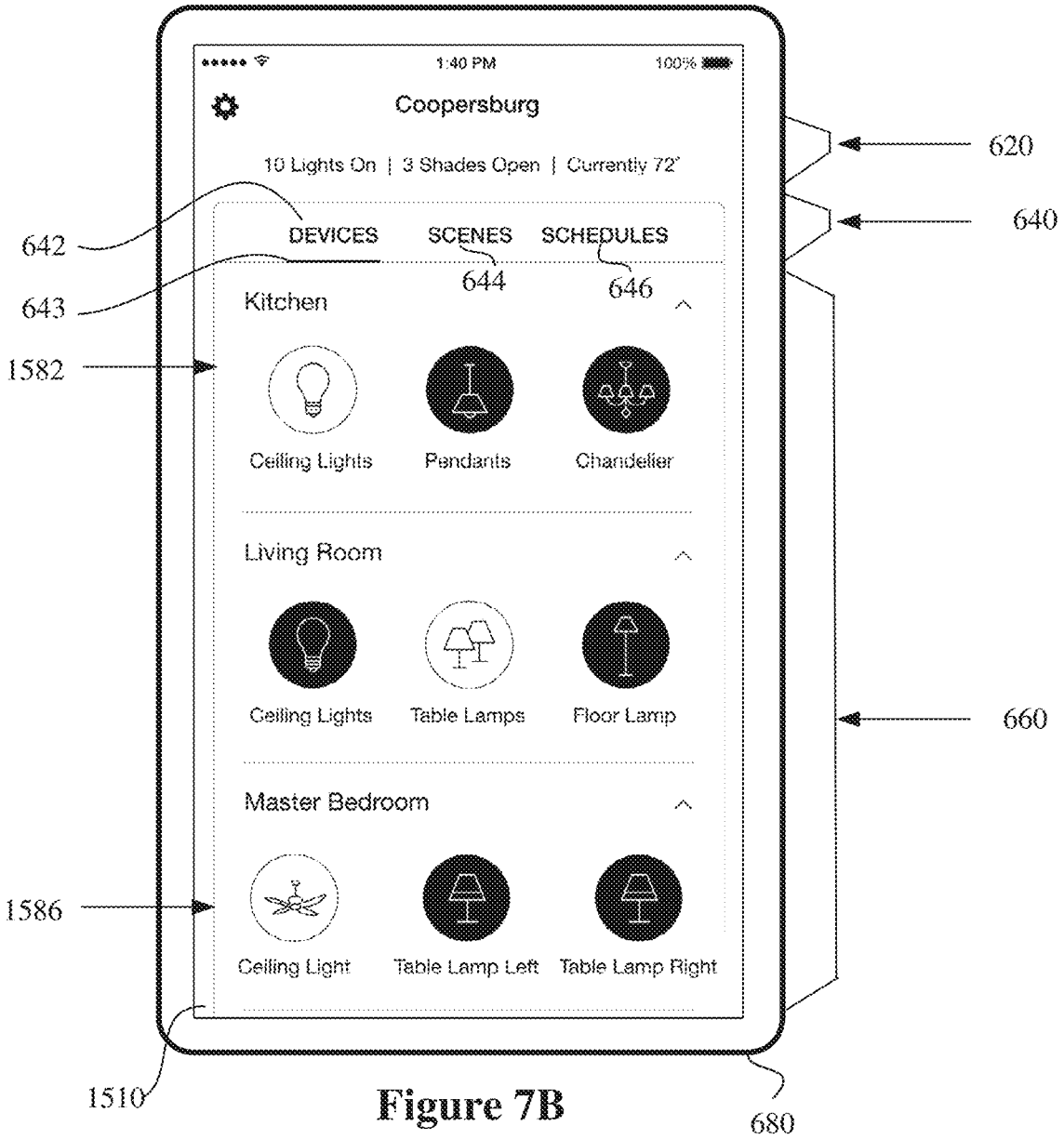

As similarly discussed above with reference to FIGS. 6O, 6Y, and 6Z for example, section 660 of interface 1510 may be vertically scrollable, for example, when any of the Devices tab 642, Scenes tab 644, Schedules tab 646 is active. Using the Devices tab 642 as the active tab as an example, as section 660 is scrolled "downward" (and/or as panes are expanded) to reveal additional pane information, such as additional information of "Master Bedroom" pane 1586 and/or additional panes below "Master Bedroom" pane 1586, section 660 may expand, with section 620 scrolling off of and/or disappearing from and/or being removed from the display interface of the network device and section 660 consuming this space. Alternatively and as shown in FIG. 7B, section 620 may be condense or be minimized by the control application as section 660 expands. For example, as shown in FIG. 7B, the icons, such as icons 1522, 1524, and 1526, may be removed by the control application but the numerical and/or text based status information, for example, may be continued to be displayed for one or more types of devices to provide status information to a user (here, "10 Lights On" for lighting devices, "3 Shades Open" for shade devices, and "Currently 72°" for thermostat devices). The displayed information and format are an example and other examples are possible. Condensed/minimized section 620 of interface 1510 may be configured to be scrollable by the user (such as left to right or up/down) in order to display additional status information and/or may be configured such that there are multiple rows of information displayed at one time to a user. Alternatively, condensed/minimized section 620 of interface 1510 may not be scrollable and may only display status information for a subset of control devices. Which devices are displayed may or may not be user definable. The status information shown in condensed/minimized section 620 of interface 1510 may be dynamically/actively updated by the control application as the status of control devices change. According to one example, condensed/minimized section 620 of interface 1510 may be configured to allow a user to select various portions (such as "10 Lights On", "3 Shades Open", and "Currently 72°") with the control application taking the user to subsequent user interfaces as discussed above. According to another example, condensed/minimized section 620 of interface 1510 may be configured such that in response to a user selecting section 620, the section may be re-expanded and section 660 may be collapsed by the control application, returning to the configuration as shown in FIG. 7A. Thereafter, section 620 may be configured to allow a user to select displayed icons as discussed above. Continuing to refer to FIG. 7B, continued "downward" scrolling of section 660 may cause the panes at the top of the section (here "Kitchen" pane 1582) to disappear from section 660 and for additional panes to appear at the bottom (below "Master Bedroom" pane 1586) of the section 660, assuming there are additional panes. Similarly, as section 660 is scrolled "upward" in the reverse direction (to possibly reveal panes such as pane 1582 that may have been scrolled off of section 660), panes at the bottom of section 660 may disappear from section 660 (such as pane 1586) and additional panes may appear at the top of section 660. Continued "upward" scrolling (and/or collapsing of panes of section 660) may cause section 660 to collapse as the top pane (here "Kitchen" pane 1582) is reached, and for section 620 to re-expand, with interface 1510 once again appearing as shown in FIG. 7A. According to another example, in addition to and/or as an alternative to the above, selecting the Devices tab 642 (such as by "touching" or "tapping") in the FIG. 7A configuration may cause section 660 to expand and section 620 to collapse as shown in FIG. 7B. Again, section 660 may then be scrollable. Similarly, selecting the Devices tab 642 and/or section 620 (such as by "touching" or "tapping") in the FIG. 7B configuration may cause section 660 to collapse and section 620 to be re-expand as shown in FIG. 7A. Hence, the expanding and collapsing of sections 620 and 660 may be achieved/obtained in various ways including through scrolling actions and/or by selecting section 620 and/or the Devices tab 642. Again, the Scenes tab 644 and the Schedules tab 646 may operate in a similar fashion.

Figure 8A:
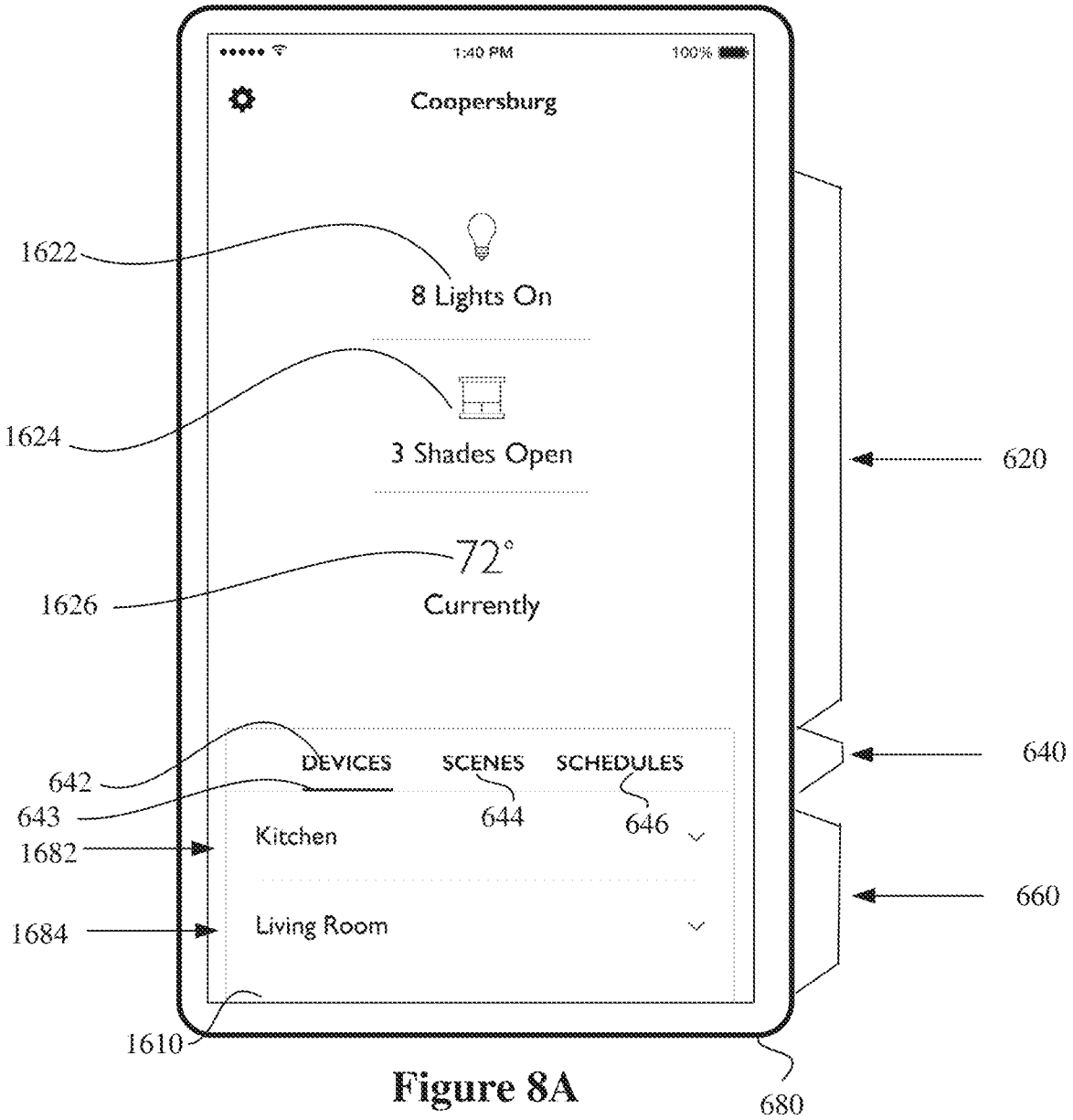
FIGS. 8A-8D show still further example graphical user interfaces of an application that may allow a user to determine information on and to control a load control system and/or control devices.

Referring now to FIG. 8A, there is shown another example graphical user interface 1610 that may be initially displayed by the control application to a user via network device 680 upon the application initially starting. Interface 1610 may be similar to interface 1510 as shown in FIG. 7A, for example, and may include three sections or panes including a status section 620, a menu selection section/tab section 640, and in information section 660. According to this example and as similarly discussed above, section 620 of interface 1610 may include one or more icons indicating different status information of one or more control devices 220a within the load control system 210a. Here, a lighting devices icon 1622, shades devices icon 1624, and a thermostat devices icon 1626 are shown. According to this example, the status icons are now arranged vertically, rather than horizontally. As further shown in FIG. 8A, the status of respective devices may be shown to a user via a numerical value and/or text associated with the icon and in particular, may be shown below the icon (here, "8 Lights On", "3 Shades Open", "Currently"), as compared to a number, for example, imposed on the icon as shown in FIG. 6A. Nonetheless, one will recognize the format used in FIG. 6A may also be used in interface 1610. Similarly, other variations are possible. As a further example, lighting devices (and similarly fan devices) in an "off" state may have the status shown as "0 Lights On" or "All Lights Off". Shade devices in a closed state may have the status shown as "0 Shades Open" or "All Shades Closed", for example. The icons shown in section or pane 620 may be selectable by a user as discussed above, with the control application taking the user to subsequent user interfaces (such as interface 702 of FIG. 6C in response to selection of icon 1622). Similarly, the status information associated with each icon may be dynamically/actively updated by the control application as the status of control devices change.

Figure 8B:
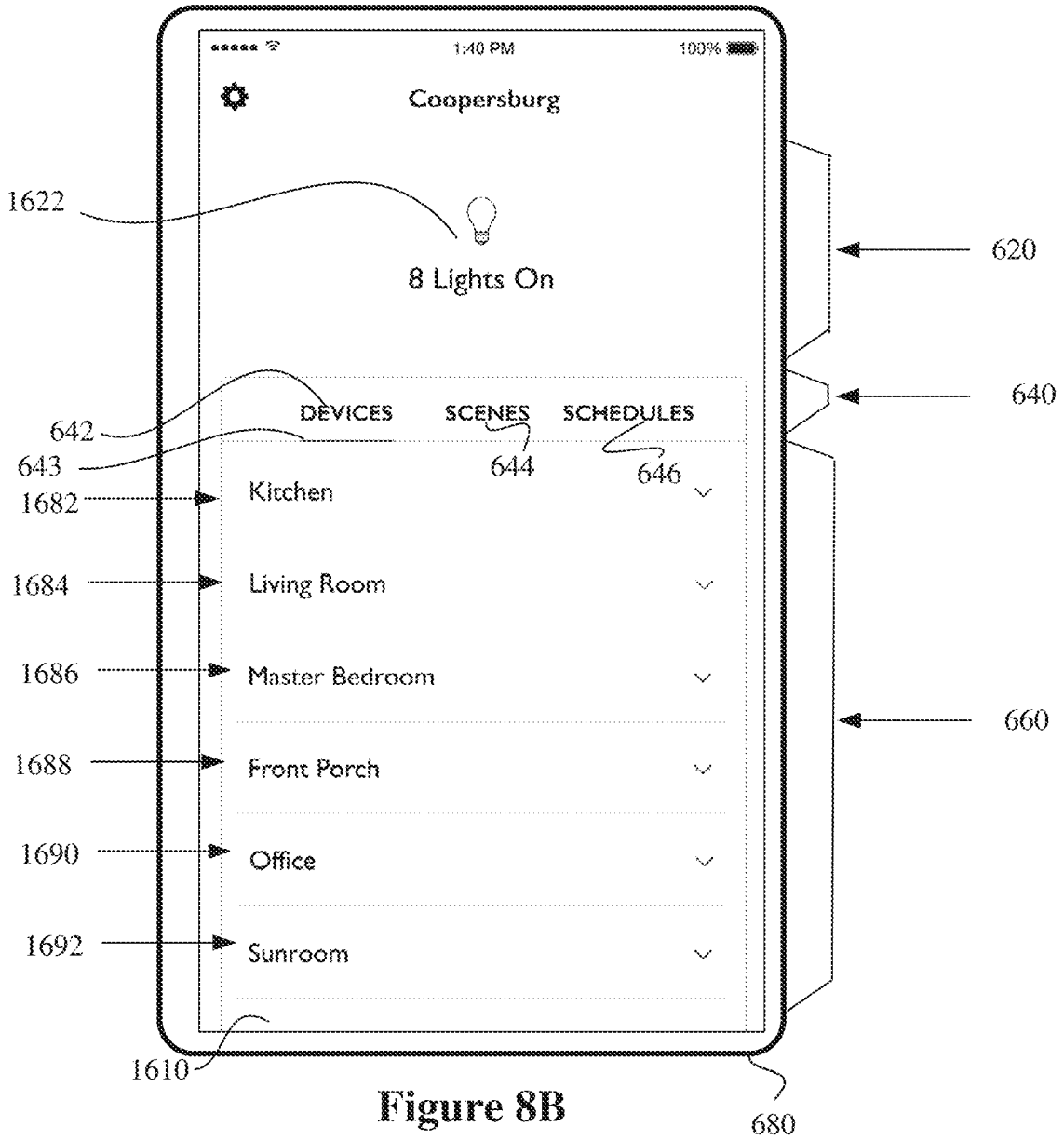
Figure 8C:
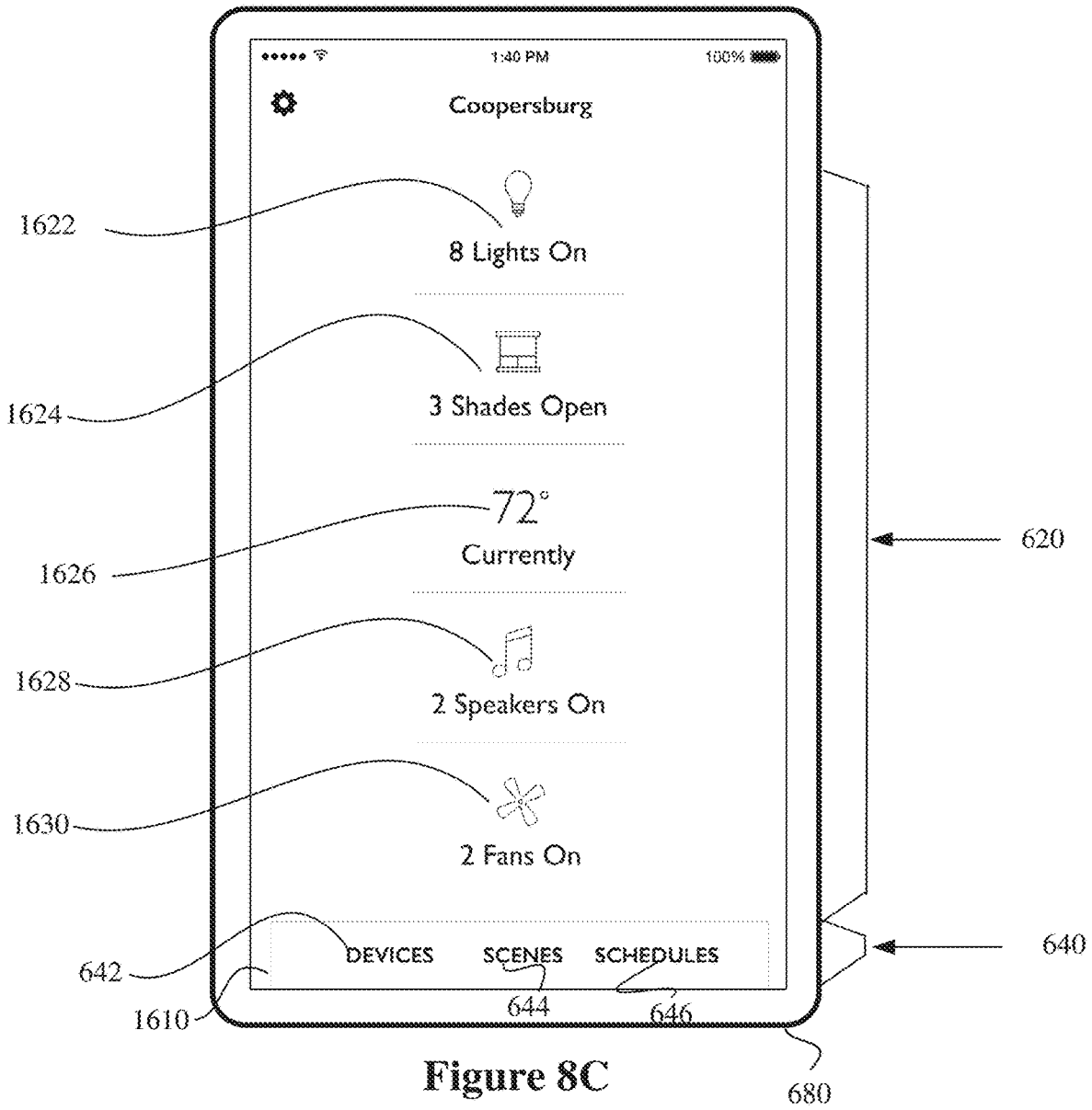

According to the example show in FIG. 8A, the load control system 210a includes three types of devices including lighting control devices, shade devices, and thermostat devices. Accordingly, the interface 1610 shows three corresponding icons in section 620. As discussed herein, a load control system may include fewer, other, and/or additional control devices, with section 620 thus including fewer, other, and/or additional icons. According to an aspect of interface 1610, the default size configuration of section 620 and section 660 may be based on the number of icons (i.e., types of control devices of the load control system) within section 620. For example, as the load control system includes an increasingly larger number of control device types, the default size of section 620 may be increased in size by the control application to display additional icons and the default size of section 660 may be decreased in size. Similarly, as the load control system includes a decreasingly smaller number of control device types, the default size of section 620 may be decreased in size by the control application to display fewer icons and the default size of section 660 may be increased in size. For example, as shown in the example of FIG. 8A, section 660 shows two panes 1682 and 1684 of the active Devices tab 642 (similarly, if the Scenes tab 644 or Schedules tab 646 were active, section 660 may display information relative to these tabs). As another example, assuming the load control system 210a includes fewer control device types, section 620 may include fewer icons and respective status information. For example, referring to FIG. 8B, assuming the load control system 210a only includes lighting control devices, section 620 may only include icon 1622 and corresponding status information. According to this example, section 660 now consumes additional remaining space of interface 1610 as compared to FIG. 8A, here showing six panes, 1682, 1684, 1686, 1688, 1690, and 1692 (similarly, if the Scenes tab 644 or Schedules tab 646 were active, section 660 may display information relative to these tabs). According to another example and as shown in FIG. 8C, assuming the load control system 210a includes not only lighting control devices, shade devices, and thermostat devices but also includes audio and fan devices, section 620 may now include five icons 1622, 1624, 1626, 1628, and 1630 respectively, and associated status information. According to this example, section 660 is no longer displayed in interface 1610. According to this example, section 620 may be vertically scrollable to display additional icons if the load control system includes still additional load control types. One will recognize that FIGS. 8A, 8B, and 8C are examples and other variations are possible. For example, with respect to FIG. 8C, more than five icons may be displayed at one time in section 620. Similarly, fewer than five icons may be displayed in section 620, with section 620 still consuming the space of the interface 1610 and section 660 not being shown.

Figure 8D:
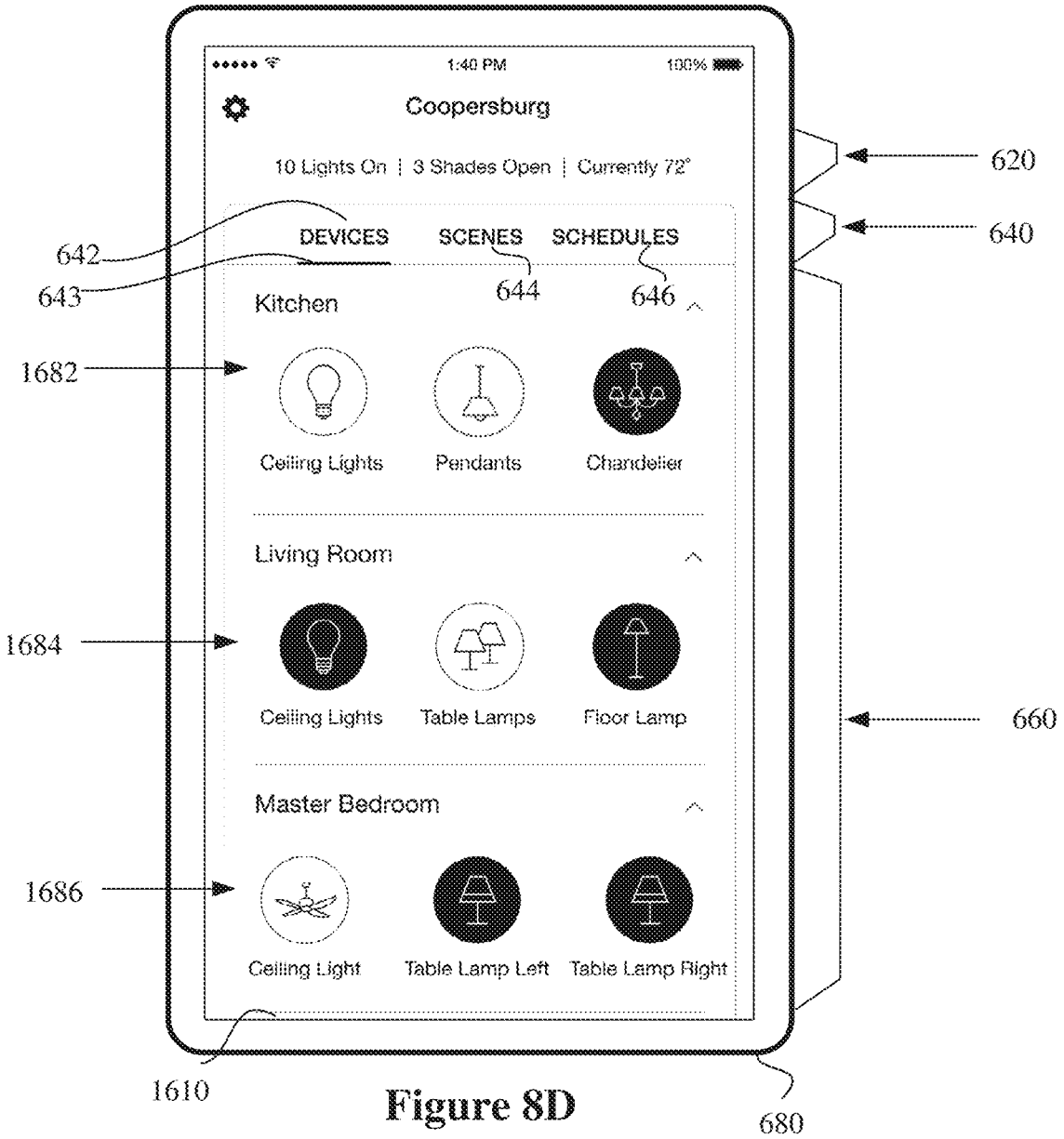

Referring again to the example of FIG. 8A (the example of FIG. 8B may operate in a similar fashion), as similarly discussed above with reference to FIGS. 7A and 7B, section 660 of interface 1610 may be vertically scrollable, for example, when any of the Devices tab 642, Scenes tab 644, Schedules tab 646 is active. Using the Devices tab 642 as the active tab as an example, as section 660 is scrolled "downward" (and/or as panes are expanded) to reveal additional pane information, such as additional panes below "Living Room" pane 1684, section 660 may expand, with section 620 scrolling off of and/or disappearing from and/or being removed from the display interface of the network device by the control application and section 660 consuming this space. Alternatively and as shown in FIG. 8D, section 620 may condense or be minimized by the control application as section 660 expands. For example, as shown in FIG. 8D, the icons, such as icons 1622, 1624, and 1626, may be removed but the numerical and/or text based status information or a variation thereof, for example, may be continued to be displayed by the control application for one or more types of devices to provide status information to a user (here, "10 Lights On" for lighting devices, "3 Shades Open" for shade devices, and "Currently 72°" for thermostat devices). The displayed information and format are an example and other examples are possible. Condensed/minimized section 620 of interface 1610 may be configured to be scrollable by the user (such as left to right or up/down) in order to display additional status information and/or may be configured such that there are multiple rows of information displayed at one time to a user. Alternatively, condensed/minimized section 620 of interface 1610 may not be scrollable and may only display status information for a subset of control devices. Which devices are displayed may or may not be user definable. The status information shown in condensed/minimized section 620 of interface 1610 may be dynamically/actively updated by the control application as the status of devices change. According to one example, condensed/minimized section 620 of interface 1610 may be configured to allow a user to select various portions (such as "10 Lights On", "3 Shades Open", and "Currently 72°") taking the user to subsequent user interfaces as discussed above. According to another example, condensed/minimized section 620 of interface 1610 may be configured such that in response to a user selecting section 620, the section may be re-expanded and section 660 may collapsed by the control application, returning to the configuration as shown in FIG. 8A, for example. Thereafter, section 620 may be configured to allow a user to select displayed icons as discussed above. Continuing to refer to FIG. 8D, continued "downward" scrolling of section 660 may cause the panes at the top of the section (here "Kitchen" pane 1682) to disappear from section 660 and for additional panes to appear at the bottom (below "Master Bedroom" pane 1686) of the section 660, assuming there are additional panes. Similarly, as section 660 is scrolled "upward" in the reverse direction (to possibly reveal panes such as pane 1682 that may have been scrolled off of section 660), panes at the bottom of section 660 may disappear from section 660 (such as pane 1686) and additional panes may appear at the top of section 660. Continued "upward" scrolling (and/or collapsing of panes of section 660) may cause section 660 to be collapsed by the control application as the top pane (here "Kitchen" pane 1682) is reached, and for section 620 to re-expand, with interface 1610 once again appearing as shown in FIG. 8A, for example. According to another example, in addition to and/or as an alternative to the above, selecting the Devices tab 642 (such as by "touching" or "tapping") in the FIG. 8A (and similarly FIG. 8B) configuration may cause section 660 to be expanded and section 620 to be collapsed by the control application as shown in FIG. 8D. Again, section 660 may then be scrollable. Similarly, selecting the Devices tab 642 and/or section 620 (such as by "touching" or "tapping") in the FIG. 8D configuration may cause section 660 to collapse and section 620 to re-expand as shown in the FIG. 8A (and similarly FIG. 8B) configuration. Hence, the expanding and collapsing of sections 620 and 660 may be achieved/obtained in various ways including through scrolling actions and/or by selecting section 620 and/or the Devices tab 642. Again, the Scenes tab 644 and the Schedules tab 646 may operate in a similar fashion.

Referring again to FIG. 8C and sections 662 and 660, this configuration (where section 660 is not initially shown) may operate similar to that described above for FIG. 8A. Using the Devices tab 642 as the active tab as an example, a selecting of the interface 1610 in an area below section 640 (i.e., where section 660 may be) for example, and "swiping" upward for example (although other mechanism may be used) may cause section 660 to appear, with section 620 scrolling off of and/or disappearing from and/or being removed from the display interface of the network device by the control application and section 660 consuming this space. Alternatively and as shown in FIG. 8D and as discussed above, section 620 may condense or be minimized as section 660 appears. The configuration of FIG. 8D may then operate as described above. For example, condensed/minimized section 620 of interface 1610 may be configured to be scrollable by the user (such as left to right or up/down) in order to display additional status information and/or may be configured such that there are multiple rows of information displayed at one time to a user. Alternatively, condensed/minimized section 620 of interface 1610 may not be scrollable and may only display status information for a subset of control devices. Which devices are displayed may or may not be user definable. The status information shown in condensed/minimized section 620 of interface 1610 may be dynamically/actively updated by the control application as the status of devices change. According to one example, condensed/minimized section 620 of interface 1610 may be configured to allow a user to select various portions (such as "10 Lights On", "3 Shades Open", and "Currently 72°") with the control application taking the user to subsequent user interfaces as discussed above. According to another example, condensed/minimized section 620 of interface 1610 may be configured such that in response to a user selecting section 620, the section may re-expand and section 660 may scroll off of and/or disappear from and/or be removed from the display interface, returning to the configuration as shown in FIG. 8D, for example. Thereafter, section 620 may be configured to allow a user to select displayed icons as discussed above. Continuing to refer to FIG. 8D, section 660 may be upward and downward scrollable as discussed above. Similarly, continued "upward" scrolling (and/or collapsing of panes of section 660) may cause section 660 to scroll off of and/or disappear from and/or be removed from the display interface as the top pane (here "Kitchen" pane 1682) is reached, and for section 620 to re-expand, with interface 1610 once again appearing as shown in FIG. 8D, for example. According to another example, in addition to and/or as an alternative to the above, selecting the Devices tab 642 (such as by "touching" or "tapping") in the FIG. 8C configuration may cause section 660 to expand and section 620 to collapse as shown in FIG. 8D. Again, section 660 may then be scrollable. Similarly, selecting the Devices tab 642 and/or section 620 (such as by "touching" or "tapping") in the FIG. 8D configuration may cause section 660 to scroll off of and/or disappear from and/or be removed from the display interface, and for section 620 to re-expand as shown in the FIG. 8C configuration. Hence, the expanding and collapsing of sections 620 and 660 may be achieved/obtained in various ways including through scrolling and/or swiping actions and/or by selecting section 620 and/or the Devices tab 642. Again, the Scenes tab 644 and the Schedules tab 646 may operate in a similar fashion.

Again, as discussed herein, status section 620 may provide a user with an aggregated summary of the load control system 210a, and the respective icons may provide a user with access to control devices the user may more likely want to control as compared to other devices.

Figure 9A:
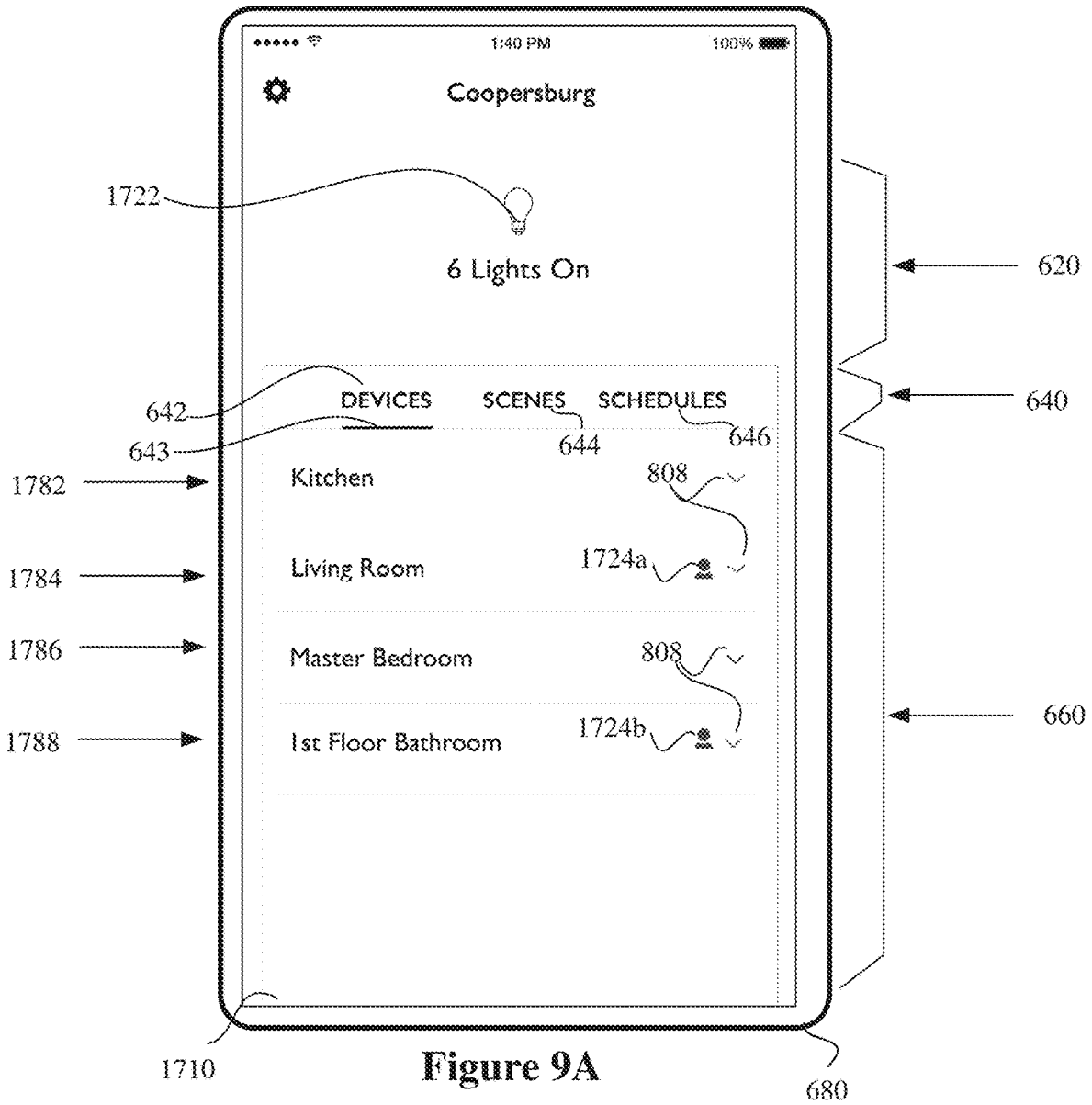
FIGS. 9A-9G show still further example graphical user interfaces of an application that may allow a user to determine information on and to control a load control system and/or control devices.

Referring now to FIG. 9A, there is shown another example graphical user interface 1710 that may be displayed by the control application to a user via network device 680. Interface 1710 may be similar to, and may operate similarly to, interface 1610 as shown in FIGS. 8A-8D, for example, and the other interfaces discussed herein. Interface 1710 includes another example of how the control application may indicate occupancy to a user of the control application. One will recognize that the displaying and operation of occupancy as discussed with respect to FIG. 9A (and similarly FIGS. 9B-9G) may be similarly applied to the other graphical user interfaces discussed herein.

For the purpose of describing FIGS. 9A-9G, it will be assumed that the user environment 202a of load control system 210a includes four rooms including a "Kitchen," a "Living Room," a "Master Bedroom," and a "1$^{st}$ Floor Bathroom," as shown in section 660 of interface 1710 of FIG. 9A. It will be further assumed that load control system 210a includes for each room at least one or more lighting control devices/lights, and further includes at least one occupancy sensor located in the "Living Room," at least one occupancy sensor located in the "Master Bedroom," and at least one occupancy sensor located in the "1$^{st}$ Floor Bathroom." Each of these rooms of the load control system 202a may include other control devices. According to this example, load control system 210a may be configured such that one or more of the lighting control devices/lights, for example, in each room may be responsive to occupancy and/or vacancy signals generated by the respective occupancy sensor(s) located in that room (although other control devices may also be responsive to occupancy and/or vacancy signals). The occupancy sensors may be standalone devices or may be integrated with/part of lighting control devices (or other control devices) for example. According to the example of FIG. 9A, as an occupancy sensor detects an occupancy event/condition in a room, the control application may receive from the system controller 250a an indication of the occupancy event and display an indication/indicator (e.g., an icon) of this event to the user via interface 1710. In this fashion, if a user is notified via interface 1710 that one or more lighting control devices (or other control devices), for example, in a room has its respective lighting load(s) in an on state, the user may further see that the room is occupied and may therefor decide not to turn off or change (e.g., dim) the lighting load(s) in that room via the control application (or, for example, alter other control devices). According to a further aspect of this example, as an occupancy sensor detects a vacancy event/condition, the control application may receive from the system controllers 250a an indication of the vacancy event and may remove from the graphical user interface 1710 the indication/indicator of occupancy. According to a further aspect of the example of FIG. 9A, as the control application initially starts, it may receive from the system controller 250a the state of the occupancy sensors (e.g., occupied/un-occupied) and display occupancy indicators accordingly. The phrases vacancy/vacant and un-occupied may be used interchangeably herein. While the example of FIG. 9A-9G is described with respect to the occupancy sensors controlling lighting control devices, these examples may also be applicable to the occupancy sensors controlling other types of control devices such as fan, shade, thermostat, and audio control devices a noted above.

Turning now more closely to FIG. 9A, graphical user interface 1710 may include three sections or panes including a status section 620, a menu selection section/tab section 640, and in information section 660 as similarly discussed herein. According to this example and as similarly discussed above, section 620 of interface 1710 may include one or more icons indicating different status information of one or more control devices 220a within the load control system 210a. Here, a lighting devices icon 1722 is shown, although other or additional icons may be shown as discussed herein. According to this example, lighting devices icon 1722 indicates that six (6) lighting control devices within the load control system have respective lighting loads currently on. As similarly discussed above and as discussed below, lighting devices icon 1722 may be selectable by a user, taking the user to subsequent user interface(s). Similarly, the status information (e.g., "6 Lights On") associated with lighting devices icon 1722 may be dynamically/actively updated by the control application as the status of lighting control devices changes within the load control system.

As shown in FIG. 9A, the Devices tab 642 is active (as shown by the under-bar 643) with section 660 thereby being subdivided into four panes 1782, 1784, 1786, and 1788, each representing a location within the user environment 202a (here, one for each of the "Kitchen," the "Living Room," the "Master Bedroom," and the "1$^{st}$ Floor Bathroom"). In this example, each of panes 1782, 1784, 1786, and 1788 is shown as being collapsed and may be expanded as a result of the control application detecting that a user has activated/selected a respective carrot 808. In particular, upon detecting/determining that a user has activated/selected a carrot 808, the control application may expand the respective pane to display one or more icons representing control devices in the respective location as discussed herein. According to this example, as a result of an occupancy sensor in a given room detecting an occupancy event, the control application may receive from the system controller 250a an indication of the occupancy event and display an occupancy indicator 1724a, 1724b (e.g., an icon, here representing a person although other icons may be used) of this condition to the user within a respective pane of section 660. In this example, the occupancy sensor in the Living Room has detected an occupancy event and as a result, the control application displays an occupancy indicator 1724a in the Living Room pane 1784 to show the room is occupied. Similarly, the occupancy sensor in the 1$^{st}$ Floor Bathroom has detected an occupancy event and as a result, the control application displays an indicator 1724b in the 1st Floor Bathroom pane 1788 to show the room is occupied. In this example, the occupancy sensor in the Master Bedroom has not detected an occupancy event (e.g., is detecting a vacancy condition/is in a vacancy state) and as a result, the control application displays no occupancy indicator in the Master Bedroom pane 1786 to show the room is vacant. In this example, the Kitchen does not include an occupancy sensor and as result, no occupancy indicator is shown in the Kitchen pane 1782 regardless of whether the Kitchen is occupied. As the control application is initially started, it may show the occupancy/vacancy condition of each room based on status information received from the system controller 250a. As the occupancy/vacancy condition within a given room changes, the control application may receive from the system controller an indication of this change and update section 660 to either show or remove a respective occupancy indicator 1724a, 1724b as appropriate.

One will recognize that this is one example. Icons other than the "person" icon 1724a, 1724b shown in FIG. 9A may be used to show occupancy. Similarly, the occupancy indicator 1724a, 1724b may be placed at a position other than the right corner of a pain. Similarly, occupancy indicators other than an icon may be used to show occupancy. For example, the occupancy indicator may include the control application changing the background color and/or fonts used with respect to pain 1784 or 1788 to show occupancy. Similarly, rather than providing an indicator to show occupancy and providing no indicator to show vacancy, an indicator may be used to show vacancy (e.g., a vacancy indicator, which may be an icon, for example) and no indicator may be provided to show occupancy. As another example, one indicator may be used to show occupancy (occupancy indicator) and another different indicator may be used to show vacancy (vacancy indicator), etc. Furthermore, for rooms such as the Kitchen that may not have an occupancy sensor, the control application may display in the respective pain (here pain 1782) an indicator (e.g., an icon) showing that the room has no sensor so that a user, in response to not seeing an occupancy indicator such as indicator 1724a, 1724b, does not assume the room is vacant. Other examples are possible.

As indicated above, upon detecting/determining that the user has activated/selected a carrot/icon 808, the control application may expand the pane to display icon(s) representing control devices in the corresponding room. For example, turning to FIG. 9B, there is shown an example of the Living Room pain 1784 expanded as a result of the control application detecting an actuation of carrot 808 of the pain, for example. In this example, two icons 1732a, 1732b are shown representing two lighting control devices as similarly described above. The two icons are shown in this example to indicate that one or more lighting loads corresponding to the respective lighting control devices are on. As further shown in this example, pain 1784 also includes an icon 1732c representing the occupancy sensor located in the Living Room. The control application may further associate with icon 1732c an indication or label (here "Occupancy Sensor") to provide further information about the sensor. As another example, the label may provide information such as where the sensor is located in the room, which lighting control devices the sensor controls, etc. Such information may be maintained by the system controller 250a and provided to the control application for display. As discussed below, a user may be able to change this label from the control application. One will recognize that icons other than icon 1732c may be used to represent the occupancy sensor. Each of icons 1732a, 1732b may be selectable as discussed above to allow a user to control/configure the respective lighting control device. Similarly, icon 1732c may be selectable to allow a user to control/configure and/or test the occupancy sensor(s) and/or the lighting control devices the sensor(s) is configured to control. As shown in this example, the control application may continue to display the occupancy indicator 1724a when the pain is expanded to show the room is occupied. As the occupancy/vacancy condition within the Living Room changes, the control application may receive from the system controller 250a an indication of this change and update pane 1784 to either show or remove the occupancy indicator 1724a, as appropriate. Similar to icons 1732a, 1732b for the lighting control devices, the control application may change the appearance of icon 1732c (e.g., change its color and/or contrast) to signify a status/state of the sensor. For example, the icon may be shown in one color/contrast to represent that the sensor is detecting an occupied condition/state and another color/contrast to represent that the sensor is detecting a vacancy condition/state. One will recognize that pain 1784 may include multiple sensor icons if the room has multiple occupancy sensors. According to one example, the load control system may be configured such that the sensors are configured differently and/or different control devices are responsive to each sensor. According to another example, a given room may include multiple occupancy sensors that are configured the same (such as if the room is large, has an irregular shape, etc.) to detect occupancy in the entire room. Such sensors and respective control devices for the given room may be configured such that the same control devices are responsive to both sensors and in particular, each respective device is configured/controlled to react the same (e.g., dims to the same level) regardless of which sensor detects an occupancy condition. In addition, the sensors may be configured the same (e.g., as an occupancy sensor, as a vacancy sensor, etc.). According to this example, if a given room is configured in this manner, the control application may only display one icon representing the multiple sensors. For example, the icon may be shown in one color/contrast when neither sensor detects occupancy and shown in another color/contrast when at least one or both of the sensors detects occupancy. As another example, selecting the icon to configure the sensors may show the configuration interfaces as discussed below as if there is one sensor, with the control application/system controller subsequently configuring both sensors the same. Other variations are possible including displaying multiple sensor icons for each sensor in this latter example. In addition, one will recognize that not all lighting control devices shown in pain 1784 (including all or none) may be responsive to signals from a given sensor. Similarly, assuming all lighting control devices represented by the icons 1732a, 1732b are responsive to signals from the occupancy sensor(s), each of the icons may indicate that its respective lighting control device is off and occupancy indicator 1724a still be displayed by the control application, thereby showing the room is occupied. As discussed above, upon detecting/determining that the user has once again activated/selected carrot/icon 808 of pain 1784, the control application may contract the pain as shown in FIG. 9A.

In general, by notifying a user that the Living Room, for example, is occupied or vacant through the use of an occupancy indicator as described herein, the user may now make a more educated decision as to whether to use the control application to turn lighting control devices/lights, for example, in the room on or off, for example, via the control application (or to control other control devices/loads such as fans, shades, HVAC, music, etc.). This may be especially advantageous if the user is using the control application from a location remote from the Living Room. For example, without the use of the occupancy indicator as described herein, the user may note through the control application that the Living Room lights are on, and decide to turn them off to save energy, for example, even though a person may be in the room. Through the use of the occupancy indicator, the user can now make a more educated decision and possibly not turn the lights off via the application knowing a person may be in the room.

Figure 9B:
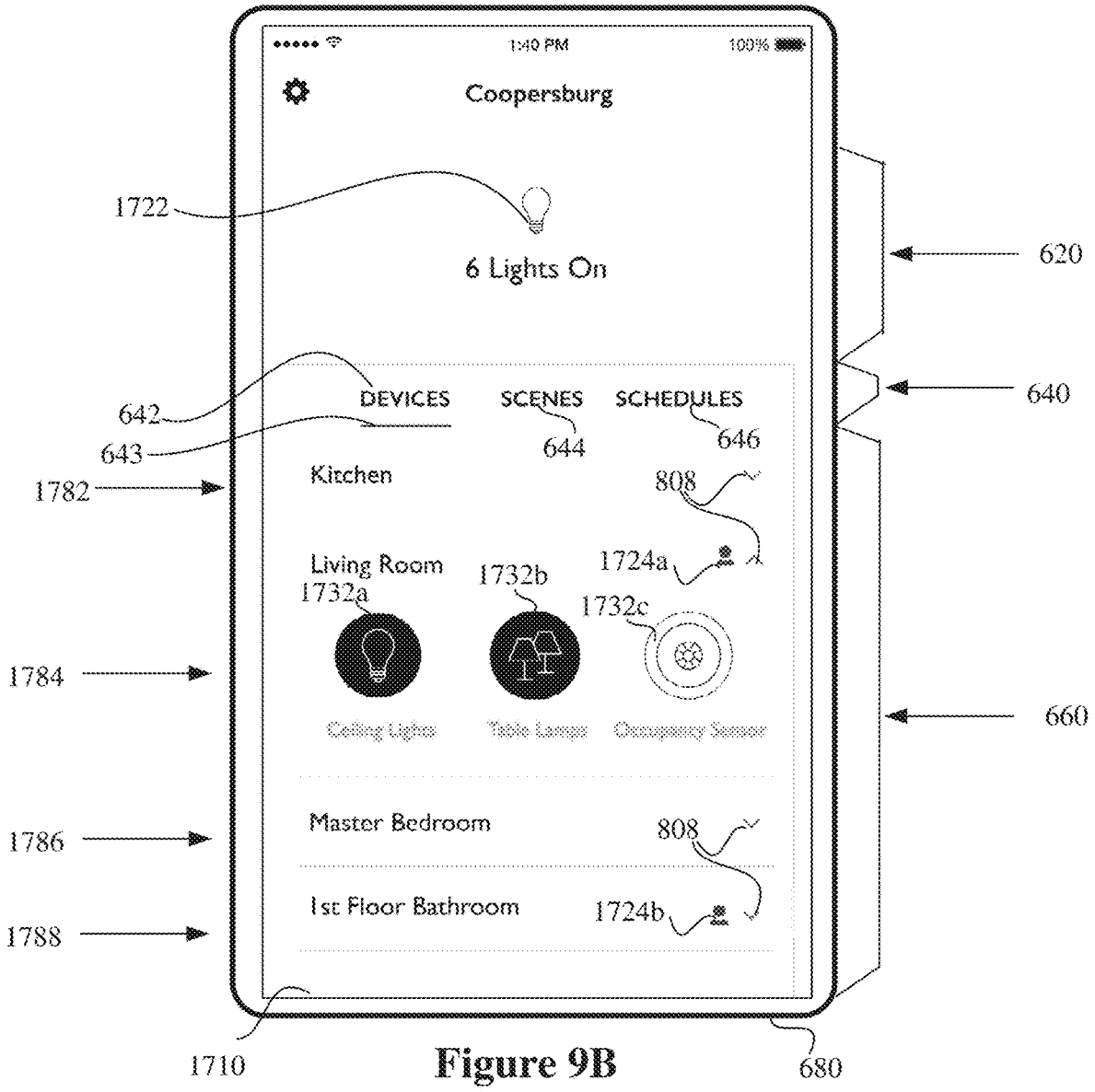
Figure 9C:
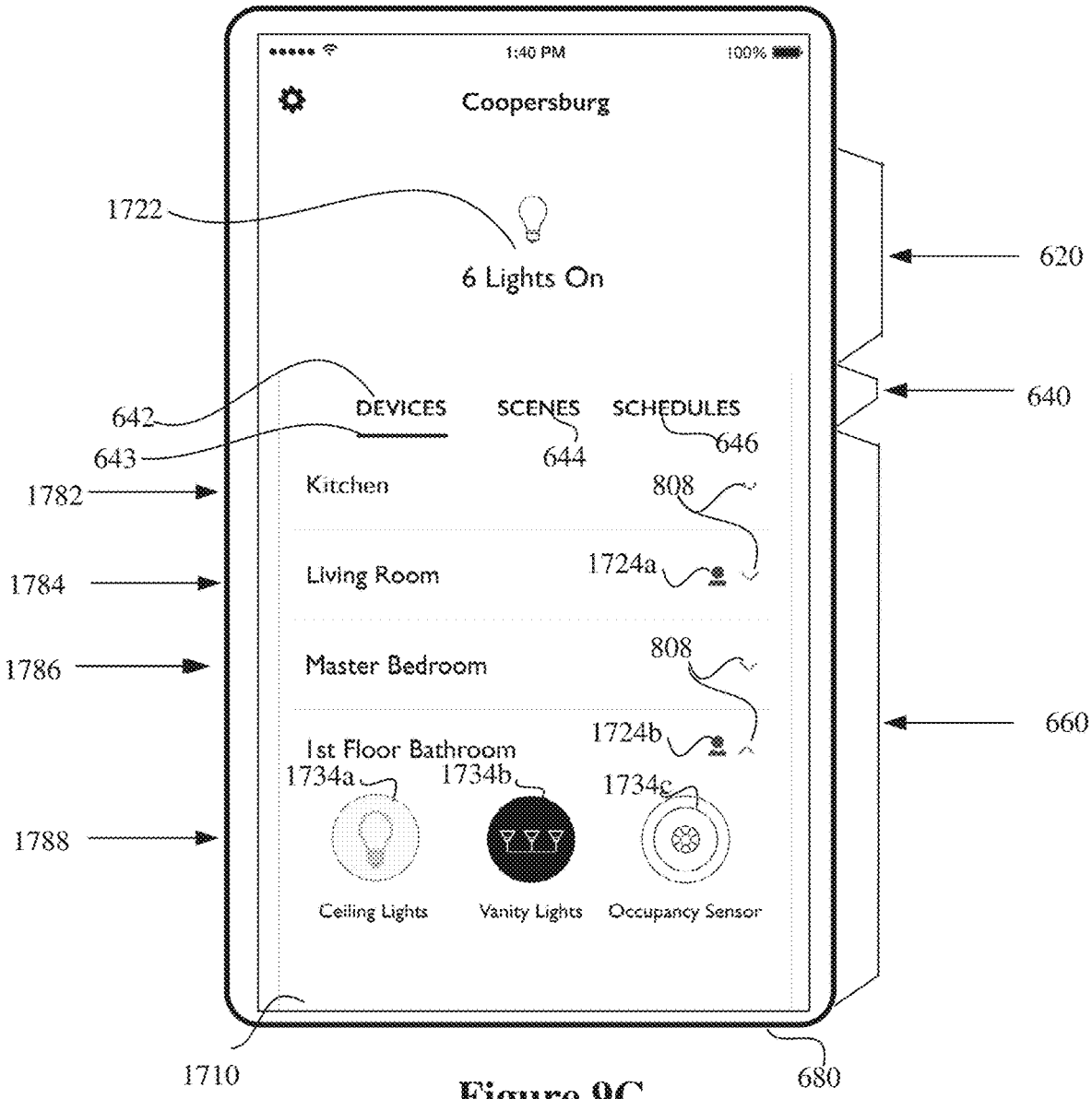

Turning to FIG. 9C, there is shown an example of the 1st Floor Bathroom pain 1788 expanded as a result of the control application detecting an actuation of carrot/icon 808 of the pain. Similar to FIG. 9B, in this example two icons 1734a, 1734b are shown representing two lighting control devices (a "Vanity Lights" and a "Ceiling Lights"). In this example, icon 1734b is shown to indicate that the Vanity Lights control device/lighting load is on. Icon 1734a is shown to indicate that the Ceiling Lights control device/lighting load is off. As further shown in this example, pain 1788 also includes an icon 1734c representing the occupancy sensor(s) located in the 1st Floor Bathroom. Similar to the occupancy sensor icon 1732c, the control application may further associate with icon 1734c an indication or label (here "Occupancy Sensor") to provide further information about the sensor. As shown in this example, the control application may continue to display the occupancy indicator 1724b when the pain is expanded to show the room is occupied. As the occupancy/vacancy condition within the 1st Floor Bathroom changes, the control application may receive from the system controller 250a an indication of this change and update pane 1788 to either show or remove the occupancy indicator 1724b, as appropriate.

Figure 9D:
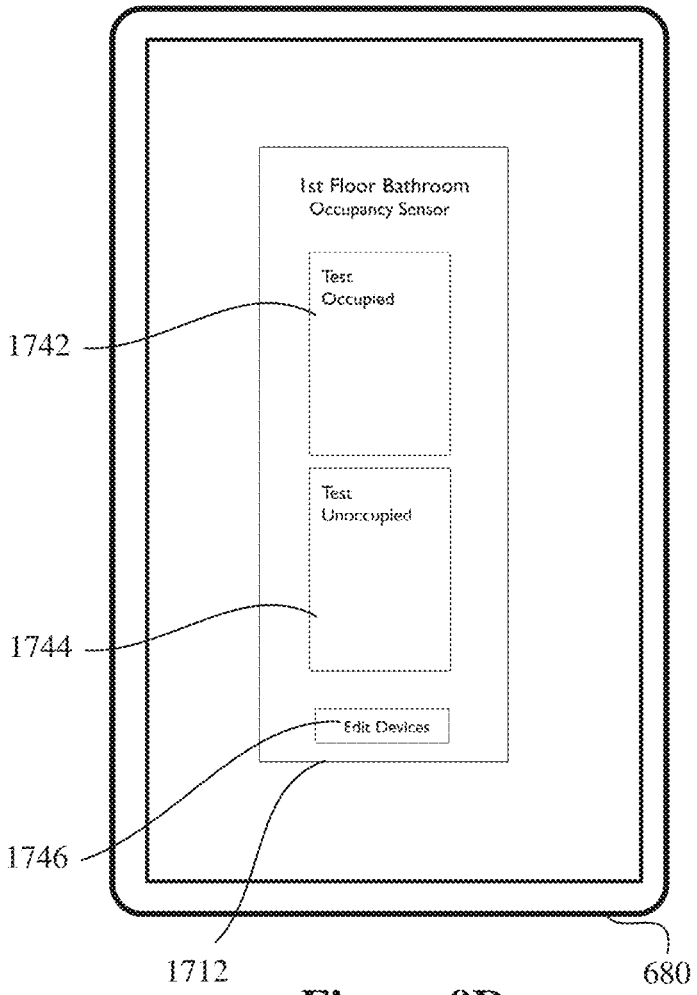

Similar to the occupancy sensor icon 1732c of FIG. 9B, occupancy sensor icon 1734c may be selectable to allow a user to control/configure and/or test the occupancy sensor and/or the lighting control devices the sensor is configured to control. For example, assuming the control application detects/determines that a user selects icon 1734c in pain 1788, the control application may display a control interface 1712 as shown in FIG. 9D. Control interface 1712 may be shown alone or superimposed over interface 1710 of FIG. 9C, for example. One will recognize that control interface 1712 is an example and other control interface configurations are possible. According to this example, control interface 1712 may have three actuators (shown here as buttons for example), including actuator 1742 (labeled "Test Occupied"), actuator 1744 (labeled "Test Unoccupied"), and actuator 1746 (labeled "Edit Device"). One will recognize that other and/or additional actuators are possible. Actuators 1742 and 1744 may allow a user to test the configuration of the sensor and lighting control devices, for example, that may be responsive to signals communicated by the sensor. Actuator 1746 may allow a user to configure the sensor and the lighting control devices, for example, that may be responsive to signals communicated by the sensor. (Again, if icon 1732c represents multiple sensors, interface 1712 and the interfaces shown in FIGS. 9E and 9F may result in both sensors being tested and configured at the same time. Alternatively, the control application may display interfaces that allows the user to test and configure the sensors individually). Assuming icon 1734c represents one sensor, for example, in response to detecting selection of actuator 1742 by a user, the control application may communicate one or more messages to the system controller 250a to instruct the controller to configure or instruct the occupancy sensor in the 1st Floor Bathroom to enter an occupancy state (if not already there) and to communicate an occupancy signal(s). In response to the occupancy signal(s), any lighting control device in the 1st Floor Bathroom that is configured to be responsive to an occupancy signal from the sensor may cause its corresponding lighting load to turn on, if not already on, for example (or go to a specific dimming level, for example, depending on the configuration of the device). If a lighting control device changes from an off state to an on state as a result of the test, the control application may receive an indication of this change from the system controller and may reflect the change in the control devices icon(s) 1734a, 1734b (e.g., by changing their color/contrast) in pain 1788 when the user returns to interface 1710, for example, and may increment the count shown in connection with icon 1722, for example. Similarly, if the sensor is in a vacancy state prior to the test and changes to an occupancy state, the control application may receive an indication of this change from the system controller and may reflect the change by displaying an occupancy indicator 1724b in graphical user interface 1710 of FIGS. 9A and 9B, for example. Subsequent to detecting selection of actuator 1742, the control application may again display graphical user interface 1710 of FIG. 9B, for example. As another example, a user may touch an area outside of interface 1746, which may cause the control application to return interface 1710 of FIG. 9B, for example. Other variations are possible.

Similarly, in response to detecting selection of actuator 1744 by a user, the control application may communicate one or more messages to the system controller 250a to instruct the controller to configure or instruct the occupancy sensor in the 1st Floor Bathroom to enter a vacancy state (if not already there) and to communicate a vacancy signal(s) for example. In response to the vacancy signal(s), any lighting control device in the 1st Floor Bathroom that is configured to be responsive to a vacancy signal from the sensor may cause its corresponding lighting load to turn off, if not already off, for example (or go to a reduced dimming level, for example, depending on the configuration of the device). If a lighting control device changes from an on state to an off state, the control application may receive an indication of this change from the system controller and may reflect the change in the control devices icon(s) 1734a, 1734b (e.g., by changing their color/contrast) in pain 1788 when the user returns to interface 1710, for example, and may decrement the count shown in connection with icon 1722, for example. Similarly, if the sensor is in an occupancy state prior to the test and thus changes to a vacancy state, the control application may receive an indication of this change from the system controller and may reflect the change by removing the occupancy indicator 1724b in graphical user interface 1710 of FIGS. 9A and 9B, for example. Subsequent to detecting selection of actuator 1744, the control application may again display graphical user interface 1710 of FIG. 9B, for example, although again, other variations are possible.

Figure 9E:
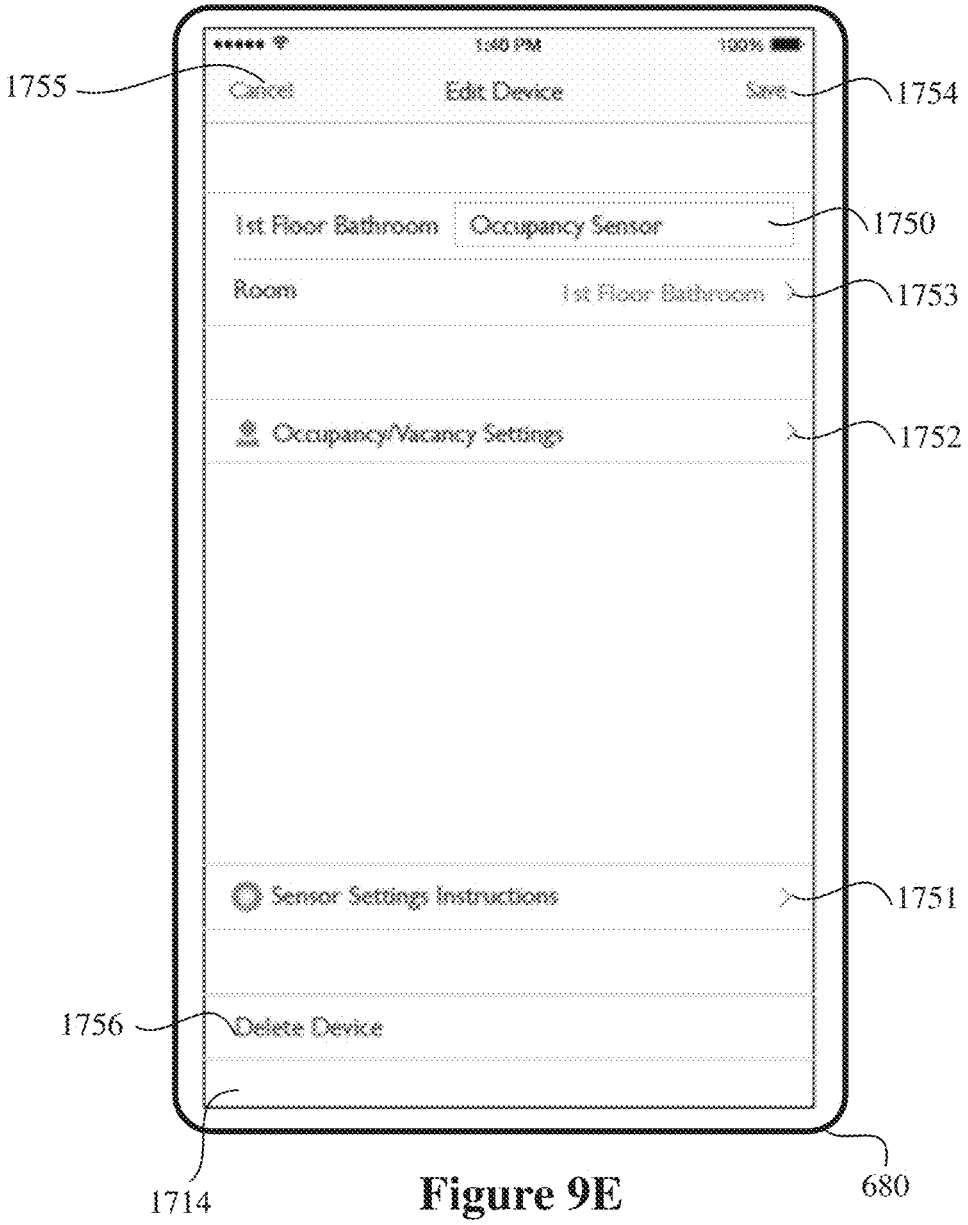

Regarding the Edit Device actuator 1746, in response to detecting/determining that the user selects the actuator, the control application may display a control interface 1714 as shown in FIG. 9E. One will recognize that control interface 1714 is an example and other control interface configurations are possible. According to this example, control interface 1714 may provide a field 1750 that may allow a user to change the label ("Occupancy Sensor") associated with the sensor icon 1734c when displayed in the expanded view of pain 1788 of FIG. 9B, for example. Control interface 1714 may further include a selectable actuator or icon 1752 that allows a user to further configure the sensor and lighting control devices, for example, that may be responsive to signals communicated by the sensor. Control interface 1714 may further include a selectable actuator or icon 1751 that causes the control application to display sensor operating instructions (not shown). Control interface 1714 may also include a selectable actuator or icon 1753 that causes the control application to display a control interface (not shown) that allows a user to further configure the load control system to note the addition or removal of control devices (such as the addition of more lights) to the bathroom. Control interface 1714 may also include a selectable actuator 1756 that allows a user to remove the sensor from the load control system.

Figure 9F:
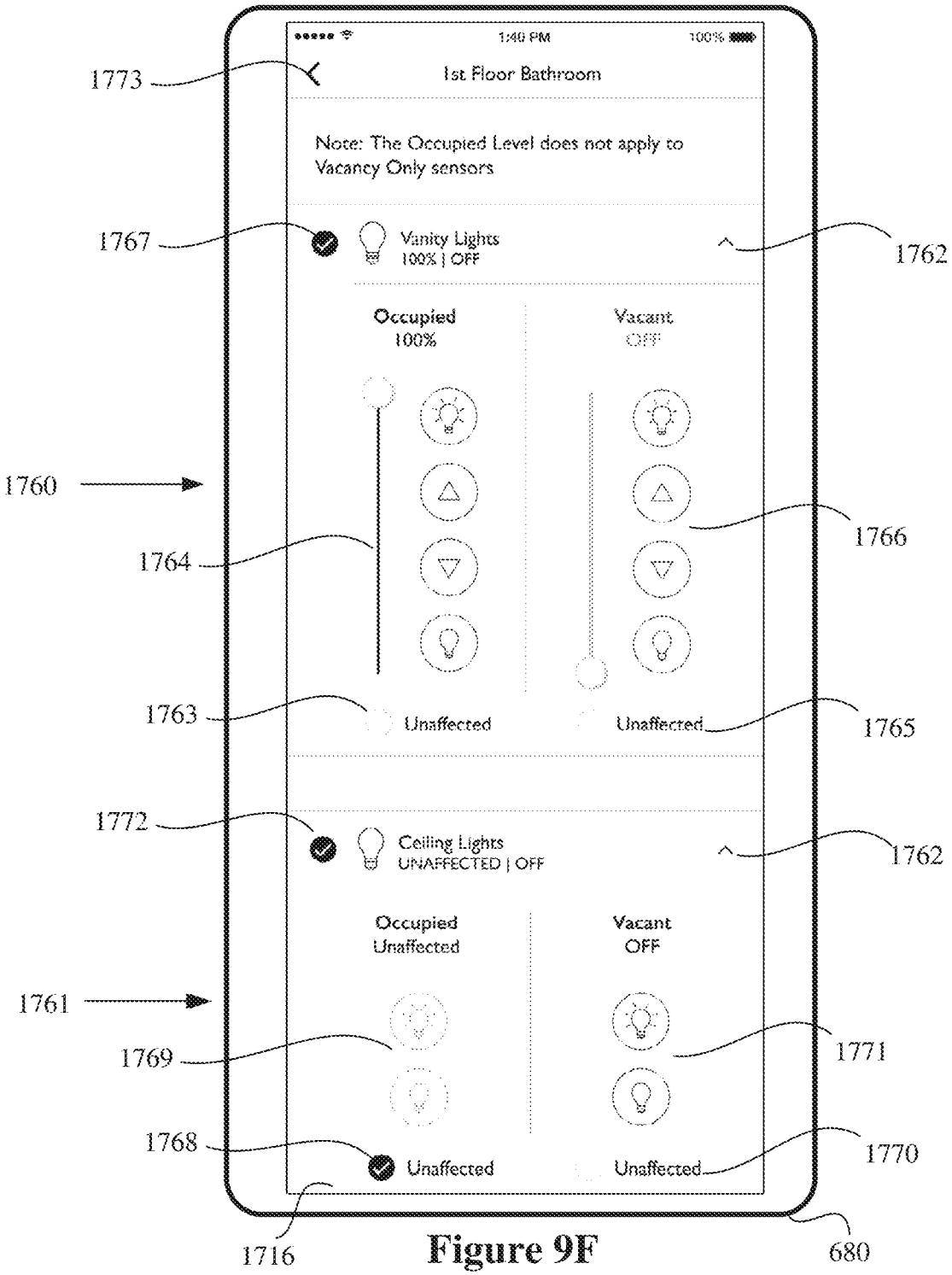

With respect to actuator 1752, in response to detecting/determining that a user selects actuator 1752 the control application may display a control interface 1716 as shown in FIG. 9F. One will recognize that control interface 1716 is an example and other control interface configurations are possible. According to one example, the control application may display in control interface 1716 a respective pane 1760 and 1761 for each lighting control device in the 1st Floor Bathroom that is configurable to be responsive to the sensor. The control application may make this determination of what control devices to display based on configuration information received from the system controller 250a. In this example, it is assumed that both the Vanity Lights and the Ceiling Lights are configurable to be responsive to the sensor and each therefore has a respective pane 1760 and 1761 in the interface. The control application may expand and contract each of panes 1760 and 1761 in response to an actuation of a respective carrot or icon 1762. Further, interface 1716 may be scrollable up and down. For ease of description, each of panes 1760 and 1761 is shown as being expanded in this example and are shown together on network device 680. According to a further example, the control application may customize each of panes 1760 and 1761 based on the capabilities of the respective lighting control device the pane corresponds to. For example, the Vanity Lights may be dimmable and as such, pane 1760 may be shown as having dimming controls (as shown here). The Ceiling Lights may be switched and accordingly, pane 1761 may be shown as having on/off based controls (as shown here). Again, the control application may make this determination as to the types of controls to display based on configuration information received from the system controller 250a. In this example, the sensor of the 1st Floor Bathroom is assumed to be configured as an occupancy/vacancy sensor. If the sensor were only a vacancy sensor, panes 1760 and 1761 may be configured to only configure vacancy conditions. Again, the control application may make this determination based on information received from the system controller 250a.

Turning to pane 1760 as an example, it may include a selectable actuator/field 1767. This actuator may allow a user (e.g., through selection and un-selection) to configure the control system 210a such that the Vanity Lights are either non-responsive or responsive in general to the sensor. Assuming field 1767 is selected as here, pane 1760 may also include a selectable actuator/field 1763 (labeled "Unaffected" here as an example). This actuator may allow a user (e.g., through selection and un-selection) to configure the control system 210a such that the Vanity Lights are either non-responsive or responsive to occupancy signals from the sensor. Assuming the Vanity Lights are configured to be responsive to occupancy signals (as in this example), pane 1760 may include an actuator 1764 (here a slide control and selectable buttons) that allows a user to set the dimming level the Vanity Lights should go to (e.g., a range from "off" to 100% "on") in response to an occupancy signal. Pane 1760 may further include an actuator/field 1765 (labeled "Unaffected" here as an example). This actuator may allow a user (e.g., through selection and un-selection) to configure the control system 210a such that the Vanity Lights are either non-responsive or responsive to vacancy signals from the sensor. Assuming the Vanity Lights are configured to be responsive to vacancy signals (as in this example), pane 1760 may include an actuator 1766 (here a slide control and selectable buttons) that allows a user to set the dimming level the Vanity Lights should go to (e.g., a range from "off" to 100% "on") in response to a vacancy signal. In this example, the Vanity Lights are configured to be responsive to go to 100% on in response to occupancy signals and to go off in response to vacancy signals.

Pane 1761 may be similarly configured as pane 1760. For example, pane 1761 may include a selectable actuator/field 1772. This actuator may allow a user (e.g., through selection and un-selection) to configure the control system 210a such that the Ceiling Lights are either non-responsive or responsive in general to the sensor. Assuming field 1772 is selected as here, pane 1761 may also include an actuator/field 1768 (labeled "Unaffected" here as an example). This actuator may allow a user (through selection and un-selection) to configure the control system 210a such that the Ceiling Lights are either non-responsive or responsive to occupancy signals from the sensor. In this example, the Ceiling Lights are configured to be non-responsive to occupancy signals from the sensor. Assuming the Ceiling Lights were configured to be responsive to occupancy signals, pane 1761 may activate an actuator 1769 (here selectable buttons and shown as un-activated) that may allow a user to cause the lights to either turn on or turn off in response to an occupancy signal. Pane 1761 may further include an actuator/field 1770 (labeled "Unaffected" here as an example). This actuator may allow a user (through selection and un-selection) to configure the control system 210a such that the Ceiling Lights are either non-responsive or responsive to vacancy signals from the sensor. Assuming the Vanity Lights are configured to be responsive to vacancy signals (as in this example), pane 1761 may include an actuator 1771 (here selectable buttons) that allows a user to cause the Ceiling Lights to either turn on or turn off in response to a vacancy signal. In this example, the Ceiling Lights are configured to turn off in response to vacancy signals.

Control interface 1716 may further include an actuator 1773, actuation of which by a user may cause the control application to display control interface 1714 of FIG. 9E. Control interface 1714 may include an actuator 1754 (here, labeled "Save" as an example). Selection of actuator 1754 may cause the control application to communicate to the system controller one more messages reflecting any changes (e.g., configuration settings) made in control interfaces 1714 and/or 1716. The system controller 250a may then reconfiguring the control device(s) as necessary. Thereafter, the control application may again display graphical user interface 1710 of FIG. 9B, for example. Similarly, control interface 1714 may include an actuator 1755 (here, labeled "Cancel" as an example). Selection of actuator 1755 may cause the control application to disregard the changes made in control interfaces 1714 and/or 1716 and to display graphical user interface 1710 of FIG. 9B, for example. Again, this is an example and other configurations are possible.

Figure 9G:
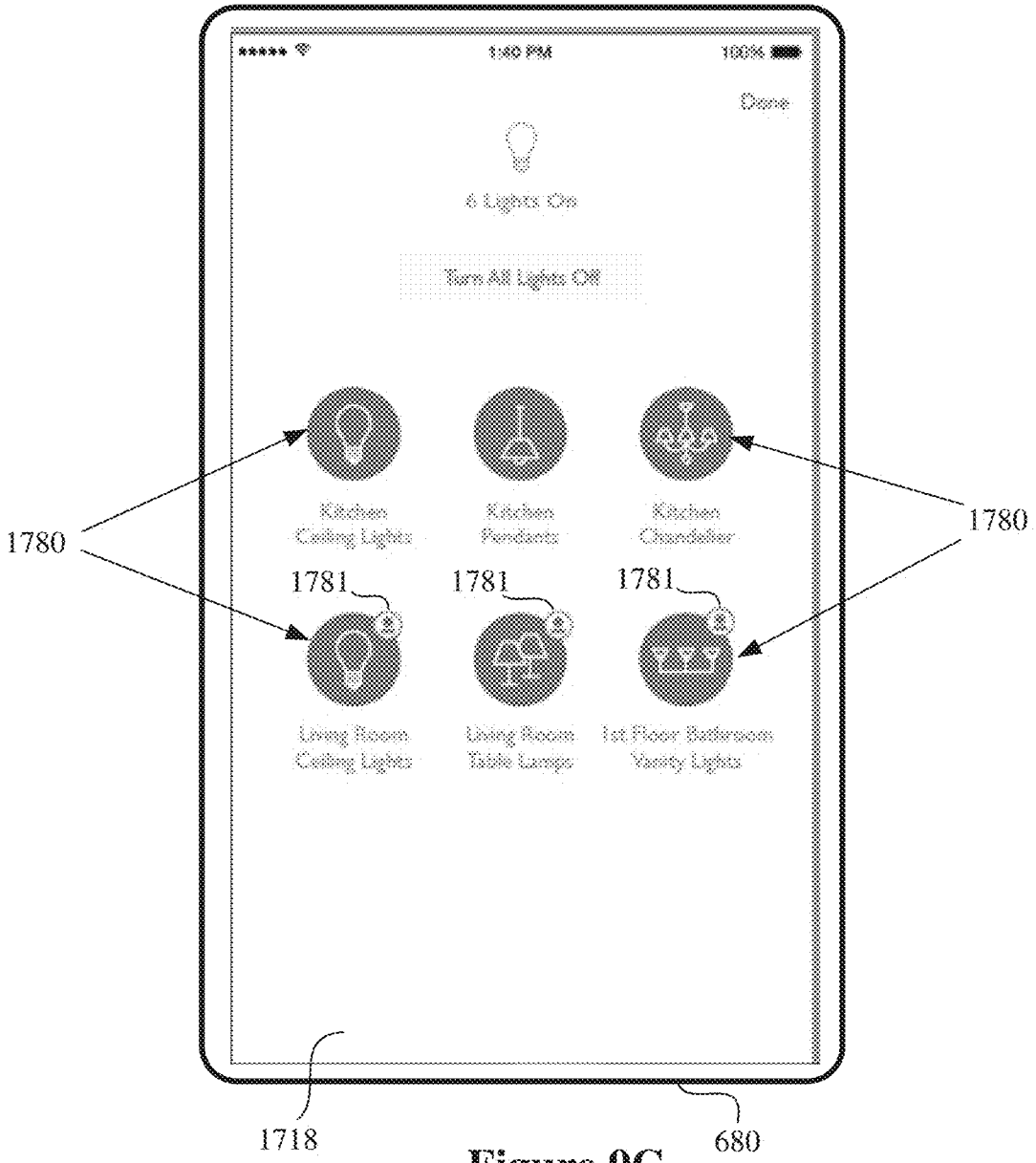

Turning again to FIG. 9A, upon detecting/determining that the user has selected lighting devices icon 1722, the control application may display to the user via network device 680 the graphical user interface 1718 as shown in FIG. 9G. FIG. 9G is similar to graphical user interface 702 of FIG. 6C, for example, and may function as similarly described for graphical user interface 702. Interface 1718 may include a respective control device icon 1780 for each lighting control device having lighting load(s) that are currently on. According to this example, for each room (here the Living Room) having an occupancy sensor that is in an occupancy state, the respective icons for the lighting control devices may include an additional occupancy indicator 1781 (here a person icon, although other icons or indicators may be used) to show that the respective room is occupied. According to one example, only the icons for the lighting control devices that are responsive to occupancy and/or vacancy signals from the sensor may include occupancy indicator 1781. According to another example, even if a lighting control device is not responsive to occupancy and/or vacancy signals from the sensor, the icon for the device may include the occupancy indicator 1781. As similarly discussed for graphical user interface 702, as a lighting control device turns its respective load(s) on, the control application may receive an indication of this change from the system controller 250a and display to the user an additional icon 1780 in interface 1718 that is associated with the lighting control device. That icon may or may not include indicator 1781 based on the occupancy condition of the room, for example. Similarly, as a lighting device turns its respective load(s) off, the control application may receive an indication of this change from the system controller 250a and remove from interface 702 the icon 706 associated with the device. Similarly, if an occupancy sensor changes from an occupied state to a vacancy/vacant state, the control application may receive an indication of this change from the system controller 250a and change respective lighting control device icons 1780 to remove icon 1781. Similarly, if an occupancy sensor changes from a vacancy/vacant state to an occupied state, the control application may receive an indication of this change from the system controller 250a and change respective lighting control device icons 1780 to add icon 1781. Other ways of showing occupancy in interface 7118 are possible. In this example, the Kitchen does not include an occupancy sensor and thus no occupancy indicator may be shown with respective icons of the Kitchen control devices.

In general, by notifying a user via interface 1718 that certain lights in certain rooms are on and that these rooms may be occupied as described herein, the user may now make a more educated decision as to whether to use the control application to turn lights in such rooms off via the control application. This may be especially advantageous if the user is using the control application from a location remote from user environment. For example, without the use of the occupancy indicator as described herein, the user may note through the control application that certain lights are on, and decide to turn them off to save energy, for example, even though a person may be in the room. Through the use of the occupancy indicator, the user can now make a more educated decision and possibly not turn the lights off via the application knowing a person may be in the room.

In addition to the examples shown in FIGS. 9A-9G, occupancy indictors may be shown in other interfaces discussed herein in a similar fashion as shown FIGS. 9A-9G. The occupancy indictors may also be associated with icons for other control devices (e.g., fan devices, shade devices, audio devices, and thermostat devices) even if the device is not responsive to a sensor but is located in a room with a sensor. For example, interfaces that include an indication of a room(s) or location(s) or space(s) in a user environment such as those shown in FIGS. 6A-6Q, 6T, 6Y-6Z, 7A-7B, and 8A-8D may include occupancy and/or vacancy indicators.

One will recognize that tabs 642, 644, and 646 of the graphical interfaces shown in FIGS. 6A, 6O, 6Y, and 6Z, and FIGS. 7A-9C for example, may be shown in different orders. For example, the graphical interfaces describe herein have the Devices tab 642 is shown first, the Scenes tab 644 second to the right of the Devices tab, and the Schedules tab 646 shown third to the right of the Scenes tab. Nonetheless, the tabs may be displayed in other orders. In addition, any of the tabs may be the default tab. Nonetheless, a user may desire to control certain devices in certain rooms. Hence, having the Devices tab 642 positioned first as shown herein and being the default tab may make this tab more easily accessible to the user.

In addition, the placement of section 620 and selectable tabs 642, 644, and 646 on a single interface like that shown in FIGS. 6A, 6O, 6Y, and 6Z, and FIGS. 7A-9C for example may be advantageous in that these functions and related features may be typical functions and features a user may use when accessing the control application.

Furthermore, the amount of information and/or the number of icons for example shown in the example interfaces herein (such as the number of icons in section 620 and the number of panes and icons shown in section 660 when the Devices tab 642 is active) may vary based on the type of network device 680 running the control application. For example, when the control application described herein runs on a phone, the application may display a first amount of information in any given interface; and when the control application described herein runs on a tablet for example that may have a larger display screen than the phone, the application may display a second amount of information in any given interface that is greater than the first amount. Alternatively and/or in addition, the information and/or icons for example in any given interface may be displayed in a different fashion based on the type of device. For example, on a phone, icons within a pane of section 660 when the Devices tab 642 is active may be shown in a number of rows. Alternatively, those same icons on a tablet for example may fit in one row or a fewer number of rows. Similarly, for devices that may have display screens with different length-width measurements and that may detect orientation, as a user re-orients the device the control application may reformat the information and/or icons based on the changing orientation. Other examples are possible.

Figure 13:
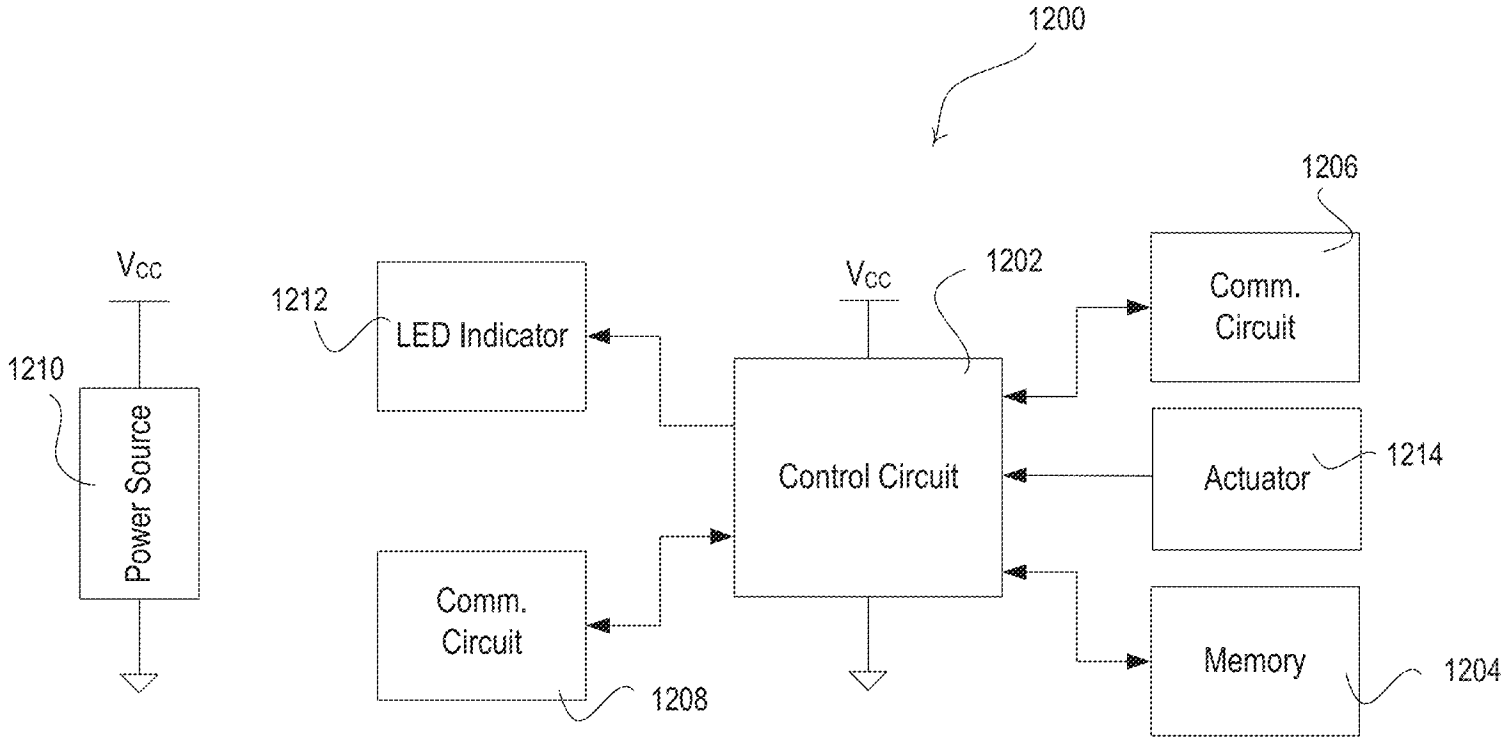
FIG. 13 is a block diagram of an example system controller.

FIG. 13 is a block diagram illustrating another example system controller 1200 (such as system controller 150 and 250a/250b, described herein). The system controller 1200 may include one or more general purpose processors, special purpose processors, conventional processors, digital signal processors (DSPs), microprocessors, microcontrollers, integrated circuits, programmable logic devices (PLD), field programmable gate arrays (FPGA), application specific integrated circuits (ASICs), or any suitable controller or processing device or the like (hereinafter collectively referred to as processor(s) or control circuit(s) 1202). The control circuit 1202 may be configured to execute one or more software-based applications that include instructions that when executed by the control circuit may configure the control circuit to perform signal coding, data processing, power control, input/output processing, or any other function, process, and/or operation for example that enables the system controller 1200 to perform as described herein. One will recognize that functions, features, processes, and/or operations described herein of the system controller 1200 may also and/or alternatively be provided by firmware and/or hardware in addition to and/or as an alternative to software-based instructions. The control circuit 1202 may store information in and/or retrieve information from the memory 1204, including configuration information/configuration information file(s), backup file(s), creation times, and signature(s) as described herein. Memory 1204 may also store software-based instructions for execution by the control circuit 1202 and may also provide an execution space as the control circuit executes instructions. Memory 1204 may be implemented as an external integrated circuit (IC) or as an internal circuit of the control circuit 1202. Memory 1204 may include volatile and non-volatile memory modules/devices and may be non-removable memory modules/devices and/or a removable memory modules/devices. Non-removable memory may include random-access memory (RAM), read-only memory (ROM), a hard disk, or any other type of non-removable memory storage. Removable memory may include a subscriber identity module (SIM) card, a memory stick, a memory card, or any other type of removable memory. One will appreciate that the memory used to store configuration information file(s), and/or backup file(s), and/or software-based instructions, etc. may be the same and/or different memory modules/devices of the system controller. As one example, configuration information file(s) and software-based instructions may be stored in non-volatile memory modules/devices while backup(s) may be stored in volatile and/or non-volatile memory modules/devices.

The system controller 1200 may include one or more communications circuits/network interface devices or cards 1206 for transmitting and/or receiving information. The communications circuit 1206 may perform wireless and/or wired communications. The system controller 1200 may also, or alternatively, include one or more communications circuits/network interface devices/cards 1208 for transmitting and/or receiving information. The communications circuit 1206 may perform wireless and/or wired communications. Communications circuits 1206 and 1208 may be in communication with control circuit 1202. The communications circuits 1206 and/or 1208 may include radio frequency (RF) transceivers or other communications modules configured to perform wireless communications via an antenna(s). The communications circuit 1206 and communications circuit 1208 may be configured to perform communications via the same communication channels or different communication channels. For example, the communications circuit 1206 may be configured to communicate (e.g., with a network device, over a network, etc.) via a wireless communication channel (e.g., BLUETOOTH®, near field communication (NFC), WIFI®, WI-MAX®, cellular, etc.) and the communications circuit 1208 may be configured to communicate (e.g., with control devices and/or other devices in the load control system) via another wireless communication channel (e.g., WI-FI®, Zigbee, Thread, etc., or a proprietary communication channel, such as CLEAR CONNECT™).

The control circuit 1202 may be in communication with an LED indicator(s) 1212 for providing indications to a user. The control circuit 1202 may be in communication with an actuator(s) 1214 (e.g., one or more buttons) that may be actuated by a user to communicate user selections to the control circuit 1202. For example, the actuator 1214 may be actuated to put the control circuit 1202 in an association mode and/or communicate association messages from the system controller 1200.

Each of the modules within the system controller 1200 may be powered by a power source 1210. The power source 1210 may include an AC power supply or DC power supply, for example. The power source 1210 may generate a supply voltage $V_{CC}$ for powering the modules within the system controller 1200. One will recognize that system controller 1200 may include other, fewer, and/or additional modules.

Figure 14:
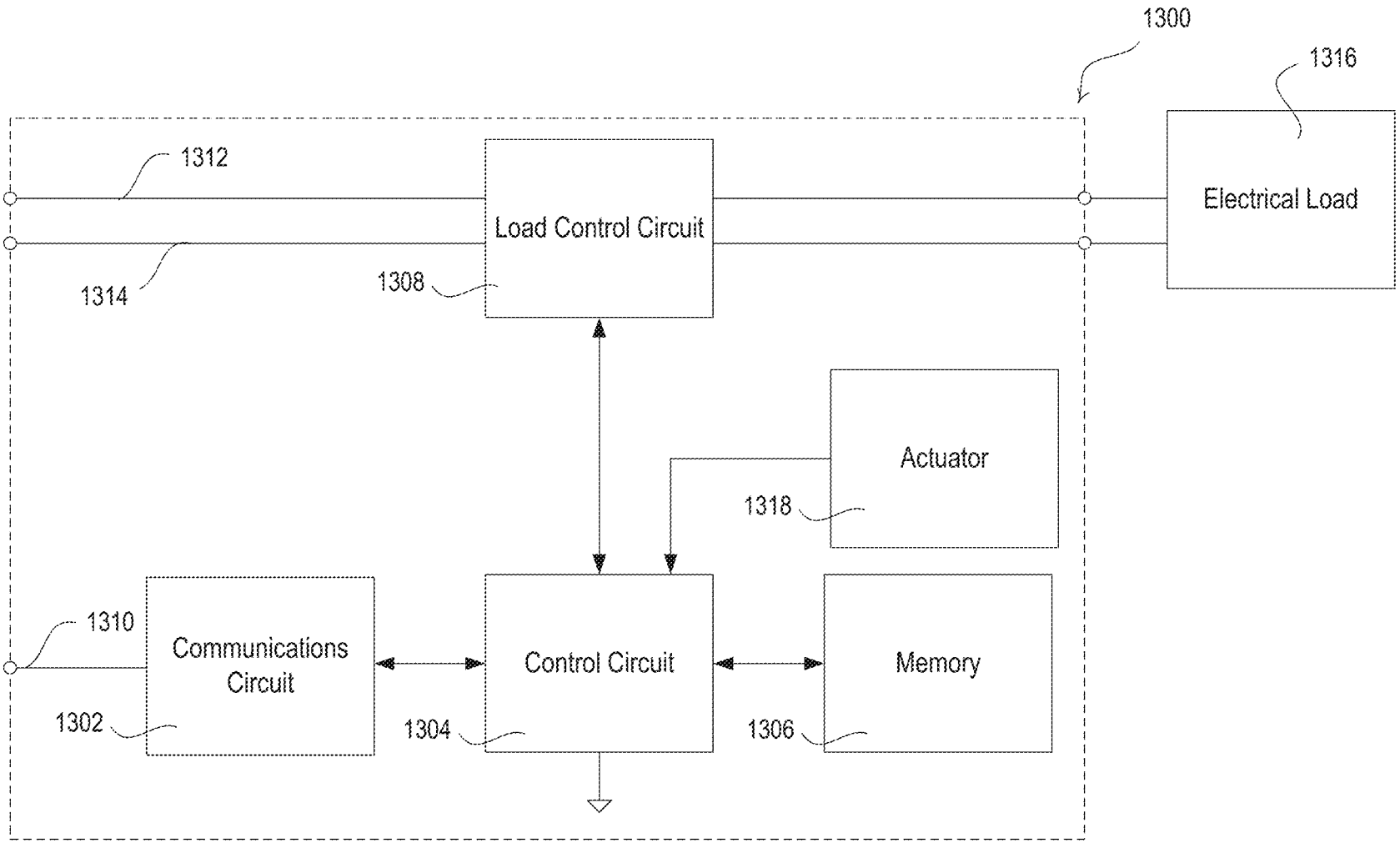
FIG. 14 is a block diagram of an example control-target device.

FIG. 14 is a block diagram illustrating an example control-target device 1300, e.g., a load control device, as described herein. The control-target device 1300 may be a dimmer switch, an electronic switch, an electronic ballast for lamps, an LED driver for LED light sources, an AC plug-in load control device, a temperature control device (e.g., a thermostat), a motor drive unit for a motorized window treatment, or other load control device. The control-target device 1300 may include one or more communications circuits/network interface devices or cards 1302. The communications circuit 1302 may include a receiver, an RF transceiver, and/or other communications module configured to perform wired and/or wireless communications via communications link 1310. For example, the communications circuit 1302 may be configured to communicate (e.g., with a network device, over a network, etc.) via a first wireless communication channel (e.g., BLUETOOTH®, near field communication (NFC), WIFI®, WI-MAX®, cellular, etc.) and may be further configured to communicate (e.g., with control source devices, a system controller, and/or other devices in the load control system) via another wireless communication channel (e.g., WI-FI®, Zigbee, Thread, etc., or a proprietary communication channel, such as CLEAR CONNECT™). The control-target device 1300 may include one or more general purpose processors, special purpose processors, conventional processors, digital signal processors (DSPs), microprocessors, microcontrollers, integrated circuits, programmable logic devices (PLD), field programmable gate arrays (FPGA), application specific integrated circuits (ASICs), or any suitable controller or processing device or the like (hereinafter collectively referred to as processor(s) or control circuit(s) 1304). The control circuit 1304 may be configured to execute one or more software-based applications that include instructions that when executed by the control circuit may configure the control circuit to perform signal coding, data processing, power control, input/output processing, or any other function, feature, process, and/or operation for example that enables the control-target device 1300 to perform as described herein. One will recognize that functions, features, processes, and/or operations, described herein for the control-target device 1300 may also and/or alternatively be provided by firmware and/or hardware in addition to and/or as an alternative to software-based instructions. The control circuit 1304 may store information in and/or retrieve information from the memory 1306. For example, the memory 1306 may maintain a registry of associated control devices and/or control configuration information. Memory 1306 may also store software-based instructions for execution by the control circuit 1304 and may also provide an execution space as the control circuit executes instructions. Memory 1306 may be implemented as an external integrated circuit (IC) or as an internal circuit of the control circuit 1304. Memory 1306 may include volatile and non-volatile memory modules/devices and may be non-removable memory modules/devices and/or a removable memory modules/devices. Non-removable memory may include random-access memory (RAM), read-only memory (ROM), a hard disk, or any other type of non-removable memory storage. Removable memory may include a subscriber identity module (SIM) card, a memory stick, a memory card, or any other type of removable memory. The control circuit 1304 may also be in communication with the communications circuit 1302.

The control-target device 1300 may include a load control circuit 1308. The load control circuit 1308 may receive instructions from the control circuit 1304 and may control an electrical load 1316 based on the received instructions. The load control circuit 1308 may send status feedback to the control circuit 1304 regarding the status of the electrical load 1316. The load control circuit 1308 may receive power via a hot connection 1312 and a neutral connection 1314 and may provide an amount of power to the electrical load 1316. The electrical load 1316 may include any type of electrical load.

The control circuit 1304 may be in communication with an actuator 1318 (e.g., one or more buttons) that may be actuated by a user to communicate user selections to the control circuit 1304. For example, the actuator 1318 may be actuated to put the control circuit 1304 in an association mode or discovery mode and may communicate association messages or discovery messages from the control-target device 1300. One will recognize that control-target device 1300 may include other, fewer, and/or additional modules.

Figure 15:
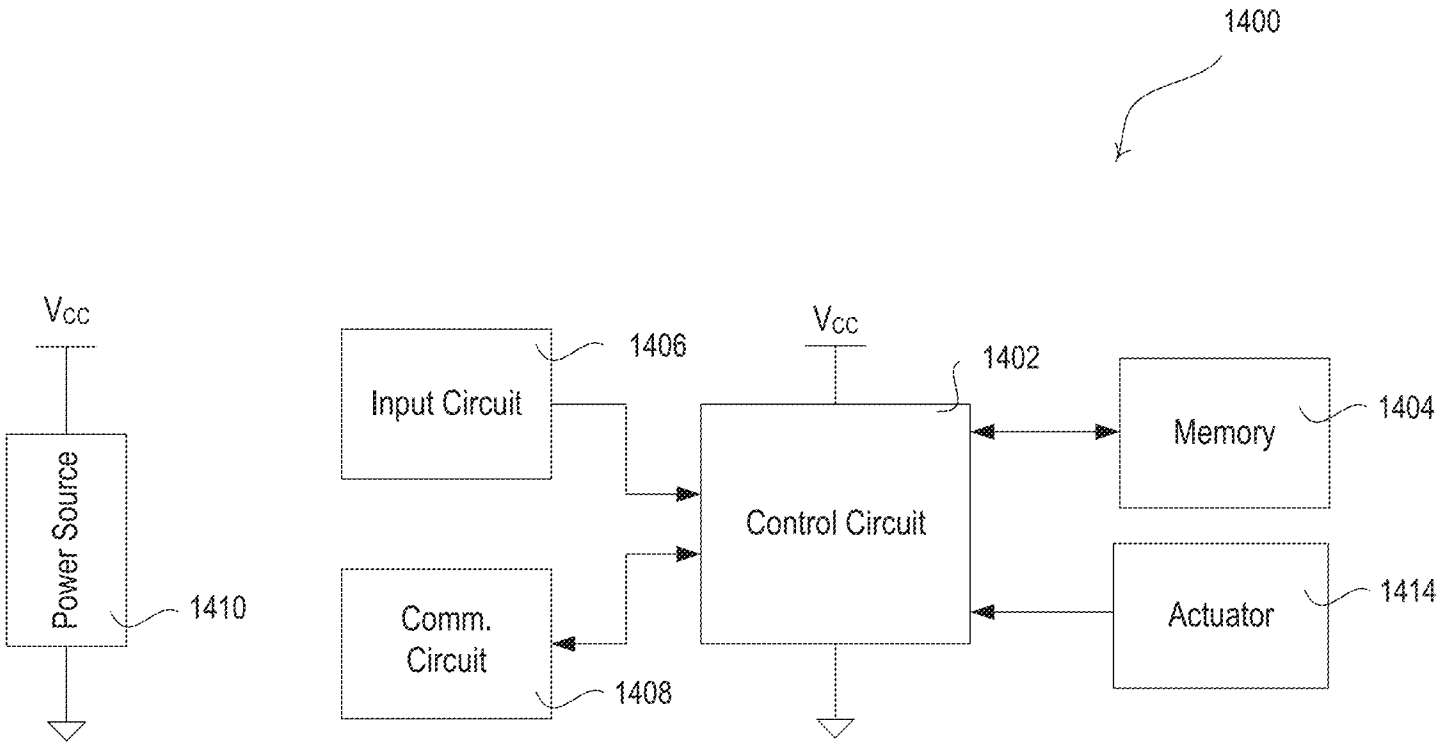
FIG. 15 is a block diagram of an example control-source device.

FIG. 15 is a block diagram illustrating an example control-source device 1400 as described herein. The control-source device 1400 may be a remote control device, an occupancy sensor, a daylight sensor, a window sensor, a temperature sensor, and/or the like. The control-source device 1400 may include one or more general purpose processors, special purpose processors, conventional processors, digital signal processors (DSPs), microprocessors, microcontrollers, integrated circuits, programmable logic devices (PLD), field programmable gate arrays (FPGA), application specific integrated circuits (ASICs), or any suitable controller or processing device or the like (hereinafter collectively referred to as processor(s) or control circuit(s) 1402). The control circuit 1402 may be configured to execute one or more software-based applications that include instructions that when executed by the control circuit may configure the control circuit to perform signal coding, data processing, power control, input/output processing, or any other function, feature, process, and/or operation for example that enables the control-source device 1400 to perform as described herein. One will recognize that functions, features, processes, and/or operations described herein for the control-source device 1400 may also and/or alternatively be provided by firmware and/or hardware in addition to and/or as an alternative to software-based instructions. The control circuit 1402 may store information in and/or retrieve information from the memory 1404. Memory 1404 may also store software-based instructions for execution by the control circuit 1402 and may also provide an execution space as the control circuit executes instructions. Memory 1404 may be implemented as an external integrated circuit (IC) or as an internal circuit of the control circuit 1402. Memory 1404 may include volatile and non-volatile memory modules/devices and may be non-removable memory modules/devices and/or a removable memory modules/devices. Non-removable memory may include random-access memory (RAM), read-only memory (ROM), a hard disk, or any other type of non-removable memory storage. Removable memory may include a subscriber identity module (SIM) card, a memory stick, a memory card, or any other type of removable memory.

The control-source device 1400 may include one or more communications circuits/network interface devices or cards 1408 for transmitting and/or receiving information. The communications circuit 1408 may transmit and/or receive information via wired and/or wireless communications via communications circuit 1408. The communications circuit 1408 may include a transmitter, an RF transceiver, and/or other circuit configured to perform wired and/or wireless communications. For example, the communications circuit 1408 may be configured to communicate (e.g., with a network device, over a network, etc.) via a first wireless communication channel (e.g., BLUETOOTH®, near field communication (NFC), WIFI®, WI-MAX®, cellular, etc.) and may be further configured to communicate (e.g., with control target devices, a system controller, and/or other devices in the load control system) via another wireless communication channel (e.g., WI-FI®, Zigbee, Thread, etc., or a proprietary communication channel, such as CLEAR CONNECT™). The communications circuit 1408 may be in communication with control circuit 1402 for transmitting and/or receiving information.

The control circuit 1402 may also be in communication with an input circuit(s) 1406. The input circuit 1406 may include an actuator(s) (e.g., one or more buttons) and/or a sensor circuit (e.g., an occupancy sensor circuit, a daylight sensor circuit, or a temperature sensor circuit) for receiving input that may be sent to a control-target device for controlling an electrical load. For example, the control-source device may receive input from the input circuit 1406 to put the control circuit 1402 in an association mode and/or communicate association messages from the control-source device. The control circuit 1402 may receive information from the input circuit 1406 (e.g., an indication that a button has been actuated or sensed information). Each of the modules within the control-source device 1400 may be powered by a power source 1410. One will recognize that control-source device 1400 may include other, fewer, and/or additional modules.

In addition to what has been described herein, the methods and systems may also be implemented in a computer program(s), software, or firmware incorporated in one or more computer-readable media for execution by a computer(s) or processor(s), for example. Examples of computer-readable media include electronic signals (transmitted over wired or wireless connections) and tangible/non-transitory computer-readable storage media. Examples of tangible/non-transitory computer-readable storage media include, but are not limited to, a read only memory (ROM), a random-access memory (RAM), removable disks, and optical media such as CD-ROM disks, and digital versatile disks (DVDs).

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure.

What is claimed is:

1. An apparatus comprising:

a display screen;

a communications circuit;

at least one processor; and at least one memory device communicatively coupled to the at least one processor and having software instructions stored thereon that when executed by the at least one processor, direct the at least one processor to:

[receive via the communications circuit from a communications network information communicated by a controller, wherein the controller is configured to communicate with a lighting control device, wherein the lighting control device is configured to control a lighting load, wherein the lighting load is configured to produce light of any of a plurality of different colors, and wherein the information comprises an indication of a color the lighting load is configured to produce;

display on the display screen a graphical user interface that comprises an on-off actuator to turn the lighting load on and off; and]

display [together with the on-off actuator in the] *on the display screen a* graphical user interface *that comprises a first color control interface configured to enable control of light produced by a lighting load within a first plurality of colors, an actuator configured to cause the graphical user interface to display a second color control interface configured to enable control of the light produced by the lighting load within a second plurality of colors, and* a color indicator that indicates the color the lighting load is *currently* configured to produce*, wherein the color indicator is displayed as having a first size in the graphical user interface;*

*detect, on the first color control interface, a selection of a color from within the first plurality of colors;*

*display the selected color from within the first plurality of colors on the color indicator at an increased second size responsive to the selection of the color on the first color control interface;*

*subsequent to the increase of the color indicator to the second size, decrease within the graphical user interface the color indicator from the second size to the first size;*

*communicate a message via the communications circuit to control the lighting load to the selected color from within the first plurality of colors responsive to the selection of the color on the first color control interface;*

*detect a selection of the actuator configured to cause the graphical user interface to display the second color control interface; and*

*remove the first color control interface from the graphical user interface and display the second color control interface along with the color indicator responsive to the selection of the actuator at the first size,*

*wherein the at least one processor is further configured to:*

*continue to display the selected color from within the first plurality of colors on the color indicator at the first size while the second color control interface is displayed and until selection of a color on the second color control interface is detected.*

2. The apparatus of claim 1, wherein the instructions, when executed by the at least one processor, further direct the at least one processor to:

detect an actuation of [the] *an* on-off actuator to turn the lighting load off; and responsive to detecting the actuation of the on-off actuator to turn the lighting load off, remove from the graphical user interface the color indicator.

3. The apparatus of claim 1, wherein the instructions, when executed by the at least one processor, further direct the at least one processor to:

display within the graphical user interface a dimming actuator to change an intensity level of the lighting load;

detect an actuation of the dimming actuator to change the lighting load to a new intensity level; and responsive to detecting the actuation of the dimming actuator to change the lighting load to the new intensity level, communicate a message [to the controller] *via the communications circuit* to control the lighting load to the new intensity level.

4. The apparatus of claim 3, wherein *the at least one processor being directed* to display within the graphical user interface the dimming actuator comprises *the at least one processor being further directed* to display the dimming actuator on a control line such that a position of the dimming actuator on the control line shows an intensity level of the lighting load.

5. The apparatus of claim 3, wherein the instructions, when executed by the at least one processor, further direct the at least one processor to:

display*,* within the graphical user interface*, the second color control interface* [a pallet together with the dimming actuator, wherein the pallet enable selection of a color;

detect a selected color on the pallet; and responsive to detecting the selected color on the pallet, communicate a message to the controller to control the lighting load to the selected color].

[6. The apparatus of claim 5, wherein the instructions, when executed by the at least one processor, further direct the at least one processor to:

display within the graphical user interface the color indicator together with the dimming actuator and the pallet; and responsive to detecting the selected color on the pallet, change the color indicator to indicate the selected color.]

[7. The apparatus of claim 6, wherein the instructions, when executed by the at least one processor, further direct the at least one processor to:

prior to detecting the selected color on the pallet, display the color indicator as having a first size in the graphical user interface; and responsive to detecting the selected color on the pallet, increase within the graphical user interface a size of the color indicator to a second size that is greater than the first size.]

[8. The apparatus of claim 7, wherein the instructions, when executed by the at least one processor, further direct the at least one processor to:

subsequent to increasing the size of the indicator to the second size, decrease within the graphical user interface the size of the color indicator from the second size to the first size.]

9. The apparatus of claim 5, wherein the lighting load comprises a plurality of light emitting diodes (LEDs) including a white or a substantially white LED; and wherein the instructions, when executed by the at least one processor, further direct the at least one processor to:

display a vibrancy actuator;

detect an actuation of the vibrancy actuator; and responsive to detecting the actuation of the vibrancy actuator, communicate a message [to the controller] *via the communications circuit* to control the lighting load to reduce an intensity of the white or the substantially white LED while continuing to produce the color the lighting load is configured to produce.

10. The apparatus of claim 9, subsequent to detecting the actuation of the vibrancy actuator, detect a further actuation of the vibrancy actuator; and responsive to detecting the further actuation of the vibrancy actuator, communicate a message [to the controller] *via the communications circuit* to control the lighting load to increase the intensity of the white or the substantially white LED while continuing to produce the color the lighting load is configured to produce.

11. The apparatus of claim 5, wherein the [pallet] *first color control interface* enables selection of a color only along a black body curve.

12. The apparatus of claim [5] *11*, wherein the lighting load comprises a plurality of light emitting diodes (LEDs) of a plurality of different colors; and wherein the [pallet] *second color control interface* enables selection of a color within *a* color gamut formed by the plurality of different colored LEDs.

13. The apparatus of claim [1] *12*, wherein the instructions, when executed by the at least one processor, further direct the at least one processor to:

display within the graphical user interface [a dimming actuator to change an intensity of the lighting load,] a warm-cool actuator to configure the lighting load to produce a color on a black body curve, and *wherein the actuator comprises* a full-color actuator to configure the lighting load to produce a color within [a] *the* color gamut comprising additional colors not found on the black body curve.

[14. The apparatus of claim 13, wherein the instructions, when executed by the at least one processor, further direct the at least one processor to:

detect an actuation of the dimming actuator to change the lighting load to a new intensity level; and responsive to detecting the actuation of the dimming actuator by the user to change the lighting load to the new intensity level, communicate a message to the controller to control the lighting load to the new intensity level.]

15. The apparatus of claim 13, wherein the instructions, when executed by the at least one processor, further direct the at least one processor to:

detect an actuation of the warm-cool actuator;

responsive to detecting the actuation of the warm-cool actuator, display on the display screen [a pallet] *the first color control interface* together with the dimming actuator, wherein the [pallet] *first color control interface* enables selection of a color on the black body curve;

detect a selected color on the [pallet] *first color control interface*; and responsive to detecting the selected color on the [pallet] *first color control interface*, communicate *via the communications circuit* a message [to the controller] to control the lighting load to the selected color.

16. The apparatus of claim [15] *1*, wherein the instructions, when executed by the at least one processor[, further direct] *directing* the at least one processor to[:

prior to detecting the selected color on the pallet,] display in the graphical user interface the *second* color *control interface along with the color indicator comprises the at least one processor being further configured to display the color* indicator as indicating a first color and having [a] *the* first size; and

*wherein the instructions, when executed by the at least one processor, further direct the at least one processor to:*

*detect on the second color control interface a selection of a color from within the second plurality of colors; and* responsive to detecting the selected color [on the pallet, change within the graphical user interface the color indicator from indicating the first color to indicate] *from within the second plurality of colors on the second color control interface, display within the graphical user interface* the selected color *from within the second plurality of colors*, and increase within the graphical user interface [a size of] the color indicator to [a] *the* second size that is greater than the first size.

17. The apparatus of claim [13] *1*, wherein the instructions, when executed by the at least one processor, further direct the at least one processor to:

[detect an actuation of the full-color actuator;

responsive to detecting the actuation of the full-color actuator, display on the display screen a pallet together with the dimming actuator, wherein the pallet enables selection of a color on the color gamut;]

detect [a selected color] on the [pallet] *second color control interface a selection of a color from within the second plurality of colors*; and responsive to detecting the selected color *from within the second plurality of colors* on the [pallet] *second color control interface*, communicate a message [to the controller] *via the communications circuit* to control the lighting load to the selected color *from within the second plurality of colors*.

18. The apparatus of claim 17, wherein the instructions, when executed by the at least one processor, further direct the at least one processor to:

prior to detecting the selected color *from within the second plurality of colors* on the [pallet] *second color control interface*, display in the graphical user interface the color indicator as indicating a first color and having [a] *the* first size; and responsive to detecting the selected color *from within the second plurality of colors* on the [pallet] *second color control interface*, [change] *display* within the graphical user interface [the color indicator from indicating first color to indicate] the selected color *from within the second plurality of colors*, and increase within the graphical user interface [a size of] the color indicator to [a] *the* second size [that is greater than the first size].

19. The apparatus of claim 13, wherein the lighting load comprises a plurality of light emitting diodes (LEDs); and wherein the instructions, when executed by the at least one processor, further direct the at least one processor to:

display a vibrancy actuator together with the dimming actuator, the warm-cool actuator, and the full-color actuator;

detect an actuation of the vibrancy actuator; and responsive to detecting the actuation of the vibrancy actuator, communicate a message [to the controller] *via the communications circuit* to control the lighting load to reduce an intensity of at least one of the plurality of LEDs while continuing to produce the color the lighting load is configured to produce.

20. The apparatus of claim 19, subsequent to detecting the actuation of the vibrancy actuator, detect a further actuation of the vibrancy actuator; and responsive to detecting the further actuation of the vibrancy actuator, communicate a message [to the controller] *via the communications circuit* to control the lighting load to increase an intensity of at least one of the plurality of LEDs while continuing to produce the color the lighting load is configured to produce.

21. The apparatus of claim 1, wherein the instructions, when executed by the at least one processor, further direct the at least one processor to:

display within the graphical user interface a [pallet] *third color control interface* together with the color indicator, wherein the [pallet] *third color control interface* enables selection of a color;

detect, *on the third control interface,* a [selected] *selection of a third* color [on the pallet]; and responsive to detecting, *on the third color control interface,* the [selected] *selection of the third* color [on the pallet], communicate a message [to the controller] *via the communications circuit* to control the lighting load to the [selected] *third* color.

22. The apparatus of claim 21, wherein the instructions, when executed by the at least one processor, further direct the at least one processor to:

responsive to detecting, *on the third color control interface,* the [selected] *selection of the third* color [on the pallet], [change] *display* within the graphical user interface the [color indicator to indicate] the selected color.

23. The apparatus of claim [21] *1*, wherein the instructions, when executed by the at least one processor, further direct the at least one processor to:

display within the graphical user interface an auto actuator that, when enabled, causes the lighting load to produce light at a color rendering index (CRI) value that is greater than or equal to a CRI value threshold; and determine that the auto actuator is enabled; and wherein to communicate the message [to the controller] *via the communications circuit* to control the lighting load to the selected color comprises to communicate the message [to the controller] *via the communications circuit* to control the lighting load to the selected color and to further control the lighting load, based on the auto actuator being enabled, to a color rendering index [(CRI)] value that is greater than or equal to the CRI value threshold.

24. The apparatus of claim 23, wherein the instructions, when executed by the at least one processor, further direct the at least one processor to:

determine that the auto actuator is disabled;

responsive to determining that the auto actuator is disabled, display within the graphical user interface a vibrancy actuator to change a vibrancy level of the lighting load;

detect an actuation of the vibrancy actuator to change the lighting load to a new vibrancy level; and responsive to detecting the actuation of the vibrancy actuator to change the lighting load to the new vibrancy level, communicate a message [to the controller] *via the communications circuit* to control the lighting load to the new vibrancy level.

25. A non-transitory tangible computer readable medium having instructions stored thereon that when executed by at least one processor direct the at least one processor to:

[receive via a communications circuit from a communications network information communicated by a controller, wherein the controller is configured to communicate with a lighting control device, wherein the lighting control device is configured to control a lighting load, wherein the lighting load is configured to produce light of any of a plurality of different colors, and wherein the information comprises an indication of a color the lighting load is configured to produce;

display on a display screen a graphical user interface that comprises an on-off actuator to turn the lighting load on and off; and]

display [together with the on-off actuator in the] *on a display screen a* graphical user interface *that comprises a first color control interface configured to enable control of light produced by a lighting load within a first plurality of colors, an actuator configured to cause the graphical user interface to display a second color control interface configured to enable control of the light produced by the lighting load within a second plurality of colors, and* a color indicator that indicates the color the lighting load is *currently* configured to produce, *wherein the color indicator is displayed as having a first size in the graphical user interface;*

*detect, on the first color control interface, a selection of a color from within the first plurality of colors;*

*display the selected color from within the first plurality of colors on the color indicator at an increased second size responsive to the selection of the color on the first color control interface;*

*subsequent to the increase of the color indicator to the second size, decrease within the graphical user interface the color indicator from the second size to the first size;*

*communicate a message via the communications circuit to control the lighting load to the selected color from within the first plurality of colors responsive to the selection of the color on the first color control interface;*

*detect a selection of the actuator configured to cause the graphical user interface to display the second color control interface; and*

*remove the first color control interface from the graphical user interface and display the second color control interface along with the color indicator responsive to the selection of the actuator at the first size,*

*wherein the instructions stored thereon, when executed, further direct the at least one processor to:*

*continue to display the selected color from within the first plurality of colors on the color indicator at the first size while the second color control interface is displayed and until selection of a color on the second color control interface is detected.*

26. A method comprising:

[receiving by at least one processor via a communications circuit from a communications network information communicated by a controller, wherein the controller is configured to communicate with a lighting control device, wherein the lighting control device is configured to control a lighting load, wherein the lighting load is configured to produce light of any of a plurality of different colors, and wherein the information comprises an indication of a color the lighting load is configured to produce;

displaying by the at least one processor on a display screen a graphical user interface that comprises an on-off actuator to turn the lighting load on and off; and]

displaying [by the at least one processor together with the on-off actuator in the] *a* graphical user interface *that comprises a first color control interface configured to enable control of light produced by a lighting load within a first plurality of colors, an actuator configured to cause the graphical user interface to display a second color control interface configured to enable control of the light produced by the lighting load within a second plurality of colors, and* a color indicator that indicates the color the lighting load is *currently* configured to produce, *wherein the color indicator is displayed as having a first size in the graphical user interface;*

*detecting, on the first color control interface, a selection of a color from within the first plurality of colors;*

*displaying the selected color from within the first plurality of colors on the color indicator at an increased second size responsive to the selection of the color on the first color control interface;*

*subsequent to the increase of the color indicator to the second size, decreasing within the graphical user interface the color indicator from the second size to the first size;*

*communicating a message via the communications circuit to control the lighting load to the selected color from within the first plurality of colors responsive to the selection of the color on the first color control interface;*

*detecting a selection of the actuator configured to cause the graphical user interface to display the second color control interface; and*

*removing the first color control interface from the graphical user interface and displaying the second color control interface along with the color indicator responsive to the selection of the actuator at the first size,*

*wherein the method further comprises:*

*continuing to display the selected color from within the first plurality of colors on the color indicator at the first size while the second color control interface is displayed and until selection of a color on the second color control interface is detected.*

27. The non-transitory tangible computer readable medium of claim 25, wherein the instructions, when executed by the at least one processor, further direct the at least one processor to:

detect an actuation of [the] *an* on-off actuator to turn the lighting load off; and responsive to detecting the actuation of the on-off actuator to turn the lighting load off, remove from the graphical user interface the color indicator.

28. The non-transitory tangible computer readable medium of claim 25, wherein the instructions, when executed by the at least one processor, further direct the at least one processor to:

display within the graphical user interface a dimming actuator to change an intensity level of the lighting load;

detect an actuation of the dimming actuator to change the lighting load to a new intensity level; and responsive to detecting the actuation of the dimming actuator to change the lighting load to the new intensity level, communicate a message [to the controller] *via the communications circuit* to control the lighting load to the new intensity level.

29. The non-transitory tangible computer readable medium of claim 28, wherein the instructions, when executed by the at least one processor, further direct the at least one processor to:

display, within the graphical user interface [a pallet], *the second color control interface* together with the dimming actuator[, wherein the pallet enable selection of a color];

detect a selected color on the [pallet] *second color control interface*; and responsive to detecting the selected color on the [pallet] *second color control interface*, communicate a message [to the controller] *via the communications circuit* to control the lighting load to the selected color.

[30. The non-transitory tangible computer readable medium of claim 29, wherein the instructions, when executed by the at least one processor, further direct the at least one processor to:

display within the graphical user interface the color indicator together with the dimming actuator and the pallet; and responsive to detecting the selected color on the pallet, change the color indicator to indicate the selected color.]

[31. The non-transitory tangible computer readable medium of claim 30, wherein the instructions, when executed by the at least one processor, further direct the at least one processor to:

prior to detecting the selected color on the pallet, display the color indicator as having a first size in the graphical user interface;

responsive to detecting the selected color on the pallet, increase within the graphical user interface a size of the color indicator to a second size that is greater than the first size; and subsequent to increasing the size of the indicator to the second size, decrease within the graphical user interface the size of the color indicator from the second size to the first size.]

32. The non-transitory tangible computer readable medium of claim 29, wherein the lighting load comprises a plurality of light emitting diodes (LEDs) including a white or a substantially white LED; and wherein the instructions, when executed by the at least one processor, further direct the at least one processor to:

display a vibrancy actuator;

detect an actuation of the vibrancy actuator; and responsive to detecting the actuation of the vibrancy actuator, communicate a message [to the controller] *via the communications circuit* to control the lighting load to reduce an intensity of the white or the substantially white LED while continuing to produce the color the lighting load is configured to produce.

33. The non-transitory tangible computer readable medium of claim 29, wherein the lighting load comprises a plurality of light emitting diodes (LEDs) of a plurality of different colors; and wherein the [pallet] *first color control interface* enables selection of a color only along a black body curve [or], *and wherein the second color control interface* enables selection of a color within *a* color gamut formed by the plurality of different colored LEDs.

34. The non-transitory tangible computer readable medium of claim 25, wherein the instructions, when executed by the at least one processor, further direct the at least one processor to:

display within the graphical user interface a dimming actuator to change an intensity of the lighting load, a warm-cool actuator to configure the lighting load to produce a color on a black body curve, and *wherein the actuator comprises* a full-color actuator to configure the lighting load to produce a color within a color gamut comprising additional colors not found on the black body curve.

35. The non-transitory tangible computer readable medium of claim 34, wherein the instructions, when executed by the at least one processor, further direct the at least one processor to:

detect an actuation of the warm-cool actuator;

responsive to detecting the actuation of the warm-cool actuator, display on the display screen [a pallet] *the first color control interface* together with the dimming actuator, wherein the [pallet] *first color control interface* enables selection of a color on the black body curve;

detect a selected color on the [pallet] *first color control interface*; and responsive to detecting the selected color on the [pallet] *first color control interface*, communicate *via the communications circuit* a message [to the controller] to control the lighting load to the selected color.

36. The non-transitory tangible computer readable medium of claim 35, wherein the instructions, when executed by the at least one processor, further direct the at least one processor to:

[prior to detecting the selected color on the pallet,] display in the graphical user interface the color indicator as indicating a first color and having [a] *the* first size;

*detect on the second color control interface a selection of a color from within the second plurality of colors;* and responsive to detecting the selected color *from within the second plurality of colors* on the [pallet] *second color control interface*, [change] *display* within the graphical user interface [the color indicator from indicating the first color to indicate] the selected color *from within the second plurality of colors*, and increase within the graphical user interface [a size of] the color indicator to [a] *the* second size [that is greater than the first size].

37. The non-transitory tangible computer readable medium of claim [34] *25*, wherein the instructions, when executed by the at least one processor, further direct the at least one processor to:

[detect an actuation of the full-color actuator;

responsive to detecting the actuation of the full-color actuator, display on the display screen a pallet together with the dimming actuator, wherein the pallet enables selection of a color on the color gamut;]

detect [a selected color] *the selection of the color from within the second plurality of colors* on the [pallet] *second color control interface*; and responsive to detecting the selected color [on the pallet] *from within the second plurality of colors*, communicate a message [to the controller] *via the communications circuit* to control the lighting load to the selected color *from within the second plurality of colors*.

38. The non-transitory tangible computer readable medium of claim [37] *25*, wherein the instructions, when executed by the at least one processor, further direct the at least one processor to:

prior to detecting the selected color *from within the second plurality of colors* on the [pallet] *second color control interface*, display in the graphical user interface the color indicator as indicating a first color and having [a] *the* first size; and responsive to detecting the selected color *from within the second plurality of colors* on the [pallet] *second color control interface*, [change] *display* within the graphical user interface [the color indicator from indicating first color to indicate] the selected color *from within the second plurality of colors*, and increase within the graphical user interface [a size of] the color indicator to [a] *the* second size [that is greater than the first size].

39. The non-transitory tangible computer readable medium of claim 34, wherein the lighting load comprises a plurality of light emitting diodes (LEDs); and wherein the instructions, when executed by the at least one processor, further direct the at least one processor to:

display a vibrancy actuator together with the dimming actuator, the warm-cool actuator, and the full-color actuator;

detect an actuation of the vibrancy actuator; and responsive to detecting the actuation of the vibrancy actuator, communicate a message [to the controller] *via the communications circuit* to control the lighting load to reduce an intensity of at least one of the plurality of LEDs while continuing to produce the color the lighting load is configured to produce.

40. The non-transitory tangible computer readable medium of claim 25, wherein the instructions, when executed by the at least one processor, further direct the at least one processor to:

[display within the graphical user interface a pallet together with the color indicator, wherein the pallet enables selection of a color;]

detect a selected color *from within the second plurality of colors* on the [pallet] *second color control interface*; and responsive to detecting the selected color *from within the second plurality of colors* on the [pallet] *second color control interface*:

communicate a message [to the controller] *via the communications circuit* to control the lighting load to the selected color; and

[change] *display* within the graphical user interface [the color indicator to indicate] the selected color *from within the second plurality of colors*.

41. The non-transitory tangible computer readable medium of claim [40] *25*, wherein the instructions, when executed by the at least one processor, further direct the at least one processor to:

display within the graphical user interface an auto actuator that, when enabled, causes the lighting load to produce light at a color rendering index (CRI) value that is greater than or equal to a CRI value threshold; and determine that the auto actuator is enabled; and wherein to communicate the message [to the controller] *via the communications circuit* to control the lighting load to the selected color comprises to communicate the message [to the controller] *via the communications circuit* to control the lighting load to the selected color and to further control the lighting load, based on the auto actuator being enabled, to a color rendering index [(CRI)] value that is greater than or equal to the CRI value threshold.

42. The non-transitory tangible computer readable medium of claim 41, wherein the instructions, when executed by the at least one processor, further direct the at least one processor to:

determine that the auto actuator is disabled;

responsive to determining that the auto actuator is disabled, display within the graphical user interface a vibrancy actuator to change a vibrancy level of the lighting load;

detect an actuation of the vibrancy actuator to change the lighting load to a new vibrancy level; and responsive to detecting the actuation of the vibrancy actuator to change the lighting load to the new vibrancy level, communicate a message [to the controller] *via the communications circuit* to control the lighting load to the new vibrancy level.

43. The method of claim 26, further comprising:

detecting [by the at least one processor] an actuation of [the] *an* on-off actuator to turn the lighting load off; and responsive to detecting the actuation of the on-off actuator to turn the lighting load off, removing [by the at least one processor] from the graphical user interface the color indicator.

44. The method of claim 26, further comprising:

displaying [by the at least one processor] within the graphical user interface a dimming actuator to change an intensity level of the lighting load;

detecting [by the at least one processor] an actuation of the dimming actuator to change the lighting load to a new intensity level; and responsive to detecting the actuation of the dimming actuator to change the lighting load to the new intensity level, communicating [by the at least one processor] a message [to the controller] to control the lighting load to the new intensity level.

45. The method of claim 44, further comprising:

displaying [by the at least one processor] within the graphical user interface [a pallet] *the second color control interface* together with the dimming actuator[, wherein the pallet enable selection of a color;

detecting by the at least one processor a selected color on the pallet; and responsive to detecting the selected color on the pallet, communicating by the at least one processor a message to the controller to control the lighting load to the selected color].

[46. The method of claim 45, further comprising:

displaying by the at least one processor within the graphical user interface the color indicator together with the dimming actuator and the pallet; and responsive to detecting the selected color on the pallet, changing by the at least one processor the color indicator to indicate the selected color.]

47. The method of claim 45, wherein the lighting load comprises a plurality of light emitting diodes (LEDs) including a white or a substantially white LED; and wherein the method further comprises:

displaying [by the at least one processor] a vibrancy actuator;

detecting [by the at least one processor] an actuation of the vibrancy actuator; and responsive to detecting the actuation of the vibrancy actuator, communicating [by the at least one processor] a message [to the controller] to control the lighting load to reduce an intensity of the white or the substantially white LED while continuing to produce the color the lighting load is configured to produce.

48. The method of claim 45, wherein the lighting load comprises a plurality of light emitting diodes (LEDs) of a plurality of different colors; and wherein the [pallet] *first color control interface* enables selection of a color only along a black body curve [or], *and wherein the second color control interface* enables selection of a color within *a* color gamut formed by the plurality of different colored LEDs.

49. The method of claim 26, further comprising:

displaying [by the at least one processor] within the graphical user interface a dimming actuator to change an intensity of the lighting load, a warm-cool actuator to configure the lighting load to produce a color on a black body curve, and *wherein the actuator comprises* a full-color actuator to configure the lighting load to produce a color within a color gamut comprising additional colors not found on the black body curve.

50. The method of claim [49] *26*, further comprising:

detecting [by the at least one processor] an actuation of the warm-cool actuator;

responsive to detecting the actuation of the warm-cool actuator, displaying [by the at least one processor] on the display screen [a pallet] *the first color control interface* together with the dimming actuator, wherein the [pallet] *first color control interface* enables selection of a color on the black body curve;

detecting [by the at least one processor] a selected color on the [pallet] *first color control interface*; and responsive to detecting the selected color on the [pallet] *first color control interface*, communicating [by the at least one processor] a message [to the controller] to control the lighting load to the selected color.

51. The method of claim [49 ]*26*, further comprising:

detecting [by the at least one processor] an actuation of the full-color actuator;

responsive to detecting the actuation of the full-color actuator, displaying [by the at least one processor] on the display screen [a pallet] the second color control interface together with the dimming actuator, wherein the [pallet] *second color control interface* enables selection of a color on the color gamut;

detecting [by the at least one processor] a selected color on the [pallet] *second color control interface*; and responsive to detecting the selected color on the [pallet] *second color control interface*, communicating [by the at least one processor] a message [to the controller] to control the lighting load to the selected color.

52. The method of claim 49, wherein the lighting load comprises a plurality of light emitting diodes (LEDs); and wherein the method further comprises:

displaying [by the at least one processor] a vibrancy actuator together with the dimming actuator, the warm-cool actuator, and the full-color actuator;

detecting [by the at least one processor] an actuation of the vibrancy actuator; and responsive to detecting the actuation of the vibrancy actuator, communicating [by the at least one processor] a message [to the controller] to control the lighting load to reduce an intensity of at least one of the plurality of LEDs while continuing to produce the color the lighting load is configured to produce.

53. The method of claim 26, further comprising:

[displaying by the at least one processor within the graphical user interface a pallet together with the color indicator, wherein the pallet enables selection of a color;]

detecting [by the at least one processor] a selected color on the [pallet] *second color control interface*; and responsive to detecting the selected color on the [pallet] *second color control interface*:

communicating [by the at least one processor] a message [to the controller] to control the lighting load to the selected color; and changing [by the at least one processor] within the graphical user interface the color indicator to indicate the selected color.

54. The method of claim 53, further comprising:

displaying [by the at least one processor] within the graphical user interface an auto actuator that, when enabled, causes the lighting load to produce light at a color rendering index (CRI) value that is greater than or equal to a CRI value threshold; and determining [by the at least one processor] that the auto actuator is enabled; and wherein communicating the message [to the controller] to control the lighting load to the selected color comprises communicating the message [to the controller] to control the lighting load to the selected color and to further control the lighting load, based on the auto actuator being enabled, to a color rendering index [(CRI)] value that is greater than or equal to the CRI value threshold.

55. The method of claim 54, further comprising:

determining [by the at least one processor] that the auto actuator is disabled;

responsive to determining that the auto actuator is disabled, displaying [by the at least one processor] within the graphical user interface a vibrancy actuator to change a vibrancy level of the lighting load;

detecting [by the at least one processor] an actuation of the vibrancy actuator to change the lighting load to a new vibrancy level; and responsive to detecting the actuation of the vibrancy actuator to change the lighting load to the new vibrancy level, communicating [by the at least one processor] a message [to the controller] to control the lighting load to the new vibrancy level.

*56. The apparatus of claim 1, wherein the instructions, when executed by the at least one processor, further direct the at least one processor to:*

*display on the display screen a graphical user interface that comprises an on-off actuator to turn the lighting load on and off;*

*detect an actuation of an on-off actuator to turn the lighting load off; and*

*responsive to detecting the actuation of the on-off actuator to turn the lighting load off, remove from the graphical user interface the color indicator.*

*57. The non-transitory tangible computer readable medium of claim 25, wherein the instructions, when executed by at least one processor, further direct the at least one processor to:*

*display a graphical user interface that comprises an on-off actuator to turn the lighting load on and off*

*detect an actuation of an on-off actuator to turn the lighting load off; and*

*responsive to detecting the actuation of the on-off actuator to turn the lighting load off, remove from the graphical user interface the color indicator.*

*58. The method of claim 26, further comprising:*

*displaying a graphical user interface that comprises an on-off actuator to turn the lighting load on and off*

*detecting an actuation of an on-off actuator to turn the lighting load off; and*

*responsive to detecting the actuation of the on-off actuator to turn the lighting load off, removing from the graphical user interface the color indicator.*

*59. A load control system comprising:*

*a lighting control device, wherein the lighting control device is configured to control a lighting load, and wherein the lighting load is configured to produce light of any of a plurality of different colors; and*

*an apparatus comprising:*

*a display screen;*

*a communications circuit*

*at least one processor; and*

*at least one memory device communicatively coupled to the at least one processor and having software instructions stored thereon that when executed by the at least one processor, direct the at least one processor to:*

*display on the display screen a graphical user interface that comprises a first color control interface configured to enable control of light produced by the lighting load within a first plurality of colors, an actuator configured to cause the graphical user interface to display a second color control interface configured to enable control of the light produced by the lighting load within a second plurality of colors, and a color indicator that indicates the color the lighting load is currently configured to produce, wherein the color indicator is displayed as having a first size in the graphical user interface;*

*receive on the first color control interface a selection of a color from within the first plurality of colors;*

*display the selected color from within the first plurality of colors on the color indicator at an increased second size responsive to the selection on the first color control interface;*

*subsequent to the increase of the color indicator to the second size, decrease within the graphical user interface the color indicator from the second size to the first size;*

*communicate a message via the communications circuit to control the lighting load to the selected color from within the first plurality of colors responsive to the selection of the color on the first color control interface;*

*receive a selection of the actuator configured to cause the graphical user interface to display the second color control interface; and*

*display the second color control interface along with the color indicator responsive to the selection of the actuator at the first size,*

*wherein the instructions, when executed by the at least one processor, further direct the at least one processor to:*

*cause the color indicator to continue to display, at the first size, the color from within the first plurality of colors being produced by the lighting load in response to the selection on the first color control interface while the second color control interface is being displayed for allowing for selection of a color within the second plurality of colors.*

*60. The load control system of claim 59, wherein the instructions, when executed by the at least one processor of the apparatus, further direct the at least one processor to:*

*detect an actuation of an on-off actuator to turn the lighting load off; and*

*responsive to detecting the actuation of the on-off actuator to turn the lighting load off, remove from the graphical user interface the color indicator.*

*61. The load control system of claim 59, further comprising a controller, wherein the controller is configured to communicate with the lighting control device to enable control of the lighting load.*

*62. The load control system of claim 60, wherein the instructions, when executed by the at least one processor, further direct the at least one processor to display within the graphical user interface the second control interface together with the dimming actuator.*

* * * * *